US012602635B2

(12) United States Patent
Simpson

(10) Patent No.: US 12,602,635 B2
(45) Date of Patent: Apr. 14, 2026

(54) METHOD AND SYSTEM FOR UTILIZING ONE OR MORE TOOL APPLIANCE UNITS

(71) Applicant: CirclesX LLC, Houston, TX (US)

(72) Inventor: Erik Mowery Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 227 days.

(21) Appl. No.: 17/510,318

(22) Filed: Oct. 25, 2021

(65) Prior Publication Data

US 2022/0044177 A1 Feb. 10, 2022

Related U.S. Application Data

(63) Continuation-in-part of application No. 17/493,455, filed on Oct. 4, 2021, and a continuation-in-part of
(Continued)

(51) Int. Cl.
*G06Q 10/0631* (2023.01)
*G06Q 50/00* (2024.01)

(52) U.S. Cl.
CPC ....... *G06Q 10/06315* (2013.01); *G06Q 50/01* (2013.01)

(58) Field of Classification Search
CPC ............... G06Q 101/02; G06Q 50/265; G06Q 10/08355; G06Q 30/08; G06Q 10/06315; G06Q 50/01; G06Q 30/108; G06Q 50/30; G06Q 2240/00; G06Q 2220/00; G06Q 20/065; G06Q 30/06; G06Q 40/02; G06Q 10/0834; G06Q 10/103; G06Q 20/027;

G06Q 40/06; G01C 21/3438; G01C 21/3423; G01C 21/343; G01C 21/3605; G06F 2212/173; G06F 21/64;
(Continued)

(56) References Cited

U.S. PATENT DOCUMENTS 1,008,279 A 11/1911 Leuthesser
D209,710 S 12/1967 Bruce
(Continued)

FOREIGN PATENT DOCUMENTS

CN 107341968 A 11/2017
JP 2003177034 A 12/2001
(Continued)

OTHER PUBLICATIONS

PCT International Search Report and Written Opinion; PCT/US2022/027077; Nov. 1, 2022.
(Continued)

*Primary Examiner* — Avia Salman
(74) *Attorney, Agent, or Firm* — Pramudji Law Group PLLC; Ari Pramudji

(57) ABSTRACT

Implementations of various methods and systems to transform tool and appliance units with two waypoints or a destination waypoint or a series sequence of waypoints into objects which have associated price-time priority queues for transformed tool and appliance units. The present disclosed invention relates to combining the concepts of objected oriented programming, market price queues, tool and appliance, navigation systems and social networking and transportation as a fungible asset class or tool and appliance linked to transportation as an open market.

20 Claims, 50 Drawing Sheets

Related U.S. Application Data application No. 17/493,432, filed on Oct. 4, 2021, now Pat. No. 12,020,532, and a continuation of application No. 16/293,712, filed on Mar. 6, 2019, now Pat. No. 11,157,852, said application No. 17/493,455 is a continuation of application No. 16/290,278, filed on Mar. 1, 2019, now Pat. No. 11,138,661, application No. 17/510,318 is a continuation-in-part of application No. 16/274,490, filed on Feb. 13, 2019, now Pat. No. 11,215,466, which is a continuation-in-part of application No. 16/258,658, filed on Jan. 27, 2019, now Pat. No. 11,035,682, application No. 17/510,318 is a continuation-in-part of application No. 16/257,032, filed on Jan. 24, 2019, now abandoned, and a continuation-in-part of application No. 16/242,967, filed on Jan. 8, 2019, now Pat. No. 12,001,999, and a continuation-in-part of application No. 16/242,981, filed on Jan. 8, 2019, now abandoned, and a continuation-in-part of application No. 16/239,485, filed on Jan. 3, 2019, and a continuation-in-part of application No. 16/183,647, filed on Nov. 7, 2018, now Pat. No. 11,861,527, and a continuation-in-part of application No. 16/167,525, filed on Oct. 22, 2018, now Pat. No. 11,810,023, and a continuation-in-part of application No. 15/877,393, filed on Jan. 23, 2018, now Pat. No. 12,124,976, and a continuation-in-part of application No. 15/484,059, filed on Apr. 10, 2017, now Pat. No. 12,039,585, said application No. 17/493,432 is a continuation of application No. 15/266,326, filed on Sep. 15, 2016, now Pat. No. 11,138,827.

(58) Field of Classification Search
CPC ............ G06F 16/2365; G06F 16/2379; G06F 16/9535; G06F 16/9537; G06F 21/10; G16Y 10/40; G21Y 2202/305; H04H 20/62; H04L 2012/402; H04L 2209/56; H04L 2463/102; H04L 63/126; H04L 9/0894; H04L 9/3239; H04L 9/50; H04L 63/02; H04L 63/0414; H04L 63/0428; H04L 63/08; H04L 63/0823; H04L 63/083; H04L 67/5682; H04L 67/5683; H04L 69/329; H04L 9/3236; G06K 9/00221; G02F 1/1333; G09F 9/30; E06B 3/481; E06B 7/16; E05D 15/264; E05D 15/30; E05Y 2201/684; E05Y 2201/686; E05Y 2201/688; E05Y 2800/12; G06N 20/00; G06N 3/006; G06N 7/01; Y02P 90/80; H04M 115/805
USPC ...................................................... 705/7.25
See application file for complete search history.

(56) References Cited

U.S. PATENT DOCUMENTS

| | | | |
|---|---|---|---|
| D318,073 S | 7/1991 | Jang | |
| 5,249,259 A | 9/1993 | Harvey | |
| 5,751,245 A | 5/1998 | Janky et al. | |
| 5,948,040 A * | 9/1999 | DeLorme .............. | G06Q 10/02 |
| | | | 701/426 |
| 6,240,396 B1 | 5/2001 | Walker et al. | |
| D453,945 S | 2/2002 | Shan | |
| 6,400,996 B1 | 6/2002 | Hoffberg | |
| D460,952 S | 7/2002 | Kataoka | |
| D468,738 S | 1/2003 | Lin | |
| D469,089 S | 1/2003 | Lin | |
| 7,010,472 B1 | 3/2006 | Vasey-Glandon et al. | |

| | | | |
|---|---|---|---|
| D590,396 S | 4/2009 | Lo | |
| 7,584,123 B1 | 9/2009 | Karonis et al. | |
| D628,171 S | 11/2010 | Hakopian | |
| D638,879 S | 5/2011 | Suto | |
| 8,065,191 B2 | 11/2011 | Senior | |
| D650,385 S | 12/2011 | Chiu | |
| 9,213,957 B2 | 12/2015 | Stefik et al. | |
| 9,274,540 B2 | 3/2016 | Anglin et al. | |
| 9,292,764 B2 | 3/2016 | Yun et al. | |
| 9,436,923 B1 | 9/2016 | Sriram et al. | |
| 9,450,817 B1 | 9/2016 | Bahadur et al. | |
| D772,828 S | 11/2016 | Kusumoto | |
| 9,665,983 B2 | 5/2017 | Spivack | |
| 9,952,042 B2 | 4/2018 | Abovitz et al. | |
| D832,355 S | 10/2018 | Castro | |
| 10,216,367 B1 | 2/2019 | Patel | |
| 10,395,332 B1 | 8/2019 | Konrardy et al. | |
| 10,403,050 B1 | 9/2019 | Beall et al. | |
| 10,408,489 B1 | 9/2019 | Trishaun et al. | |
| 10,452,978 B2 | 10/2019 | Shazeer et al. | |
| 10,533,850 B2 | 1/2020 | Abovitz et al. | |
| 10,737,585 B2 | 8/2020 | Chaudhary et al. | |
| D896,315 S | 9/2020 | Castro | |
| 10,832,337 B1 | 11/2020 | Floyd et al. | |
| D903,657 S | 12/2020 | Catania | |
| D903,658 S | 12/2020 | Catania | |
| D903,659 S | 12/2020 | Catania | |
| 10,872,381 B1 | 12/2020 | Leise et al. | |
| D910,758 S | 2/2021 | Leong | |
| 11,138,827 B2 | 10/2021 | Simpson | |
| 11,183,080 B2 | 11/2021 | Wolf et al. | |
| D938,375 S | 12/2021 | Zhang | |
| 11,288,563 B2 | 3/2022 | Lee et al. | |
| 11,296,897 B2 | 4/2022 | Endress et al. | |
| 11,298,017 B2 | 4/2022 | Tran | |
| 11,298,591 B2 | 4/2022 | Evancha | |
| 11,537,953 B2 | 12/2022 | Beaurepaire | |
| 11,555,709 B2 | 1/2023 | Simpson | |
| 11,586,993 B2 | 2/2023 | Handler et al. | |
| D980,210 S | 3/2023 | Wu | |
| 11,651,464 B2 | 5/2023 | Park | |
| D993,316 S | 7/2023 | Lin | |
| 11,704,219 B1 | 7/2023 | Lerner et al. | |
| 11,722,500 B2 | 8/2023 | Singh | |
| 11,734,618 B2 | 8/2023 | Ogden | |
| D1,000,137 S | 10/2023 | Shuster | |
| D1,007,451 S | 12/2023 | Im et al. | |
| D1,024,065 S | 4/2024 | Kim et al. | |
| 12,001,999 B2 | 6/2024 | Simpson | |
| 2002/0004788 A1 | 1/2002 | Gros et al. | |
| 2002/0017997 A1 | 2/2002 | Wall | |
| 2002/0065738 A1 | 5/2002 | Riggs et al. | |
| 2002/0128952 A1 | 9/2002 | Melkomaian | |
| 2003/0191725 A1 * | 10/2003 | Ratliff .................... | G06Q 30/06 |
| | | | 705/26.1 |
| 2004/0115596 A1 | 6/2004 | Snyder et al. | |
| 2004/0249742 A1 | 12/2004 | Laurent et al. | |
| 2004/0254819 A1 * | 12/2004 | Halim .................... | G06Q 10/02 |
| | | | 705/5 |
| 2005/0132070 A1 | 6/2005 | Redlich et al. | |
| 2006/0104224 A1 | 5/2006 | Singh | |
| 2006/0184321 A1 | 8/2006 | Kawakami | |
| 2007/0005224 A1 | 1/2007 | Sutardja | |
| 2007/0260723 A1 | 11/2007 | Cohen | |
| 2008/0129490 A1 | 6/2008 | Linville et al. | |
| 2008/0140557 A1 | 6/2008 | Bowlby et al. | |
| 2008/0195428 A1 | 8/2008 | O'Sullivan | |
| 2008/0195432 A1 | 8/2008 | Fell et al. | |
| 2008/0262892 A1 | 10/2008 | Prager et al. | |
| 2009/0221338 A1 | 9/2009 | Stewart | |
| 2009/0271236 A1 * | 10/2009 | Ye ........................ | G06Q 10/083 |
| | | | 705/330 |
| 2009/0309729 A1 | 12/2009 | Nichols | |
| 2010/0042421 A1 | 2/2010 | Bai et al. | |
| 2010/0042453 A1 | 2/2010 | Scaramellino et al. | |
| 2010/0081548 A1 | 4/2010 | Labedz | |
| 2010/0208029 A1 | 8/2010 | Marti | |
| 2010/0280748 A1 | 11/2010 | Mundinger et al. | |
| 2010/0306078 A1 | 12/2010 | Hwang | |

(56) References Cited

U.S. PATENT DOCUMENTS

| | | | |
|---|---|---|---|
| 2010/0318373 A1 | 12/2010 | Harris | |
| 2011/0025267 A1 | 2/2011 | Kamen et al. | |
| 2011/0059693 A1 | 3/2011 | O'Sullivan | |
| 2011/0098056 A1 | 4/2011 | Rhoads et al. | |
| 2011/0106660 A1 | 5/2011 | Ajjarapu et al. | |
| 2011/0184784 A1 | 7/2011 | Rudow | |
| 2011/0191248 A1* | 8/2011 | Bishop | G06Q 20/363 |
| | | | 705/67 |
| 2011/0202418 A1 | 8/2011 | Kempton et al. | |
| 2012/0023032 A1 | 1/2012 | Visdomini | |
| 2012/0072925 A1 | 3/2012 | Jenkins et al. | |
| 2012/0075067 A1 | 3/2012 | Attaluri | |
| 2012/0130556 A1 | 5/2012 | Marhoefer | |
| 2012/0136527 A1 | 5/2012 | McQuade | |
| 2012/0158762 A1 | 6/2012 | IwuchukWu | |
| 2012/0323645 A1* | 12/2012 | Spiegel | G06Q 10/0835 |
| | | | 705/14.1 |
| 2013/0035973 A1 | 2/2013 | Desai et al. | |
| 2013/0132261 A1 | 5/2013 | Ebersole | |
| 2013/0173326 A1 | 7/2013 | Anglin et al. | |
| 2013/0268325 A1 | 10/2013 | Dembo | |
| 2013/0275156 A1 | 10/2013 | Kinkaid et al. | |
| 2014/0032034 A1 | 1/2014 | Raptopoulos | |
| 2014/0038781 A1 | 2/2014 | Foley | |
| 2014/0052500 A1 | 2/2014 | Vallapuzha et al. | |
| 2014/0075528 A1 | 3/2014 | Matsuoka | |
| 2014/0129302 A1 | 5/2014 | Amin et al. | |
| 2014/0149157 A1 | 5/2014 | Shaam et al. | |
| 2014/0162598 A1 | 6/2014 | Villa-Real | |
| 2014/0180732 A1* | 6/2014 | Rotchin | G06Q 10/083 |
| | | | 705/5 |
| 2014/0229258 A1* | 8/2014 | Seriani | G06Q 30/08 |
| | | | 705/14.23 |
| 2014/0282586 A1 | 9/2014 | Shear et al. | |
| 2014/0310149 A1 | 10/2014 | Singh | |
| 2014/0358431 A1 | 12/2014 | Isert et al. | |
| 2015/0058051 A1 | 2/2015 | Movshovich | |
| 2015/0097864 A1 | 4/2015 | Alaniz | |
| 2015/0154516 A1* | 6/2015 | Joachim | G06Q 10/02 |
| | | | 705/5 |
| 2015/0161564 A1 | 6/2015 | Sweeney et al. | |
| 2015/0178642 A1 | 6/2015 | Abboud | |
| 2015/0198459 A1 | 7/2015 | MacNeille et al. | |
| 2015/0206443 A1 | 7/2015 | Aylesworth et al. | |
| 2015/0260474 A1 | 9/2015 | Rublowsky et al. | |
| 2015/0348282 A1* | 12/2015 | Gibbon | G06Q 50/30 |
| | | | 382/103 |
| 2016/0018969 A1 | 1/2016 | Sundarraman | |
| 2016/0026253 A1 | 1/2016 | Bradski et al. | |
| 2016/0034305 A1 | 2/2016 | Shear et al. | |
| 2016/0041628 A1 | 2/2016 | Verma | |
| 2016/0063436 A1 | 3/2016 | Coles | |
| 2016/0117657 A1 | 4/2016 | Forbes, Jr. et al. | |
| 2016/0148289 A1 | 5/2016 | Altschuler | |
| 2016/0221935 A1 | 8/2016 | Jaworska-Maslanka | |
| 2016/0253662 A1 | 9/2016 | Sriram | |
| 2016/0298977 A1 | 10/2016 | Newlin | |
| 2016/0307276 A1 | 10/2016 | Young | |
| 2016/0307288 A1 | 10/2016 | Yehuda et al. | |
| 2016/0364679 A1 | 12/2016 | Cao | |
| 2017/0039770 A1 | 2/2017 | Lanier et al. | |
| 2017/0046664 A1 | 2/2017 | Haldenby et al. | |
| 2017/0046799 A1 | 2/2017 | Chan et al. | |
| 2017/0046806 A1 | 2/2017 | Haldenby et al. | |
| 2017/0048216 A1 | 2/2017 | Chow et al. | |
| 2017/0053461 A1 | 2/2017 | Pal et al. | |
| 2017/0146360 A1 | 5/2017 | Averbuch | |
| 2017/0232300 A1 | 8/2017 | Tran et al. | |
| 2017/0293881 A1 | 10/2017 | Narkulla | |
| 2017/0293950 A1 | 10/2017 | Rathod | |
| 2017/0318325 A1 | 11/2017 | Ortiz | |
| 2017/0330274 A1* | 11/2017 | Conant, II | G06F 16/9537 |
| 2017/0356749 A1 | 12/2017 | Shelby | |
| 2017/0357914 A1 | 12/2017 | Tulabandhula | |
| 2017/0373509 A1 | 12/2017 | Betzin | |
| 2018/0012149 A1 | 1/2018 | Yust | |
| 2018/0025417 A1 | 1/2018 | Brathwaite et al. | |
| 2018/0046431 A1 | 2/2018 | Thagadur Shivappa et al. | |
| 2018/0053226 A1 | 2/2018 | Hutton et al. | |
| 2018/0068355 A1 | 3/2018 | Garry | |
| 2018/0088455 A1 | 3/2018 | Cippant | |
| 2018/0111494 A1 | 4/2018 | Penilla et al. | |
| 2018/0117447 A1 | 5/2018 | Bao et al. | |
| 2018/0121958 A1 | 5/2018 | Aist et al. | |
| 2018/0129276 A1 | 5/2018 | Nguyen et al. | |
| 2018/0140903 A1 | 5/2018 | Poure | |
| 2018/0157999 A1 | 6/2018 | Arora | |
| 2018/0165364 A1 | 6/2018 | Mehta et al. | |
| 2018/0173742 A1 | 6/2018 | Liu et al. | |
| 2018/0173800 A1 | 6/2018 | Chang et al. | |
| 2018/0188715 A1 | 7/2018 | Cella et al. | |
| 2018/0190026 A1 | 7/2018 | Barnett et al. | |
| 2018/0209801 A1 | 7/2018 | Stentz | |
| 2018/0209803 A1 | 7/2018 | Rakah | |
| 2018/0238705 A1 | 8/2018 | O'Herlihy | |
| 2018/0240542 A1 | 8/2018 | Grimmer | |
| 2018/0278984 A1 | 9/2018 | Aimone et al. | |
| 2018/0313798 A1 | 11/2018 | Chokshi et al. | |
| 2018/0342106 A1 | 11/2018 | Rosado | |
| 2018/0348863 A1 | 12/2018 | Aimone et al. | |
| 2018/0365904 A1 | 12/2018 | Holmes | |
| 2018/0374268 A1 | 12/2018 | Niles | |
| 2019/0019144 A1 | 1/2019 | Gillen | |
| 2019/0020973 A1 | 1/2019 | Harish | |
| 2019/0050634 A1 | 2/2019 | Nerayoff et al. | |
| 2019/0066528 A1 | 2/2019 | Hwang et al. | |
| 2019/0102946 A1 | 4/2019 | Spivack et al. | |
| 2019/0108686 A1 | 4/2019 | Spivack et al. | |
| 2019/0139448 A1 | 5/2019 | Marshall et al. | |
| 2019/0180862 A1 | 6/2019 | Wisser et al. | |
| 2019/0186942 A1 | 6/2019 | Rubin | |
| 2019/0188450 A1 | 6/2019 | Spivack et al. | |
| 2019/0202448 A1 | 7/2019 | Pal et al. | |
| 2019/0204110 A1 | 7/2019 | Dubielzyk | |
| 2019/0228269 A1 | 7/2019 | Brent et al. | |
| 2019/0236741 A1 | 8/2019 | Bowman et al. | |
| 2019/0236742 A1 | 8/2019 | Tomskii et al. | |
| 2019/0251503 A1 | 8/2019 | Simpson | |
| 2019/0251509 A1 | 8/2019 | Simpson | |
| 2019/0259008 A1 | 8/2019 | Lindsey | |
| 2019/0272589 A1 | 9/2019 | Simpson | |
| 2019/0293438 A1 | 9/2019 | Simpson | |
| 2019/0304000 A1 | 10/2019 | Simpson | |
| 2019/0311431 A1 | 10/2019 | Simpson | |
| 2019/0324989 A1 | 10/2019 | Borochoff et al. | |
| 2019/0325541 A1 | 10/2019 | Simpson | |
| 2019/0333166 A1 | 10/2019 | Simpson | |
| 2019/0333181 A1 | 10/2019 | Simpson | |
| 2019/0353499 A1 | 11/2019 | Stenneth | |
| 2020/0005388 A1 | 1/2020 | Lim et al. | |
| 2020/0013498 A1 | 1/2020 | Gelber | |
| 2020/0027096 A1 | 1/2020 | Cooner | |
| 2020/0047055 A1 | 2/2020 | Ward | |
| 2020/0098071 A1 | 3/2020 | Jackson | |
| 2020/0125999 A1 | 4/2020 | Simpson | |
| 2020/0151816 A1 | 5/2020 | Simpson | |
| 2020/0156495 A1 | 5/2020 | Lindup | |
| 2020/0184416 A1 | 6/2020 | Javaheri | |
| 2020/0226853 A1 | 7/2020 | Ahmed et al. | |
| 2020/0317075 A1 | 10/2020 | Yokoyama et al. | |
| 2020/0389301 A1 | 12/2020 | Detres et al. | |
| 2021/0004909 A1 | 1/2021 | Farmer et al. | |
| 2021/0012278 A1 | 1/2021 | Alon et al. | |
| 2021/0041258 A1 | 2/2021 | Simpson | |
| 2021/0042835 A1 | 2/2021 | Simpson | |
| 2021/0065100 A1 | 3/2021 | Hwang | |
| 2021/0158447 A1 | 5/2021 | Simpson | |
| 2021/0166317 A1 | 6/2021 | Simpson | |
| 2021/0248633 A1 | 8/2021 | Simpson | |
| 2021/0318132 A1 | 10/2021 | Simpson | |
| 2021/0326872 A1 | 10/2021 | Robotham | |
| 2021/0379447 A1 | 12/2021 | Lee | |
| 2021/0382924 A1 | 12/2021 | Aaltonen et al. | |

(56) References Cited

U.S. PATENT DOCUMENTS

| | | | |
|---|---|---|---|
| 2022/0020073 A1 | 1/2022 | Farmer | |
| 2022/0058578 A1 | 2/2022 | Javaheri | |
| 2022/0068081 A1 | 3/2022 | Pariseau | |
| 2022/0100731 A1 | 3/2022 | Tirapu Azpiroz et al. | |
| 2022/0122026 A1 | 4/2022 | Okabe et al. | |
| 2023/0157579 A1 | 5/2023 | Sato | |
| 2023/0377409 A1 | 11/2023 | Rye | |

FOREIGN PATENT DOCUMENTS

| | | |
|---|---|---|
| WO | 9508240 A2 | 3/1995 |
| WO | 2015059691 A1 | 4/2015 |
| WO | 2015161307 A1 | 4/2015 |
| WO | 2019/134005 A1 | 7/2019 |
| WO | 2019183468 A1 | 9/2019 |
| WO | 2021/163675 A1 | 8/2021 |

OTHER PUBLICATIONS

Wei, et al. "impact of aircraft size and seat availability on airlines demand and market share in duopoly markets" Published by Elsevier, 2005, pp. 315-327.

PCT International Search Report and Written Opinion; PCT/US2022/052969; Mar. 21, 2023.

Little, T.D., et al., On the Joys of Missing Data, Journal of pediatric psychology, 2014, pp. 151-162.

Honaker, J., et al., What to do About Missing Values in Time-Series Cross-Section Data, American Journal of Political Science, Sep. 6, 2008, pp. 561-581.

Westerhoff, Market Depth and Price Dynamics: A Note, University of Osnabrueck, Department of Economics Rolandstrasse 8, D-49069 Osnabrueck, German, Mar. 30, 2004, pp. 1-8.

PCT International Search Report and Written Opinion; PCTUS2022/051998; Mar. 8, 2023.

EP23153137.7 European Search Report, May 24, 2023, pp. 1-10.

EP20787830.7 European Search Report, May 12, 2023, pp. 1-10.

Zheyong, Bian, et al., "Planning the Ridesharing Route for the First-Mile Service Linking to Railway Passenger Transportation," Joint Rail Conference, Apr. 2017, pp. 1-11.

EP23168879.7 European Search Report, Jul. 5, 2023, pp. 1-13.

The Wayback Machine, Interest Rate Swaps, https://web.archive.org/web/20171006212154/https://global.pimco.com/en/gbl/resources/education/understanding-interest-rate-swaps, 2016, pp. 1-7.

Freight Derivatives—a Vital Tool for YOur Business, https://www.reedsmith.com/-/media/files/perspectives/2007/02/freight-derivatives--a-vital-tool-for-your-business/files/freight-derivatives--a vital-tool-for-your-business/fileattachment/etcfreightderivativesavitaltoolforyourbusiness.pdf (Year: 2007), Energy, Trade & Commodities, pp. 1-3.

Barry, Kieth, App lets drivers auction public parking spaces, Wired, Aug. 11, 2011, pp. 1-4.

Jiang, Landu, et al., Sun Chase: Energy-Efficient Route Planning for solar-powered Evs, IEEE 37th international conference on distrubuted computing systems, 2017, pp. 1-11.

Netlingo, https://web.archive.org/web/20170122184857/https://www.netlingo.com/word/electronic-exchange.php,dated Oct. 22, 2017.

Laseter, Tim, "B2B benchmark: The State of Electronic Exchanges", Tech & Innovation, dated Oct. 1, 2001.

Directed Graph, https://en.wikipedia.org/wiki/Directed_graph, pp. 1-6, 2022.

About IBM Food Trust, https://www.ibm.com/downloads/cas/E9DBNDJG, pp. 1-17, 2019.

IBM Blockchain Transparent Supply, https://www.ibm.com/downloads/cas/BKQDK0M2, pp. 1-14, Aug. 2020.

Radocchia, Samantha, 3 Innovative Ways Blockchain Will Build Trust in The Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.

Change the World, https://fortune.com/change-the-world/2019/IBM/, Fortune Media IP Limited, pp. 1-5, 2022.

IBM Food Trust, https://www.constellationr.com/node/17601/vote/application/view/588, Constellation Research Inc., pp. 1-4, 2010-2022.

Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.

Ramasubramanian, Vasant, "Quadrasense: Immersive UAV-based cross-reality environmental sensor networks," phD diss., Massachusetts Institute of Technology, pp. 1-75, 2015.

Wyzant, https://web.archive.org/web/20190327185429/https://www.wyzant.com/hotitworks/students, Wyzant tutoring, pp. 1-13 , Mar. 27, 2019.

PCT International Search Report and Written Opinion; PCT/US2021/065855; Mar. 29, 2022.

PCT International Search Report and Written Opinion; PCT/US2022/012717; Mar. 30, 2022.

Zhao, et al., Incentives in Ridesharing with Deficit Control, Proceedings of the 13th International Conference on Autonomous Agents and Multiagent Systems (AAMAS 2014), May 5-9, 2014, pp. 1021-1028.

Peters, et al.; Student Support Services for Online Learning Re-Imagined and Re-Invigorated: Then, Now and What's to Come; Contact North | Contact Nord; Sep. 2017.

Papa, U., & Del Core, G., "Design of Sonar Sensor Model for Safe Landing of an UAV," IEEE Metrology for Aerospace, 2015, pp. 346-350.

Li, Jundong, et al., "Multi-network Embedding", pp. 1-9, 2018.

Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.

Freebeat, Smart Exercise Bike; retrieved from internet: https://www.amazon.com/Resistance-Cushioned-Detection-Altorithm-Instructors/dp/B0BZKKZ6B3/?th=1; Mar. 3, 2023; p. 1.

Aratani, Lori, "This app wants to reward you for smart commuting choices," The Washington Post, Aug. 18, 2018, pp. 1-3.

Yu, Haicong et al.; "A Multi-Modal Route Planning Approach with an Improved Genetic Algorithm", The International Archives of the Photogrammetry, Remote Sensing and Spaital Information Sciences, vol. 38, Part 1, 2010.

"Node Influence Metric", Wikipedia, Nov. 6, 2020, pp. 1-5.

EP21916571 European Search Report, May 29, 2024, pp. 1-9.

Bortolini, et al.; "Fresh food sustainable distribution: cost, delivery time and carbon footprint three-objective optimization," 2016, pp. 1-12.

Fulldomepro, VR Aquatic Simulator with a Dome, Pub. Sep. 3, 2018, https://www.youtube.com/watch?v=k_53G5DksjQ, pp. 1-2.

Randomoneh, Dome Screens & Displays, Pub. Oct. 12, 2012, https:// hardforum.com/threads/dome-screens-displays, p. 1.

Borgobello, Bridget, TOOB Personal Dome Screen Revamped, Pub. Jan. 12, 2012, https:// newatlas.com/toob-earth-personal-dome-screen/21082, p. 1.

Asghari, et al; "Price-aware Real-time Ride-sharing at Scale—An Auction-based Approach", Oct. 31, 2016, SIGSPACIAL'16: Proceedings of the 24th ACM SIGSPATIAL International Conference on Advances in Geographic Information Systems, Article No. 3, pp. 1-10.

EP22740218.7 European Search Report, Nov. 12, 2024, pp. 1-29.

EP23153137.7 Exam Report (Communication pursuant to Article 94(3) EPC), Mar. 5, 2025, pp. 1-11.

Chang, et al., "Estimating Real-Time Traffic Carbon Dioxide Emissions Based on Intelligent Transportation System Technologies," IEEE Mar. 1, 2013, vol. 14, pp. 1-11.

Valdes, J. J.,et al.; (Sep. 2007). Virtual reality high dimensional objective spaces for multi-objective optimization: An improved representation. In 2007 IEEE Congress on Evolutionary Computation (pp. 4191-4198). IEEE., pp. 1-11.

Valdes, J. J.,et al.; (2007). Multi-objective evolutionary optimization for constructing neural networks for virtual reality visual data mining: Application to geophysical prospecting. Neural networks, 20(4), pp. 498-508.

(56)        References Cited

OTHER PUBLICATIONS

Zhao, et al., Deshpande, P. M., Naughton, J. F., & Shukla, A (Jun. 1998). Simultaneous optimization and evaluation of multiple dimensional queries. In Proceedings of the 1998 ACM SIGMOD international conference on Management of data (pp. 271-282).

Karbassi, et al.; "Vehicle Route Prediction and Time of Arrival Estimation Techniques for Improved Transportation System Management" Published by IEEE; 2003, pp. 511-516.

S. Pramanik, P. Agrawal, and A. Hussain, "OmniNet: A unified architecture for multi-modal multi-task learning," Jul. 3, 2020 v2 , arXiv:1907.07804.

R. Akula, S. Gella, Y. Al-Onaizan, S.-C. Zhu, and S. Reddy, "Words aren't enough, their order matters: On the robustness of grounding visual referring expressions," 2020, arXiv:2005.01655.

R. Child, S. Gray, A. Radford, and I. Sutskever, "Generating long sequences with sparse transformers," 2019, arXiv:1904.10509.

Y. Xian, C. H. Lampert, B. Schiele, and Z. Akata, "Zero-shot learning—A comprehensive evaluation of the good, the bad and the ugly," IEEE Trans. Pattern Anal. Mach. Intell., vol. 41, No. 9, pp. 2251-2265, Sep. 2019.

Owens and A. A. Efros, "Audio-visual scene analysis with selfsupervised multisensory features," inProc. Eur. Conf. Comput. Vis., 2018, pp. 639-658.

T. Chen and R. R. Rao, "Audio-visual integration in multimodal communication," Proc. IEEE, vol. 86, No. 5, pp. 837-852, May 1998.

N. Li, S. Liu, Y. Liu, S. Zhao, and M. Liu, "Neural speech synthesis with transformer network," in Proc. AAAI Conf. Artif. Intell., 2019, pp. 6706-6713.

M. Chen, Y. Li, Z. Zhang, and S. Huang, "TVT: Two-view transformer network for video captioning," in Proc. 10th Asian Conf. Mach. Learn., 2018, pp. 847-862.

X. Lin, C. Ding, J. Zeng, and D. Tao, "GPS-Net: Graph property sensing network for scene graph generation," in Proc. IEEE Conf. Comput. Vis. Pattern Recognit., 2020, pp. 3743-3752.

W. Hao, C. Li, X. Li, L. Carin, and J. Gao, "Towards learning a generic agent for vision-and-language navigation via pre-training," in Proc. IEEE Conf. Comput. Vis. Pattern Recognit., 2020, pp. 13134-13143.

S. Ren, K. He, R. Girshick, and J. Sun, "Faster R-CNN: Towards realtime object detection with region proposal networks," in Proc. Int. Conf. Neural Inf. Process. Syst., 2015, pp. 91-99.

Y.-H. H. Tsai, S. Bai, P. P. Liang, J. Z. Kolter, L.-P. Morency, and R. Salakhutdinov, "Multimodal transformer for unaligned multimodal language sequences," in Proc. Conf. Assoc. Comput. Linguistics, 2019, pp. 6558-6569.

J. Lin, A. Yang, Y. Zhang, J. Liu, J. Zhou, and H. Yang, "InterBert: Vision-and-language interaction for multi-modal pretraining," 2020, arXiv:2003.13198.

D. Tran, H.Wang, L. Torresani, J. Ray, Y. LeCun, and M. Paluri, "A closer look at spatiotemporal convolutions for action recognition," inProc. IEEE Conf. Comput. Vis. Pattern Recognit., 2018, pp. 6450-6459.

S. Xie, C. Sun, J. Huang, Z. Tu, and K. Murphy, "Rethinking spatiotemporal feature learning for video understanding," 2017, arXiv:1712.04851.

L. Zhou, Y. Zhou, J. J. Corso, R. Socher, and C. Xiong, "End-to-end dense video captioning with masked transformer," in Proc. IEEE Conf. Comput. Vis. Pattern Recognit., 2018, pp. 8739-8748.

X. Wang, R. Girshick, A. Gupta, and K. He, "Non-local neural networks," in Proc. IEEE Conf. Comput. Vis. Pattern Recognit., 2018, pp. 7794-7803.

J. L. Ba, J. R. Kiros, and G. E. Hinton, "Layer normalization," 2016, arXiv:1607.06450.

S. Ioffe and C. Szegedy, "Batch normalization: Accelerating deep network training by reducing internal covariate shift," in Proc. Int. Conf. Mach. Learn., 2015, pp. 448-456.

K. He, X. Zhang, S. Ren, and J. Sun, "Deep residual learning for image recognition," in Proc. IEEE Conf. Comput. Vis. Pattern Recognit., 2016, pp. 770-778.

J. Malmaud, J. Huang, V. Rathod, N. Johnston, A. Rabinovich, and K. Murphy, "What's Cookin'? Interpreting cooking videos using text, speech and vision," 2015, arXiv:1503.01558.

L. Zhou, C. Xu, and J. J. Corso, "Towards automatic learning of procedures from web instructional videos," in Proc. AAAI Conf. Artif. Intell., 2018, pp. 7590-7598.

D. Kiela et al., The hateful memes challenge: Detecting hate speech in multimodal memes, 2020, arXiv:2005.04790.

Miech, D. Zhukov, J.-B. Alayrac, M. Tapaswi, I. Laptev, and J. Sivic, "HowTo100M: Learning a text-video embedding by watching hundred million narrated video clips," in Proc. IEEE Int. Conf. Comput. Vis., 2019, pp. 2630-2640.

Das et al., "Visual dialog," in Proc. IEEE Conf. Comput. Vis. Pattern Recognit., 2017, pp. 1080-1089.

R. Krishna, K. Hata, F. Ren, L. Fei-Fei, and J. C. Niebles, "Densecaptioning events in videos," in Proc. IEEE Int. Conf. Comput. Vis., 2017, pp. 706-715.

V. Ordonez, G. Kulkarni, and T. Berg, "Im2Text: Describing images using 1 million captioned photographs," in Proc. Int. Conf. Neural Inf. Process. Syst., 2011, pp. 1143-1151.

R. Krishna et al., "Visual genome: Connecting language and vision using crowdsourced dense image annotations," Int. J. Comput. Vis., vol. 123, pp. 32-73, 2017.

S. Antol et al., "VQA: Visual question answering," in Proc. IEEE Int. Conf. Comput. Vis., 2015, pp. 2425-2433.

T.-Y. Lin et al., "Microsoft COCO: Common objects in context," in Proc. Eur. Conf. Comput. Vis., 2014, pp. 740-755.

P. Sharma, N. Ding, S. Goodman, and R. Soricut, "Conceptual captions: A cleaned, hypernymed, image alt-text dataset for automatic image captioning," in Proc. Conf. Assoc. Comput. Linguistics, 2018, pp. 2556-2565.

H. Luo et al., "UniVL: A unified video and language pre-training model for multimodal understanding and generation," 2020, arXiv:2002. 06353.

D. Qi, L. Su, J. Song, E. Cui, T. Bharti, and A. Sacheti, "ImageBert: Cross-modal pre-training with large-scale weak-supervised image-text data," 2020, arXiv:2001.07966.

Z. Huang, Z. Zeng, B. Liu, D. Fu, and J. Fu, "Pixel-Bert: Aligning image pixels with text by deep multi-modal transformers," 2020, arXiv:2004.00849.

X. Li et al., "Oscar: Object-semantics aligned pre-training for vision-language tasks," in Proc. Eur. Conf. Comput. Vis., 2020, pp. 121-137.

J. Lu, V. Goswami, M. Rohrbach, D. Parikh, and S. Lee, "12-in-1: Multitask vision and language representation learning," in Proc. IEEE Conf. Comput. Vis. Pattern Recognit., 2020, pp. 10434-10443.

L. Zhou, H. Palangi, L. Zhang, H. Hu, J. Corso, and J. Gao, "Unified vision-language pre-training for image captioning and VQA," in Proc. AAAI Conf. Artif. Intell., 2020, pp. 13041-13049.

C. Alberti, J. Ling, M. Collins, and D. Reitter, "Fusion of detected objects in text for visual question answering," 2019, arXiv:1908. 05054.

G. Li, N. Duan, Y. Fang, M. Gong, and D. Jiang, "Unicoder-VL: A universal encoder for vision and language by cross-modal pre-training," in Proc. AAAI Conf. Artif. Intell., 2020, pp. 11336-11344.

C. Sun, F. Baradel, K. Murphy, and C. Schmid, "Learning video representations using contrastive bidirectional transformer," 2019, arXiv:1906.05743.

Y.-C. Chen et al., "UNITER: Universal image-text representation learning," in Proc. Eur. Conf. Comput. Vis., 2020, pp. 104-120.

W. Su et al., "VL-Bert: Pre-training of generic visual-linguistic representations," 2019, arXiv:1908.08530.

L. H. Li, M. Yatskar, D. Yin, C.-J. Hsieh, and K.-W. Chang, "VisualBert: A simple and performant baseline for vision and language," 2019, arXiv:1908.03557.

H. Tan and M. Bansal, "LXMERT: Learning cross-modality encoder representations from transformers," 2019, arXiv:1908.07490.

J. Lu, D. Batra, D. Parikh, and S. Lee, "ViLBERT: Pretraining taskagnostic visiolinguistic representations for vision-and-language tasks," 2019, arXiv:1908.02265.

(56) References Cited

OTHER PUBLICATIONS

Z. Yang, Z. Dai, Y. Yang, J. Carbonell, R. R. Salakhutdinov, and Q. V. Le, "XLNet: Generalized autoregressive pretraining for language understanding," in Proc. Int. Conf. Neural Inf. Process. Syst., 2019.

Z. Dai, Z. Yang, Y. Yang, J. Carbonell, Q. V. Le, and R. Salakhutdinov, "Transformer-XL: Attentive language models beyond a fixed-length context," 2019, arXiv:1901.02860.

Radford, K. Narasimhan, T. Salimans, and I. Sutskever, "Improving language understanding by generative pre-training," 2018. [Online]. Available: https://s3-us-west-2.amazonaws.com/openai-assets/ research-covers/language-unsupervised/language_understanding_ paper.pdf.

M. Lewis et al., "Bart: Denoising sequence-to-sequence pre-training for natural language generation, translation, and comprehension," 2019, arXiv:1910.13461.

Y. Li et al., "Behrt: Transformer for electronic health records," Sci. Rep., vol. 10, 2020.

A. Lazarus et al., Multimodal Behavior Therapy. Berlin, Germany: Springer, 1976.

B. P. Yuhas, M. H. Goldstein, and T. J. Sejnowski, "Integration of acoustic and visual speech signals using neural networks," IEEE Commun. Mag., vol. 27, No. 11, pp. 65-71, Nov. 1989.

W. Guo, J. Wang, and S. Wang, "Deep multimodal representation learning: A survey," IEEE Access, vol. 7, pp. 63373-63394, 2019.

L. Wu, S. L. Oviatt, and P. R. Cohen, "Multimodal integration-a statistical view," IEEE Trans. Multimedia, vol. 1, No. 4, pp. 334-341, Dec. 1999.

J. Shang, T. Ma, C. Xiao, and J. Sun, "Pre-training of graph augmented transformers for medication recommendation," 2019, arXiv:1906.00346.

K. Gavrilyuk, R. Sanford, M. Javan, and C. G. Snoek, "Actor transformers for group activity recognition," inProc. IEEE Conf. Comput. Vis. Pattern Recognit., 2020, pp. 836-845.

Beltagy, M. E. Peters, and A. Cohan, "Longformer: The long-document transformer," 2020, arXiv:2004.05150.

D. Shin, Z. Ren, E. B. Sudderth, and C. C. Fowlkes, "3D scene reconstruction with multi-layer depth and epipolar transformers," in Proc. IEEE Int. Conf. Comput. Vis., 2019, pp. 2172-2182.

P. Xu et al., "SketchMate: Deep hashing for million-scale human sketch retrieval," in Proc. IEEE Conf. Comput. Vis. Pattern Recognit., 2018, pp. 8090-8098.

K. Gupta, J. Lazarow, A. Achille, L. Davis, V. Mahadevan, and A. Shrivastava, "LayoutTransformer: Layout generation and completion with self-attention," 2020, arXiv:2006.14615.

T. Hastie, R. Tibshirani, J. H. Friedman, and J. H. Friedman, The Elements of Statistical Learning: Data Mining, Inference, and Prediction, vol. 2. Berlin, Germany: Springer, 2009.

C. Zhang, Z. Yang, X. He, and L. Deng, "Multimodal intelligence: Representation learning, information fusion, and applications," IEEE J. Sel. Topics Signal Process., vol. 14, No. 3, pp. 478-493, Mar. 2020.

C. Sun, A. Myers, C. Vondrick, K. Murphy, and C. Schmid, "VideoBert: A joint model for video and language representation learning," in Proc. IEEE Int. Conf. Comput. Vis., 2019, pp. 7463-7472.

N. Carion, F. Massa, G. Synnaeve, N. Usunier, A. Kirillov, and S. Zagoruyko, "End-to-end object detection with transformers," in Proc. Eur. Conf. Comput. Vis., 2020, pp. 213-229.

J. Devlin, M.-W. Chang, K. Lee, and K. Toutanova, "Bert: Pretraining of deep bidirectional transformers for language understanding," 2018, arXiv:1810.04805.

Vaswani et al., "Attention is all you need," in Proc. Int. Conf. Neural Inf. Process. Syst., 2017, pp. 5998-6008.

T. Baltrušaitis, C. Ahuja, and L.-P. Morency, "Multimodal machine learning: A survey and taxonomy." IEEE Trans. Pattern Anal. Mach. Intell., vol. 41, No. 2, pp. 423-443, Feb. 2019.

Cai, et al.; Incorporating Visual Information in Audio Based Self-Supervised Speaker Recognition; IEEE/ACM Transactions on Audio, Speech and Language Processing; vol. 30; pp. 1422-1435; Mar. 24, 2022.

Saulle, Rosella, et al., "Cost and Cost-Effectiveness of the Mediterranean Diet: Results of a Systematic Review," www.mdpi.com/ journal/nutrients, Nutrients 2013, 5, pp. 4566-4586.

Nikonowicz, et al., "Virtual Power Plants", Published by Open Acess Journal, 2012, pp. 135-149.

Garamvolgyi et al.; Towards_Model-Driven_Engineering_of_Smart_ Contracts; IEEE/IFIP; pp. 134-139; 2018.

Khan et al.; "A Distri buted-Ledger Consortium Model for Collaborative_Innovation"; IEEE pp. 29-37; 2017.

Meiklejohn S.; Top Ten Obstacles along Distributed Ledgers Path to Adoption; UCL; pp. 13-19; 2017.

Muttavarapu et al.; Distributed_Ledger_for_Spammers_Resume; IEEE; 9 pages, 2018.

Chen, M., et al.; What may visualization processes optimize ?. IEEE transactions on visualization and computer. 2015, pp. 1-10.

Meneghini, et al.; Information to the Eye of the Beholder: Data Visualization for Many-Objective Optimization; Institute for polymers and Composites, University of Minho, 2018, pp. 1-9.

Franco, et al.; "Road vehicle emission factors development: A review" Published by Elsevier (Year: 2013); pp. 84-97.

Silverman, "New App Will Let You Buy Or Sell A Parking Space In NYC", CBS News, Jul. 20, 2011; https://www.cbsnews.com/ newyork/news/new-app-will-let-you-buy-or-sell-a-parking-space/ (Year: 2011).

* cited by examiner

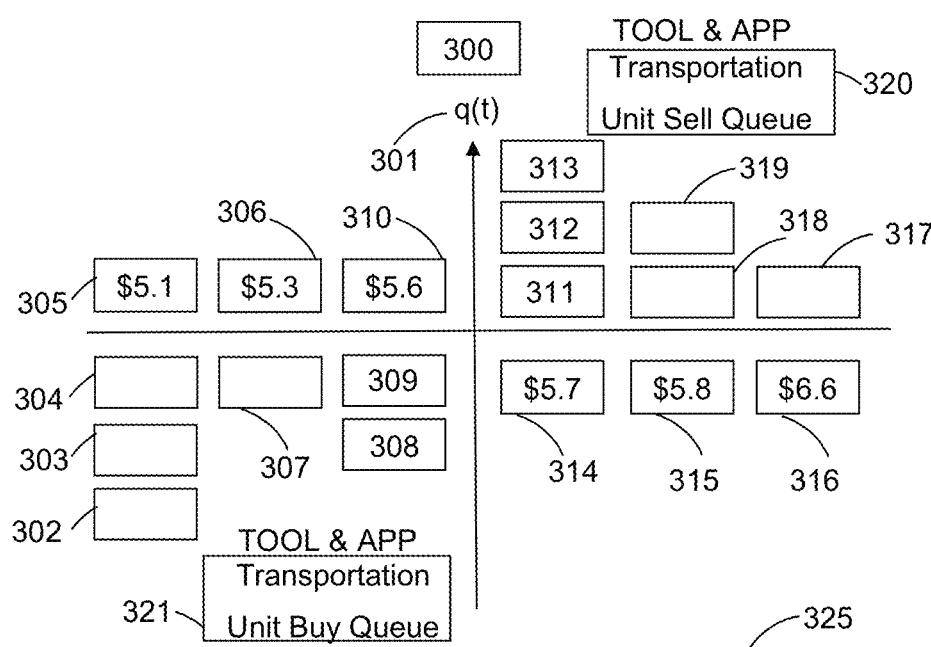

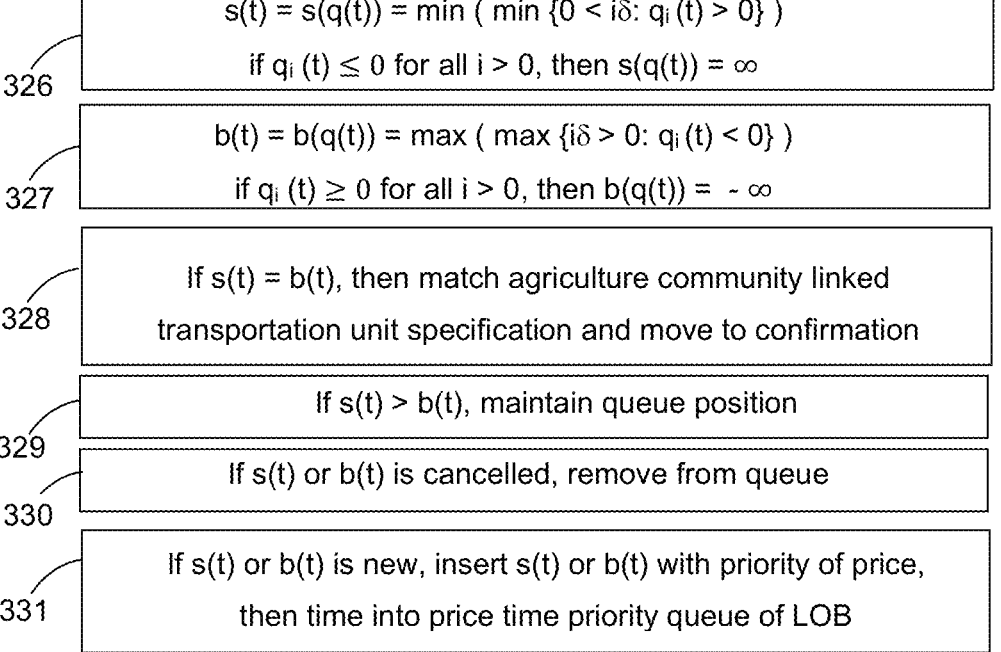

Transportation unit specification limit order book ("LOB") is represented by vector q(t) such that the i-th coordinate for i>0, $q_i(t)$, is the number of sell limit orders that are waiting in the LOB at time t at price $i\delta$ ($\delta$ is the price unit tick size) The number of buy limit orders at $i\delta$ are represented with a negative sign $q_i(t)$ $$s(t) = s(q(t)) = \min ( \min \{0 < i\delta: q_i(t) > 0\} )$$
if $q_i(t) \le 0$ for all i > 0, then $s(q(t)) = \infty$ $$b(t) = b(q(t)) = \max ( \max \{i\delta > 0: q_i(t) < 0\} )$$
if $q_i(t) \ge 0$ for all i > 0, then $b(q(t)) = -\infty$ If s(t) = b(t), then match agriculture community linked transportation unit specification and move to confirmation If s(t) > b(t), maintain queue position If s(t) or b(t) is cancelled, remove from queue If s(t) or b(t) is new, insert s(t) or b(t) with priority of price, then time into price time priority queue of LOB

ORDER TIME IN FORCE:

DAY
GOOD TIL CANCELLED (GTC)
IMMEDIATE OR CANCEL (IOC)
GOOD TILL DATE (GTD)
DAY TILL CANCELLED (DTC)

ORDER TYPE:

LIMIT

MARKET
MARKET IF TOUCHED (MIT)
SNAP MARKET
SNAP MID
SNAP TO PRIMARY
PEG TO BENCHMARK
ADAPTIVE CUSTOM

720

SET

740

270

1100

1200

1400

210

1410

MENU:

1411 — ORIGIN (FROM) / DESTINATION (TO)

1412 — MARKET

1413 — TIMINGS AND SPECS

1414 — TERM AND SPECS

1415 — ORDER TIME AND TYPE

1416 — MODES

1417 — VIRTUAL HUBS

1418 — NO ARB SETTINGS

1419 — ORDERS & CONFIRMS

1420 — POOL MESSAGE

1421 — TAX & ACCOUNTING

SET

1440

270

1500

Figure 16:
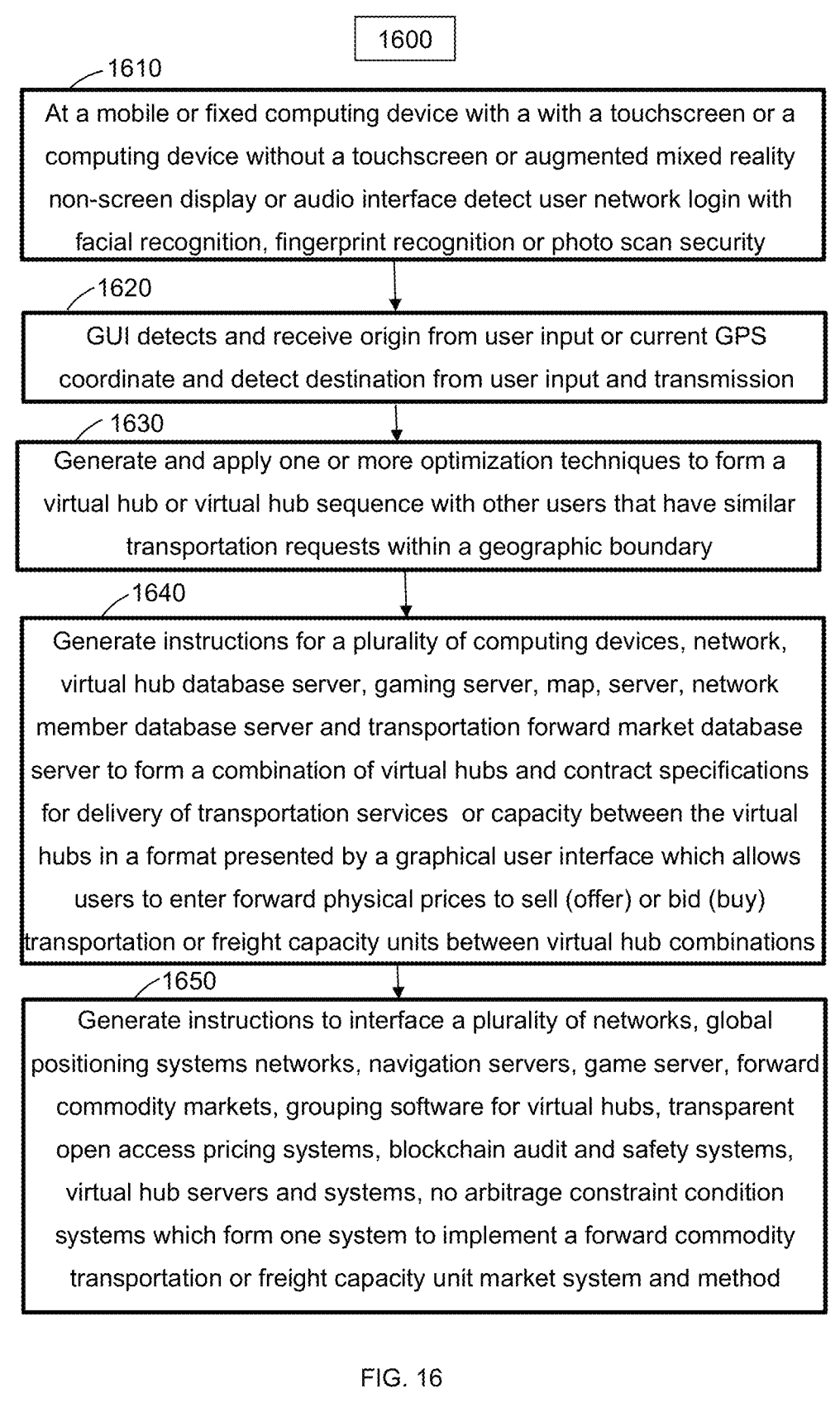

1600

1610

At a mobile or fixed computing device with a with a touchscreen or a computing device without a touchscreen or augmented mixed reality non-screen display or audio interface detect user network login with facial recognition, fingerprint recognition or photo scan security

1620

GUI detects and receive origin from user input or current GPS coordinate and detect destination from user input and transmission

1630

Generate and apply one or more optimization techniques to form a virtual hub or virtual hub sequence with other users that have similar transportation requests within a geographic boundary

1640

Generate instructions for a plurality of computing devices, network, virtual hub database server, gaming server, map, server, network member database server and transportation forward market database server to form a combination of virtual hubs and contract specifications for delivery of transportation services or capacity between the virtual hubs in a format presented by a graphical user interface which allows users to enter forward physical prices to sell (offer) or bid (buy) transportation or freight capacity units between virtual hub combinations

1650

Generate instructions to interface a plurality of networks, global positioning systems networks, navigation servers, game server, forward commodity markets, grouping software for virtual hubs, transparent open access pricing systems, blockchain audit and safety systems, virtual hub servers and systems, no arbitrage constraint condition systems which form one system to implement a forward commodity transportation or freight capacity unit market system and method

Virtual Hub 1 Virtual Hub 2
Address: 111 1st Ave, NY
Sun, Sep 30 @ 4:10 PM

Status
PickUp

CheckIn    Message    Call

PickUp Message

911    Pick Up Address

Date/Time

3235 — Basic Market: $3-3.10  16 mins — 3265

3240 — Basic Market: $4-4.10  21 mins — 3270

3245 — Int Market:    $4.8-4.9  16 mins — 3275

3250 — Int Market:    $5-5.10  21 mins — 3280

3255 — Prem Market: $9.70-9.80  16 mins — 3285

3260 — Prem Market: $10-10.10  21 mins — 3290

3291 — Nav        3292 — Game        3293 — Market

3600

3800

3900

3905

3910 — User Score: 12,455

3915 — User Power: 456

3920 — SOV Count: 29

Weapon: 45 — 3925

Balance: $50 — 3930

Pick Ups: 2 — 3988

3969

3935

3968

3940 — GPS View

Augmented View — 3967

3945

Passenger — 3985

3950

3966

3965

3963

GO

STOP 3979   3964

3955

3960   3961   3962 Market

4710
4751
4715
MENU
BUY/SELL/TRADE — 4716
4717  NAVIGATION
MY ROUTES 4718
4719  TRIPS
ORDERS 4720
4721  ACCOUNT
COMMUNITIES 4722
4723  ROUTE SEQUENCES
+ ADD A VIRTUAL HUB 4724
4725  GAME
PACKAGE SCANNER 4726
4727  REWARD PROGRAM
DASHBOARD 4728
4729  MUSIC
SHOP 4730
HELP
4731  SETTINGS 4732
INVITE FREINDS
4733  LOG OUT 4734

5000

METHOD AND SYSTEM FOR UTILIZING ONE OR MORE TOOL APPLIANCE UNITS

RELATED APPLICATIONS

This application is a continuation of patent application Number U.S. Ser. No. 16/293,712, filed 2019 Mar. 6; this application is a continuation-in-part (CIP) of patent application Number U.S. Ser. No. 17/493,455, filed 2021 Oct. 4; which is a continuation of patent application Number U.S. Ser. No. 16/290,278, filed 2019 Mar. 1 and issued as U.S. Ser. No. 11/138,661 on 2021 Oct. 5; this application is also a continuation-in-part (CIP) of patent application Number U.S. Ser. No. 16/274,490, filed 2019 Feb. 13; which is a CIP of patent application Number U.S. Ser. No. 16/258,658, filed 2019 Jan. 27 and issued as U.S. Ser. No. 11/035,682 on 2021 Jun. 15; this application is also a CIP of patent application Number U.S. Ser. No. 16/257,032 filed 2019 Jan. 24; a CIP of patent application Number U.S. Ser. No. 16/242,981, filed 2019 Jan. 8; a CIP of patent application Number U.S. Ser. No. 16/242,967, filed 2019 Jan. 8; a CIP of patent application Number U.S. Ser. No. 16/239,485, filed 2019 Jan. 3; a CIP of patent application Number U.S. Ser. No. 16/183,647, filed 2018 Nov. 7; a CIP of patent application Number U.S. Ser. No. 16/167,525, filed 2018 Oct. 22; a CIP of patent application Number U.S. Ser. No. 15/877,393, filed 2018 Jan. 23; a CIP of patent application Number U.S. Ser. No. 15/484,059, filed 2017 Apr. 10; and a CIP of patent application Number U.S. Ser. No. 17/493,432, filed 2021 Oct. 4; which is a continuation of patent application Number U.S. Ser. No. 15/266,326, filed 2016 Sep. 15 and issued as U.S. Ser. No. 11/138,827 on 2021 Oct. 5. All of these applications are incorporated by reference herein in their entireties.

BACKGROUND OF THE INVENTION

Field of the Invention

Implementations of various methods and systems to transform tool and appliance units into objects with geolocation attributes to which a user may subscribe which have associated price-time priority queues for transformed tool and appliance units. The present disclosed invention relates to combining the concepts of objected oriented programming, market price-time priority queues, tools and appliances, navigation systems and social networking and localized tool and appliance units as a fungible asset class or localized tool and appliance units as an open market. Home improvement markets have grown tremendously over the past 50 years. However most home owners find themselves on a typical weekday or weekend in need of a tool or appliance where they will go to Home Depot, Lowes or some appliance store to fulfill their need by buying a tool they will use 1 to 2 times or maybe even not at all. Nevertheless a person's neighbors or general nearby community is likely have the tool or appliance that a given person needs and would be more than willing to rent the tool or appliance to the neighbor, but there exists no such method or system to efficiently make the required search, geolocation and rental transaction transformations necessary to complete such a demand or request. The disclosed novel invention triangulates tool and appliance unit data transformations that combine the concepts of object oriented programming, market price-time priority queues, tool and appliance markets, navigation systems and social networking and localized tool and appliance units as fungible asset classes that reduce transaction costs of the product and transportation costs in such a way that would allow communities and neighbors to effectively transact tool and appliance rental by dramatically lowering transaction costs. The route or road between two waypoints may be our commute to work, it may be an errand, it may be a route to school, it may be a route to the gym, it may be a route to a friends house, it could even be a single destination waypoint or a plurality of other connected waypoint origin and waypoint destination points. The present disclosed invention transforms these routes with one destination waypoint, or two or more waypoints into objects which may then be further transformed into communities based on tool and appliance units. Prior to the disclosed invention, localized tool or appliance rental markets have remained extraordinarily expensive due to the very high transaction costs of people driving many of miles to a home improvement or appliance store that is in most cases very unorganized and inefficient. Even worse, high transaction costs have allowed oligopolies to form in such tool and appliance areas that charge unnecessarily high prices for items that will only be used very infrequently. In disparate fields of study, more recently, the concept of virtual communities has developed with examples that may range from a social network topic hashtag that would form a virtual subject community around a topic such as #SuperBowl or #MartinLutherKing or #baby or many, many other topics. Theglobe.com or MySpace or Facebook or many others have also developed virtual communities around many topics but remain ineffective towards areas that require more organized markets and technologies to lower transaction costs. Waze has contributed to making a virtual community of drivers that help identify road hazards or traffic accidents or gas prices or map chat or map issues or lane closures or many other features to outsmart traffic together as a community. Waze has even attempted to combine carpooling features in their carpooling application and associated intellectual property. Methods and systems of ride matching systems do little more than match rides and are deficient in the areas of transforming transportation objects or units into fungible commodities or transform routes into communities or provide data transformations to form price-time priority queues around transformed transportation units. No companies or prior art have attempted to make transactional social networks for tool and appliance based units such as hammers, saws, ladders, power tools, appliances, power appliances, drills, screwdrivers, plumbing tools, or general tools and appliances. No prior art or technology has been able to combine the concepts of transportation communities with tool and appliance communities in a way that lowers transaction costs. Yet with all these innovations in other fields of study and because of many method and system deficiencies in tool and appliance markets due to no organized methods to efficiently share or rent tools and appliances. While former systems may have been incrementally useful, they do not place a cost or an economic value to the tool and appliance production methods which result in large transaction costs to society or spending money on items that provide an overall low utility or single use utility. Further, no invention has previously existed that transforms a tool and appliance unit with geolocation attributes into a community object which may form the basis of a social network which includes a marketplace with a time-price priority queue for the transformed tool and appliance units. We reason, the invention of a transformed tool and appliance unit community platform between waypoints or a single waypoint destination has never existed because people reason they are isolated in neighborhoods or communities and there is no mechanism that pools all the local tool or appliance owners on a given route between two waypoints or a relevant single waypoint destination where a consumer may have buying or rental interest. In our research we have seen elementary forms of electronic bulletin boards for tool and appliance products on Craigslist or Facebook, but these systems are disorganized, they lack geolocation instructions, they do not provide firm service and they do not have quality standards or market structure. Further GPS systems and networks are weak or non-existent on platforms such as Facebook or Craigslist. Home owners remain captive to very inefficient high cost home improvement stores which serve a very limited purpose and sometimes only provide a high price for a tool or appliance that will be used once. After considering the effects of non-substitutability of traditional tool and appliance markets and transport mechanisms, the high quality tool and appliance activity is actually not economic for most people because of the time problems due to high transaction costs and lack of platform systems that would lower transaction costs. While U.S. patent application Ser. No. 15/877,393, "electronic forward market exchange for transportation seats and capacity in transportation spaces and vehicles," filed Jan. 23, 2018, solves the problem of transport and freight substitutability by completing substantial data transformations for transportation units by creating a method for a new data transformation and entirely new asset of a transformed transportation units which makes transportation units fully fungible or exchangeable, further deficiencies are because the transportation units are not linked to tool and appliance units and the lack of linkage makes transaction costs uneconomic for most urban residents to have access to high quality tools or appliances that are convenient from a geolocation perspective. Further, the purpose of such a tool and appliance community may also be lacking because there is potentially no economic benefit because the pools are so small or the pools don't match tool owners with urban customers coupled with rider or driver routes. Tool and appliance markets have also lacked network technology development to lower transaction costs. Further, transportation systems have generally assumed transportation is a personalized good (carpooling and branded transportation network companies) rather than a commodity which is substitutable or linkable to tool and appliance units. In the United States, 85% of all vehicles ride with a single passenger in the vehicle which is a tremendously inefficient use of energy and it causes high levels of traffic congestion. Trunk space in vehicles is largely empty or idol because of high transaction costs. The freight system in the US which comprises 20% of road traffic is also laden with dead-head (no haul) routes due to no developed platforms which connect tool and appliance communities with urban communities. As 90% of vehicle space remains idol or unutilized due to high transaction costs, trunk space could be filled with tool and appliance platforms which allow for transportation units and tool and appliance units to be seamlessly combined over a platform social network with a transaction gateway. Mobile networks have allowed for the rise of Transportation Network Companies that promote hired drivers but the cost of these systems has continued to be expensive for the majority of the public which has held back wide scale adoption. It has also been proven that transportation network companies have increased traffic and pollution (Fitzsimmons, E., "Uber Hit With Cap as New York City Takes Lead in Crackdown Further, transportation companies.", Aug. 8, 2018, rather than reducing traffic and pollution due to incorrect and inefficient methods and systems. Transportation Network Companies have created systems which allow a given company to set the prices of transportation capacity rather than an open transparent market place. Separately, tool and appliance systems and transportation systems are completely unlinked which creates non-transparent terms for buyers and sellers of tool and appliance units. Separately but related to transportation of freight, Transportation Network Companies even provide similar customers with pricing that may vary by 30% from the same pick-up and delivery points at the same time of ride request which is necessarily price discrimination and is illegal. There is no way for customers of these transportation network companies to see if they are being offered the same price as a mobile smart phone unit across the street. Transportation companies know these deficiencies and openly exploit people because there is no mechanism to ensure that the price one rider pays for one good is the same as another person on the exact same waypoint combination at the exact same time. The current algorithms of transportation network companies are not based on fair and open pricing mechanisms and there is no community to enforce accountability around the pricing structures. We could not imagine going to a grocery store and seeing two customers with the same cup of coffee be charged two different prices for the same cup of coffee because of the way they look or the fact that their smart phone has a different origin location or a plurality of other factors. These deficiencies in the market are not only illegal from a federal trade commission perspective, but the government does not have the resources to police such illegal activity. The disclosed invention, eliminates price discrimination among many other deficiencies because the tool and appliance unit virtual hub community data transformation as well as combined tool and appliance and transportation unit market structure data transformations allow complete transparency for similar commodity services (Federal Trade Commission, "Price Discrimination: Robinson-Patman Violations.".

In the development of the method and system of transforming a series of tool and appliance units near transportation waypoint(s) into virtual communities, high quality tool and appliance rental markets may then become virtual communities where accountability, transparency and economic markets may form in local communities. Current methods and systems leave most home owners or users of tools and appliances isolated from their community because there is no method or mechanism to efficiently tap into a transportation network and certainly no linkage to tool and appliance markets. Prior art does not transform tool and appliance unit data structures or sequences of waypoint combinations into virtual communities. Accordingly, in a very real way, neighbors make a community, all the people on a given commute route are a community, but there is no tool and appliance linkage, structure, method or system to allow the communities to benefit from each other or their tools and appliances. The implementation of the disclosed method and system creates a tool and appliance unit community on a given destination waypoint or series of waypoints which is further transformed into an object to which people may subscribe, friend, follow, comment, post, and using U.S. patent application Ser. No. 15/877,393, "electronic forward market exchange for transportation seats and capacity in transportation spaces and vehicles," filed Jan. 23, 2018, they may transact on an open and transparent transportation security market which forces the lowest cost, transparent and non-price discriminatory solution to dominate the market since all participants have equal access to the market method and system for tool and appliance and transportation capacity units or securities. It is a well-known fact that transparent open access markets create the lowest price for a good or service with fungible characteristics such as occurred in airlines, telecom and electricity markets (Pentland, W., "After decades of doubt, deregulation delivers lower electricity prices.", Oct. 13, 2013, The lowest cost and most efficient solution will greatly reduce travel distances for tool and appliance rentals, improve community well-being, improve community wealth by keeping wealth within a community, reduce pollution, increase transportation capacity utilization rates, reduce traffic congestion, increase service frequency and save consumers of tool and appliance transportation services billions in cost by increasing utilization rates. A method to create an tool and appliance community route or waypoint sequence based object to provide a gateway to open access transparent systems for trading tool and appliance units linked to transportation units will also ensure that new technologies such as autonomous cars do not become elitist and are only reserved for the wealthy and do not actually add to pollution and congestion problems as New York City has seen with Transportation Network Companies. Transportation and tool and appliance markets are currently some of the most inefficient markets in the world making up 30% of greenhouse gases. A tool and appliance unit community route or waypoint sequence structure to provide a gateway for open forward market for tool and appliance linked transportation capacity units will bring market discipline and low-cost commodity pricing to all classes and forms of tool and appliance linked transportation capacity, freight movement and services.

If people on a given waypoint destination or series of waypoints on a tool and appliance route have a method and system to make a community and a gateway to provide each other economic benefits in that tool and appliance community data structure waypoint sequence, substantial congestion, pollution, and maintenance issues will be reduced.

Further, common transportation modes and methods have lacked basic security. Drivers may be felons without anyone able to monitor safety dealing in tool and appliance units. Anyone skilled the art of tool and appliance or transportation would quickly recognize that there is fairly robust security to travel by air, but nearly no security while traveling by truck, bus, car, autonomous car, motorcycle, ship, train, subway, light rail or many other methods. Many scams and uncomfortable transactions also occur on a plurality of online services as Craigslist because the communities are not managed and no background checks occur at any level. It is well known that these security deficiencies lead to widespread issues of illegal prostitution and human trafficking. While all these common methods of transactions lack security checks, the number one reason people use to not use such services is personal security. The disclosed novel invention integrates a high level of security technology within the context of a tool and appliance unit community data transformation for routes to provide a gateway for an open market method of a multi-modal open forward market for tool and appliance and associated freight capacity. The security technology greatly reduces former barriers to community and tool and appliance or transportation unit safety.

Lastly, roadways are generally the highest cause of death with well more dying in vehicle accidents than in all wars combined. Methods and systems such as the disclosed system which build tool and appliance community around a series or sequence of waypoints to provide gateways to economic tool and appliance linked transportation platforms to help riders and drivers combine vehicles not only has tremendous benefits of saving money, reducing pollution, decreasing congestion, but also, it saves lives because all people drive more cautiously when they have more than one person in the vehicle or they are providing a commercial service or activity.

Description of the Related Art

The following descriptions and examples are not admitted to be prior art by virtue of their inclusion within this section.

The current implementations of methods to build tool and appliance unit communities linked to transportation networks suffer from lack of structure, firm service, safety, accountability, scheduling issues, substitutability issues and general lack of technology development. No vibrant tool and appliance unit virtual community platforms aggregate or transform tool and appliance units into virtual communities along specific routes with efficient methods or ancillary benefits. Further, most implementations of methods do not allow price discovery between various sellers and buyers of tool and appliance because the systems are disparate and are not open access or transparent. Anyone skilled in the art of tool and appliance rental or purchase markets would know there is no such community tool and appliance based prior art with search linkages to price-time priority queues and geolocation instructions. Similarly, users of Transportation Network Company services today in New York City may request a ride at the same moment in time from the exact same pick up location and drop off location and experience pricing that is 30% different. The majority of mobile method and system transportation services are utilizing mobile technology and GPS as well as system algorithms to manage transportation as a service which is fundamentally different than viewing transportation or tool and appliance units as a securitized commodity and as a commodity market and forming tool and appliance unit virtual route waypoint sequence communities which the disclosed system and method accomplish. Competing methods do not form waypoint sequence based communities and do not provide gateways to price tool and appliance or transportation as a linked service with the consumer buying multiple units with no transparent marketplace governing price competition for a single tool and appliance, freight or transportation unit along a hub to hub route or at a single waypoint community hub. Furthermore, these services and methods do not foster accountability in service. Typical tool and appliance or transportation systems do not enforce delivery penalties for non-performance as the method is not firm and it does not transform the transportation unit into a standardized security asset with the properties of cost of cover, liquidated damages and force majeure among many attributes of the contract specification. Additional competing implementations of methods do not allow for forward selling or forward purchasing of tool and appliance units linked to transportation, freight or capacity beyond a single transaction which a commodity forward market for transportation unit securities allows through the disclosed systems and methods which are a bridged gateway from the data transformation of a social network into tool and appliance unit route based virtual communities of the disclosed invention. The disclosed creation of tool and appliance unit route based virtual community objects to provide a gateway to a forward market of tool and appliance unit security between virtual hubs along map routes has also never held the attributes of a forward contract security which allows for one tool and appliance unit security to be substitutable for another tool and appliance unit security. In other words, if user A bought a tool and appliance unit security from user B, but then user A was not able to perform the obligation to purchase the tool and appliance unit security from user B, user A could resell the tool and appliance unit security contract to a third party user C on the forward tool and appliance unit price-time priority queue auction market to retrieve the financial payment made for their original purchase from user B and then user C would replace user A and be matched with user B while incorporating the data transformation of the overall method and system while considering additional subordinate concepts such as cost of cover, liquidated damages and force majeure. No prior art transforms a series of waypoints or waypoint sequences into a tool and appliance unit community object that have features which allow users to subscribe, friend, follow or member or to gain benefits of a gateway to an economic mechanism to trade tool and appliance as a transformed tool and appliance unit(s). No prior art discloses the disclosed tool and appliance unit communities which provide gateways to transportation unit securities to incorporate the concepts of cost of cover, liquidated damages, force majeure, contract specifications or firm service to ensure reliability and asset performance. No other system or method performs the aforementioned data transformation combination, nor do the prior art methods and systems capture the technical elements that make the data transformations possible.

Not only does the formation of tool and appliance unit route based or waypoint sequence based community objects increase accountability mechanisms along a give route or single community waypoint, it provides an efficient gateway and market data transformation structure for an open and transparent market for tool and appliance unit securities and allows for large increases in price discovery and by economic theory results in the lowest possible price for consumers. City planners from New York to Austin to San Francisco to Paris to Mumbai to Tokyo to Beijing to Sao Paulo or Johannesburg all struggle to see how the future options of transportation will shape city planning, yet the disclosed method and system dramatically reduces travel by allowing a local community network to develop with associated price-time priority queues for tool and appliances. City planners have large concerns that when markets move to autonomous cars that cities will still have massive congestion problems if people continue to ride as a single passenger in one car or do not utilize empty trunk space.

Implementations of methods have been made in systems that provide virtual communities for ride sharing but none frame the problem as tool and appliance unit routes being a community object data structure or as a gateway to a forward commodity market or a unitized tool and appliance security capacity market with simple elegant systems and methods which allows the natural forces of supply and demand to set the price through a universally transparent medium such as an open transportation and freight capacity forward market with securitized contract specifications. Additionally, no prior art system or method proposes a technically capable solution of integrating the technical software and hardware requirements and data transformations for integrating the tasks of a community forming system for specific routes or tool and appliance unit virtual hub sequences of waypoints which are an object to which one may subscribe, friend, follow or become a member alongside a network, GPS system, mobile computing devices, servers, forward commodity markets, grouping software for hubs, community route processors, my route processors, sequence route processors, transparent open access pricing systems, blockchain audit, safety methods and systems, virtual hub systems, map routing systems, algorithms for no arbitrage conditions in a simple easy to use graphical user interface format for mobile or virtual computing over various mediums which are connected via a network.

1) U.S. Pat. No. 6,708,879 issued Mar. 23, 2004 to Douglas Harold Hunt discloses an automated unmanned rental system that enables the automatic tracking of rental activity and equipment movement with an RFID tracking system and RFID tags. The prior art relates to a specific radio frequency method and system of tracking rental equipment. The disclosed system and method of the novel invention is fundamentally different in that the method and system specifically make a social community object data transformation for tools and appliances with geolocation and associated price-time priority queues for transaction and rental purposes. The two systems and methods carry no overlap of invention in that the prior art would be incapable of performing the methods disclosed in the novel invention due to lack of specific formulas or descriptive words that would enable such a system to perform the required task such as community object formation GPS routing, or price-time priority queues to organize the transformed data.

2) U.S. Pat. No. 6,356,838 issued Mar. 12, 2002 to Sunil Paul discloses a method, system and program for determining an efficient transportation route. The prior art relates to a computer-implemented method is described for determining an efficient transportation route comprising: compiling travel data over one or more travel segments, the travel data transmitted from one or more transportation vehicles traveling over the travel segments; receiving positional data associated with a transportation request, the positional data including an origin and a destination; and providing a driver of a vehicle with a first efficient route from the origin to the destination using the travel data, the first efficient route including one or more of the travel segments. Also described is a computer-implemented method for providing transportation services comprising: receiving a transportation request from a passenger; tracking the passenger's position following the request using positional detection logic; and transmitting positional data identifying the passenger's position to a pickup vehicle. The prior art patent is widely cited as the business model taken by most mobile application based transportation services companies. While the prior art does describe the service model of the current construct of the market for transportation with a custom on demand service and then a corresponding company delivering that service through both the technology and the actual physical transportation, it defines a completely different market scenario than a virtual hub to virtual hub transportation sequence which has been predefined as a community as a gateway for an open transparent market forward market for an individual transportation or freight capacity unit. As previously discussed a commodity based transportation capacity unit market has a completely different market construct than is defined by all operators and patents in the space. The prior art is simply matching transportation requests through a series of servers, GPS systems, and mobile devices. The prior art clearly was a novel invention, but as evidenced by the market, the method has been utilized to replace the inefficient taxi model rather than create a community route sequence marketplace for transportation units that can be priced as a commodity with specific commodity contract specifications and the discipline a market brings to a business problem to fill up unutilized transportation capacity through the efficient mechanism of price. It is very clear the result of the methods and systems of the prior art has contributed to increased congestion and traffic unlike the disclosed methods and systems. In a tool and appliance unit virtual route based community gateway to a commodity-based tool and appliance capacity system with open access transparent systems and methods, the price will continue to go lower until all space has been utilized or supply for the tool and appliance linked transportation units is equal to the demand for tool and appliance linked transportation units. As any observer with ordinary skill would see, most transportation or freight unit tools or appliances go unutilized and this is a proof and counterexample that no such system is in existence and that the patents and prior art in this field do not address the present novel invention of bringing an tool and appliance commodity market to bear on the prices of individual units of tool and appliance linked transportation or freight capacity between virtual hub to virtual hub routes or they have been ineffective of removing transaction costs. If prior art addressed the novel invention, then a marketplace would exist for tool and appliance units of capacity which is open access and transparent and prices would drop until a level was reached where all tool and appliance linked transportation was fully utilized, just as has occurred in oil and gas or other commodity markets. The prior art simply makes the method of taxi cab and private service cars more efficient and in fact adds to congestion as has been empirically documented by all cities across the world. By contrast the novel invention may use the method and system integrating the technical software and hardware requirements for integrating the tasks of a network, GPS system, mobile computing devices, servers, forward commodity markets, grouping software for hubs, route sequence processors, community route processors, transparent open access pricing systems, blockchain audit and safety methods and systems, virtual hub topology systems, securitization, algorithms for no arbitrage conditions in a simple easy to use graphical user interface format for mobile or virtual computing over various mediums which are connected via a network which dramatically lower transaction costs.

3) U.S. Pat. No. 6,421,606 issued Jul. 16, 2002 to Asai et al., discloses a method and system for a route guiding apparatus and medium. The prior art specifically addresses a route guiding apparatus providing information for a route using public transportation as an alternative to a vehicular route. In addition to searching for a vehicular route from a current location to a destination, it is determined whether the current location and the destination are within a zone in which public transportation can be used. When the current location and the destination are determined to be within a public transportation zone, a route using public transportation is searched for. Subsequently, the cost of the route using public transportation and the cost of the vehicular route are compared. When the cost of the public transportation route falls within a predetermined limit, the apparatus indicates the public transportation route. The route costs are calculated considering factors such as required travel time and ticket fees. The apparatus may also recommend public transportation when no parking is available near the destination, or based on traffic information concerning the vehicular route. The prior art clearly addresses a comparing function to determine the lowest cost route to move from one point to another point however the prior art is completely void of providing tool and appliance unit virtual hub waypoint sequence communities as a gateway to an open access transparent forward commodity market for individual tool and appliance capacity units to place the method of a market over the system which would then allow for dramatically lower and more efficient prices and utilization would increase dramatically as supply and demand forces would force the market to balance through price. Accordingly, the prior art is not comparable from a market method and system basis or from an efficiency basis. The novel invention by contrast integrates the technical software and hardware requirements for integrating the tasks of a network, community grouping objects, GPS system, mobile computing devices, servers, securitization, forward commodity markets with price-time priority queues, grouping software for hubs, transparent open access pricing systems, blockchain audit and safety methods and systems, virtual communities, virtual hub topology systems, algorithms for no arbitrage conditions in a simple easy to use graphical user interface format for mobile or virtual computing over various mediums which are connected via a network.

4) U.S. Pat. No. 7,373,320 issued May 13, 2008 to Timothy Francis McDonough discloses a method and system for an invention relating to a futures exchange for services contracts. The SerFEx is an electronic market system that enables the exchange of cash (spot and futures) contracts and futures contracts for the delivery of services. Services are traded on the exchange similar to commodities on a prior art commodities exchange. The exchange allows the futures market to determine the right price for services for the producers and consumers of those services. Participants may buy, sell, or leverage services contracts through a variety of order types. The exchange is composed of an electronic infrastructure that has four major components: a front-end facility comprised of licensed authorized intermediaries, an automated bid/ask matching system, a clearinghouse system, and a title management system. The exchange operates twenty-four hours per day and seven days per week with all accounts settled at least once in every twenty-four hours. Participants in the exchange may be producers of services, intermediaries, speculators, and consumers of the services. The prior art very clearly calls the title and claims of the patent a contract futures exchange. A person with ordinary skill in the art would know there is a dramatic difference between a futures contract which are on regulated exchanges and forward contracts which trade over the counter. Futures contracts are highly regulated by definition. There are very specific legal differences between futures and forward contracts and they can't be confused or used interchangeably. As one of many examples, speculators are not permitted to trade forward contracts as all contracts must be transacted with a physical underlying ownership and must be physically delivered unlike regulated futures exchanges which permit speculators. For the sake of clarity, the tool and appliance linked transportation capacity market is exclusively limited to forward physical contracts which means that the contracts are limited to be traded by only those who are actually providing the underlying service or method. The prior art specifically mentions a data system method for implementing a service contract exchange for construction, transportation, warehousing, postal services, information, real estate, rental, leasing, financial, insurance, professional, scientific, technical services, management, administrative services, educational services, health care, social assistance arts, entertainment and recreation among others. Again someone with ordinary skill would note the specific technical difference between a forward contract which is disclosed and the prior art futures contract. As a very important further technical difference to anyone with ordinary skill in the art, the prior art does not show mobile computers or GPS systems as part of the disclosed futures exchange in any of the claims or as any part of any diagram and it would be clear this would be a necessary requirement to functionally allow for the delivery of futures or forward contracts for tool and appliance units linked with transportation or freight. Furthermore the prior art does not address forming tool and appliance unit virtual hub sequence based communities as objects to which people may subscribe, follow, friend or become a member. Therefore the prior art method and system would be incapable of completing the novel invention disclosed in this patent method and systems. FIGS. 9A and 9B of the prior art show that the primary art of the patent in question was a futures contract to sell a royalty escrow service contract which does not require GPS or mobile based technology to complete a transaction. Accordingly, the prior art would be disqualified from comparison very clearly to someone with ordinary skill based on the futures to forwards legal differences and the technical inability to complete an tool and appliance linked transportation capacity contract without mobile or GPS based technology outlined in any claim or figure of the patents. The prior art is limited to a regulated futures exchange which has a clearing house that guarantees the transactions through a highly regulated process. By contrast forward contracts carry default risks. The prior art refers to mark to market contracts which are a hall mark of futures contracts whereas the novel invention of tool and appliance linked communities as a gateway to forward tool and appliance unit contracts are settled on one date at the end of the contract. The prior art is clearly limited to regulated futures which are heavily participated in by speculators who are betting on price directions and usually close out positions prior to maturity as evidenced by any regulated commodity futures trading commission data. The novel invention by contrast is a forward tool and appliance linked transportation or freight capacity unit security contract which is mainly used by hedgers and physical participants in the market to eliminate the volatility of an asset price and physical delivery usually takes place as would be the case for someone actually using or providing the tool and appliance linked transportation or freight capacity unit. The prior art futures contracts are generally subject to one single regulatory regime as by definition they must be regulated by a single entity in one jurisdiction. The prior art is limited in the claims to futures which in the case of physical delivery, counterparties are chosen randomly by the exchange. By contrast the novel invention of a tool and appliance forward transportation capacity or freight security unit specifies to whom the delivery should be made. The prior art claims are limited to futures where there are margin requirements and periodic margin calls by which cash may change hands daily. By contrast the novel invention of a computer implemented forward commodity tool and appliance linked transportation capacity unit security market, no cash flows until physical delivery takes place. By comparison the novel invention may be transacted across jurisdictional boundaries and are primarily governed by the transactional relations between the parties. The prior art is a futures exchange for service contracts for royalties of many service products highlighting the service of tool and appliance linked transportation or tool and appliance linked transportation as a service which is not an actual physical fungible good such as a commodity like copper or coffee or oil which can have an associated futures contract. By contrast the novel invention is a fungible tool and appliance linked transportation commodity forward contract of an actual tool or appliance transportation capacity bearing unit security. A service of the prior art would not be able to group users using a virtual hub pooling server which would then combine with another virtual hub or combination of hubs to make a tradable commodity unit, again therefore rendering the prior art as incapable of delivering or even rendering the service. The novel invention by contrast integrates the technical software and hardware requirements for integrating the tasks of a network, GPS system, mobile computing devices, servers, forward commodity markets, community grouping software, grouping topology software for hubs, transparent open access pricing systems, blockchain audit and safety methods and systems, virtual hub topology systems, algorithms for no arbitrage conditions in a simple easy to use graphical user interface format for mobile or virtual computing over various mediums which are connected via a network. The prior art is technically incapable of providing the software or hardware that would allow for the completion of a transaction between two users in any of the claims. The prior art also provides no technical language or math formulas to transform the data of a service contract into a futures contract or how that contract would functionally trade with any mention of priority or queueing. Lastly, the prior art of McDonough largely resembles the recent U.S. Supreme court decision in *Alice Corp.* v. *CLS Bank International*. The issue in the Alice case was whether certain claims about a computer-implemented, electronic escrow service for facilitating financial transactions covered abstract ideas ineligible for patent protection. The patents were held to be invalid because the claims were drawn to an abstract idea, and implementing those claims on a computer was not enough to transform that idea into patentable subject matter. It is very clear that the prior art of McDonough is dangerously close in spirit if not fully resembling the Alice decision as the patent is simply pushing forth the concept of using a financial exchange to cover a general abstract idea with very little evidence to support a novel invention, data transformations of the actual structure of the market or a novel approach to how to make the physical market perform with either an escrow service contract futures exchange or a transportation service contract futures exchange. In this specific case, the Supreme court gave a two-step test which McDonough would follow the precedent of Alice in that they are simply borrowing the concept of a futures exchange without a novel technical method or system as to facilitating a transaction and as we clearly present in our arguments, the prior art could not facilitate a transportation futures contract implementation because there is no mobile technology to route tool and appliance units which renders the implementation non-feasible. Further there is no specific computer system or unique program which is novel in the implementation other than regurgitating back the business method of a prior art exchange and then applying it to the abstract concept of applying the existing prior art to service contracts. The novel system and methods of this patent specifically outline the implementation of integrating a novel interfacing of networks, GPS systems, community networks, mobile computing devices, services, forward commodity markets, securitization, grouping software for hubs, transparent open access pricing systems, virtual hub topology, no arbitrage conditions alongside a novel graphical user interface that combines all these systems and methods for forward tool and appliance unit contracts based on tool and appliance community objects. Clearly the current disclosed patent (unlike McDonough), adds "something extra" that embodies and "innovative concept" and is not generic, conventional or obvious as no other patent or business offers these novel concepts.

5) U.S. Pat. No. 7,756,633 issued Jul. 13, 2010 to Huang et al., discloses a method and system for a comprehensive security-enhanced rideshare system is provided. The rideshare program includes localization, mapping and ride matching for participants. Participation incentives and revenue methods provide for the financial viability of the rideshare system. Participant security is monitored in near real-time using location-determining communication devices used by the participants in the system. The rideshare system monitors a number of security-indicating criteria and takes action when an anomalous condition is recognized. The method claim of the prior art specifically refers to providing security in a rideshare environment and monitoring that participant to look for anomalies during the travel route or travel times by a pre-defined threshold and sending security alerts to be confirmed by the rideshare participant that indeed they are safe. Unlike Huang et al., the disclosed novel invention claims defining route or virtual hub sequences as community objects to which members may subscribe, friend, follow or become a member as a gateway to the forward tool and appliance unit market with price-time priority queues. The novel invention is fundamentally different than the prior art as the blockchain technology for security within the forward tool and appliance capacity market relies upon algorithms which include independent comprehensive background checks of participants combined algorithms which alert towards the actual commodity unit of the tool and appliance capacity unit security not being delivered as per the forward contract specifications in the agreement. Further facial recognition, finger print, video 911 and photo recognition dependent sub-methods are not utilized to ensure the identity of users which are part of the novel invention and patent.

6) U.S. Pat. No. 7,680,770 issued Mar. 16, 2010 to Buyukkokten et al. discloses systems and methods for automatic generation and recommendation of communities in a social network or set forth. The prior art claims specifically deal with collecting user profiles or user profile attributes to create a new defined community based on matched profiles. By contrast the disclosed novel invention is defining communities based on static tool and appliance virtual hub sequences, not on user profiles. The static virtual hub(s) or hub sequence(s) are independent of people or members and further require additional data transformations that would not be possible from determining user profiles. Just as bus stops are not determined by user profiles, nor are virtual hubs or sequences. People may join, friend, follow or become a member of an tool and appliance unit virtual hub routes sequence as a community object, but the object is independent of the people. The disclosed novel invention also requires use of GPS networks and servers which are not to be found in the diagrams or claims of the prior art. The disclosed novel invention also requires use of data transformations to form tool and appliance unit virtual hub sequences as community objects as a gateway for additional data transformations of turning tool and appliance units into securities or commodities which are substitutable in a price-time priority queue. The prior art method is specifically creating incremental communities based on a plurality of user features whereas the tool and appliance unit community sequences with price-time priority queues operate and are transformed independent of user features.

7) U.S. Pat. No. 8,121,780 issued Feb. 21, 2012 to Gerdes et al. discloses a method for offering a user reward based on a chosen navigation route includes calculating alternative routes from a starting location to a destination location by taking into consideration route segments including public transportation route segments and road network route segments. The alternative routes are presented to a user. A reward is offered for choosing a respective one of the routes. A navigation system that performs the route calculation preferably queries a network database for public transportation information. The prior art in concept is similar to the Paul et al, US Patent application No 2015/0248689 wherein the user of the system and method are given a reward or incentive for choosing a route which in theory promotes the concept of transportation pooling or the use of public transportation. The clear differences again are that the prior art is not a tool and appliance unit route based virtual hub waypoint sequence as a community to provide a gateway to a forward based tool and appliance unit capacity market which may drive the tool and appliance capacity price to the lowest possible economic level. Accordingly, the prior art does not necessarily lead to the most efficient outcome and is a distinctly different method from an tool and appliance unit community object based on a route sequence and associated price-time priority queue for transactions. The forward commodity individual unit security transparent open access forward market is required to arrive at the most efficient lowest price outcome in the limit and therefore the disclosed invention uses methods and systems to come to a superior solution and is therefore fundamentally different and unique. The novel invention by contrast integrates the technical software and hardware requirements for integrating the tasks of an object oriented programming data transformations, network, GPS system, mobile computing devices, community grouping instructions, community route processors, sequence route processors, servers, forward commodity markets, grouping software for hubs, securitization, transparent open access pricing systems, blockchain audit and safety methods and systems, virtual hub topology systems, algorithms for no arbitrage conditions in a simple easy to use graphical user interface format for mobile or virtual computing over various mediums which are connected via a network.

8) U.S. Pat. No. 8,762,035 issued Jun. 24, 2014 to Uri Levine et al., discloses a method and system for real-time community information exchange for a traffic mapping service for allowing plurality of users having each a navigation device to transmit their locations to a server and optionally to signal to the server their requested destination. The system and method are further capable of calculating traffic parameters such as current traffic speed at a given road based on the momentary locations of the users. The system and method of the invention may also calculate and advise the users of preferred roads to take in order to arrive at the requested location with minimum delay. The prior art utilizes GPS systems and mobile devices to route people most efficiently from a starting point to an ending point utilizing a community of users. The prior art makes no mention of using tool and appliance unit route based virtual hub sequences as community objects to which people may subscribe, friend or follow to provide a gateway to a forward tool and appliance unit market with price-time priority queues. The prior art utilizes a community but has nothing to mention of an open access transparent tool and appliance, transportation or freight trading market for forward tool and appliance or freight capacity with price-time priority queues. Further the prior art is focused on the shortest mapping route for a transportation segment, not using a market to price the value of the individual tool and appliance or transportation capacity units along a given tool and appliance unit virtual hub to virtual hub topology route or a series of single or multi-modal, multi-hub topology subject to constraints to price the transportation or freight capacity. The novel invention by contrast integrates the technical software and hardware requirements for integrating the tasks of an object oriented programming data transformation, network, GPS system, mobile computing devices, servers, securitization, community route processors, my route processors, sequence route processors, forward commodity markets, grouping software for hubs, transparent open access pricing systems, blockchain audit and safety methods and systems, virtual hub topology systems, algorithms for no arbitrage conditions in a simple easy to use graphical user interface format for mobile or virtual computing over various mediums which are connected via a network.

9) U.S. Pat. No. 8,798,593 issued Aug. 5, 2014 to Haney, discloses location sharing and tracking using mobile phones or other wireless devices. The prior art systems and methods provide a system for exchanging GPS or other position data between wireless devices for purposes of group activities, child location monitoring, work group coordination, dispatching of employees etc. Cell phones and other wireless devices with GPS receivers have loaded therein a Buddy Watch application and a TalkControl application. The Buddy Watch application communicates with the GPS receiver and other wireless devices operated by buddies registered in the users phone as part of buddy groups or individually. GPS position data and historical GPS position data can be exchanged between cell phones of buddies and instant buddies such as tow truck drivers via a buddy watch server. Referencing the *Alice Corp.* v. *CLS Bank International* decision, the prior art generally falls under the category of an abstract concept of grouping people using GPS which is not a novel concept or method beyond a general business method from prior art without specific application. Further, the prior art would struggle to stand the light of Alice additionally considering *Bilski* v. *Kappos* that the idea of grouping people with GPS is an abstract idea and does not apply to a specific novel example of tool and appliance or transportation, building a virtual community based on a route sequence data transformation, transportation as a commodity, unique tool and appliance unit contract specifications, uniquely defining tool and appliance unit linked transportation capacity securities as cargo space, tool and appliance unit linked transportation to define a virtual or actual hub or hub series topology in the context of a forward contract market for tool and appliance securities with price-time priority queues.

10) U.S. Patent Application No. US 2015/0248689 with publication date of Sep. 3, 2015 to Sunil Paul et al., discloses a method and system for providing transportation discounts. The prior art systems and methods for providing transportation discounts are disclosed as a server receives, from a client device of a user, a request for a transportation service. In response, the server identifies that the request relates to a particular characteristic associated with modified pricing. The server then calculates an adjusted price for the transportation service based on the modified pricing associated with the particular characteristic. As we have reviewed in the background section of this patent application the disclosed system and method uses proprietary information for a company to price a transportation discount which is non-transparent and the company assigned the patent uses its technology to price the discount rather than an open transparent market such as a commodity market for tool and appliance unit linked transportation or freight capacity. The Paul et al patent application refers to a ride request in FIG. 7 which prices a discount for a ride option based on longer wait time and fewer pick-ups as a disclosed example. In this example, the ride request and the market is not for an individual security unit of tool and appliance linked transportation or freight capacity and the example is not an open access market forward market for the individual units of tool and appliance linked transportation securities and there is no associated price-time priority queue. Custom discounts or the concept of generally used discounts are not used in Individual custom rides are not commodities which has been why the transportation market has not been able to get to the result of the disclosed invention. In a hub to hub based system (or multi-hub topology, there would be enough liquidity and participants to create a viable marketplace of substitutable tool and appliance linked transportation or freight capacity securities. A hub to hub tool and appliance linked transportation model may generally leave the last mile of transportation to another system or method such as the method of a custom tool and appliance linked transportation request. A commodity market for tool and appliance linked transportation or freight capacity may be only viable where there is ample liquidity for substitution as a security. The disclosed method and system of Paul et al., is fundamentally different and more akin to the current methods and systems currently available through companies such as Uber or Lyft or Grab or Via. Paul et al, in FIG. 8 propose an electronic bulletin board for matching custom requests, but clearly do not function as commodity forward market securities with defined commodity delivery points (virtual hubs or multi-layered virtual hubs), price-time priority queues, product specifications, penalties for non-performance, etc. . . . as are standard in commodity contracts for well-known alternative products such as wheat, corn, natural gas, power, oil, etc. . . . . Further FIG. 9 disclosed by Paul et al, shows a cross promotional package approach to transportation and theater or dinner shows which defeats the purpose of defining transportation units as a commodity unit security which will bear the lowest cost and provide the highest economic incentive for usage or making a homogenous asset which can be associated with a price-time priority queue. FIG. 12 from Paul et al describes a method and system for using user profile history data to generate discounts which by definition are set by the system. This is fundamentally different from setting a price by an open access market where any participant can offer any price at any time for a given hub to hub route with uniformity of contract as a security. No system or company controls the pricing, the market is left free to float which is different from the system and method Paul et al, propose which has a transportation server price the transportation request for some hot spot location. Paul makes no mention of tool and appliance unit linked virtual hub sequenced based community object which allows members to subscribe, follow, friend or join to provide a gateway to a forward tool and appliance linked transportation unit market. Further, Paul et al suggest some embodiments are defined from a sponsor giving a transportation discount to a particular location as a promotion. A tool and appliance linked transportation unit commodity security market eliminates custom behavior and treats a tool and appliance linked transportation unit securities for a specific product as uniform without special characteristics such as are disclosed by Paul et al. The novel invention by contrast integrates the technical software and hardware requirements for integrating the tasks of a object oriented programming data transformations, network, GPS system, data transformations, mobile computing devices, securitization, servers, forward commodity markets with price-time priority queues, object oriented community grouping instructions, grouping software for virtual hubs, transparent open access pricing systems, blockchain audit and safety methods and systems, virtual hub topology systems, algorithms for no arbitrage conditions in a simple easy to use graphical user interface format for mobile or virtual computing over various mediums which are connected via a network.

11) U.S. Patent Application No. US 2009/0287401 A1 with publication date of Nov. 19, 2009 to Uri Levine et al., disclose a system and method for traffic mapping service are disclosed for allowing plurality of users having each a navigation device to transmit their locations to a server and optionally to signal to the server their requested destination. The system and method are further capable of calculating traffic parameters such as current traffic speed at a given road based on the momentary locations of the users. The prior art is void to mention a tool and appliance unit transport virtual hub sequence as a community object to which a member may subscribe, join, friend or follow as a gateway to a forward tool and appliance linked transportation unit market with price-time priority queues. The system is designed to advise the users of preferred roads to take in order to arrive at the requested location with minimum delay. The prior art systems and methods clearly route based on time-based routing which is fundamentally different from market price based routing or price based navigation with associated tool and appliance community linked objects which are associated with price-time priority queues. No prior art directly deals with tool and appliance unit communities linked to price based navigation because no market has existed for tool and appliance linked transportation unit securities such as disclosed in the novel and unique invention.

12) U.S. Pat. No. 9,389,094 B2 issued on Jul. 12, 2016 to Jennifer T Brenner et al., disclose systems and methods presented for sequencing locations and events and determining routing and itineraries for the sequence. The prior art makes no mention of forming a tool and appliance unit virtual hub sequence as a community object to which members may subscribe, follow, join or friend as a gateway to a forward tool and appliance linked transportation unit market with associated price-time priority queues. The prior art method and system is very clearly route based on event sequencing rather than price based routing based on a market for underlying tool and appliance linked transportation unit securities. Event sequencing as disclosed in the prior art is based on event addresses which would be fundamentally different from a route based on an underlying forward market for tool and appliance linked transportation units. Further the prior art sequences are dynamic as compared to tool and appliance community units which are route based sequences which are static once formed as transformed data objects. The prior art makes no remote referencing to forward markets for tool and appliance linked transportation, transportation pricing on a route, forming virtual communities around static routes of waypoints or waypoint sequences which are fixed, price sequencing, or other related routing techniques. The prior art method and system would also be incapable of routing or navigation based on price or tool and appliance community objects or forward market tool and appliance linked transportation unit securities with price-time priority queues.

SUMMARY

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

The aforementioned deficiencies and other problems associated with the general tool and appliance markets, lack of connectivity between tool and appliances and transportation and geolocation, social network communities that lack technical capabilities, navigation systems, price-time priority queues, transportation and freight markets, securitization of tool and appliance linked transportation units, other novel systems and interfaces and how tool and appliance linked transportation functions with large inefficiencies which use electronic devices to hail transportation services are reduced or eliminated by the disclosed method and system of integrating and interfacing a plurality of systems into one system which allows the necessary data transformations for the tool and appliance community linked transportation unit security combined with the efficiency of a forward market to price and ration unused spaced as to eliminate wasted tool and appliance community linked transportation units or freight capacity as securities inside transportation spaces. In some embodiments, the methods and systems are on portable devices. In some embodiments, the disclosed method and system is a layer on mapping and map routing software on a plurality of computing devices. In some embodiments, the disclosed method and systems are tool and appliance community networks with geolocation logistic data transformations, associated geolocation transformations and price-time priority queues. In some embodiments, the methods and systems use subordinate legal contracts to transform the data. In some embodiments, the methods and systems are on stationary devices. In yet other embodiments, the methods and system disclosed may use mixed reality, augmented reality or virtual reality or other audio or visualization methods to allow a user to transact and trade freight and tool and appliance community linked transportation capacity as a forward commodity security with associated price-time priority queues. In some embodiments the graphical user interface ("GUI") on any mobile or stationary computer device interfaces with one or more processors, memory and one or more modules, programs or sets of instructions stored in the memory for performing multiple functions. In some embodiments, the user interacts with the GUI primarily through finger contacts or voice commands or other sensory methods to interface with the GUI. In some embodiments, the functions may include the user directing the GUI to place a user profile in a tool and appliance community linked virtual hub so that they may participate, transact or trade a combination of tool and appliance community linked virtual hub transportation routes as a forward commodity for tool and appliance community linked transportation or freight capacity with associated price-time priority queues. In some embodiments, the functions may include the user instructing the GUI to participate, transact, or trade various modes of tool and appliance community linked transportation capacity units such as automobile, air, autonomous vehicle, bike, boat, bus, drone, limo, motorcycle, moped, shuttle, spaceship, subway, taxi, train, other transportation methods, cargo freight, package freight, virtual or various combinations of the aforementioned modes. In some embodiments, the functions may include the user instructing the GUI to form a new or existing tool and appliance community linked virtual hub or virtual hub combination which then has a specification function which forms a basis for the GUI to present the plurality of buyers and sellers of tool and appliance community linked transportation and freight capacity securities between two or more virtual hubs.

In an aspect of the invention, a computer-implemented method for use in conjunction with a computing device with various display formats comprises: a user at a mobile or fixed computing device with a touchscreen or a computing device without a touchscreen or augmented reality non-screen display or audio non-screen interface detecting a user network login, detecting a secure login based on facial recognition, fingerprint recognition or photo scan or biometric interface recognition of the user, performing multiple local and external security and crime checks on the user, detecting and receiving from the user an origin location through the GUI user input or GPS coordinate input from the computing device and detecting from the user input a destination coordinate and transmission of said coordinates, generating and applying specific data legal contract transformations to incorporate general specifications as well as the concepts of cost of cover, liquidated damages, and force majeure, generating and applying one or more optimization techniques to form a virtual hub with other users that have similar tool and appliance community linked transportation requests within a geographic boundary, determining if two or more tool and appliance community linked virtual hubs are required for the path of the auction between a said starting point and ending point, generating instructions to index and rank pricing for a plurality of routes in context of tool and appliance community linked virtual hubs or navigation routing, generating instructions to index navigation routes based on pricing for tool and appliance community linked transportation units along the routes, generating instructions for a plurality of computing devices, networks, community grouping processor and database instructions, virtual hub database servers, network member database servers, transportation platform market database servers to form a combination of virtual hubs and contract specifications for delivery of transportation services or freight capacity between the virtual hubs in a format presented by a GUI which allows the user to submit prices to sell (offer) or bid (buy) in a price-time priority queue tool and appliance community linked transportation or freight capacity between tool and appliance community linked virtual hub combinations, generating instructions to interface a plurality networks, navigation routing based on price of tool and appliance community linked transportation unit securities, global positioning systems networks, servers, securitization, forward commodity markets, grouping software for virtual hubs, map routing systems and methods, transparent open access pricing systems which form a price auction with price-time priority queues of a given quality specification, blockchain audit and safety systems, tool and appliance community linked virtual hub topology servers and systems, no arbitrage constraint condition systems which form one system to implement a forward commodity tool and appliance community linked transportation and freight capacity unit market with price-time priority queues system and method. The programs and instructions are stored in memory and configured to be executed by one or more processes by a plurality of users. The programs may include a plurality of configurations and specification instructions for various modes of tool and appliance community linked transportation capacity. The programs also may include as specification options to select a plurality of timings, quality levels of capacity and service, cost of cover, liquidated damages, force majeure, term of timings such as by the second, minute, hour, day, weekday, weekend, month, annual or day of the week, various order types such as day, good till cancelled, immediate or cancel, good till date, day till cancelled, limit, market, market if touched, snap market, snap mid, snap to primary, peg to benchmark, adaptive custom orders. The programs may also include a plurality of instruction modes such as automobile, air, autonomous vehicle, bike, boat, bus, drone, limo, motorcycle, moped, shuttle, spaceship, subway, taxi, train, packages, multimodal and cargo for tool and appliance community linked transportation or freight capacity. The programs also may include: instructions for virtual hub pick up and drop off points as well as instructions to set various constraints such as cheapest route, single mode, multi-mode, fastest route, most scenic route, highest rating, routing alternatives based on the prices of the tool and appliance community linked transportation unit securities between two hubs, most available or liquid, highest volume, most frequent, service level, security and safety and group restricted modes. The programs may include a plurality of interfaces with map routing software such as Google Maps, Apple Maps, TomTom Maps, Open Street Maps, Bing Maps, Nokia Maps, MapBox or a plurality of other map routing technologies to place the tool and appliance community linked forward transportation unit security pricing on the map navigation routes as an integration layer. The programs and instructions from the GUI provide master instructions for the plurality of computing devices and servers which interface to allow the user to participate, transact and trade a plurality of tool and appliance community linked transportation and freight capacity modes between a plurality of virtual hubs.

In another aspect of the invention, a computing system comprises: a plurality of networks, global positioning systems networks, servers, forward commodity market servers and instructions, securitization legal data transformations, grouping program instructions for virtual hubs and associated servers, transparent open access pricing servers and instructions, community grouping processor and database instructions, GPS map routing servers, indexing databases and programs to rank alternative navigation routes based on tool and appliance community linked transportation unit security pricing, blockchain audit and safety servers and instructions, price-time priority queues, user identification history and instructions against crime databases and identity databases to confirm security of the system and users, virtual hub servers and instructions, no arbitrage constraint condition servers and instructions which form one system to implement a forward commodity tool and appliance community linked transportation and freight capacity unit security market system and method.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 3 illustrates an exemplary price-time priority queue for tool and appliance community linked route objects or waypoint combinations and community route object sequences for transformed tool and appliance community linked transportation and freight units.

FIG. 16 is a flow diagram illustrating methods exemplary users move through while participating, transacting and trading tool and appliance community linked transportation or freight capacity with associated price-time priority queues in accordance with some embodiments.

FIG. 25 illustrates an exemplary user interface to display open or restriction settings for auctions of the tool and appliance community linked transportation or freight forward market with associated price-time priority queues system and method in accordance with some embodiments.

FIG. 40 illustrates an exemplary user interface and database configuration which allow the user to select model, make, type, year, fuel type in configuration for tool and appliance community linked price based navigation with associated price-time priority queues.

DETAILED DESCRIPTION

Figure 1:
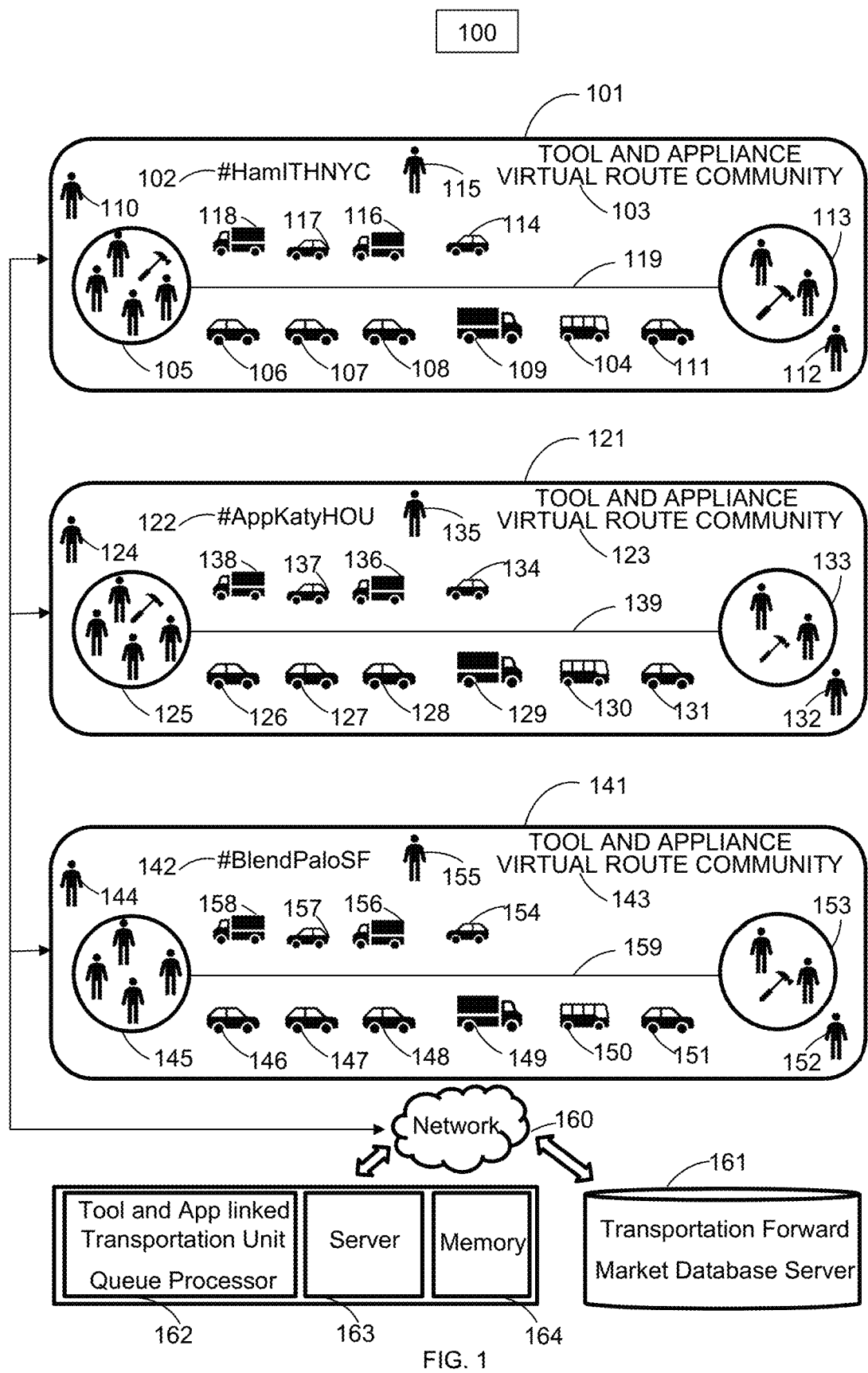
FIG. 1 illustrates a schematic diagram of a plurality of tool and appliance community linked virtual hub sequences data transformations into waypoint combinations as community objects to which users may subscribe and associate price-time priority queues.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade and transact tool and appliance community linked transportation and freight units with associated price-time priority queues as a physical forward commodity. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a", "an" and "the" are intended to also include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a mobile computing device may be substituted for a fixed stationary computing device or a virtual reality headset or a mixed reality headset or an augmented reality headset or an audio interfaced computer device. Embodiments may also occur on a projection computing device or in any other method or system which communicates and integrates the use of a network, community route processor, my route processor, sequence route processor, global positioning system network, mobile computing devices, servers, forward commodity forward market price-time priority auction database, price-time priority queues, grouping software instructions for hubs, securitization transformations and specifications, game servers, tool and appliance community linked objects, indexing algorithms for tool and appliance community linked transportation unit securities on various navigation routes, navigation servers, virtual hub topology methods and systems, transparent open access user interface pricing systems, blockchain audit and safety methods, facial recognition, fingerprint recognition or photo recognition of users for security and identity check, algorithms for no arbitrage conditions and constraints with a user interface or graphical user interface formatted on mobile or stationary computing devices over various mediums which are connected through a network for the purpose of grouping users into virtual hub sequences of community objects as a gateway to participating, transacting or trading tool and appliance community linked transportation or freight capacity units between combinations of virtual hubs as a forward commodity in an auction with price-time priority queues.

The following paragraphs provide various techniques of various embodiments described herein such as illustrated as in FIG. 1. In one implementation as illustrated in FIG. 1, a user 110 may be assigned or may join a tool and appliance community linked virtual route community 101, 103 which is a sequence of virtual hub(s). In some embodiments, the tool and appliance community linked virtual hub sequence may be assigned a metadata tag such as #HamITHNYC 102 which is short for a longer full name sequence such as a hammer as a tool and appliance product originating in Ithaca, NY with a destination waypoint of New York City, NY. In some embodiments, the origin tool and appliance community linked virtual hub 105, may be a specific address and geolocation data in the city of Ithaca, NY. In some embodiments, the route 119 between the Ithaca, NY tool and appliance community linked virtual hub 105 and the New York City, NY tool and appliance community linked virtual hub 113 may be a sequence of two tool and appliance community linked virtual hubs. In some embodiments, there may be many one or more trucks 118 along the route 119 or cars 117 or additional trucks 116 or additional cars 114 which are headed in a certain direction along the route 119. In some embodiments, additional vehicles 106, 107, 108, 109, 104, 111 may be headed the other direction along the virtual hub sequence 119 between two tool and appliance community linked virtual hub points 105, 113. In some embodiments, additional user(s) 112 may join the virtual hub route sequence community 103. In yet another exemplary implementation, a user 110 may be assigned or may join a tool and appliance community linked virtual route community 121, 123 which is a sequence of virtual hub(s). In some embodiments, the virtual hub sequence may be assigned a metadata tag such as #AppKatyHOU 122 which is short for a longer full name tool and appliance community linked sequence such as appliance as a tool and appliance product originating in Katy, Texas with a destination waypoint of Houston, NY. In some embodiments, the origin tool and appliance community linked virtual hub 125, may be a specific address and geolocation data in the city of Katy, Texas. In some embodiments, the tool and appliance community linked route 139 between the Katy, Texas virtual hub 125 and the Houston, Texas virtual hub 133 may be a sequence of two virtual hubs. In some embodiments, there may be many one or more trucks 138 along the tool and appliance community linked route 139 or cars 137 or additional trucks 136 or additional cars 134 which are headed in a certain direction along the route 139. In some embodiments, additional vehicles 126, 127, 128, 129, 130, 131 may be headed the other direction along the virtual hub sequence 139 between two tool and appliance community linked virtual hub points 125, 133. In some embodiments, additional user(s) 132 may join the tool and appliance community linked virtual hub route sequence community 123. In yet another exemplary implementation, a user 144 may be assigned or may join a tool and appliance community linked virtual route community 141, 143 which is a sequence of virtual hub(s). In some embodiments, the tool and appliance community linked virtual hub sequence may be assigned a metadata tag such as #BlendPaloSF 142 which is short for a longer full name sequence such as a tool and appliance community linked sequence such as blender as an tool and appliance product originating in Palo Alto, California with a waypoint destination of San Francisco, California. In some embodiments, the origin virtual hub 145, may be a specific address and geolocation data in the city of Palo Alto, California. In some embodiments, the tool and appliance community linked route 159 between the Palo Alto, California tool and appliance community linked virtual hub 145 and the San Francisco tool and appliance community linked virtual hub 153 may be a sequence of two virtual hubs. In some embodiments, there may be many one or more trucks 158 along the route 159 or cars 157 or additional trucks 156 or additional cars 154 which are headed in a certain direction along the route 159. In some embodiments, additional vehicles 146, 147, 148, 149, 150, 151 may be headed the other direction along the virtual hub sequence 159 between two virtual hub points 145, 153. In some embodiments, additional user(s) 152 may join the tool and appliance community linked virtual hub route sequence community 143.

In some embodiments, tool and appliance community linked virtual hub sequences such as Ithaca, NY tool and appliance community linked virtual hub 105 to New York City, NY tool and appliance community linked virtual hub 113 are transformed into community objects which may then be assigned a plurality of attributes in the same sense as a class in the Java programming language has methods as a part of the class object in object oriented programming. In some embodiments, the data transformation of a tool and appliance community linked virtual hub sequence into a community object allows the similar benefits of the data transformations involved in computing languages with methods which help the instructions of the computer program communicate in an organized manner using modular logic. In some embodiments, tool and appliance community linked virtual hub sequences such as 105 to 113 #HamITH-NYC 102 may be combined with other tool and appliance community linked virtual hub sequences to extend the series sequence. In some embodiments, tool and appliance community linked virtual hub sequences such as 105 to 113 #HamITHNYC 102 which is short for a longer full name sequence such as a tool and appliance community linked sequence such as hammer as a tool and appliance product originating in Ithaca, NY with a waypoint destination of New York, NY. In some embodiments, tool and appliance community linked virtual hub sequences with price-time priority queues may be two virtual hubs that are next door to your home and only 500 feet between waypoints or they may be many miles apart. As we have discussed at length in the previous sections of the disclosed invention, while there may be hundreds or thousands or millions of people along various tool and appliance community linked transportation virtual hub sequences, there currently exists no method or system of organizing an tool and appliance community linked route or tool and appliance community linked virtual hub sequence into a transformed data community object. The attributes of communities allow for superior communication, accountability and even transactions to occur within a community object 101. In some embodiments, the data transformation of a tool and appliance community linked virtual hub sequence community object 101 allows a plurality of network members 110, 112 to be assigned tool and appliance community linked virtual route communities 103 based on a plurality of attributes, prior GPS location histories, navigation search queries or other attributes. In some embodiments, tool and appliance community linked virtual hub sequences which have been transformed into community objects 101 provide greater communication and organizational ability for a market to transact tool and appliance community linked transportation unit(s) and provide a gateway for those transportation unit transactions as described in U.S. patent application Ser. No. 15/877,393, "Electronic Forward market exchange for transportation seats and capacity in transportation spaces and vehicles," filed Jan. 23, 2018, the entirety of which is incorporated by reference herein.

In some embodiments, tool and appliance community linked virtual hub sequences which have been transformed into community objects 141 communicate through a network 160 to associate a price-time priority queue for a transformed tool and appliance community linked transportation community object using a tool and appliance community linked transportation unit queue processor 162, a server 163, memory 164 and a tool and appliance community linked transportation forward market database server 161. In some embodiments, the virtual hub sequences or community objects 141, 121, 101 may be independent or sequenced to construct a waypoint sequence of multiple linked tool and appliance community linked virtual hub route community objects 101, 121, 141. In some embodiments, the associated price-time priority queue 300 for tool and appliance community linked transportation units may have generated processing and user interface display instructions from the tool and appliance community linked transportation unit queue processor 162, the server 163, the memory 164 and a tool and appliance community linked transportation forward market database server 161 through a network 160. In some embodiments, the price-time priority queue 300 for transformed tool and appliance community linked transportation units may process and display a plurality of time and date sequences for a plurality of forward delivery periods for tool and appliance community linked transformed transportation unit(s).

Figure 2:
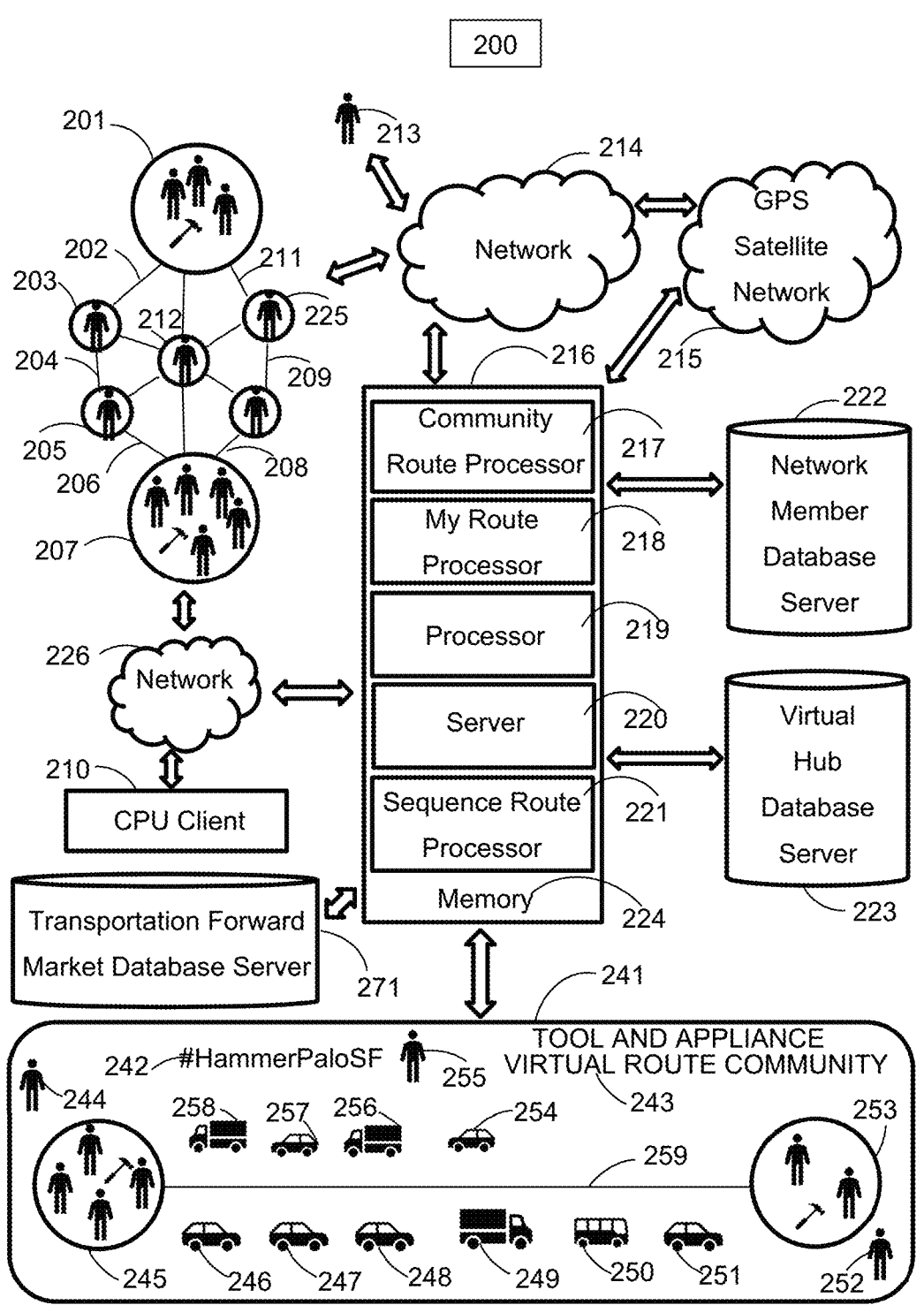
FIG. 2 illustrates a schematic diagram of an exemplary network configuration and of a tool and appliance community linked virtual hub sequences data transformation into a waypoint combination as community object to which users may subscribe and associate price-time priority queues.

FIG. 2 illustrates in some embodiments, an exemplary network configuration 200. In some embodiments a network of tool and appliance community linked virtual transportation hubs 201, 203, 205, 207, 212, 225 may represent a tool and appliance community linked virtual transportation network of a neighborhood, village, city, county, state, country, continent or even inter-virtual hub networks across geographies. Prior art as well as current inventions carry no methods or data transformations to transform tool and appliance community linked navigation routes 202 which are a virtual hub sequence 202 between a series of virtual transportation hubs 201 and 203 or 203 and 212 or even multi-leg tool and appliance community linked combinations such as 201 to 203 and 203 to 212 as a sequence. In some embodiments, user(s) 213 or the network 214 have input hundreds or thousands or millions or more tool and appliance community linked virtual hubs 201 to form a network topology for tool and appliance community linked transportation virtual hub sequences 241. In some embodiments, the tool and appliance community is linked transportation data transformation to a series of virtual transportation hubs 245, 253 allows for network structure 201, 203, 212, 205, 207, 225, 212 and organization such as a hub and spoke model which is heavily utilized within the airline transportation industry or a plurality of other competing network topologies which are not dependent on road pathways. While hub and spoke transportation systems are common for airplane transportation or bus and train networks, they do not exist for private vehicle networks in an organized manner other than road ways. In some embodiments, tool and appliance community linked virtual transportation hub topologies 241 over road structures 259 allows for the benefits of public transportation networks to be combined with private vehicle networks. In some embodiments, the tool and appliance community linked virtual transportation hub network 201, 203, 212, 205, 207, 225, 212 has been input into the network 214. In some embodiments, the topology of the virtual hub network 201, 203, 212, 205, 207, 225, 212 then moves for further data transformation in the community route processor 217 which transforms subsections of the tool and appliance community linked transportation network topology 201, 203, 212, 205, 207, 225, 212 into a tool and appliance community linked virtual hub sequence 241 which represents two addresses 245, 253 along a tool and appliance community linked virtual hub sequence 242 such as Palo Alto, California 245 to San Francisco, California 253 corresponding each tool and appliance community linked virtual hub address 245,

252 with a physical address. Tool and appliance community linked virtual route communities 243 may be one to one, one to two or one to many and any superset or subset combination thereof. The My Route Processor 218 further processes tool and appliance community linked virtual hub combination and tool and appliance community linked virtual transportation hub sequences into a specific network members account on the network member database server 222. In some embodiments, the tool and appliance community linked sequence route processor 221 may connect a plurality of virtual hub sequences 201, 203 205, 207 in a logical order to complete a path combination 201 to 207 for tool and appliance community linked navigation or community object construction. In some embodiments, community objects may be made from simple direct path routes 202 between two virtual hubs 201 and 203 or multi-virtual hub constructions between two tool and appliance community linked virtual hub sequences 201 to 207 by waypoints of 201 to 203 to 212 to 207 or any combination or superset or subset thereof. In some embodiments, the tool and appliance community linked virtual route community objects 243 allow attributes to be assigned to the community objects. In some embodiments, users may be assigned to a plurality or tool and appliance community virtual hub sequence objects 241. In some embodiments, network members 213 may be assigned to a tool and appliance community linked virtual route community 241 because the user(s) route history on the GPS satellite network 215 suggests the route has overlap with tool and appliance community linked virtual hub route sequences the user has used or queried on various search methods on the system for the tool and appliance product. In some embodiments, the search interface 5000 interprets a keyword, such as hammer, which then queries the tool and appliance community linked virtual route object, which then indexes search results based on the following priority of tool and appliance 242, then geolocation 242, 245, 253, then tool and appliance community linked virtual route object price-time priority queue 271. In some embodiments the user 213 may use a CPU client 210 that is a visual, audio or other type of computing interface with the network 226 of tool and appliance community linked navigation route communities 243. In some embodiments, the tool and appliance community linked transportation forward market database server 271 may interface with a processor 219 or sequence route processor 221 or my route processor 218 or tool and appliance community linked community route object processor 217 to process a plurality of price-time priority queues 300 for transformed transportation unit(s). In some embodiments, a plurality of vehicles 258, 257, 256, 254, 246, 247, 248, 249, 250, 251 may be in route between a said first virtual hub 245 and a second said virtual hub 253. In some embodiments, vehicles 257, 247 may be moving in opposite directions along a route 259. In some embodiments, a truck 258 may contain a transformed transportation unit(s) or a car 251 may contain a transformed transportation unit(s) or a bus 250 may contain a transformed transportation unit(s) or a plurality of other vehicle types may contain a transformed tool and appliance community linked transportation unit(s) under a specification which is substitutable. In some embodiments, the tool and appliance community linked virtual hub or community object sequence of waypoints may be reversed from waypoint 245 to waypoint 253 to waypoint 253 to waypoint 245. In some embodiments, the tool and appliance community linked route object 241 or tool and appliance linked community route object sequence 101, 121, 141 may have an infinite series of associated price-time queues 300 whereby any subset or superset comprise a forward market for transformed tool and appliance community linked transportation unit(s), transformed tool and appliance community linked route object(s) and the associated transformed tool and appliance community linked transportation unit(s). In some embodiments tool and appliance community linked virtual route communities 241, 101, 121, 141 are transformed data structures that form objects which community users 213 may subscribe, friend, join, follow to more efficiently have news and understanding for the tool and appliance community linked transportation unit transactions as described in U.S. patent application Publication, Ser. No. 15/877,393, "Electronic Forward market exchange for transportation seats and capacity in transportation spaces and vehicles," filed Jan. 23, 2018, the entirety of which is incorporated by reference herein.

FIG. 3 illustrates exemplary user price-time priority queue 300 for transacting or matching transformed tool and appliance community linked transportation unit data, participating, transacting and/or trading tool and appliance community linked transportation, representing the transformed tool and appliance community linked transportation unit value as a homogeneous asset specification or freight as a physical forward commodity security between combinations of virtual hubs over various transportation modes. In some embodiments, user transformed tool and appliance community linked transportation unit(s) or transformed tool and appliance community linked transportation unit(s) associated with tool and appliance community linked route community objects interface 300 includes the following instructions, transformations and elements, or a subset or superset thereof:

exemplary transformed tool and appliance community linked transportation unit price-time priority sell queue 320;

exemplary transformed tool and appliance community linked transportation unit price-time priority buy queue 321;

exemplary transformed tool and appliance community linked transportation unit price priority bucket 305 in the transportation unit buy queue of $5.10;

exemplary transformed tool and appliance community linked transportation unit price priority bucket 306 in the transportation unit buy queue of $5.30;

exemplary transformed tool and appliance community linked transportation unit price priority bucket 310 in the transportation unit buy queue of $5.60;

exemplary transformed tool and appliance community linked transportation unit price priority bucket 314 in the transportation unit sell queue of $5.70;

exemplary transformed tool and appliance community linked transportation unit price priority bucket 315 in the transportation unit sell queue of $5.80;

exemplary transformed tool and appliance community linked transportation unit price priority bucket 316 in the transportation unit sell queue of $6.60;

exemplary transformed tool and appliance community linked transportation unit price-time priority buy price 304 in the first time position of the price priority bucket 305 of $5.10;

exemplary transformed tool and appliance community linked transportation unit price-time priority buy price 303 in the second time position of the price priority bucket 305 of $5.10;

exemplary transformed tool and appliance community linked transportation unit price-time priority buy price 302 in the third time position of the price priority bucket 305 of $5.10;

exemplary transformed tool and appliance community linked transportation unit price-time priority buy price 307 in the first time position of the price priority bucket 306 of $5.30;

exemplary transformed tool and appliance community linked transportation unit price-time priority buy price 309 in the first time position of the price priority bucket 310 of $5.60;

exemplary transformed tool and appliance community linked transportation unit price-time priority buy price 308 in the second time position of the price priority bucket 310 of $5.60;

exemplary transformed tool and appliance community linked transportation unit price-time priority sell price 311 in the first time position of the price priority bucket 314 of $5.70;

exemplary transformed tool and appliance community linked transportation unit price-time priority sell price 312 in the second time position of the price priority bucket 314 of $5.70;

exemplary transformed tool and appliance community linked transportation unit price-time priority sell price 313 in the third time position of the price priority bucket 314 of $5.70;

exemplary transformed tool and appliance community linked transportation unit price-time priority sell price 318 in the first time position of the price priority bucket 315 of $5.80;

exemplary transformed tool and appliance community linked transportation unit price-time priority sell price 319 in the second time position of the price priority bucket 315 of $5.80;

exemplary transformed tool and appliance community linked transportation unit price-time priority sell price 317 in the first time position of the price priority bucket 316 of $6.60;

exemplary transformed tool and appliance community linked transportation unit price time priority limit order book ("LOB") 325 is represented by the vector q(t) 301, such that the i-th coordinate for i>0, $q_i$ (t), is the number of sell limit orders of transformed transportation units that are waiting in the LOB at time t a price iδ (δ is the price unit tick size of the transformed tool and appliance community linked transportation unit), the number of buy limit orders for transformed tool and appliance community linked transportation units at iδ are represented with a negative sign $q_i$ (t);

exemplary benchmark price 326 of all sell limit orders at time t are computed as s(t)=s(q(t))=min (min {0<iδ:$q_i$ (t)>0}), if $q_i$ (t) is less than or equal to 0 for all i>0, then s (q (t))=infinity;

exemplary benchmark price 327 of all buy limit orders at time t are computed as b(t)=b (q (t))=max (max {iδ>0: $q_i$ (t)<0}), if $q_i$ (t) is greater than or equal to 0 for all i>0, then b(q (t))=negative infinity;

exemplary order match 328 in the transformed tool and appliance community linked transportation unit limit order book where s(t)=b(t), which then moves the method and system to the matched transformed tool and appliance community linked transportation unit limit order confirmation and delivery process;

exemplary limit order book status of no order match 329, where s (t)>b (t);

exemplary limit order book i-th $q_i$ (t) element 330 of LOB is cancelled, remove from queue;

exemplary i-th qi (t) element is a new transformed tool and appliance community linked transportation unit order 331 in LOB, insert into respective limit order buy queue 321 or limit order sell queue 320 with priority of price, then time into the price time priority queues 300.

In some embodiments, the price-time priority queue 300 for transformed tool and appliance community linked transportation units may be assigned to a tool and appliance community linked commute community object 241 which is a waypoint sequence of transformed tool and appliance community linked transportation units. In some embodiments, the price-time priority queue 300 may be assigned to two waypoints as an tool and appliance community linked commute community object 241 or the price-time prior queue 300 may be assigned to an tool and appliance community linked commute community waypoint object sequence of many waypoints 203 to 205 to 207 to 212 which have been added together to form one continuous tool and appliance community linked commute community object 241 and respective price-time priority queue for transformed tool and appliance community linked transportation units through processing instructions from the tool and appliance community linked Community Route Processor 217 and tool and appliance community linked Sequence Route Processor 221 via the network(s) 226 and 214 and 215. In some embodiments, the limit order book 301 vector may be assigned to a specific date and time for the tool and appliance community linked commute community waypoint object which is a forward market price for transformed tool and appliance community linked transportation unit(s) 271 and tool and appliance community linked commute community waypoint object(s) 241. In some embodiments, a specific transformed tool and appliance community linked transportation unit price-time priority queue limit buy order 304 with a specific price stamp bucket 305 of $5.10, may be cancelled, if the 304 order is cancelled, the 303 price-time priority limit order book buy queue price then moves to the higher price-time priority queue position of 304 and price-time priority price of 302 moves to position 303. In some embodiments, the price-time priority limit order sell price 319 of price-time priority bucket price 315 of $5.80 may be cancelled, if 319 price-time priority of the transformed tool and appliance community linked transportation unit is cancelled, then order 317 moves to a higher position in the overall transformed tool and appliance community linked transportation queue 320 even though the limit order book price 317 remains in the price bucket of 316 which is $6.60. In some embodiments, price-time priority insertion may occur where a new order is inserted into either the transformed tool and appliance community linked transportation unit buy queue 320 or transformed tool and appliance community linked transportation unit sell queue 321. In some embodiments, by example but not limiting by example, a new price-time limit order for a transformed tool and appliance community linked transportation unit may be inserted as a sell order at a price of $5.70 at position 313 which would then assume order 312 was also at a price of $5.70 and that order 312 was placed with a time that was before order 313 was placed. In the aforementioned example of the price-time order insertion of 313, price-time orders of 319, 318 and 317 have moved lower in their relative position even though they remain in distinctly different price buckets of 315 and 316 respectively as the price-time priority queue 300, price is first priority, then time stamp in the price-time priority queue 300 for transformed tool and appliance community linked transportation units.

In some embodiments, the lowest selling price s(t) 326 may equal the highest buying price b(t) 327, in which case the highest transformed tool and appliance community linked transportation unit buy queue price bucket 310 is equal to the lowest transformed tool and appliance community linked transportation unit sell queue 320 selling bucket price 314. In the example 300 of the limit order book 301, but not limiting by example, the highest transformed tool and appliance community linked transportation unit buy price 310 of $5.60 is lower than the lowest tool and appliance community linked transportation unit sell queue 320 lowest selling bucket 314 of $5.70 so no match occurs because s (t)>b (t) 329. In some embodiments, many order insertions 331 or order cancellations 330 may occur for transformed tool and appliance community linked transportation units from the tool and appliance community linked transportation forward market database server 271 associated with tool and appliance community linked community objects which are series of waypoints 241.

In some embodiments, the LOB 300 for transformed tool and appliance community linked transportation units may contain many different types of instruction structures and specifications such as limit orders 720, market orders 720, market if touched orders 720, snap market orders 720, snap mid orders 720, snap to primary orders 720, peg to benchmark orders 720, or adaptive custom orders 720 which are custom customer designed instructions which are all standard order types for anyone skilled in the art of markets. In some embodiments, the LOB 300 for transformed transportation units may also contain instructions for order times such as good for the day 710, good till cancelled 710, immediate or cancel 710, good till date 710, day till cancelled 710 or a plurality of additional custom instructions for the timing of the order of the transformed transportation unit in the LOB 300 that is associate with an tool and appliance community linked commute community object 241. In some embodiments, a plurality of additional instructions and specifications may also be unique to each transformed tool and appliance community linked transportation unit LOB 300 such as automobile mode 811, air mode 812, autonomous vehicle mode 813, bike mode 814, boat mode 815, bus mode 816, drone mode 817, limo mode 818, motorcycle mode 819, moped mode 820, shuttle mode 821, spaceship mode 822, subway mode 823, taxi mode 824, train mode 825, fastest optimized mode 826 which may combine many modes 810 or a single mode 810 for a waypoint commute community object 241 or waypoint tool and appliance community linked sequence 201 to 203 to 205 to 212 to 207 of many tool and appliance community linked commute communities 241.

In some embodiments, the LOB 300 may be assigned to transformed tool and appliance community linked transportation unit packages 828 that have associated tool and appliance community linked commute community objects 241. In some embodiments, the LOB 300 for transformed transportation units may be assigned to cargo 829 such as a trailer of a rig or container of a boat or container on a truck or any type of cargo that takes up the space of a transformed tool and appliance community linked transportation unit. In some embodiments, the LOB 300 may even be assigned to the virtual transformed tool and appliance community linked transportation unit 830 which would be space along a packet moving medium such as a telecom pipeline, satellite telecom or wireless telecom that moves packets of data which are transformed transportation units.

Figure 4:
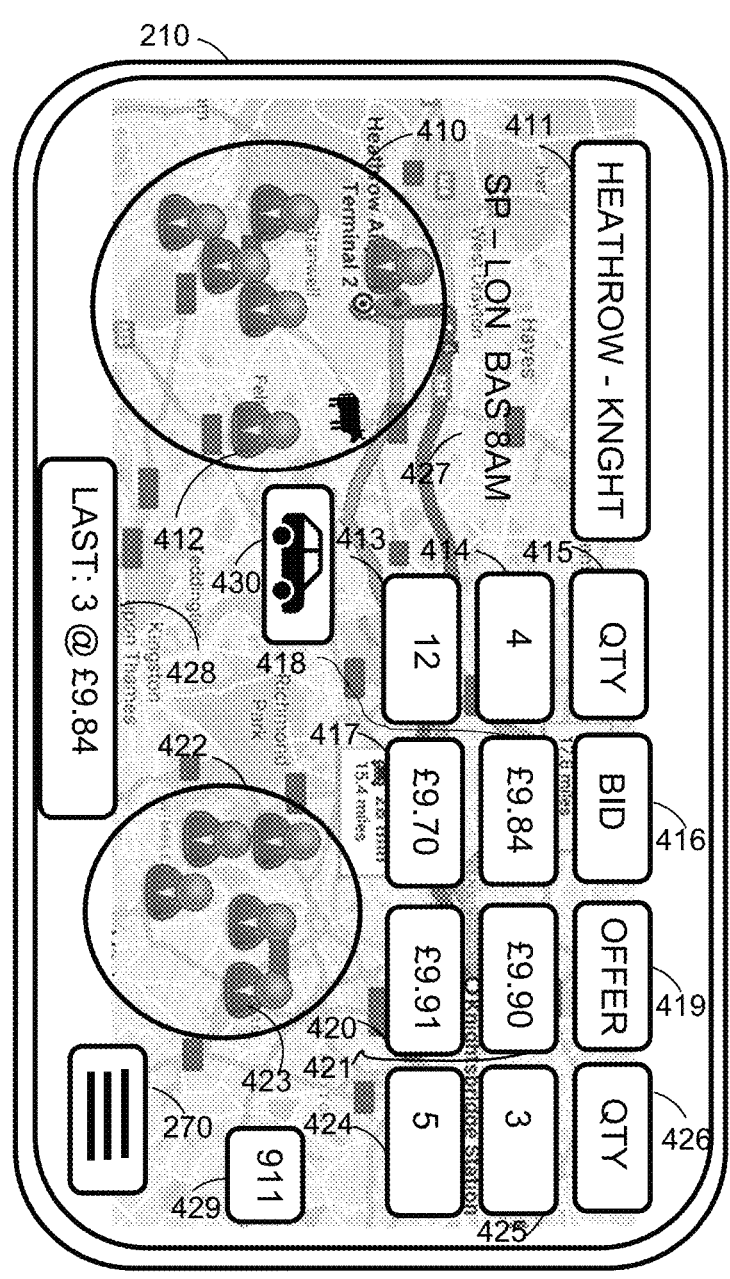
FIG. 4 illustrates an exemplary user interface with various international configurations of trading tool and appliance community linked automobile or freight capacity with associated price-time priority queues in accordance with some embodiments.

FIG. 4 illustrates exemplary user interfaces 210 for participating, transacting and/or trading tool and appliance community linked transportation as a physical forward data transformed tool and appliance community linked transportation unit commodity or security between combinations of virtual hubs which may be community objects 241 over various transportation modes. In some embodiments, user interface 210 includes the following elements, or a subset or superset thereof:

exemplary tool and appliance community linked virtual hub combination 411;

exemplary tool and appliance community linked virtual hub origin/from location 410 with users 412 within the tool and appliance community linked virtual hub location 310;

exemplary specification summary of the market, level of service and time of delivery commencement 427, in this particular embodiment the GUI 210 has moved to an international tool and appliance community linked virtual market hub combination market such as within London;

exemplary mode of tool and appliance community linked transportation capacity type 430;

exemplary tool and appliance community linked transaction summary of the last trade price-time priority queue auction quantity and price 428 in the local currency or another currency set by the user 110;

exemplary tool and appliance community linked virtual hub destination/to location 422 and user who is being delivered on the tool and appliance community linked transportation or freight capacity unit 423;

exemplary bid/buy quantity title header 415 for an exemplary tool and appliance community linked virtual transportation hub market;

exemplary bid/buy price title header 416 for an exemplary tool and appliance community linked virtual transportation hub market;

exemplary offer/sell price title header 419 for an exemplary tool and appliance community linked virtual transportation hub market;

exemplary offer/sell quantity title header 426 for an exemplary tool and appliance community linked virtual transportation hub market;

exemplary bid/buy quantity 414 for the best bid quantity for the associated LOB 300 from a plurality of users 110 for an exemplary respective transportation capacity tool and appliance community linked virtual hub combination that has undergone a plurality of data transformations in the method 411;

exemplary bid/buy quantity 413 for the second-best bid quantity for the associated LOB 300 from a plurality of users 110 for an exemplary respective tool and appliance community linked transportation or freight capacity virtual hub combination that has undergone a plurality of data transformations in the method 411;

exemplary bid/buy price 418 for the best bid price for the associated LOB 300 from a plurality of users 110 for an exemplary respective tool and appliance community linked transportation capacity virtual hub combination that has undergone a plurality of data transformations in the method 411;

exemplary bid/buy price 417 for the second-best bid price for the associated LOB 300 from a plurality of users 110 for an exemplary respective tool and appliance community linked transportation or freight capacity virtual hub combination that has undergone a plurality of data transformations in the method 411;

exemplary offer/sell price 421 for the best offer price for the associated LOB 300 from a plurality of users 110 for an exemplary respective tool and appliance community linked transportation or freight capacity virtual hub combination that has undergone a plurality of data transformations in the method 411;

exemplary offer/sell price 420 for the second-best offer price for the associated LOB 300 from a plurality of users 110 for an exemplary respective tool and appliance community linked transportation or freight capacity virtual hub combination that has undergone a plurality of data transformations in the method 411;

exemplary offer/sell quantity 425 for the best offer quantity for the associated LOB 300 from a plurality of users 110 for an exemplary respective tool and appliance community linked transportation or freight capacity virtual hub combination that has undergone a plurality of data transformations in the method 411;

exemplary offer/sell quantity 424 for the second-best offer quantity for the associated LOB 300 from a plurality of users 110 for an exemplary respective tool and appliance community linked transportation or freight capacity virtual hub combination that has undergone a plurality of data transformations in the method 411;

exemplary safety dispatch "911" button 429 to enact video and audio recording of the user 110 environment and dispatch of that information to authorities.

exemplary hamburger menu button 270 to move back to menu options and settings away from the participation, transaction, trading GUI 210 embodiment.

In some embodiments the user 110 may enter a tool and appliance community linked transaction quantity and price for transformed tool and appliance community linked transportation or freight capacity unit securities to participate, transact and/or trade by the GUI 210 detecting user 110 contact with a bid/buy price 418 or offer/sell price 421. The GUI 210 detects user 110 contact with any of the GUI 210 buttons which have been aforementioned. The GUI 210 may detect user contact 110 with any of the GUI 210 buttons 418, 417, 420,421 or user 110 voice interface with the application 210 method. Upon user 110 contact with buttons on the GUI 210, instructions are instantiated which allows the user 110 to change the specifications of the respective tool and appliance community linked virtual hub combination 411. A plurality of prices and markets may be presented based on a plurality of contract specifications. In some embodiments, the best bid/buy price 418 may be moving up in price or down in price depending on the market conditions at any given time. In some embodiments the last auction trade or last transacted price for a given specification is listed to help the user 110 understand how the market is moving so that the user 110 may submit a competitive offer/selling price 421 or bid/buying price 414. In some embodiments, users 110 may adjust settings of the GUI 210 to show more bid/buying prices 417 or more offer/selling prices 420. In some embodiments the matrix of tool and appliance community linked market quantities and prices 413, 414, 415, 416, 417, 418, 419, 420, 421, 424, 425, 426 may be referred to as market depth in the GUI 210 embodiment. In some embodiments the number of users 110 may be displayed as user icons 412 or 423 for the amount of people logged in which desire to transact, trade or participate in a given tool and appliance community linked virtual hub 410 to tool and appliance community linked virtual hub 422 combination auction with price-time priority queues. In some embodiments, users 110 may select the tool and appliance community linked transportation mode 430 such that the user allows a market for only one form of transformed tool and appliance community linked transportation capacity as a commodity or security or the user 110 may allow the system to show multiple forms of transformed tool and appliance community linked transportation capacity between two virtual tool and appliance community linked transportation capacity hubs 410, 411, 422. In some embodiments the GUI 210 may detect a user 110 selecting the 911 button 429 which may activate voice and video recording functions on the mobile or stationary device 111 and transmit the data with a confirmation from the user 110 to the authorities to provide enhanced security while participating, transacting or trading forward transformed tool and appliance community linked transportation or freight as a commodity or security. In some embodiments the user may toggle between the GUI 210 market view screen in FIG. 4 and other menu 270 options and settings by the user 110 selecting the hamburger button 270 and the GUI 210 detecting the user 110 input or contact. In some embodiments the GUI 210 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs 410, 422 with a plurality of specifications 427 at specific market prices.

Figure 5:
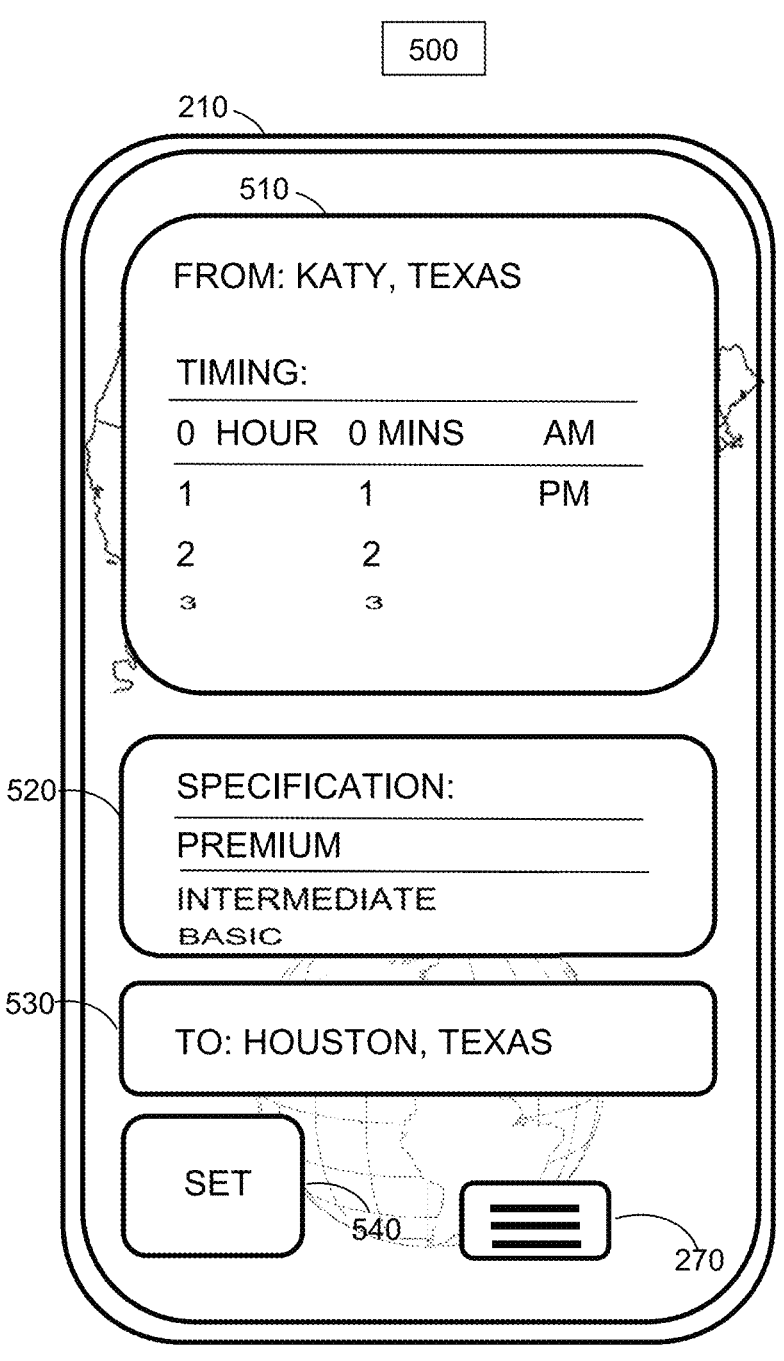
FIG. 5 illustrates an exemplary user interface to select a specification grade of tool and appliance community linked transportation or freight capacity with associated price-time priority queues with various timing specifications in accordance with some embodiments.

FIG. 5 illustrates an exemplary user interface 210 for listing timing specifications 510 on a portable multifunction device in accordance with some embodiments. In some embodiments, user interface 210 includes the following elements, or a subset or superset thereof:

origin/From virtual hub timing (a data transformation) 510;

specification of quality of tool and appliance community linked transportation capacity (a data transformation) 520;

destination/To virtual hub (a data transformation) 530;

setting button 540 to transmit the timings 510 and quality specification grade 520 (a data transformation);

hamburger button 270 to instruct the GUI 210 to take the user 110 to the menu screen.

In some embodiments, the user 110 may select a plurality of timing options in the timing selection specification 510. The timing specification constraint may be the time at which the transformed tool and appliance community linked transportation or freight capacity unit security departs from the origin/from tool and appliance community linked virtual hub 410. As in any commodity market, if a user 110 is late and they have purchased the tool and appliance community linked transportation capacity unit, the user must still pay for the tool and appliance community linked transportation or freight capacity unit regardless if the user 110 is present at the time of delivery, departure or not. The user has the option if they know they will be late to sell back the tool and appliance community linked transportation or freight capacity unit to the market at the then current price. Accordingly, for the purpose of example, but not limiting by example, if a user 110 bought a transformed tool and appliance community linked transportation capacity unit security for £9.90 421 and the user 110 realized they would be late for the 8 am departure specification 427, then the user 110 may either pay for the tool and appliance community linked transportation unit even though the user 110 was present and did not take delivery of the tool and appliance community linked transportation unit security, or the user 110 may preemptively sell back the tool and appliance community linked transportation capacity unit security to the market at the then current bid price 418. The user 110 would then have offset their obligation in a timely manner and another user 110 on the network 140, 160 may then purchase the available tool and appliance community linked transportation or freight capacity unit security. By eliminating the initial obligation by an creating an offset obligation, the additional data tool and appliance community linked transformation concepts such as cost of cover, liquidated damages or force majeure are not employed by the method. In some embodiments, virtual tool and appliance community linked transportation or freight hub combination units may or may not have the available liquidity if the user 110 were to wait too long before delivery of the tool and appliance community linked transportation capacity unit to make an adjustment and therefore may need to take delivery even if they are not present. In some embodiments, the user 110 may select a grade specification 520. For the purpose of example, but not limiting by example, a plurality of specification grades may exist, such as "premium" which may be defined by certain classes of tool and appliance community linked transportation capacity units and/or certain quality levels. Similarly, for the purpose of example, but not limiting by example, a plurality of specification grades may exist such as "intermediate" or "basic" which may be defined by certain classes of tool and appliance community linked transportation or freight capacity unit securities and/or certain quality levels. In some embodiments, the user 110 may select the destination/to tool and appliance community linked virtual hub 530 to change the tool and appliance community linked virtual hub combination. In some embodiments, the user 110, may contact the "set" button 540 to transmit the transformed tool and appliance community linked transportation capacity unit security specification data by using the GUI 210 detecting the user 110 input or contact. In some embodiments the GUI 210 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs 410, 422 with a plurality of specifications at specific market prices.

Figure 6:
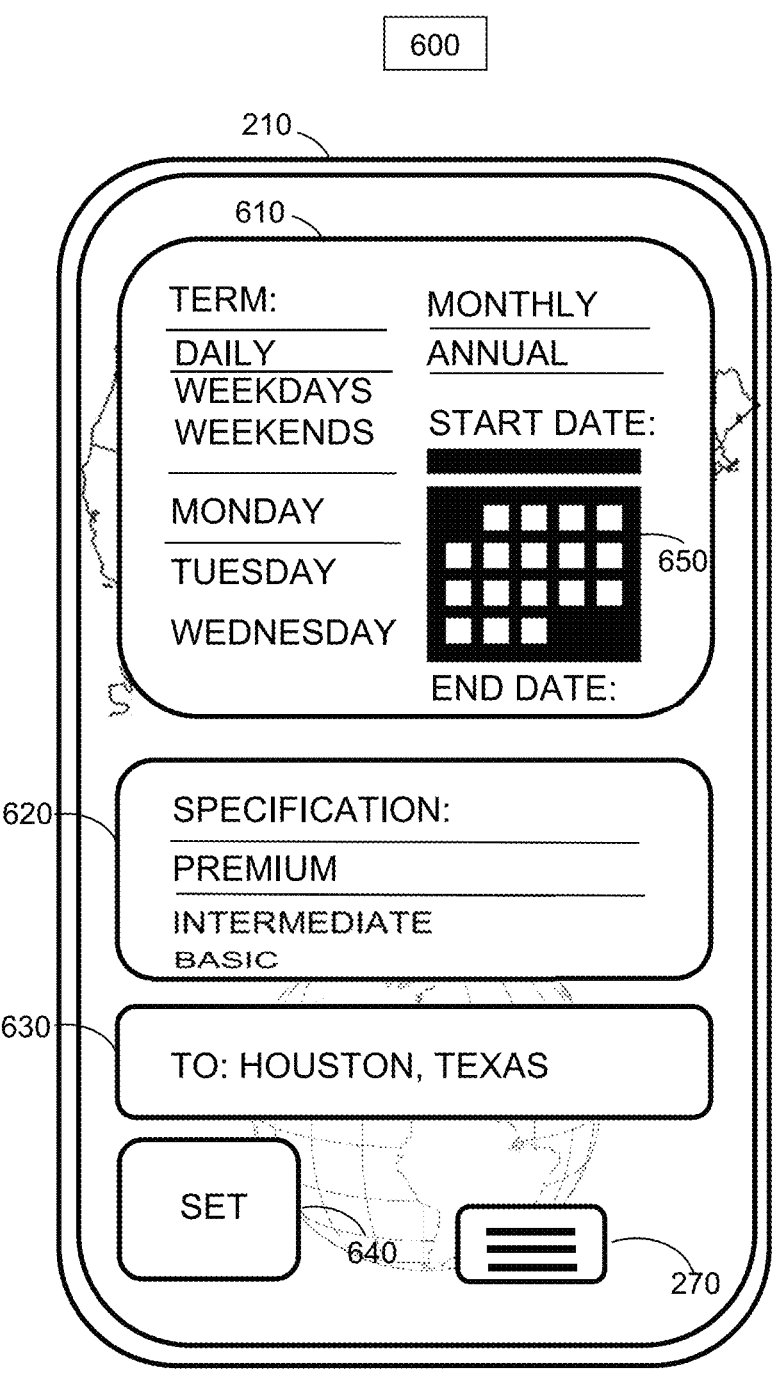
FIG. 6 illustrates an exemplary user interface with various term specifications for tool and appliance community linked transportation or freight capacity with associated price-time priority queues in accordance with some embodiments.

FIG. 6 illustrates an exemplary user interface 210 for selecting the term transformation specification 610 on a portable multifunction device in accordance with some embodiments. In some embodiments, user interface 210 includes the following elements, or a subset or superset thereof:

term specification options (a data transformation) 610;

specification of quality of tool and appliance community linked transportation or freight capacity (a data transformation) 620;

destination/To tool and appliance community linked virtual hub (a data transformation) 630;

setting button 640 to transmit the term 610 and quality specification grade (a data transformation) 620;

calendar button 650 to select specification start dates and end dates for a plurality of tool and appliance community linked virtual transportation or freight hub combinations (a data transformation);

hamburger button 270 to instruct the GUI 210 to take the user 110 to the menu screen.

In some embodiments, the term specification 610 may be used to participate, transact and/or trade in a specific tool and appliance community linked virtual hub combination for a specific time period specification. Users 110 may set the term to daily, weekly, monthly, annual, weekdays, weekends, specific days such as Monday, Tuesday, Wednesday, Thursday, Friday, Saturday, Sunday or any combination of term selections the user 110 sets as relevant for participating, transacting or trading in the transformed tool and appliance community linked transportation or freight capacity unit securities market. Not limiting by example, but for use of illustrating a possible subset of term selections, the user 110 may select "weekdays" 610 during a specific calendar time period 650 of a given year. In some embodiments, specific time start dates and end dates may be set by the user with the calendar button 650. In some embodiments a user 110 may select "Mondays" 610 within a specification date window 650 (a data transformation). In some embodiments, the user 110 may select "weekends" 610 during a specification calendar window of dates 650 (a data transformation). In some embodiments, the user, 110, may contact the "set" button 640 to transmit the transformed tool and appliance community linked transportation or freight capacity unit specification data by using the GUI 210 detecting the user 110 input or contact. In some embodiments the GUI 210 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs 410, 422 with a plurality of specifications at specific market prices.

Figure 7:
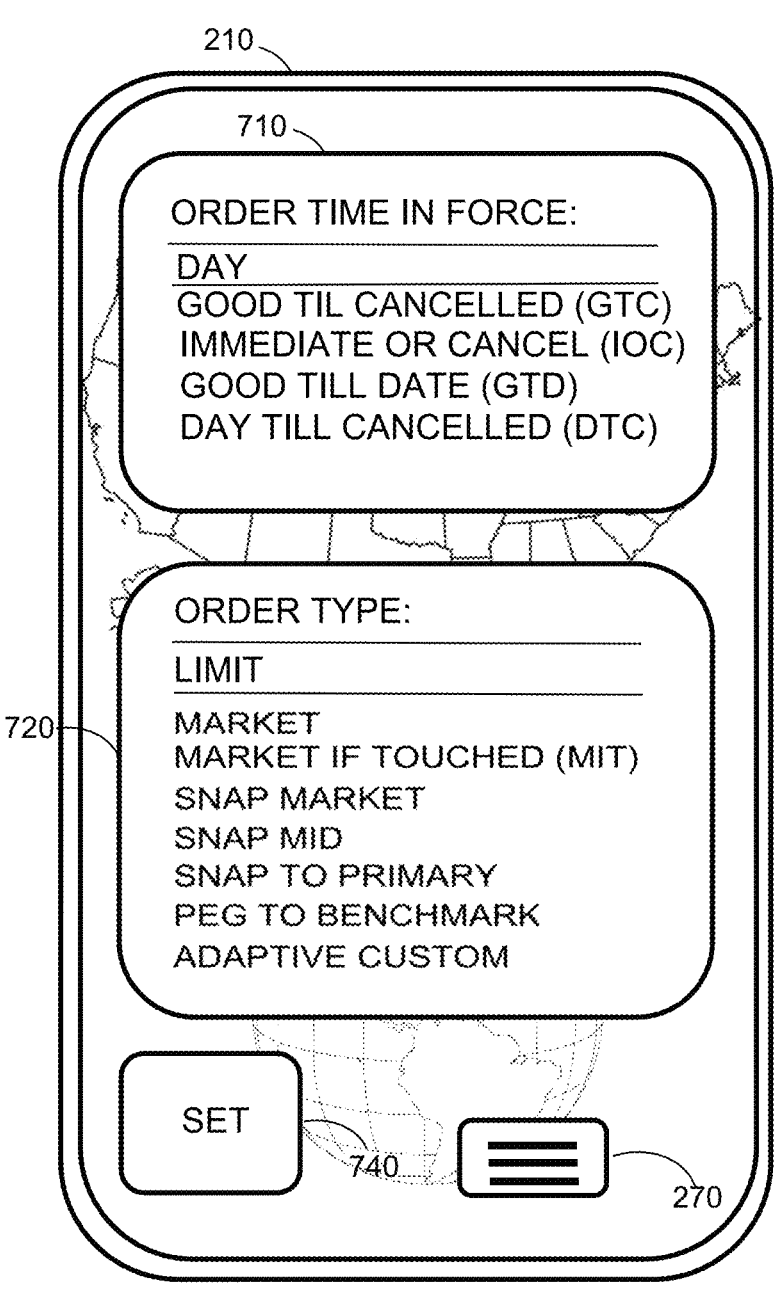
FIG. 7 illustrates an exemplary user interface with various order types and order time in force designations for tool and appliance community linked transportation or freight capacity with associated price-time priority queues in accordance with some embodiments.

FIG. 7 illustrates an exemplary user interface 210 for selecting order time in force order types 710 (a data transformation) as well as order types 720 (a data transformation) on a portable multifunction device in accordance with some embodiments. In some embodiments, user interface 210 includes the following elements, or a subset or superset thereof:

order time in force specification options (a data transformation) 710;

order type specification options (a data transformation) 720;

setting button 740 to transmit the order time in force specification 710 and Order type specification option 720 (a data transformation);

hamburger button 270 to instruct the GUI 210 to take the user 110 to the menu screen.

In some embodiments, user interface 210 may be used by the user 110 to select a plurality of order time in force 710 specifications. In some embodiments, order time in force selections 710 may include a subset or superset thereof: day (DAY) order 710; good till cancelled order (GTC) 710; immediate or cancel order (10C) 710; good till date order (GTD) 710; day till cancelled order (DTC) 710. Order time in force 710 specifications may be used to designate how long a user 110 order may be valid. In some embodiments, the GUI 210 may display the definitions of a plurality of order time in force 710 characteristics so that the user 110 may select the appropriate order time in force 710 specification for the tool and appliance community linked transportation or freight capacity unit that the user 110 may participate, transact and/or trade. In some embodiments, the user interface 210 may be used to select the order type 720 specifications. In some embodiments, order type selections 720 may include a subset or superset thereof: Limit 720, Market 720, Market if Touched (MIT) 720; Snap to Market 720; Snap to Mid 720; Snap to primary 720; Peg to benchmark 720; adaptive custom 720. In some embodiments, the GUI 210 may display the definitions of a plurality of order types 720 characteristics so that the user 110 may select the appropriate order type 720 specification for the tool and appliance community linked transportation or freight capacity unit that the user 110 may participate, transact and/or trade. In some embodiments, the user 110, may contact the "set" button 740 to transmit the tool and appliance community linked transportation or freight capacity unit specification data by using the GUI 210 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs 410, 422 with a plurality of specifications at specific market prices.

Figure 8:
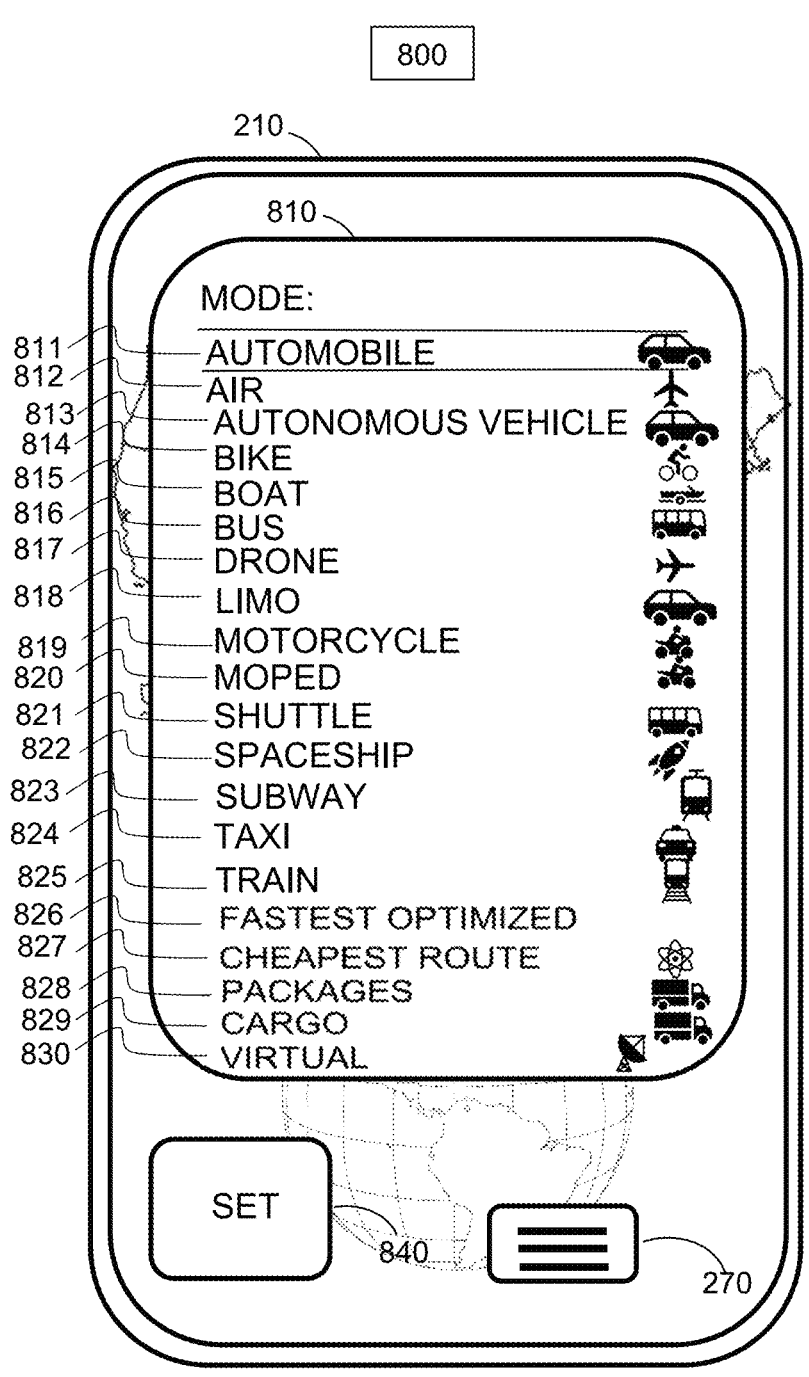
FIG. 8 illustrates an exemplary user interface with various modes of tool and appliance community linked transportation or freight capacity with associated price-time priority queues in accordance with some embodiments.

FIG. 8 illustrates an exemplary user interface 210 for selecting tool and appliance community linked virtual hub transportation capacity unit modes 810 (a data transformation) on a portable multifunction device in accordance with some embodiments. In some embodiments, user interface 210 includes the following elements, or a subset or superset thereof:

virtual hub tool and appliance community linked transportation capacity unit modes 810 (a data transformation);

setting button 840 to transmit the tool and appliance community linked virtual hub transportation capacity unit modes 810;

hamburger button 270 to instruct the GUI 210 to take the user 110 to the menu screen.

In some embodiments, user interface 210 may be used by the user 110 to select a plurality of tool and appliance community linked virtual hub transformed transportation capacity unit security modes 810 specifications. In some embodiments, tool and appliance community linked virtual hub transportation capacity unit mode selections 810 may include a subset or superset thereof: Automobile 811; air 812; autonomous vehicle 813; bike 814; boat 815; bus 816; drone 817; limo 818; motorcycle 819; moped 820; shuttle 821; space 822; subway 823; taxi 824; train 825; fastest optimized 826; cheapest route 827; packages 828; cargo 829; virtual 830. In some embodiments, virtual hub tool and appliance community linked transportation capacity unit modes are simply that a user 110 would have a virtual transportation or freight capacity unit seat in an automobile or an airplane as examples, but not limiting by example. In some embodiments, the user 110 may bid on cargo 829 or package capacity 828 in any mode or multi-modal of transformed tool and appliance community linked transportation or freight capacity between a combination of virtual tool and appliance community linked transportation hub locations. In some embodiments, the user 110 may use one or multiple modes of tool and appliance community linked transportation between a combination of tool and appliance community linked virtual transportation hub capacity points. In some embodiments, the user 110, may contact the "set" button 840 to transmit the transformed tool and appliance community linked transportation or freight capacity unit specification mode data by using the GUI 210 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs 410, 422 with a plurality of specifications at specific market prices.

Figure 9:
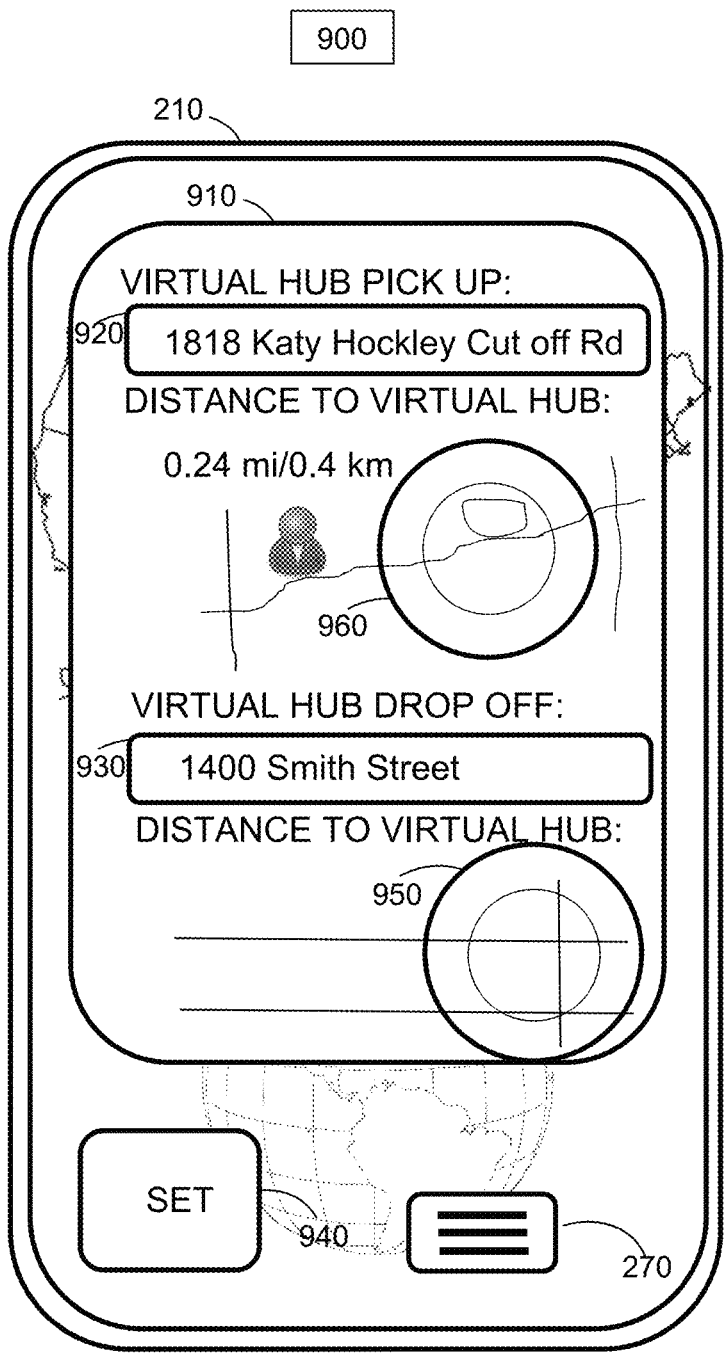
FIG. 9 illustrates an exemplary user interface with the distance between the user and a tool and appliance community linked virtual hub pick up point for tool and appliance community linked transportation or freight capacity with associated price-time priority queues as well as the distance between a user and a virtual drop off point for tool and appliance community linked transportation or freight capacity with associated price-time priority queues in accordance with some embodiments.

FIG. 9 illustrates an exemplary user interface 210 for identifying the distance the user 110 is from the tool and appliance community linked virtual hub from a map and distance perspective on a portable multifunction device in accordance with some embodiments. In some embodiments, user interface 210 includes the following elements, or a subset or superset thereof:

virtual hub tool and appliance community linked transportation capacity unit pick up display 910;

virtual hub tool and appliance community linked transportation capacity unit pick up address 920;

virtual hub tool and appliance community linked transportation capacity unit drop off address 930;

virtual hub tool and appliance community linked transportation capacity pick-up target zone 960;

virtual hub tool and appliance community linked transportation capacity drop-off target zone 950;

setting button 940 to transmit the tool and appliance community linked virtual hub transportation capacity unit addresses 920, 930;

hamburger button 270 to instruct the GUI 210 to take the user 110 to the menu screen.

In some embodiments, user interface 210 may be used by the user 110 to select a plurality of tool and appliance community linked virtual hub transportation capacity unit address 910 specifications. In some embodiments, tool and appliance community linked virtual hub transportation or freight capacity unit address selections 910 may include a subset or superset thereof: tool and appliance community linked virtual hub pick up address 920; tool and appliance community linked virtual hub drop off address 930. In some embodiments, tool and appliance community linked virtual hub transportation capacity unit addresses 920 and 930 may be changed before delivery of a tool and appliance community linked virtual transportation capacity unit. The user interface map and address tool 910 displays the users 110 distance from the address of the tool and appliance community linked virtual transportation or freight hub as well as a map to assist the user 110 in finding the location of the tool and appliance community linked virtual transportation hub. In some embodiments, user interface 210 displays the virtual hub pick up zone 960 on a map in context to the user's 110 location. In some embodiments, user interface 210 displays the virtual hub drop off zone 950 on a map in context to the user's 110 location. In some embodiments, the user 110, may contact the "set" button 940 to transmit the tool and appliance community linked transportation capacity unit specification address data by using the GUI 210 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs 410, 422 with a plurality of specifications at specific market prices.

Figure 10:
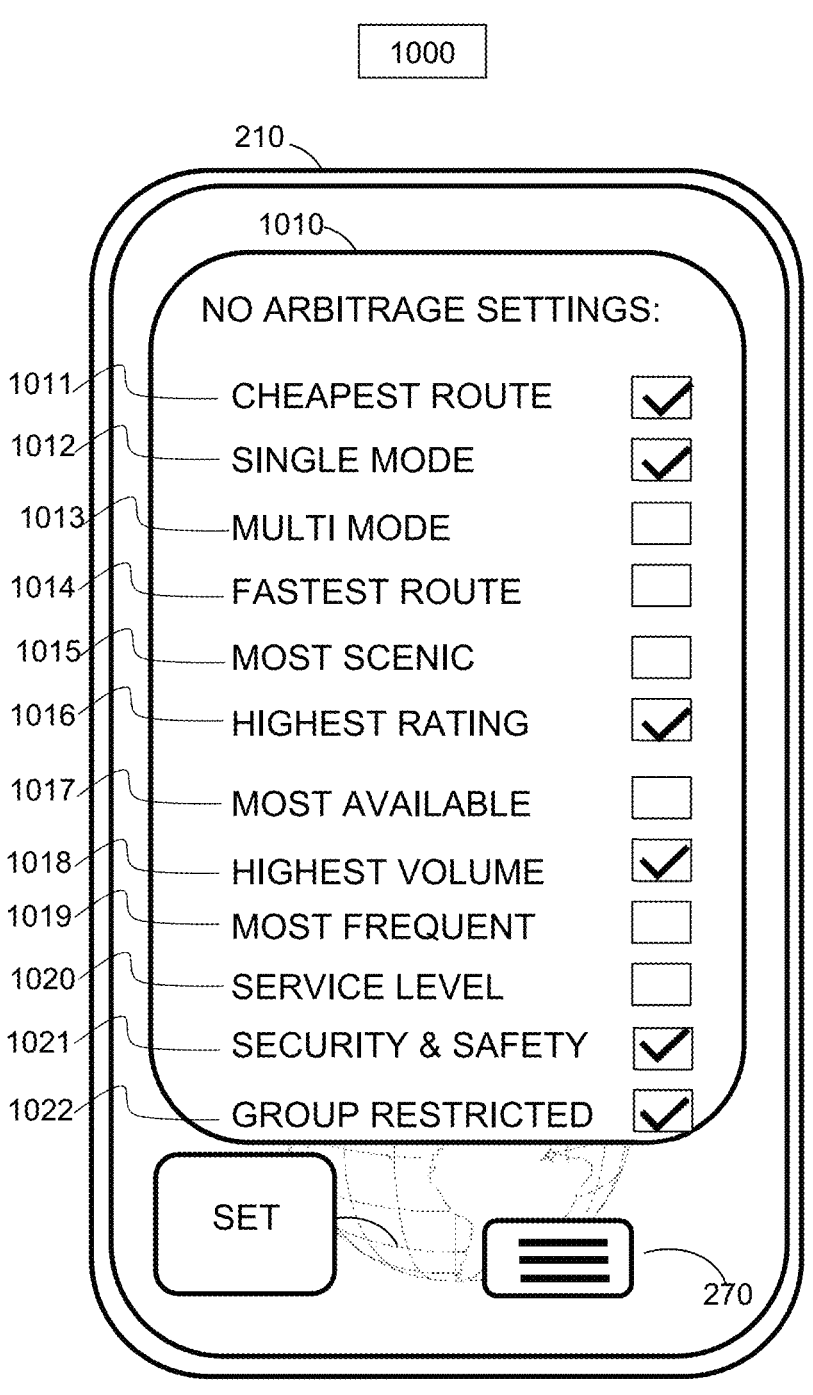
FIG. 10 illustrates an exemplary user interface for settings and constraints of the tool and appliance community linked transportation or freight capacity with associated price-time priority queues trading method and system in accordance with some embodiments.

FIG. 10 illustrates an exemplary user interface 210 for identifying the constraints and no arbitrage settings 1010 the user 110 selects on a portable multifunction device in accordance with some embodiments (multiple data transformations). In some embodiments, user interface 210 includes the following elements, or a subset or superset thereof:

constraint and no arbitrage settings 1010 (a data transformation);

setting button 1040 to transmit the tool and appliance community linked virtual hub transportation capacity constraints and no arbitrage settings;

hamburger button 270 to instruct the GUI 210 to take the user 110 to the menu screen.

In some embodiments, user interface 210 may be used by the user 110 to select a plurality of tool and appliance community linked virtual hub transportation capacity constraint and no arbitrage settings 1010. In some embodiments, tool and appliance community linked virtual hub transportation capacity unit constraint and no arbitrage selections 1010 may include a subset or superset thereof: cheapest route 1011 (a data transformation); single mode 1012 (a data transformation); multi-mode 1013 (a data transformation); fastest route 1014 (a data transformation); most scenic 1015 (a data transformation); highest rating 1016 (a data transformation); most available 1017 (a data transformation); highest volume 1018 (a data transformation); most frequent 1019 (a data transformation); service level 1020 (a data transformation); security and safety 1021 (a data transformation). In some embodiments, the "cheapest route setting" 1011 instantiates instructions in the memory of the CPU 190 to complete a standard cost minimization linear program to assist the user 110 to complete the tool and appliance community linked transportation capacity unit between two virtual hubs with the lowest cost. In some embodiments, the "single mode" 1012 instantiates instructions in the memory of the CPU 190 to set a constraint for the user 110 to complete the tool and appliance community linked transportation capacity unit between two virtual hubs with the only one mode of transportation. In some embodiments, the "multi mode" 1013 instantiates instructions in the memory of the CPU 190 to set a constraint for the user 110 to complete the tool and appliance community linked transportation capacity unit between two virtual hubs with more than one mode of transportation. In some embodiments, the "fastest route" 1014 instantiates instructions in the memory of the CPU 190 to complete standard linear programming equation to minimize travel time for the user 110 to complete the tool and appliance community linked transportation capacity unit between two virtual hubs with the shortest time. In some embodiments, the settings 1010 may set instructions for the tool and appliance community linked price based navigation routing index and GUI presentation on the user(s) 110 interface 111. In some embodiments, the "most scenic" 1015 instantiates instructions in the memory of the CPU 190 to complete an algorithm with the highest ratings for scenery to assist the user 110 to complete the transformed tool and appliance community linked transportation capacity unit between two virtual hubs with highest scenery rating. In some embodiments, the "highest rating" 1016 instantiates instructions in the memory of the CPU 190 to complete a rating algorithm to assist the user 110 to complete the tool and appliance community linked transportation capacity unit between two virtual hubs with the highest rating. In some embodiments, the "most available" 1017 instantiates instructions in the memory of the CPU 190 to complete an algorithm to search for the route with the most open tool and appliance community linked transportation capacity units to assist the user 110 to complete the tool and appliance community linked transportation capacity unit between two tool and appliance community linked virtual hubs with the most available open seats or open tool and appliance community linked transportation capacity units. In some embodiments, the "highest volume" 1018 instantiates instructions in the memory of the CPU 190 to complete an algorithm to select the route with the highest volume of participants to assist the user 110 to complete the transformed tool and appliance community linked transportation capacity unit between two virtual hubs with the largest number of users 110. In some embodiments, the "most frequent" 1019 instantiates instructions in the memory of the CPU 190 to complete most frequent route analysis from a timing constraint perspective to assist the user 110 to complete the tool and appliance community linked transportation capacity unit between two tool and appliance community linked virtual hubs with the most frequent departures. In some embodiments, the "service level" 1020 instantiates instructions in the memory of the CPU 190 to align the constraint to select the service level to assist the user 110 to complete the tool and appliance community linked transportation capacity unit between two virtual hubs with the correct level of service. In some embodiments, the "security and safety" 1021 instantiates instructions in the memory of the CPU 190 to run safety and security algorithms on the user's 110 based on block chain performance of drivers and riders to assist the user 110 to complete the tool and appliance community linked transportation capacity unit between two virtual hubs with the highest level of safety and security. In some embodiments, the "group restricted" 1022 instantiates instructions in the memory of the CPU 190 to run grouping limitation algorithms on the user's 110 price-time priority queue market auction based on limiting the pool of tool and appliance community linked drivers and riders or freight providers and shippers to assist the user 110 to complete the tool and appliance community linked transportation or freight capacity unit between two tool and appliance community linked virtual hubs with a limit on the pool of available users. In some embodiments, a plurality of settings which transform the data may be sequenced for presenting as a transformed market 400 or as a transformed market as a layer on a navigation system with indexed routes based on price 4200. A user(s) 110 pool for group restricted 1022 (a data transformation) settings may limit the user pool displayed by email, security, sex, rating or a plurality of other restrictions. In some embodiments, the user 110, may contact the "set" button 1040 to transmit the tool and appliance community linked transportation or freight capacity unit security specification constraint and arbitrage data by using the GUI 210 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs 410, 422 with a plurality of specifications at specific market prices in an price-time priority queue auction format.

Figure 11:
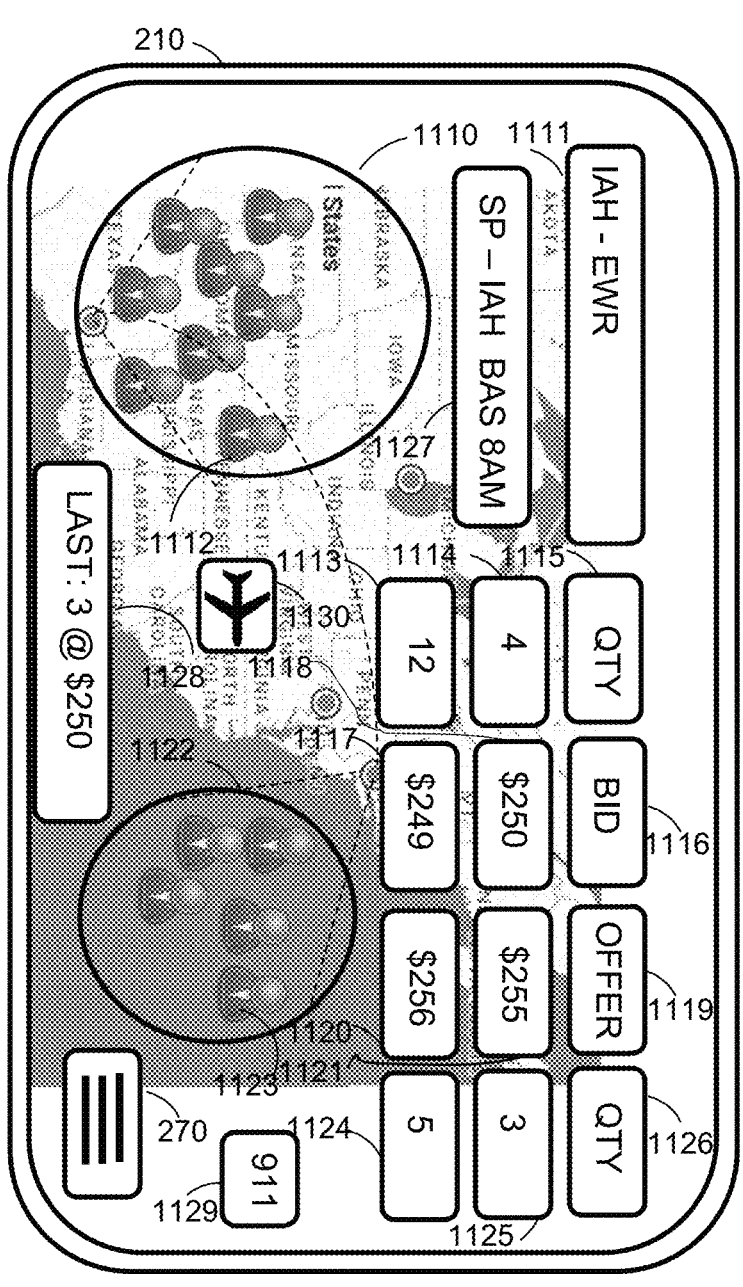
FIG. 11 illustrates an exemplary user interface for transacting and trading tool and appliance community linked domestic air travel transportation or air freight capacity with associated price-time priority queues in accordance with some embodiments.

FIG. 11 illustrates exemplary user interfaces 210 for participating, transacting and/or trading transformed tool and appliance community linked transportation or freight as a physical forward commodity or security between combinations of tool and appliance community linked virtual hubs over various transportation modes. In some embodiments, user interface 210 includes the following elements, or a subset or superset thereof:

exemplary tool and appliance community linked virtual hub combination 1111;

exemplary tool and appliance community linked virtual hub origin/from location 1110 with users 1112 within the tool and appliance community linked virtual hub location 1110;

exemplary specification summary of the market, level of service and time of delivery commencement 1127;

exemplary mode of air transportation or freight capacity type 1130;

exemplary transaction summary of the last trades quantity and price 1128;

exemplary tool and appliance community linked virtual hub destination/to location 1122 and user who is being delivered on the transportation capacity unit 1123;

exemplary bid/buy quantity title header 1115 for an exemplary tool and appliance community linked virtual transportation hub market;

exemplary bid/buy price title header 1116 for an exemplary tool and appliance community linked virtual transportation or freight hub market;

exemplary offer/sell price title header 1119 for an exemplary tool and appliance community linked virtual transportation or freight hub market;

exemplary offer/sell quantity title header 1126 for an exemplary tool and appliance community linked virtual transportation or freight hub market;

exemplary bid/buy quantity 1114 for the best bid quantity from a plurality of users 110 for an exemplary respective tool and appliance community linked transportation or freight capacity tool and appliance community linked virtual hub combination that has undergone a plurality of data transformations in the method 1111;

exemplary bid/buy quantity 1113 for the second-best bid quantity from a plurality of users 110 for an exemplary respective tool and appliance community linked transportation or freight capacity virtual hub combination that has undergone a plurality of data transformations in the method 1111;

exemplary bid/buy price 1118 for the best bid price from a plurality of users 110 for an exemplary respective tool and appliance community linked transportation or freight capacity virtual hub combination that has undergone a plurality of data transformations in the method 1111;

exemplary bid/buy price 1117 for the second-best bid price from a plurality of users 110 for an exemplary respective tool and appliance community linked transportation or freight capacity virtual hub combination that has undergone a plurality of data transformations in the method 1111;

exemplary offer/sell price 1121 for the best offer price from a plurality of users 110 for an exemplary respective tool and appliance community linked transportation or freight capacity virtual hub combination that has undergone a plurality of data transformations in the method 1111;

exemplary offer/sell price 1120 for the second-best offer price from a plurality of users 110 for an exemplary respective tool and appliance community linked transportation or freight capacity virtual hub combination that has undergone a plurality of data transformations in the method 1111;

exemplary offer/sell quantity 1125 for the best offer quantity from a plurality of users 110 for an exemplary respective tool and appliance community linked transportation or freight capacity virtual hub combination that has undergone a plurality of data transformations in the method 1111;

exemplary offer/sell quantity 1124 for the second-best offer quantity from a plurality of users 110 for an exemplary respective tool and appliance community linked transportation or freight capacity virtual hub combination that has undergone a plurality of data transformations in the method 1111;

exemplary safety dispatch "911" button 1129 to enact video and audio recording of the user 110 environment and dispatch of that information to authorities.

exemplary hamburger menu button 270 to move back to menu options and settings away from the participation, transaction, trading auction GUI 210 embodiment.

In some embodiments the user 110 may enter a transaction quantity and price for transformed tool and appliance community linked transportation or freight capacity unit securities to participate, transact and/or trade by the GUI 210 detecting user 110 contact or audio interface with a bid/buy price 1118 or offer/sell price 1121. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual hub combination 1111. A plurality of prices and markets may be presented based on a plurality of contract specifications. In some embodiments, the best bid/buy price 1118 may be moving up in price or down in price depending on the market conditions at any given time. In some embodiments the last trade or last transacted price for a given specification is listed to help the user 110 understand how the market is moving so that the user 110 may submit a competitive offer/selling price 1121 or bid/buying price 1118. In some embodiments, users 110 may adjust settings of the GUI 210 to show more bid/buying prices 1117 or more offer/selling prices 1120. In some embodiments the matrix of market quantities and prices 1113, 1114, 1115, 1116, 1117, 1118, 1119, 1120, 1121, 1124, 1125, 1126 may be referred to as market depth in the GUI 210 embodiment. In some embodiments the number of users 110 may be displayed as user icons 1112 or 1123 for the amount of people logged in which desire to transact, trade or participate in a given virtual hub 1110 to virtual hub 1122 combination. In some embodiments, users 110 may select the tool and appliance community linked transportation mode 1130 such that the user allows a market for only one form of tool and appliance community linked transportation capacity as a commodity or the user 110 may allow the system to show multiple forms of transportation capacity between two tool and appliance community linked virtual transportation capacity hubs 1110, 1111, 1122. In some embodiments the GUI 210 may detect a user 110 selecting the 911 button 1129 which may activate voice and video recording functions on the mobile or stationary device 111 and transmit the data with a confirmation from the user 110 to the authorities to provide enhanced security while participating, transacting or trading transformed tool and appliance community linked forward transportation as a commodity or security. In some embodiments the user may toggle between the GUI 210 market view screen in FIG. 3 and other menu 270 options and settings by the user 110 selecting the hamburger button 270 and the GUI 210 detecting the user 110 input or contact or audio instruction. In some embodiments the GUI 210 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs 1110, 1122 with a plurality of specifications at specific market prices.

Figure 12:
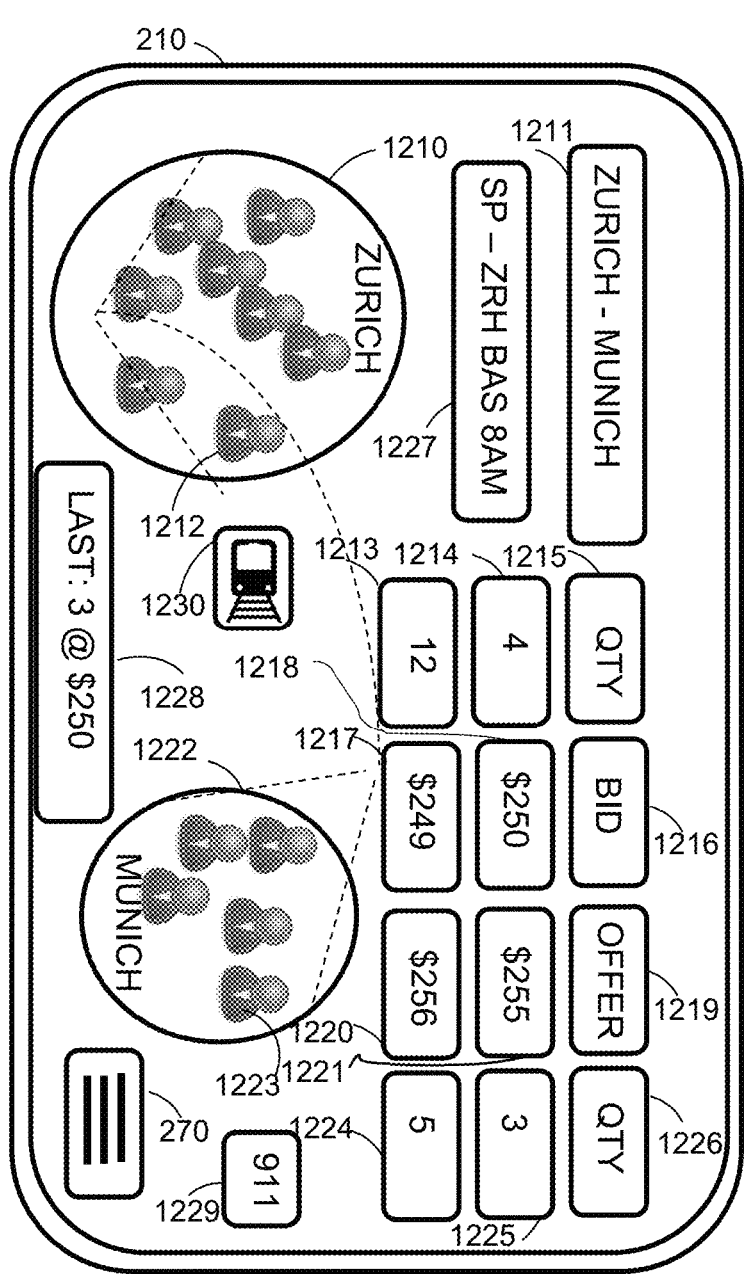
FIG. 12 illustrates an exemplary user interface for transacting and trading tool and appliance community linked international train transportation or train freight capacity with associated price-time priority queues in accordance with some embodiments.

FIG. 12 illustrates exemplary user interfaces 210 for participating, transacting and/or trading transformed tool and appliance community linked transportation as a physical forward commodity or security between combinations of tool and appliance community linked virtual hubs over various transportation modes. In some embodiments, user interface 210 includes the following elements, or a subset or superset thereof:

exemplary tool and appliance community linked virtual hub combination 1211;

exemplary tool and appliance community linked virtual hub origin/from location 1210 with users 1212 within the tool and appliance community linked virtual hub location 1210;

exemplary specification summary of the market, level of service and time of delivery commencement 1227;

exemplary mode of train tool and appliance community linked transportation capacity type 1230;

exemplary transaction summary of the last trades quantity and price 1228;

exemplary tool and appliance community linked virtual hub destination/to location 1222 and user who is being delivered on the tool and appliance community linked transportation or freight capacity unit 1223;

exemplary bid/buy quantity title header 1215 for an exemplary virtual tool and appliance community linked transportation or freight hub market;

exemplary bid/buy price title header 1216 for an exemplary tool and appliance community linked virtual transportation or freight hub market;

exemplary offer/sell price title header 1219 for an exemplary tool and appliance community linked virtual transportation or freight hub market;

exemplary offer/sell quantity title header 1226 for an exemplary tool and appliance community linked virtual transportation for freight hub market;

exemplary bid/buy quantity 1214 for the best bid quantity from a plurality of users 110 for an exemplary respective tool and appliance community linked transportation or freight capacity virtual hub combination that has undergone a plurality of data transformations in the method 1211;

exemplary bid/buy quantity 1213 for the second-best bid quantity from a plurality of users 110 for an exemplary respective tool and appliance community linked transportation or freight capacity virtual hub combination that has undergone a plurality of data transformations in the method 1211;

exemplary bid/buy price 1218 for the best bid price from a plurality of users 110 for an exemplary respective tool and appliance community linked transportation or freight capacity virtual hub combination that has undergone a plurality of data transformations in the method 1211;

exemplary bid/buy price 1217 for the second-best bid price from a plurality of users 110 for an exemplary respective tool and appliance community linked transportation or freight capacity virtual hub combination that has undergone a plurality of data transformations in the method 1211;

exemplary offer/sell price 1221 for the best offer price from a plurality of users 110 for an exemplary respective tool and appliance community linked transportation or freight capacity virtual hub combination that has undergone a plurality of data transformations in the method 1211;

exemplary offer/sell price 1220 for the second-best offer price from a plurality of users 110 for an exemplary respective tool and appliance community linked transportation or freight capacity virtual hub combination that has undergone a plurality of data transformations in the method 1211;

exemplary offer/sell quantity 1225 for the best offer quantity from a plurality of users 110 for an exemplary respective tool and appliance community linked transportation or freight capacity virtual hub combination that has undergone a plurality of data transformations in the method 1211;

exemplary offer/sell quantity 1224 for the second-best offer quantity from a plurality of users 110 for an exemplary respective tool and appliance community linked transportation or freight capacity virtual hub combination that has undergone a plurality of data transformations in the method 1211;

exemplary safety dispatch "911" button 1229 to enact video and audio recording of the user 110 environment and dispatch of that information to authorities.

exemplary hamburger menu button 270 to move back to menu options and settings away from the participation, transaction, trading GUI 210 embodiment.

In some embodiments the user 110 may enter a transaction quantity and price for tool and appliance community linked transportation or freight capacity units to participate, transact and/or trade by the GUI 210 detecting user 110 contact with a bid/buy price 1218 or offer/sell price 1221. The GUI 210 detects user 110 contact with any of the GUI 210 buttons which have been aforementioned. Upon user 110 contact with buttons or audio interface on the GUI 210, instructions are instantiated which allows the user 110 to change the specifications of the respective tool and appliance community linked virtual hub combination 1211. A plurality of transformed prices and transformed markets may be presented based on a plurality of transformed contract specifications. In some embodiments, the best bid/buy price 1118 may be moving up in price or down in price depending on the market conditions at any given time. In some embodiments the last trade or last transacted price for a given specification is listed to help the user 110 understand how the market is moving so that the user 110 may submit a competitive offer/selling price 1221 or bid/buying price 1214. In some embodiments, users 110 may adjust settings of the GUI 210 to show more bid/buying prices 1217 or more offer/selling prices 1120. In some embodiments the matrix of market quantities and prices 1213, 1214, 1215, 1216, 1217, 1218, 1219, 1220, 1221, 1224, 1225, 1226 may be referred to as market depth in the GUI 210 embodiment. In some embodiments the number of users 110 may be displayed as user icons 1212 or 1223 for the amount of people logged in which desire to transact, trade or participate in a given tool and appliance community linked virtual hub 1210 to tool and appliance community linked virtual hub 1222 combination. In some embodiments, users 110 may select the tool and appliance community linked transportation mode 1230 such that the user allows a market for only one form or mode of tool and appliance community linked transportation capacity as a commodity or security or the user 110 may allow the system to show multiple forms (multi-modal) of transportation capacity between two virtual tool and appliance community linked transportation capacity hubs 1210, 1211, 1222. In some embodiments the GUI 210 may detect a user 110 selecting the 911 button 1229 which may activate voice and video recording functions on the mobile or stationary device 210 and transmit the data with a confirmation from the user 110 to the authorities to provide enhanced security while participating, transacting or trading transformed forward tool and appliance community linked transportation or freight units as a commodity or security. In some embodiments the user may toggle between the GUI 210 market view screen in FIG. 3 and other menu 270 options and settings by the user 110 selecting the hamburger button 270 and the GUI 210 detecting the user 110 input or contact or audio instructions. In some embodiments the GUI 210 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs to users 110 from and to a plurality of virtual hubs 1210, 1222 with a plurality of specifications at specific market prices.

Figure 13:
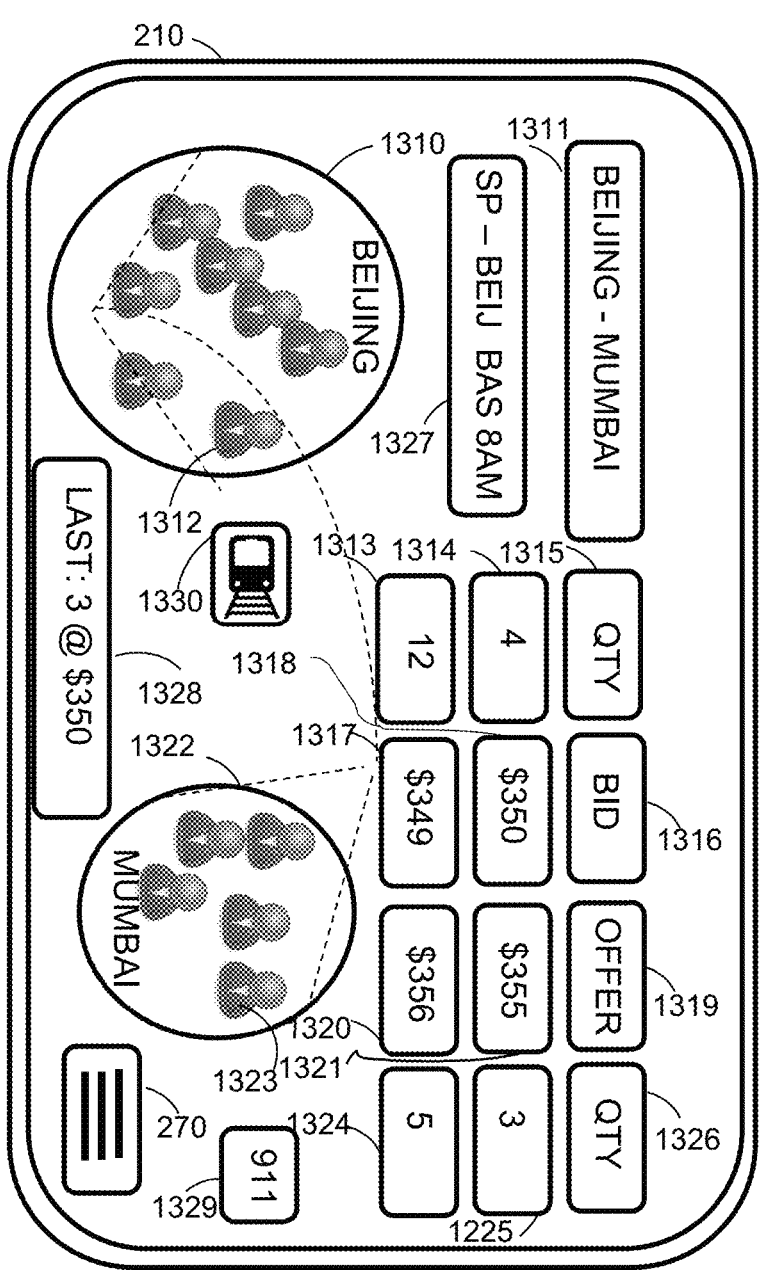
FIG. 13 illustrates an exemplary user interface for transacting and trading tool and appliance community linked international train transportation or train freight capacity with associated price-time priority queues in accordance with some embodiments.

FIG. 13 illustrates exemplary user interfaces 210 for participating, transacting and/or trading transformed tool and appliance community linked transportation as a physical forward commodities or securities between combinations of tool and appliance community linked virtual hubs over various transportation modes. In some embodiments, user interface 210 includes the following elements, or a subset or superset thereof:

exemplary tool and appliance community linked virtual hub combination 1311;

exemplary tool and appliance community linked virtual hub origin/from location 1310 with users 1312 within the tool and appliance community linked virtual hub location 1310;

exemplary specification summary of the market, level of service and time of delivery commencement 1327;

exemplary mode of train tool and appliance community linked transportation capacity type 1330;

exemplary transaction summary of the last trades quantity and price 1328;

exemplary tool and appliance community linked virtual hub destination/to location 1322 and user who is being delivered on the tool and appliance community linked transportation or freight capacity unit 1323;

exemplary bid/buy quantity title header 1315 for an exemplary tool and appliance community linked virtual transportation or freight hub market;

exemplary bid/buy price title header 1316 for an exemplary tool and appliance community linked virtual transportation or freight hub market;

exemplary offer/sell price title header 1319 for an exemplary tool and appliance community linked virtual transportation or freight hub market;

exemplary offer/sell quantity title header 1326 for an exemplary tool and appliance community linked virtual transportation or freight hub market;

exemplary bid/buy quantity 1314 for the best bid quantity from a plurality of users 110 for an exemplary respective tool and appliance community linked transportation or freight capacity virtual hub combination that has undergone a plurality of data transformations in the method 1311;

exemplary bid/buy quantity 1313 for the second-best bid quantity from a plurality of users 110 for an exemplary respective tool and appliance community linked transportation or freight capacity virtual hub combination that has undergone a plurality of data transformations in the method 1311;

exemplary bid/buy price 1318 for the best bid price from a plurality of users 110 for an exemplary respective tool and appliance community linked transportation or freight capacity virtual hub combination that has undergone a plurality of data transformations in the method 1311;

exemplary bid/buy price 1317 for the second-best bid price from a plurality of users 110 for an exemplary respective tool and appliance community linked transportation or freight capacity virtual hub combination that has undergone a plurality of data transformations in the method 1311;

exemplary offer/sell price 1321 for the best offer price from a plurality of users 110 for an exemplary respective tool and appliance community linked transportation or freight capacity virtual hub combination that has undergone a plurality of data transformations in the method 1311;

exemplary offer/sell price 1320 for the second-best offer price from a plurality of users 110 for an exemplary respective tool and appliance community linked transportation or freight capacity virtual hub combination that has undergone a plurality of data transformations in the method 1311;

exemplary offer/sell quantity 1325 for the best offer quantity from a plurality of users 110 for an exemplary respective tool and appliance community linked transportation or freight capacity virtual hub combination that has undergone a plurality of data transformations in the method 1311;

exemplary offer/sell quantity 1324 for the second-best offer quantity from a plurality of users 110 for an exemplary respective tool and appliance community linked transportation or freight capacity virtual hub combination that has undergone a plurality of data transformations in the method 1311;

exemplary safety dispatch "911" button 1329 to enact video and audio recording of the user 110 environment and dispatch of that information to authorities.

exemplary hamburger menu button 270 to move back to menu options and settings away from the participation, transaction, trading GUI 210 embodiment.

In some embodiments the user 110 may enter a transaction quantity and price for tool and appliance community linked transportation or freight capacity units to participate, transact and/or trade by the GUI 210 detecting user 110 contact or audio instructions with a bid/buy price 1318 or offer/sell price 1321. The GUI 210 detects user 110 contact with any of the GUI 210 buttons which have been aforementioned. Upon user 110 contact or audio interface with buttons or audio instructions on the GUI 210, instructions are instantiated which allows the user 110 to change the specifications of the respective virtual hub combination 1311. A plurality of prices and markets may be presented based on a plurality of transformed contract specifications. In some embodiments, the best bid/buy price 1318 may be moving up in price or down in price depending on the market conditions at any given time. In some embodiments the last trade or last transacted price for a given transformed specification is listed to help the user 110 understand how the market is moving so that the user 110 may submit a competitive offer/selling price 1321 or bid/buying price 1314. In some embodiments, users 110 may adjust settings of the GUI 210 to show more bid/buying prices 1317 or more offer/selling prices 1320. In some embodiments the matrix of market quantities and prices 1313, 1314, 1315, 1316, 1317, 1318, 1319, 1320, 1321, 1324, 1325, 1326 may be referred to as market depth in the GUI 210 embodiment. In some embodiments the number of users 110 may be displayed as user icons 1312 or 1323 for the amount of people logged in which desire to transact, trade or participate in a given virtual hub 1310 to virtual hub 1322 transformed combination. In some embodiments, users 110 may select the tool and appliance community linked transportation mode 1330 such that the user allows a market for only one form of tool and appliance community linked transportation capacity as a commodity or the user 110 may allow the system to show multiple forms of transformed tool and appliance community linked transportation or freight capacity or securities between two tool and appliance community linked virtual transportation capacity hubs 1310, 1311, 1322. In some embodiments, by way of example and not to limit by example to avoid doubt, transformed tool and appliance community linked transportation units or transformed transportation unit securities may even be substitutable between modes if the other specifications meet the grade category of the transformed tool and appliance community linked transportation unit specification or transformed tool and appliance community linked transportation unit security. A user (s) 110 may have bought a transformed tool and appliance community linked transportation unit with a specification and the delivery mechanism was a bus, however the bus user 110 bought back their transformed tool and appliance community linked transportation unit or transformed tool and appliance community linked transportation unit security and now the original purchaser may be matched with a car of another user 110 who will deliver the transformed tool and appliance community linked transportation unit or transformed tool and appliance community linked transportation unit security. In some embodiments, bus 816, train 1330, airplane 1130, car 430, or a plurality of other modes may be substitutable if the transformed tool and appliance community linked transportation unit or transformed tool and appliance community linked transportation unit security meets the delivery transformed specification grade. In some embodiments the GUI 210 may detect a user 110 selecting the 911 button 1329 which may activate voice and video recording functions on the mobile or stationary device 111 and transmit the data with a confirmation from the user 110 to the authorities to provide enhanced security while participating, transacting or trading forward tool and appliance community linked transportation or freight as a commodity. In some embodiments the user may toggle between the GUI 210 market view screen in FIG. 3 and other menu 270 options and settings by the user 110 selecting the hamburger button 270 and the GUI 210 detecting the user 110 input or contact. In some embodiments the GUI 210 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs 1310, 1322 with a plurality of specifications at specific market prices.

Figure 14:
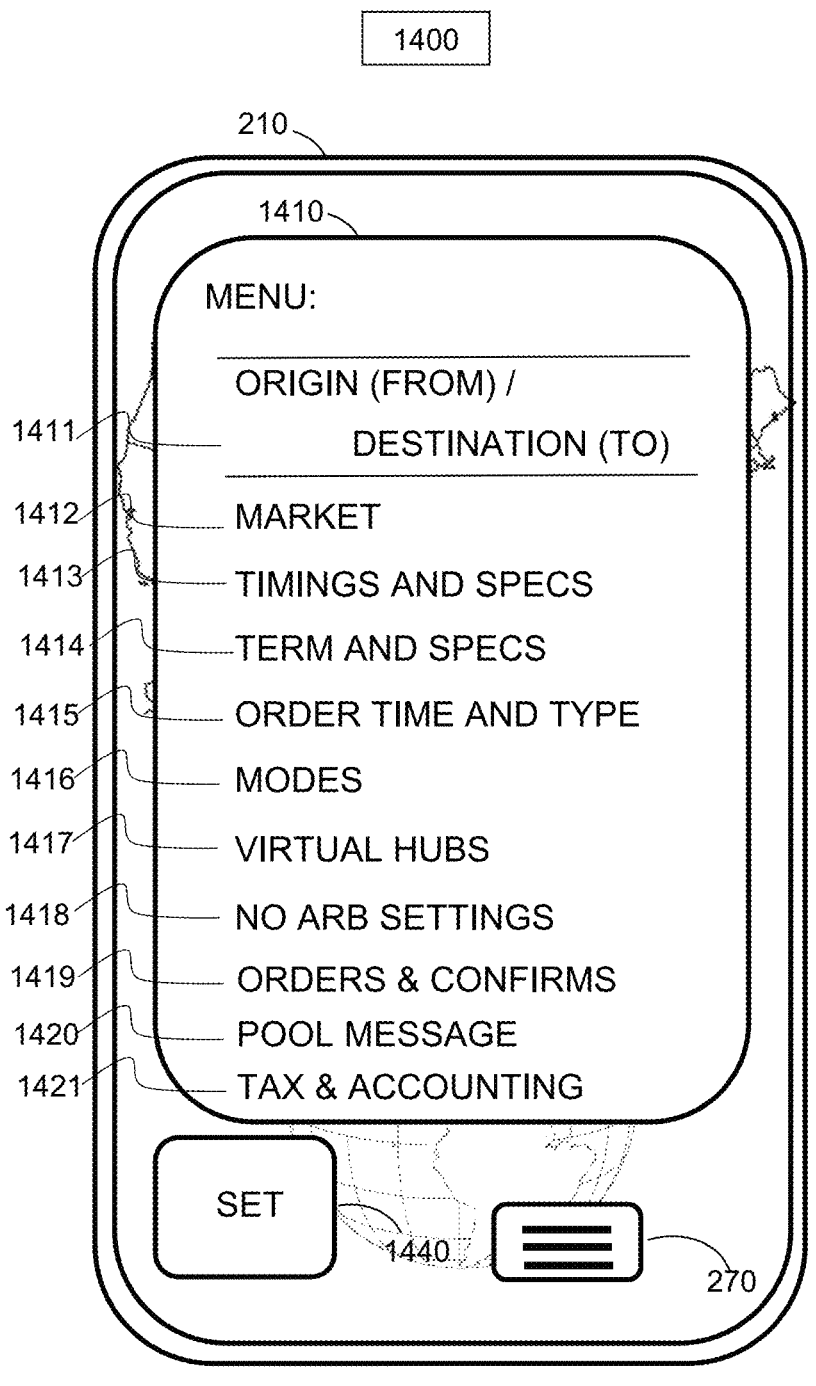
FIG. 14 illustrates an exemplary user interface for tool and appliance community linked objects with associated price-time priority queues transacting and trading various menu options within the system and method in accordance with some embodiments.

FIG. 14 illustrates an exemplary user interface 210 for selecting menu options 1410 on a portable multifunction device in accordance with some embodiments. In some embodiments, user interface 210 includes the following elements, or a subset or superset thereof:

menu options 1410;

origin (From)/Destination (to) menu option 1411;

market menu option 1412;

timings and Specs menu option 1413;

term and Specs menu option 1414;

order time and type menu option 1415;

modes menu option 1416;

virtual Hubs menu option 1417;

no arb settings menu option 1418;

orders and Confirms menu option 1419;

pool Message menu option 1420;

tax and Accounting menu option 1421;

setting button 1440 to transmit the menu option;

hamburger button 270 to instruct the GUI 210 to take the user 110 to the menu screen.

In some embodiments, user interface 210 may be used by the user 110 to select a plurality of menu options 1410. In some embodiments, the user 110 may select the origin (from)/destination (to) menu option 1411 which may instruct the GUI 210 to go to an address input rendering 910 and/or FIG. 2. In some embodiments, the user 110, may contact the "market" menu option 1412 which may instruct the GUI 210 to render a market participation, transaction and/or trading screen such as 300, 400, 1100, 1200, or 1300. In some embodiments the user may toggle between the GUI 210 market view screen in FIG. 3 and other menu 270 options and settings by the user 110 selecting the hamburger button 270 and the GUI 210 detecting the user 110 input or contact. In some embodiments, the user 110, may contact the "timings and specs" menu option 1413 which may instruct the GUI 210 to render a timings and specs screen such as 500. In some embodiments, the user 110, may contact the "term and specs" menu option 1414 which may instruct the GUI 210 to render a term and specs screen such as 600. In some embodiments, the user 110, may contact the "order time and type" menu option 1415 which may instruct the GUI 210 to render an order time and type screen such as 700. In some embodiments, the user 110, may contact the "modes" menu option 1416 which may instruct the GUI 210 to render a mode screen such as 800. In some embodiments, the user 110, may contact the "Virtual Hubs" menu option 1417 which may instruct the GUI 210 to render a virtual hubs screen such as 900. In some embodiments, the user 110, may contact the "no arb settings" menu option 1418 which may instruct the GUI 210 to render a no arbitrage constraint screen such as 1000. In some embodiments, the user 110, may contact the "orders and confirms" menu option 1419 which may instruct the GUI 210 to render the market orders and transaction confirmations for the user 110. In some embodiments, the user 110, may contact the "pool message" menu option 1420 which may instruct the GUI 210 to message either the actual tool and appliance community linked transportation capacity unit 170 or the opposite seller user 110 or buyer user 110 depending on if the user 110 was an opposite buyer or seller of the tool and appliance community linked transportation capacity unit. In some embodiments, the user 110, may contact the "tax and accounting" menu option 1421 which may instruct the GUI 210 to render tax and accounting information for the respective user 110. In some embodiments the GUI 210 menu option selection 1410 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs 410, 422 with a plurality of specifications at specific market prices.

Figure 15:
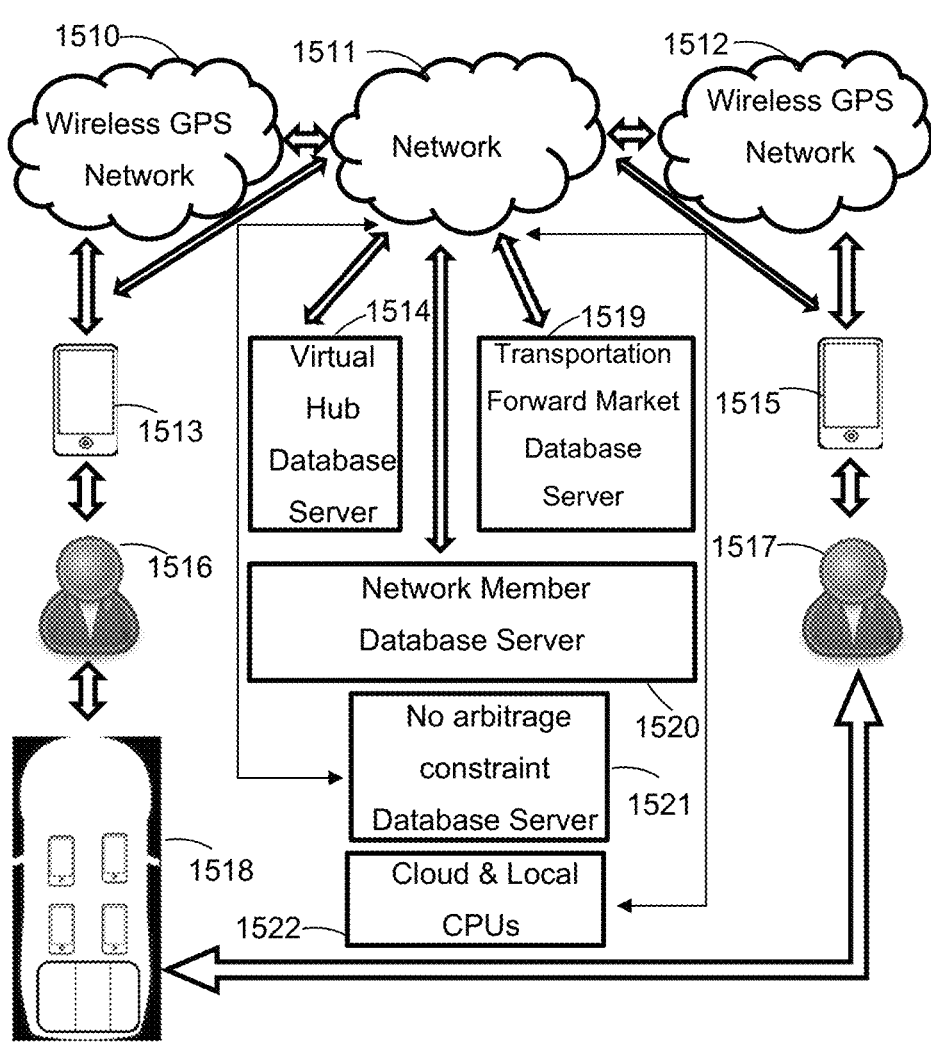
FIG. 15 illustrates a schematic diagram of a network configuration and implementations of methods which support the method and system of trading tool and appliance community linked transportation capacity with associated price-time priority queues in accordance with some embodiments.

FIG. 15 illustrates an exemplary network configuration 1500 in one exemplary implementation of participating, transacting and/or trading transformed tool and appliance community linked transportation or freight capacity units or securities in accordance with some embodiments. In some embodiments, network configuration 1500 includes the following elements, or a subset or superset thereof:

wireless global positioning system (GPS) network 1510;
    network/s 1511;
    additional global positioning system (GPS) network 1512;
    user member portable multifunction device 1513;
    virtual hub database server 1514;
    tool and appliance community linked transportation forward market database server 1519;
    additional user member portable multifunction device 1515;

--- network member database server 1520;
network member user 1516;
additional network member user 1517;
no arbitrage constraint database server 1521;
cloud and Local CPUs 1522;
tool and appliance community linked transportation or freight capacity unit mode 1518.

---

In some embodiments, the software and/or instructions stored in memory of the cloud & local CPUs 1522 and portable multifunction devices 1513, 1515 may include additional instructions to instantiate specification requirements, participation, transactions, and/or trading on the tool and appliance community linked transportation or freight capacity unit network 1511. In some embodiments, instructions may include standard database web services with the database as service provider (i.e. calling from the outside in, which lets the client GUI 210 or 1513 call each of the tool and appliance community linked virtual hub database server 1514 and/or tool and appliance community linked transportation forward market database server 1519 and/or network member database server 1520 and/or no arbitrage constraint database server 1521 and/or cloud & local CPUs 1522 through the wireless GPS network 1510 or network 1511. In some embodiments, each of the tool and appliance community linked virtual hub database server 1514 and/or tool and appliance community linked transportation forward market database server 1519 and/or network member database server 1520 and/or no arbitrage constraint database server 1521 and/or cloud & local CPUs 1522 may instruct the network to instantiate the database servers 1514, 1519, 1520, 1521, 1522 as service consumers (i.e. calling from the inside out, which lets a SQL query or application module in the database session consume an external web service. In some embodiments, users 1516 and/or 1517 may use portable multifunction devices 1513 and/or 1515 to access the tool and appliance community linked transportation or freight capacity unit market GUI 210 so that the users 1516 and/or 1517 may participate, transact and/or trade tool and appliance community linked transportation or freight capacity units. In some embodiments, the virtual hub database server 1514 stores map tile data in addition to user location data which is utilized by the GUI 210 to display or render location of virtual hubs and user 1516 proximity to those virtual hubs 200, 300, 400, 900, 1100, 1200, 1300. In some embodiments, the tool and appliance community linked transportation forward market database server 1519 stores bid and offer data for respective quantities of users as well as transaction data and a plurality of market data for each tool and appliance community linked virtual hub combination. In some embodiments, the network member database server 1520 stores user profile, user transaction, user trade, user settings, user specifications, user rating, user criminal history or background check data or facial recognition data or fingerprint recognition data or photo scan recognition data or ride history data, user track record, user bank data, user credit card data, user history data, user tax data and a plurality of other data. In some embodiments, the no arbitrage constraint database server 1521 stores data and algorithms to identify user 110 constraints 1000 and run algorithm calculations for users on specific constraints to check for compliance with constraints. In some embodiments, network servers and CPUs 1514, 1519, 1520, 1521, 1522, 1513, 1515 my interface through the network 1511 and/or wireless GPS networks 1510, 1512 such that tool and appliance community linked transportation or freight capacity units may be participated in, transacted and/or traded efficiently in the context of a market for transportation capacity units or securities. Included aforementioned data elements may be a subset or superset of data used for any specific calculation or transformation to participate, transact or trade tool and appliance community linked transportation or freight capacity units or securities.

FIG. 16 illustrates a flowchart embodiment of steps a user may perform to participate, transact and/or trade transformed tool and appliance community linked transportation capacity units or securities between virtual hub combinations. In some embodiments a user at a mobile or portable multifunction device and/or fixed computing device with a touchscreen or a computing device without a touchscreen or augmented, audio interface computing device, mixed reality non-screen display may detect user login to the tool and appliance community linked transportation capacity unit network 1610. In some embodiments, the GUI of the transportation capacity unit network may detect and receive origin location from user input or current GPS coordinate information and detect destination address from user input and transmission of data 1620. In some embodiments, the GUI and/or CPUs and/or databases may generate and apply one or more optimization techniques to form a tool and appliance community linked virtual hub with other users that have similar tool and appliance community linked transportation requests within a geographic boundary 1630. In some embodiments, the GUI and/or CPUs and or databases may generate instructions for a plurality of computing devices, network, virtual hub database server, network member database server and tool and appliance community linked transportation forward market database server 130 to form a combination of virtual hubs and transformed contract specifications for delivery of tool and appliance community linked transportation services or transportation or freight capacity between the virtual hubs in a format presented by a graphical user interface which allows users to enter forward physical prices to sell (offer) or bid (buy) transportation capacity units or securities between virtual hub combinations 1640 in an open market auction format. In some embodiments, the GUI and/or CPUs and or databases may generate instructions to interface a plurality of networks, global positioning systems networks, servers, forward commodity market auctions, map routing servers, grouping instruction software for virtual hubs, navigation servers, transparent open access pricing systems, game servers, blockchain audit and safety systems, virtual hub servers and systems, no arbitrage constraint condition systems which form one system to implement a forward commodity transportation or freight capacity unit forward market system and method 1650.

Figure 17:
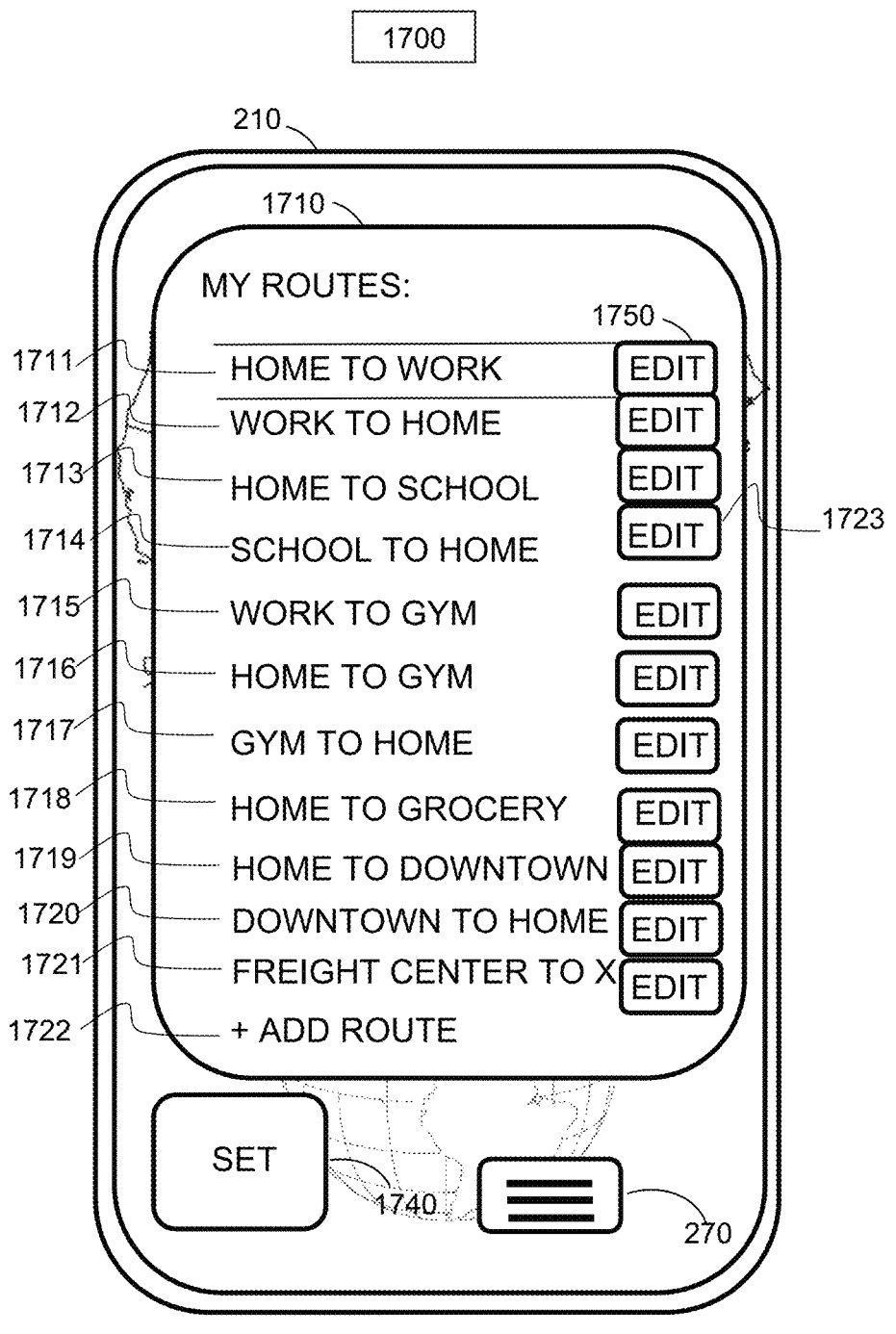
FIG. 17 illustrates an exemplary user interface for displaying most frequent routes in accordance with some embodiments.

FIG. 17 illustrates an exemplary embodiment of a user 110 most frequent transportation or freight unit routes 1710 in one exemplary implementation of participating, transacting and/or trading tool and appliance community linked transportation or freight capacity units in accordance with some embodiments. In some embodiments, most frequent my routes include the following elements, or a subset or superset thereof:

Home to Work 1711 (may have subsets of transformed data);

Work to Home 1712 (may have subsets of transformed data);

Home to School 1713 (may have subsets of transformed data);

School to Home 1714 (may have subsets of transformed data);

Work to Gym 1715 (may have subsets of transformed data);

Home to Gym 1716 (may have subsets of transformed data);

Gym to Home 1717 (may have subsets of transformed data);

Home to Grocery 1718 (may have subsets of transformed data);

Home to Downtown 1719 (may have subsets of transformed data);

Downtown to Home 1720 (may have subsets of transformed data);

Freight Center to X where X is a delivery route or multi virtual hub combination 1721 (may have subsets of transformed data);

+Add Route 1722 (may have subsets of transformed data);

Edit 1723 (may have subsets of transformed data);

Setting button 1740 to transmit the My Routes data;

Hamburger button 270 to instruct the GUI 210 to take the user 110 to the menu screen.

In some embodiments, the GUI 210 may be used to select, store and/or edit user 110 frequent or preferred routes ("MY ROUTES") 1710 for more efficient access to tool and appliance community linked transportation capacity unit markets over various modes and specifications of transportation capacity. In some embodiments, the user 110 may select, store and/or edit address and specification data for "Home to Work" 1711 and/or "Work to Home" 1712 and/or "Home to School" 1713 and/or "School to Home" 1714 and/or "Work to Gym" 1715 and/or "Home to Gym" 1716 and/or "Gym to Home" 1717 and/or "Home to Grocery" 1718 and/or "Home to Downtown" 1719 and/or "Downtown to Home" 1720 and/or "Freight Center to X" 1721 and/or "+Add Route" 1722. In some embodiments, the My Routes 1710 module may include any route a user 110 may request on any tool and appliance community linked transportation or freight capacity unit mode and/or specification. In some embodiments the user may toggle between the GUI 210 market view screen in FIG. 3 and other menu 270 options and settings by the user 110 selecting the hamburger button 270 and the GUI 210 detecting the user 110 input or contact. In some embodiments, the user 110 is notified via SMS text, in application, email or a plurality of other well-known communication methods when market activity occurs on a given route or virtual hub combination. In other words, the "my routes" 1710 feature not only allows for one touch access to a saved route, but also performs notification features between users. Lastly, in some embodiments, the EDIT 1750 button allows a user 110 to modify a plurality of notification settings such as email, SMS text, in application, voice, messaging or other notification methods.

Figure 18:
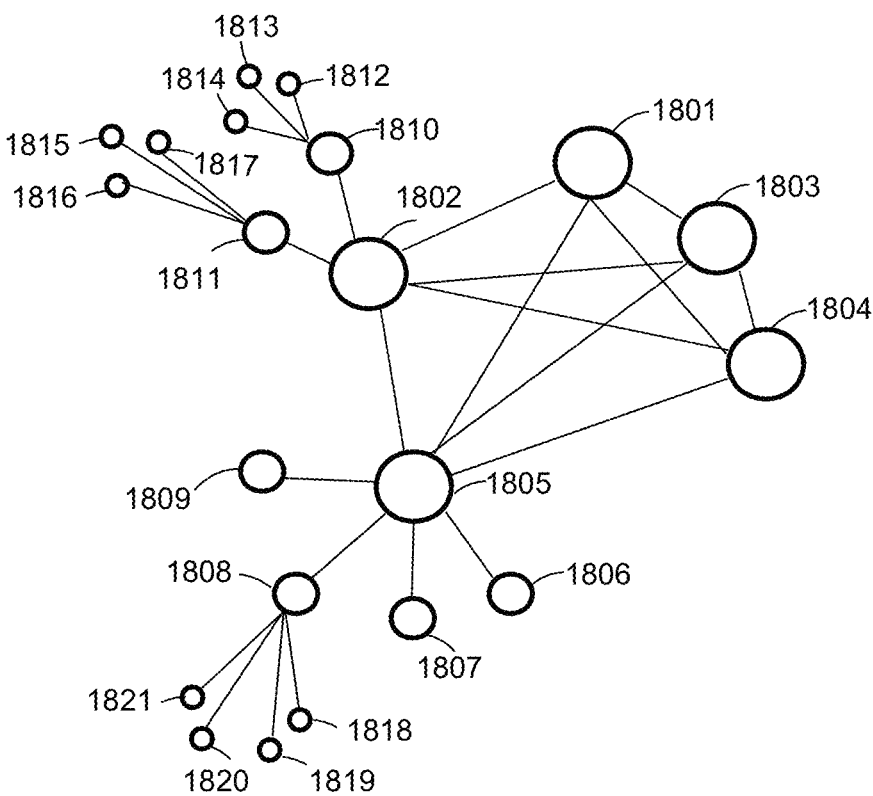
FIG. 18 illustrates an exemplary network topology of a tool and appliance community linked virtual hub combination or series of multiple tool and appliance community linked virtual hub combinations for use in the market auction platform for forward tool and appliance community linked transportation or freight capacity with associated price-time priority queues method in accordance with some embodiments.

FIG. 18 illustrates an exemplary network topology configuration 1800 in one exemplary implementation of participating, transacting and/or trading transformed tool and appliance community linked transportation or freight capacity units or securities in accordance with some embodiments. In some embodiments, network configuration 1800 includes the following elements, or a subset or superset thereof:

large tool and appliance community linked Virtual Hub nodes such as 1801, 1802, 1803, 1804, 1805;

medium tool and appliance community linked Virtual Hub nodes such as 1810, 1811, 1809, 1808, 1807, 1806;

small tool and appliance community linked Virtual Hub nodes such as 1812, 1813, 1814, 1815, 1816, 1816, 1817, 1818, 1819, 1820, 1821;

In some embodiments, the overall network node topology 1800 is comprised of large virtual hub nodes 1801, 1802, 1803, 1804, 1805 and medium virtual hub nodes 1810, 1811, 1809, 1808, 1807, 1806 and small virtual hub nodes 1812, 1813, 1814, 1815, 1816, 1816, 1817, 1818, 1819, 1820, 1821, or a subset or superset thereof. In some embodiments a user may input a starting point of 1815 and an ending point of 1818 which represent specific geographic virtual hub locations in a city, multiple cities or even countries or multiple countries. In some embodiments, tool and appliance community linked forward transportation market price-time priority queue auctions may occur directly between two exemplary points such as 1815 and 1818 or the method and system may combine a series of smaller auctions to comprise a larger price-time priority queue auction between two endpoints on the system. In some embodiments, a series of smaller price-time priority queue auctions may be combined between 1815 and 1811 as well as 1811 and 1802 as well as 1802 and 1805 as well as 1805 and 1808 as well as 1808 and 1818 which would be added together to make a combined tool and appliance community linked virtual hub price-time priority queue auction. A combined series of smaller auctions may be constrained by instructions which form auctions based on cheapest tool and appliance community linked transportation or freight route 1011, single mode tool and appliance community linked transport or freight auctions 1012, multi-mode transport or freight 1013, fastest transport or freight constraints 1014, most scenic auctions 1015, highest rating auctions 1016, most available or liquid auctions 1017, highest volume tool and appliance community linked auctions 1018, most frequent tool and appliance community linked auctions 1019, service level tool and appliance community linked auctions 1020, security and safety level tool and appliance community linked auctions 1021, group restricted auctions by sex, email, organization, gender or other 1022. In some embodiments, the constraints allow for many types of auctions which are unique and novel for tool and appliance community linked transformed transportation and freight capacity units or securities in a forward transportation and freight market. In some embodiments, the user 110 may specify instructions that set tool and appliance community linked forward market price-time priority queue auction constraints based on one or a plurality of constraints. In some embodiments, the constrained auctions may have fungible units which allow many participants to transact in the auctions. In some embodiments, the disclosed creation of a tool and appliance community linked forward market of transportation units between virtual hubs 1801 and 1804 or other combinations along map routes has the attributes of a fungible forward contract which allows for one tool and appliance community linked transportation unit to be substitutable for another transportation unit because the unit has been transformed and defined as a commodity contract. In other words, if user A bought a tool and appliance community linked transportation unit from user B between 1801 virtual hub and 1804 virtual hub, but then user A was not able to perform the obligation to purchase the tool and appliance community linked transportation unit between 1801 tool and appliance community linked virtual hub and 1804 tool and appliance community linked virtual hub from user B, user A could resell the tool and appliance community linked transportation unit contract between tool and appliance community linked virtual hub 1801 and tool and appliance community linked virtual hub 1804 to a third party user C on the tool and appliance community linked forward transportation unit auction market between virtual hub 1804 and tool and appliance community linked virtual hub 1801 to retrieve the financial payment made for their original purchase from user B and then user C would replace user A and be matched with user B for the tool and appliance community linked transportation unit transformation between tool and appliance community linked virtual hub 1804 and tool and appliance community linked virtual hub 1801. No other prior art system or method performs the aforementioned data transformation combination. In some embodiments, the tool and appliance community linked transportation or freight unit auction substitutability dynamic creates a unique and novel invention that does not exist in the world today. In some embodiments, user 110 input 220, 230 instructions use constrained optimization to form one auction between two points or a series of multiple auctions that form one larger auction with price-time priority queues.

In some embodiments, the forward tool and appliance community linked transportation and freight unit auctions subject to various constraints may be presented as a linear programming cost minimization problem in the exemplary case where the user 110 selects the cheapest route 1011 constraint. In such exemplary case, the series of auctions may be combined that utilize the lowest cost path between the start point 1815 and the ending point 1818. In such exemplary case, the linear programming cost minimization function may select the following path of 1815 to 1811 to 1802 to 1804 to 1805 to 1808 to 1818 if that combination is the lowest cost auction path. In another such exemplary case, the user 110 may select instructions for the auction to minimize both cost and shortest route. In such exemplary case the linear programming function may minimize cost subject to a constraint that time is the shortest along the path and the resulting auction may combine a different and unique series of auctions between the starting point of 1815 and ending point 1818. Accordingly, the path may be optimized to minimize cost subject to the shortest path that yields a path of 1815 to 1811 to 1802 to 1805 to 1808 to 1818. The plurality of combinations of linear programming sequences of auctions for tool and appliance community linked transportation or freight units between two points may consider an infinite set of combinations and permutations.

In some embodiments, the forward transformed tool and appliance community linked transportation and freight unit or transformed tool and appliance community linked transportation security unit auctions may be held side by side between two competing routes 4200. By way of example but not limiting by example a user may input instructions for the method and system to route between 1801 tool and appliance community linked virtual hub and 1805 tool and appliance community linked virtual hub. One route may be directly between 1801 tool and appliance community linked virtual hub and 1805 tool and appliance community linked virtual hub. Another route may be between tool and appliance community linked virtual hub 1801 and tool and appliance community linked virtual hub 1805 by way of tool and appliance community linked virtual hub 1802. The time between the routes may vary due to traffic, construction, road conditions, accidents or a plurality of other exogenous factors, however, the data transformation of the disclosed method allows for two price-time priority queue auctions to form side by side. Side by side price-time priority auctions may be displayed on a market based user interface 1300 or as a software layer of instructions over a navigation system 4200. The first tool and appliance community linked transportation unit price-time priority queue auction may be between tool and appliance community linked virtual hub 1805 and tool and appliance community linked virtual hub 1801 directly as one auction. A second auction may be by combining two smaller price-time priority queue auctions between tool and appliance community linked virtual hub 1805 and tool and appliance community linked virtual hub 1802 with the auction between 1802 tool and appliance community linked virtual hub and 1801 tool and appliance community linked virtual hub which could be expressed independently or as a combined auction. The plurality of route auctions for the transportation unit (auction one directly between 1801 virtual hub and 1805 virtual hub) (auction two between 1801 tool and appliance community linked virtual hub and 1805 tool and appliance community linked virtual hub by way of 1802 tool and appliance community linked virtual hub) may allow for the user to have transparent price auction information for the value of various proposed routes which have different price values.

Figure 19:
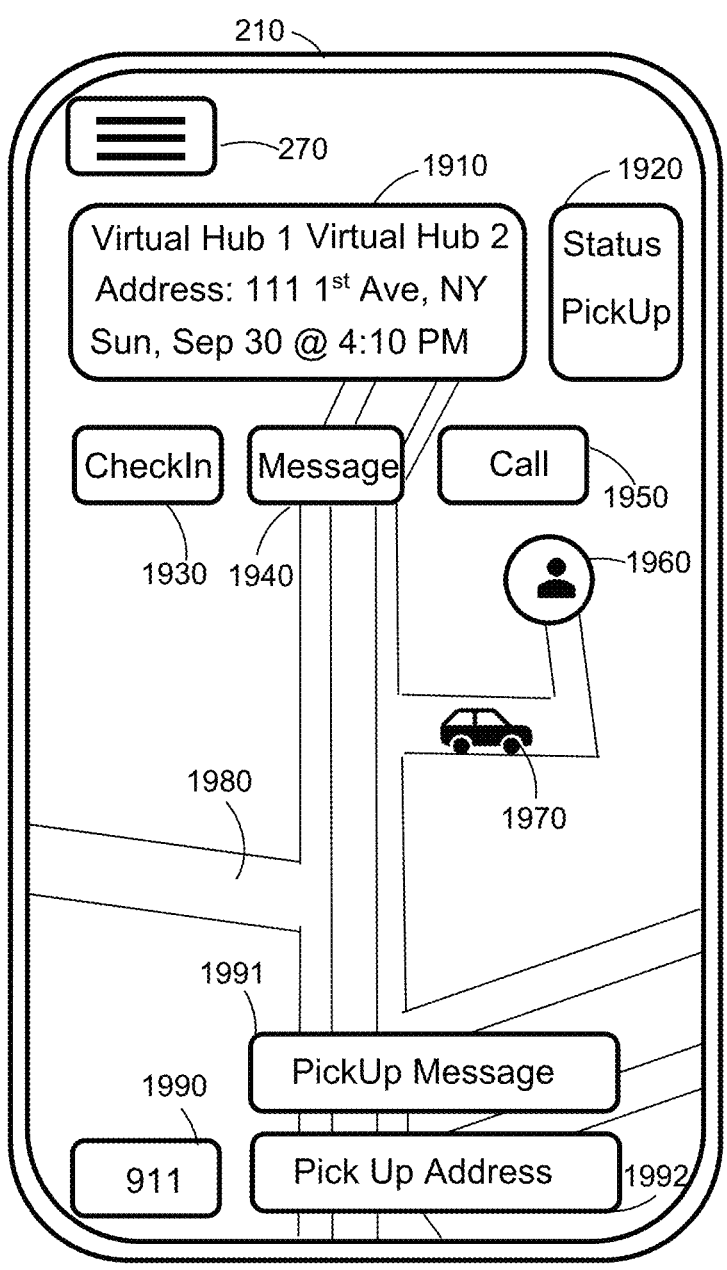
FIG. 19 illustrates an exemplary user interface to display the map of the tool and appliance community linked virtual hub to virtual hub route of a given transaction for tool and appliance community linked forward transportation or freight capacity with associated price-time priority queues units in accordance with some embodiments.

FIG. 19 illustrates an exemplary delivery and pick up status configuration 1900 in one exemplary implementation of participating, transacting and/or trading transformed tool and appliance community linked transportation or freight capacity units or securities in accordance with some embodiments. In some embodiments, the delivery and pick up status configuration 1900 includes the following elements, or a subset or superset thereof:

computing device unit GUI 210 to display method of multi layered network node topology for forward market of tool and appliance community linked transportation and freight units.

hamburger menu toggle 270 to move between different application configurations;

tool and appliance community linked virtual hub 1 pickup address and tool and appliance community linked virtual hub 2 destination address at a contract specification with regards to quality, day, date and time 1910;

trip status for PickUp of tool and appliance community linked transportation or freight unit 1920;

checkIn passenger or freight status for tool and appliance community linked transportation unit 1930;

messaging texts and instructions between users to make pick up and delivery of tool and appliance community linked transportation or freight capacity units 1940;

call between users with number masking for privacy security 1950;

GPS map location of user 110 who is a rider or if freight cargo location 1960;

GPS map location of user 110 who is a driver or if tool and appliance community linked freight, cargo carrier tool and appliance community linked unit location 1970;

GPS map of tool and appliance community linked transportation or freight unit delivery and pickup 1980;

texting message window for freight or tool and appliance community linked transportation unit communication between users 1991;

PickUp address data window during PickUp status 1992;

security button to report security issues to 911 and system database 1990;

In some embodiments, the GUI 210 transmits delivery instructions to the users 110 to help the user have a rendering or map of their GPS location 1960 relative to the selling user 1970 of freight or tool and appliance community linked transportation units. In some embodiments, the GUI 210 displays the trips status such as PickUp 1920 status, the trip status may include subsets or supersets of various status conditions such as PickUp, start, leaving, on-going, in-progress, arriving, arrived or a plurality of other trip status conditions. In some embodiments, the trip view of the GUI 210 may include a CheckIn 1930 button to confirm a passenger or tool and appliance community linked freight transformed transportation unit has been moved into the transformed tool and appliance community linked transportation unit object which could be a car, airplane, autonomous vehicle, bike, boat, ship, bus, drone, limo, motorcycle, moped, shuttle, spaceship, subway, taxi, train, cargo, combination of transformed modes or other type of transportation mode. In some embodiments, the user 110 may transmit a message using the message 1940 button which may transmit audio, visual or text messages between users 110, 1970, 1960. In some embodiments, the users 110, 1960, 1970 may call each other using the call 1950 button to communicate pickup or delivery instructions. In some embodiments, a user 110, 1960, 1970 may message another user 110, 1960, 1970 to communicate using the PickUp Message window 1991 which may utilize visual, audio or text communication modes as well as log a message history between users. In some embodiments the users 110, 1960, 1970 may toggle to other modes of the application using the menu hamburger button 270. In some embodiments the GPS display of a map with the relative position of a tool and appliance community linked transportation or freight unit seller 1970 and a transportation or freight unit buyer 1960 are displayed to help users 110 understand each others relative position and location on a map 1980. In some embodiments the GPS location of the tool and appliance community linked transportation and freight unit seller 1970 and transportation or freight unit buyer 1960 are tracked in real time with location updates on the map 1980.

Figure 20:
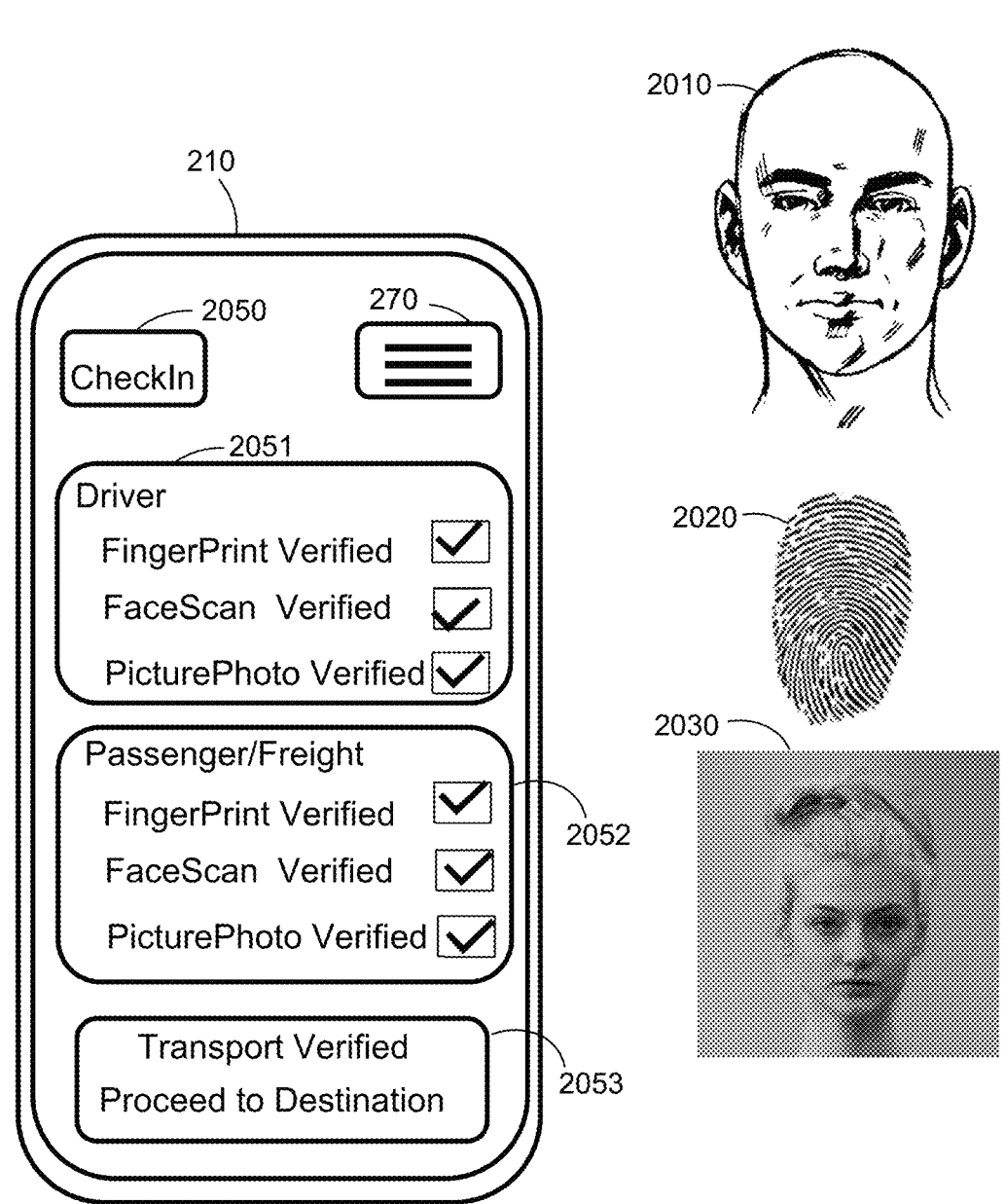
FIG. 20 illustrates an exemplary user interface to display the results of a security check and verification of users identity for tool and appliance community linked forward transportation or freight capacity units with associated price-time priority queues in accordance with some embodiments.

FIG. 20 illustrates an exemplary CheckIn configuration 2000 in one exemplary implementation of participating, transacting and/or trading tool and appliance community linked transportation or freight capacity units in accordance with some embodiments. In some embodiments, the CheckIn 2050 for a buyer or seller of a tool and appliance community linked transportation or freight unit includes the following elements, or a subset or superset thereof:

computing device unit GUI 210 to display method of multi layered network node topology for forward market of tool and appliance community linked transportation and freight units with security CheckIn;

hamburger menu toggle 270 to move between different application configurations;

driver or seller of tool and appliance community linked transportation or freight unit scan check for finger print, face scan or picture photo scan to verify identity of user 2051;

passenger or freight and tool and appliance community linked transportation unit buyer unit scan check for finger print, face scan or picture photo scan to verify identity of user 2052;

transport verification confirmation window to confirm identities of users in the system at the application system level 2053;

buyer and seller of tool and appliance community linked transportation or freight unit facial recognition confirmation 2010;

buyer and seller of tool and appliance community linked transportation or freight unit finger print recognition confirmation 2020;

buyer and seller of tool and appliance community linked transportation or freight unit photo recognition confirmation 2030;

In some embodiments, the GUI 210 of a computing device transmits and confirms the identity of users against identity records in the Network Member Database Server 160 which also confirms security checks for criminal records or other activity that would suspend a user from the platform environment. In some embodiments, the driver verification window 2051 may fail an identity verification due to a user not being the registered user 2010 on the Network Member Database Server 160. In some embodiments, the passenger or freight verification window 2052 may fail an identity verification due to a user 2010 not being the registered user on the network member database server 160. In some embodiments, the transport verification window 2053 may instruct the user 2010 to proceed to destination if verification is successful. In some embodiments, the transport verification window 2053 may instruct the user not to proceed to the destination if the verification is not successful. The identity verification system is unique and novel and dependent on a novel and unique price-time priority queue auction forward market for transformed tool and appliance community linked transportation unit or freight unit or securities over multiple nodes or virtual hubs topologies.

Figure 21:
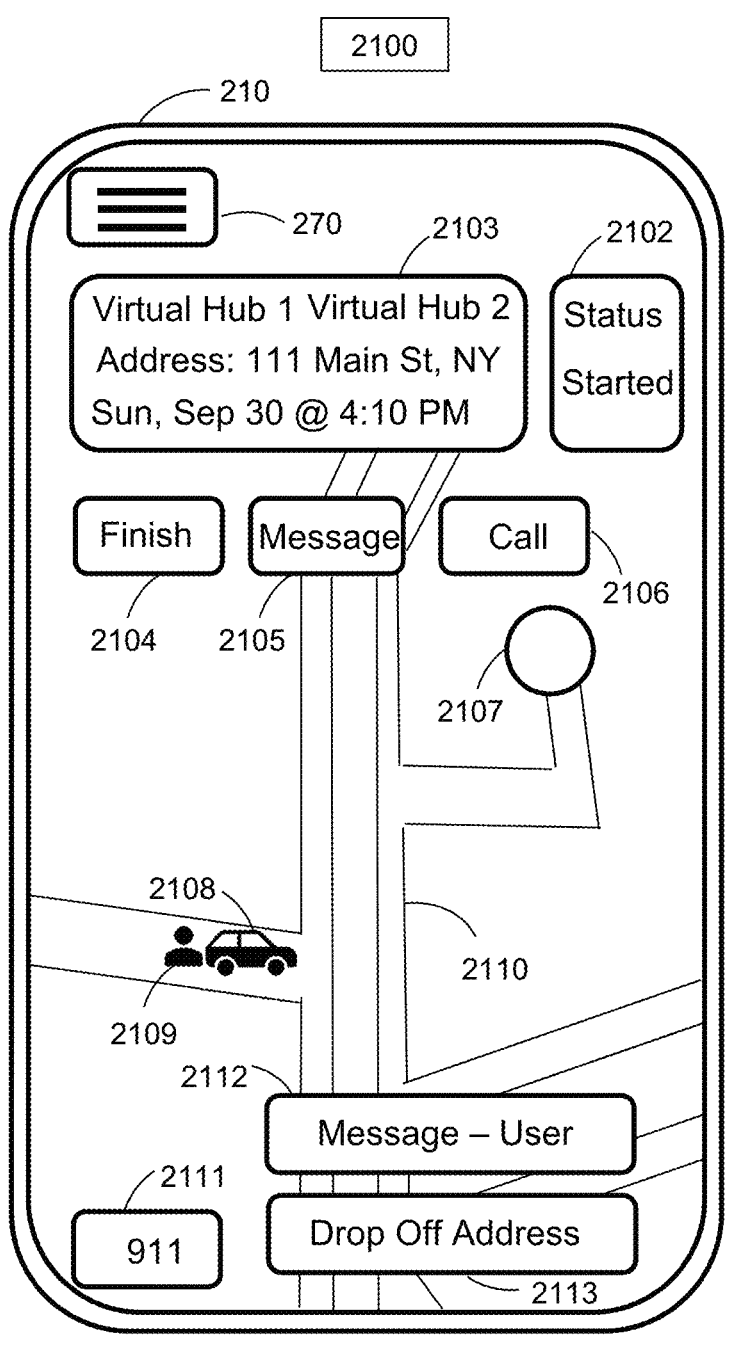
FIG. 21 illustrates an exemplary user interface to display the status of the tool and appliance community linked virtual hub to virtual hub route of a given transaction for tool and appliance community linked forward transportation or freight capacity units with associated price-time priority queues in accordance with some embodiments.

FIG. 21 illustrates an exemplary delivery and pick up status configuration 2100 once a tool and appliance community linked transportation or freight unit delivery has started in one exemplary implementation of participating, transacting and/or trading tool and appliance community linked transportation or freight capacity units in accordance with some embodiments. In some embodiments, the delivery and pick up status configuration 2100 includes the following elements, or a subset or superset thereof:

computing device unit GUI 210 to display method of multi layered network node topology for tool and appliance community linked forward market of transportation and freight units;

hamburger menu toggle 270 to move between different application configurations;

tool and appliance community linked virtual Hub 1 pickup address and tool and appliance community linked Virtual Hub 2 destination address at a transformed contract specification with regards to quality, day, date and time 2103 of delivery of a transportation or freight unit;

trip status of started of tool and appliance community linked transportation or freight unit or security 2102;

finish trip passenger or freight status for tool and appliance community linked transportation unit 2104 once a tool and appliance community linked transportation or freight unit has been delivered;

messaging texts and instructions between users to make pick-up, on-going route status and delivery complete of tool and appliance community linked transportation or freight capacity units 2105;

call between system users with number masking for privacy security 2106;

GPS map location of user 2109 who is a rider or if tool and appliance community linked freight, cargo location 2109;

GPS map location of user 2108 who is a driver or if tool and appliance community linked freight, cargo carrier unit location 2108;

GPS map of transportation or freight unit delivery and pickup 2110;

texting message window for freight or tool and appliance community linked transportation unit communication between users 2112;

starting point of virtual hub for forward tool and appliance community linked transportation or freight units 2107;

security button to report security issues to 911 and system database 2111;

drop off address for delivery of passenger or freight for transportation or freight unit 2111.

In some embodiments, the GUI 210 transmits delivery instructions to the users 110 to help the user have a rendering or map of their GPS location 2109 relative to the selling user 2108 of transformed tool and appliance community linked freight or transportation units or securities. In some embodiments, the GUI 210 displays the trips status such as Started 2102 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2104 button to confirm a passenger or tool and appliance community linked freight transportation unit has been delivered or completed by the tool and appliance community linked transportation unit object which could be a car, airplane, autonomous vehicle, bike, boat, ship, bus, drone, limo, motorcycle, moped, shuttle, spaceship, subway, taxi, train, cargo or other types of transportation modes. In some embodiments, the user 110 may transmit a message using the message 2105 button which may transmit audio, visual or text messages between users 110, 2109, 2108. In some embodiments, the users 110, 2109, 2109 may call each other using the call 2106 button to communicate pickup or delivery instructions or other necessary communication. In some embodiments, a user 110, 2109, 2108 may message another user 110, 2109, 2108 to communicate using the Message-User window 2112 which may utilize visual, audio or text communication modes as well as log a message history between users. In some embodiments the users 110, 2109, 2108 may toggle to other modes of the application using the menu hamburger button 270. In some embodiments the GPS display of a map with the relative position of a transformed tool and appliance community linked transportation or freight unit or security seller 2108 and a transformed tool and appliance community linked transportation or freight unit or security buyer 2109 are displayed to help users 110 understand each others relative position and location on a map 2110. In some embodiments the GPS location of the tool and appliance community linked transportation and freight unit seller 2108 and tool and appliance community linked transportation or freight unit buyer 2109 are tracked in real time with location updates on the map 2110.

Figure 22:
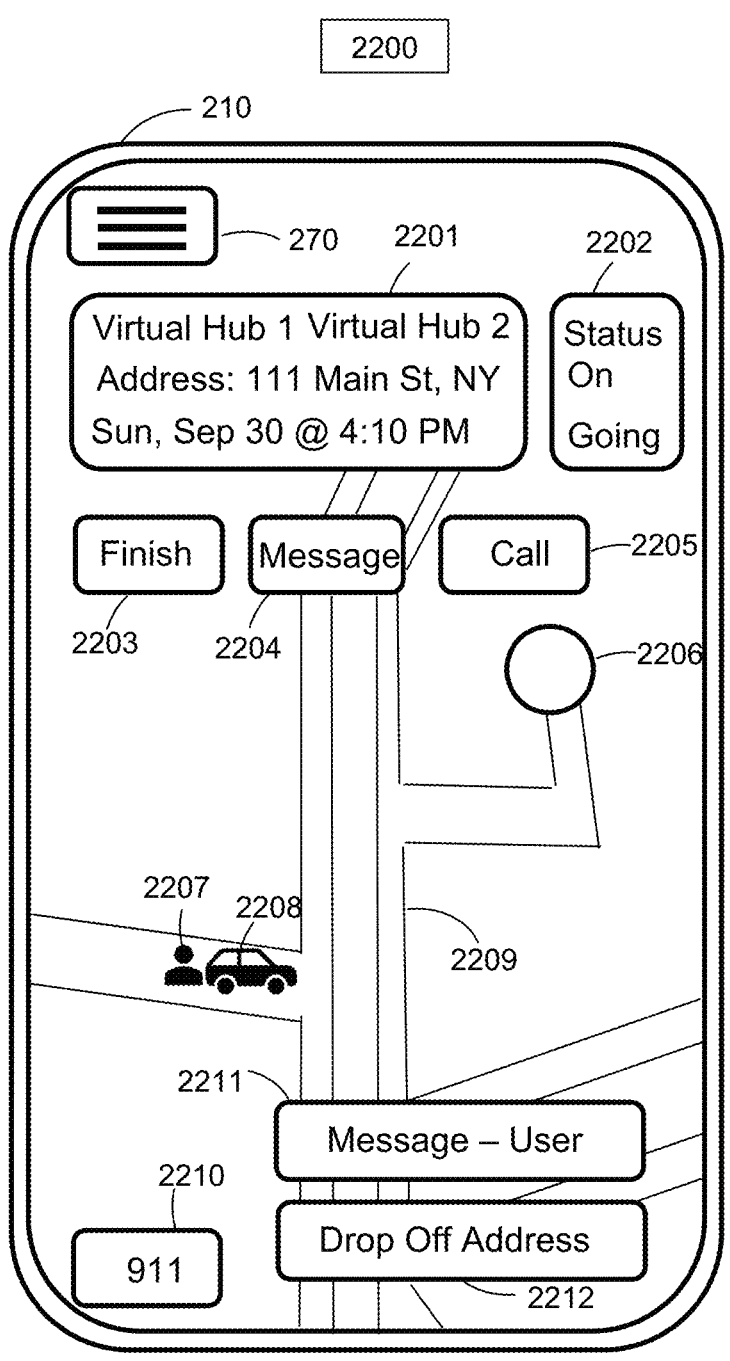
FIG. 22 illustrates an exemplary user interface to display the status of the tool and appliance community linked virtual hub to virtual hub route of a given transaction for tool and appliance community linked forward transportation or freight capacity units with associated price-time priority queues in accordance with some embodiments.

FIG. 22 illustrates an exemplary delivery and pick up status configuration 2200 once a transportation or freight unit delivery is ongoing in one exemplary implementation of participating, transacting and/or trading transformed tool and appliance community linked transportation or freight capacity units or securities in accordance with some embodiments. In some embodiments, the delivery and pick up status configuration 2200 includes the following elements, or a subset or superset thereof:

computing device unit GUI 210 to display method of multi layered network node topology for forward market of tool and appliance community linked transportation and freight units;

hamburger menu toggle 270 to move between different application configurations;

tool and appliance community linked virtual Hub 1 pickup address and tool and appliance community linked virtual Hub 2 destination address at a contract specification with regards to quality, day, date and time 2201 of delivery of a tool and appliance community linked transportation or freight unit;

trip status of ongoing for tool and appliance community linked transportation or freight unit 2202;

finish trip passenger or freight status button for tool and appliance community linked transportation unit 2203 once a tool and appliance community linked transportation or freight unit has been delivered;

messaging texts and instructions between users to make pick-up, on-going route status and delivery complete of tool and appliance community linked transportation or freight capacity units 2204;

call between system users with number masking for privacy security 2205;

GPS map location of user 2209 who is a rider or if tool and appliance community linked freight, cargo location 2209;

GPS map location of user 2208 who is a driver or if tool and appliance community linked freight, cargo carrier unit location 2207;

GPS map of tool and appliance community linked transportation or freight unit delivery and pickup 2206;

texting message window for tool and appliance community linked freight or transportation unit communication between users 2211;

starting point of virtual hub for forward tool and appliance community linked transportation or freight units 2206;

security button to report and record security issues to 911 and system database 2210;

drop off address for delivery of passenger or tool and appliance community linked freight for transportation or freight unit 2212.

In some embodiments, the GUI 210 transmits delivery instructions to the users 110 to help the user 110 have a rendering or map of their GPS location 2207 relative to the selling user 2208 of tool and appliance community linked freight or transportation units. In some embodiments, the GUI 210 displays the trips status such as On-Going 2202 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2203 button to confirm a passenger or tool and appliance community linked freight transportation unit or security has been delivered or completed by the transportation unit object which could be a car, airplane, autonomous vehicle, bike, boat, ship, bus, drone, limo, motorcycle, moped, shuttle, spaceship, subway, taxi, train, cargo or other types of transportation modes. In some embodiments, the user 110 may transmit a message using the message 2204 button which may transmit audio, visual or text messages between users 110, 2207, 2208. In some embodiments, the users 110, 2207, 2208 may call each other using the call 2205 button to communicate pickup or delivery instructions or other necessary communication. In some embodiments, a user 110, 2207, 2208 may message another user 110, 2207, 2208 to communicate using the Message-User window 2211 which may utilize visual, audio or text communication modes as well as log a message history between users 110, 2207, 2208. In some embodiments the users 110, 2207, 2208 may toggle to other modes of the application using the menu hamburger button 270. In some embodiments the GPS display of a map with the relative position of a tool and appliance community linked transportation or freight unit seller 2208 and a tool and appliance community linked transportation or freight unit buyer 2207 are displayed to help users 110 understand each others relative position and location on a map 2209. In some embodiments the GPS location of the tool and appliance community linked transportation and freight unit seller 2208 and tool and appliance community linked transportation or freight unit buyer 2207 are tracked in real time with location updates on the map 2209. In some embodiments, the GUI 210 may display the Drop Off Address 2212 of the tool and appliance community linked transportation or freight unit. In some embodiments a user 110, 2207, 2208 may use a 911 button 2210 to submit a recording to the system servers and to authorities who are connected to the system if anything has occurred that may compromise the security of any user or tool and appliance community linked transportation unit.

Figure 23:
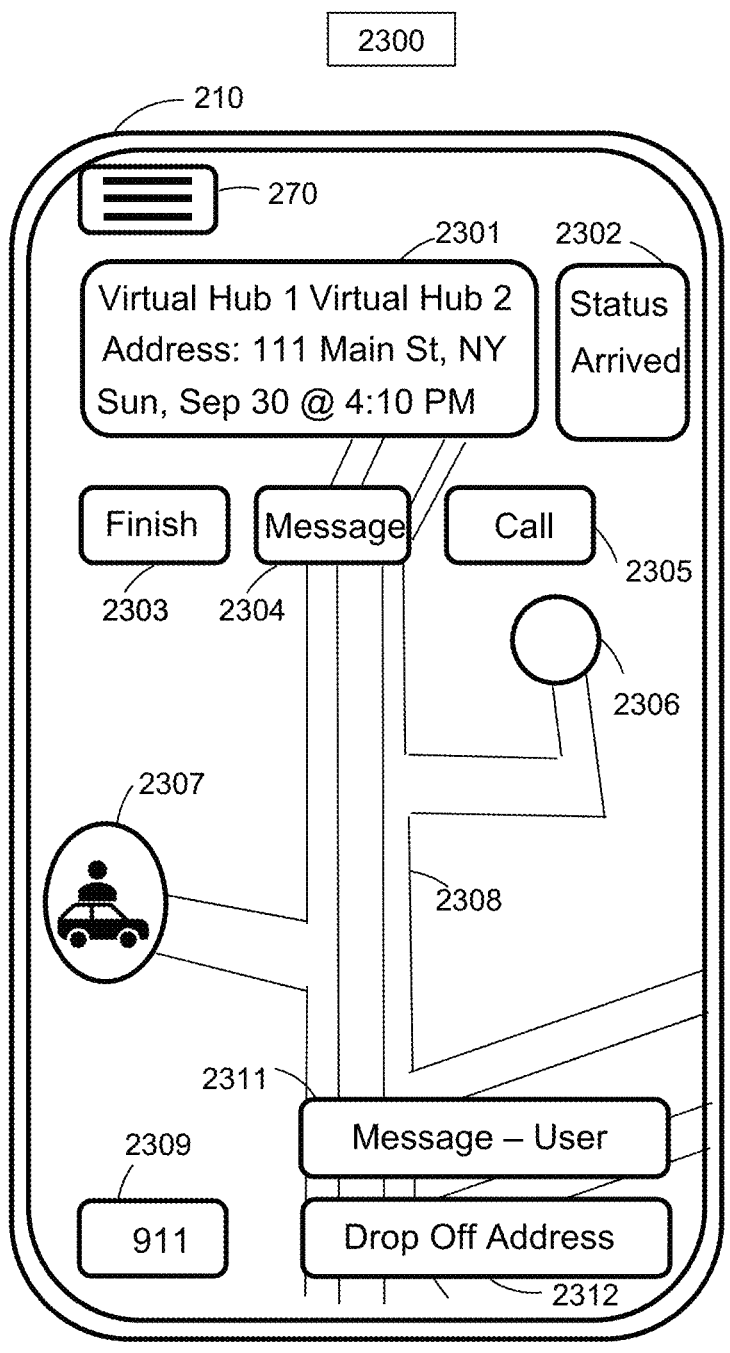
FIG. 23 illustrates an exemplary user interface to display the status of the tool and appliance community linked virtual hub to virtual hub route of a given transaction for tool and appliance community linked forward transportation or freight capacity units with associated price-time priority queues in accordance with some embodiments.

FIG. 23 illustrates an exemplary delivery and pick up status configuration 2300 once a tool and appliance community linked transportation or freight unit delivery has arrived in one exemplary implementation of participating, transacting and/or trading tool and appliance community linked transportation or freight capacity units in accordance with some embodiments. In some embodiments, the delivery and pick up status configuration 2300 includes the following elements, or a subset or superset thereof:

computing device unit GUI 210 to display method of multi layered network node topology for forward market of tool and appliance community linked transportation and freight units.

hamburger menu toggle 270 to move between different application configurations;

tool and appliance community linked virtual hub 1 pickup address and tool and appliance community linked virtual hub 2 destination address at a contract specification with regards to quality, day, date and time 2301 of delivery of a tool and appliance community linked transportation or freight unit;

trip status of arrived for tool and appliance community linked transportation or freight unit 2302;

finish trip passenger or freight status button for tool and appliance community linked transportation unit 2303 once a tool and appliance community linked transportation or freight unit has been delivered;

messaging texts and instructions between users to make pick-up, on-going route status and delivery complete of tool and appliance community linked transportation or freight capacity units 2304;

call between system users with number masking for privacy security 2305;

GPS map location of user 2307 who is a rider or if freight, cargo location 2307;

GPS map location of user 2307 who is a driver or if freight, cargo carrier unit location 2307;

GPS map of tool and appliance community linked transportation or freight unit delivery and pickup 2308;

texting message window for tool and appliance community linked freight or transportation unit communication between users 2311;

starting point of virtual hub for tool and appliance community linked forward transformed transportation or freight units or securities 2306;

ending point of virtual hub for tool and appliance community linked forward transformed transportation units or freight units or securities 2307;

security button to report and record security issues to 911 and system database 2309;

drop off address for delivery of tool and appliance community linked freight for transportation or freight unit 2312;

In some embodiments, the GUI 210 transmits delivery instructions to the users 110 to help the user 110 have a rendering or map of their GPS location 2307 relative to the selling user 2307 of tool and appliance community linked freight or transportation units. In some embodiments, the GUI 210 displays the trips status such as "Arrived" 2302 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2303 button to confirm a tool and appliance community linked freight transportation unit has been delivered or completed by the tool and appliance community linked transportation unit object which could be a car, airplane, autonomous vehicle, bike, boat, ship, bus, drone, limo, motorcycle, moped, shuttle, spaceship, subway, taxi, train, cargo or other types of transportation modes. In some embodiments, the user 110 may transmit a message using the message 2304 button which may transmit audio, visual or text messages between users 110, 2307. In some embodiments, the users 110, 2307 may call each other using the call 2305 button to communicate pickup or delivery instructions or other necessary communication. In some embodiments, a user 110, 2307 may message another user 110, 2307 to communicate using the Message-User window 2311 which may utilize visual, audio or text communication modes as well as log a message history between users 110, 2307. In some embodiments the users 110, 2307 may toggle to other modes of the application using the menu hamburger button 270. In some embodiments the GPS display of a map with the relative position of a tool and appliance community linked transportation or freight unit seller 2307 and a tool and appliance community linked transportation or freight unit buyer 2307 are displayed to help users 110 understand each others relative position and location on a map 2308. In some embodiments the GPS location of the tool and appliance community linked transportation and freight unit seller 2307 and transformed tool and appliance community linked transportation or freight unit or security buyer 2307 are tracked in real time with location updates on the map 2308. In some embodiments, the GUI 210 may display the Drop Off Address 2312 of the transformed tool and appliance community linked transportation or freight unit or security. In some embodiments a user 110, 2307 may use a 911 button 2309 to submit a recording to the system servers and to authorities who are connected to the system if anything has occurred that may compromise the security of any user or tool and appliance community linked transportation unit.

Figure 24:
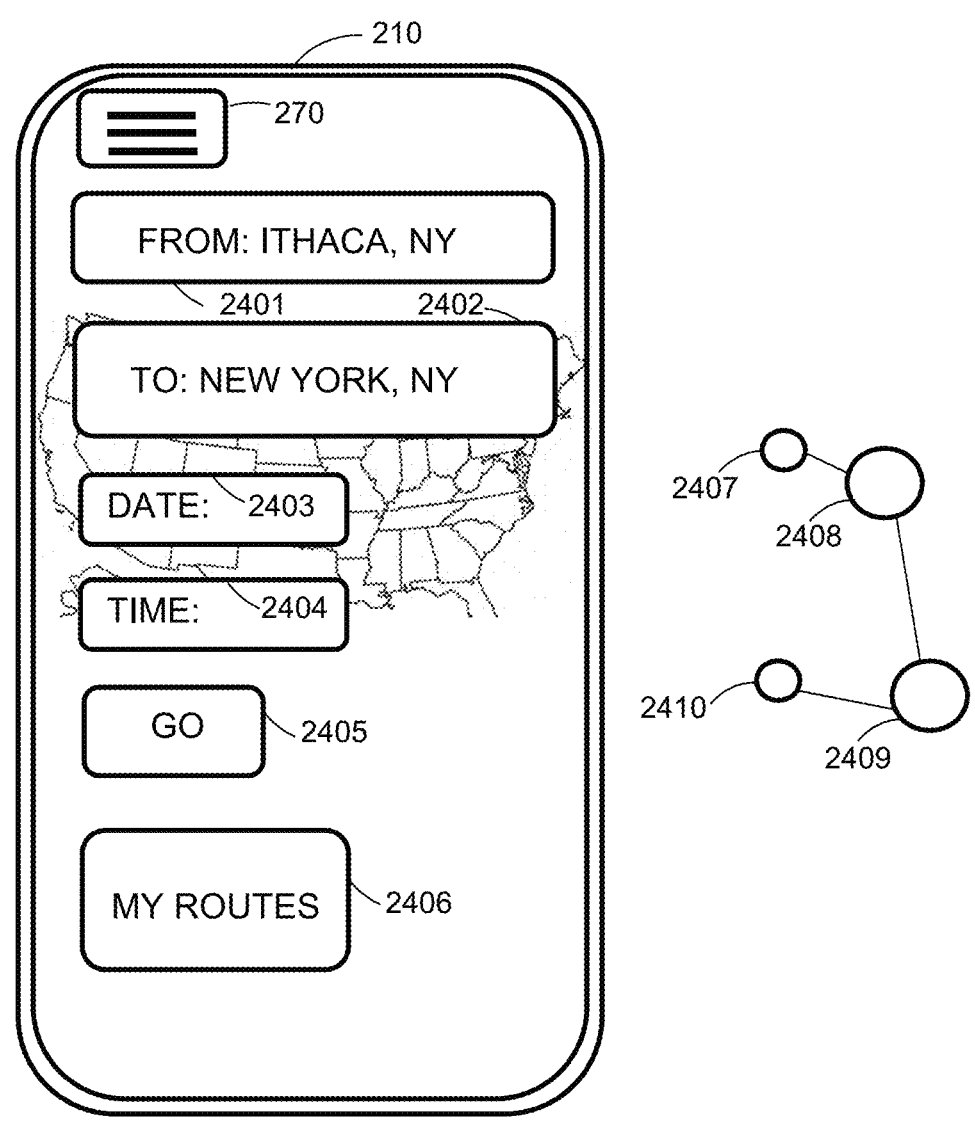
FIG. 24 illustrates an exemplary user interface to display a multi-hub, virtual-hub sequence given a start and end point for a transaction auction for tool and appliance community linked forward transportation or freight capacity units with associated price-time priority queues in accordance with some embodiments.

FIG. 24 illustrates an exemplary delivery and pick up configuration 2400 for a tool and appliance community linked transportation or freight unit multi layered network node topology in one exemplary implementation of participating, transacting and/or trading tool and appliance community linked transportation or freight capacity units in accordance with some embodiments. In some embodiments, the multi layered network node topology of participating, transacting and/or trading tool and appliance community linked transportation or freight capacity configuration 2400 includes the following elements, or a subset or superset thereof:

> computing device unit GUI 210 to display method of multi layered network node topology for forward market of tool and appliance community linked transportation and freight units;
>
> hamburger menu toggle 270 to move between different application configurations;
>
> from node starting point 2401 of a multi layered network node topology for forward market of tool and appliance community linked transportation and freight units;
>
> to or destination node ending point 2402 of a multi layered network node topology for forward market of tool and appliance community linked transportation and freight units;
>
> date module 2403 in GUI 210 of an auction for a multi layered network node topology for tool and appliance community linked forward market of transformed transportation and freight units or securities;
>
> time module 2404 in GUI 210 of pickup and delivery of an auction for a multi layered network node topology for tool and appliance community linked forward market of transportation and freight units;
>
> go button 2405 to form an auction for a multi layered network node topology for tool and appliance community linked forward market of transformed transportation and freight units or securities;
>
> My Routes button 2406 to quickly obtain common From 2401 or To 2402 points in a price-time priority auction for a multi layered network node topology for tool and appliance community linked forward market of transformed transportation and freight units for a user on the system;
>
> multi-hub network 2407, 2408, 2409, 2410 which may form a single dual node price-time priority auction 2407 to 2408 or 2407 to 2410 or any possible node combination or a multi-node auction series for a multi layered network node topology for tool and appliance community linked forward market of transportation and freight units for a user on the system.

In some embodiments, the GUI 210 transmits a From node 2401 and To node 2402 with instructions to the users 110 with a specific date 2403 and time 2404 of a multi layered network node topology for forward market of transformed tool and appliance community linked transportation and freight units for a user on the system to perform an auction by pressing the Go button 2405. The system may use a plurality of constraints such as but not limited by cheapest route 1011, single mode of tool and appliance community linked transportation 1012, multi method mode of tool and appliance community linked transportation 1013, fastest route 1014, most scenic route 1015, highest rated route or highest rated driver 1016, most available route 1017, highest volume route 1018, most frequent route 1019, service level route 1020, security and safety of route 1021, group restricted email or group criteria 1022 to use any two node points 2407, 2408, 2409, 2410 or any combination of points 2407, 2408, 2409, 2410. In some embodiments the system may use no constraint, one constraint or a plurality of constraints to allow the user 110 to participate, transact or trade in a multi layered network node topology for tool and appliance community linked forward market of transportation and freight units in an auction. In some embodiments the price-time priority queue auction for tool and appliance community linked forward market transformed transportation or freight units or securities may be comprised of an auction between only two points or a plurality of points subject to a plurality of constraints. In some embodiments the from or starting point or starting virtual hub may be 2407, but the system selects an auction between 2408 and 2409 rather than starting at 2407 because one or more constraints were selected to frame the price-time priority queue auction for tool and appliance community linked forward market transportation or freight units. In some embodiments, an auction may be comprised of multiple modes of tool and appliance community linked transportation comprising a vehicle tool and appliance community linked transportation or freight unit auction between 2407 and 2408 points, followed by an tool and appliance community linked airplane transportation or freight unit auction between 2408 and 2409, followed by an tool and appliance community linked ship auction between 2410 and 2409 for tool and appliance community linked transportation or freight units. In some embodiments the various plurality of auctions may be displayed as one price-time priority auction or a series of price-time priority auctions. In some embodiments, auctions for a multi layered network node topology for a tool and appliance community linked forward market of transportation and freight units may consist of any subset or superset of the aforementioned possibilities including any constraints 1000 or any plurality of modes 800.

Figure 25:
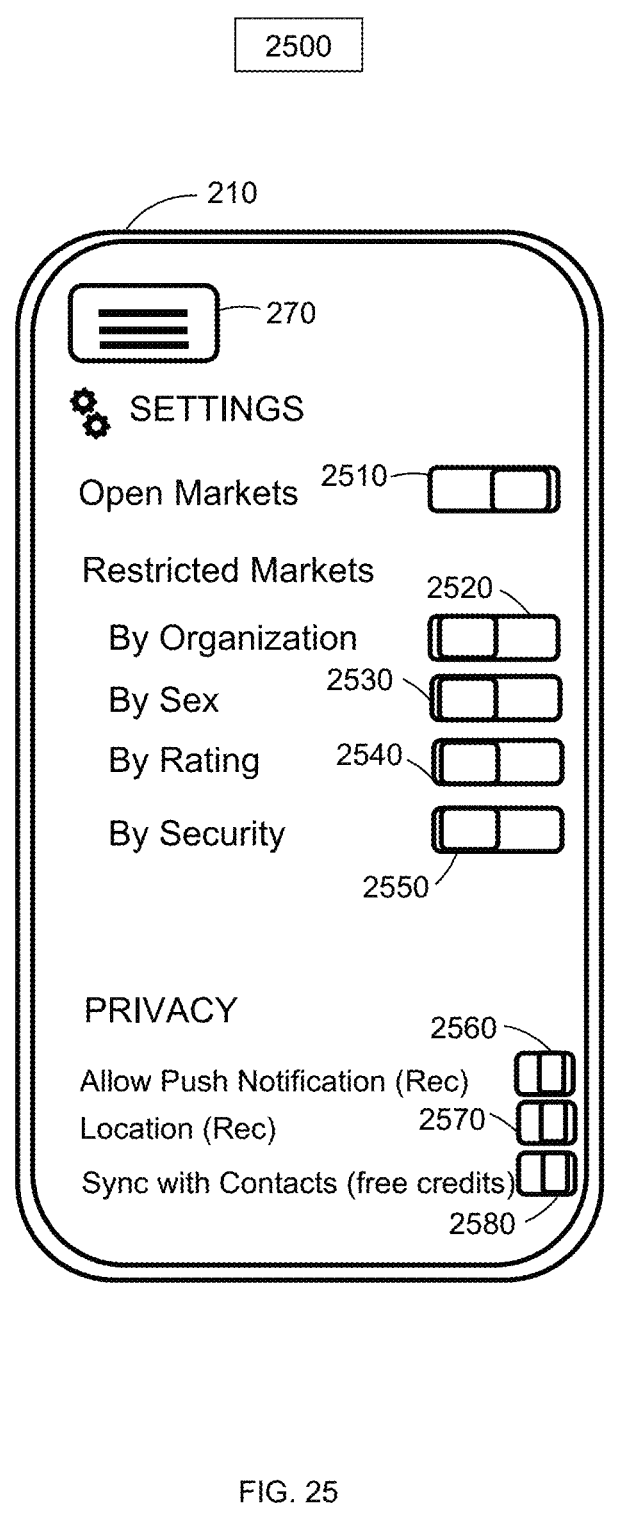

FIG. 25 illustrates an exemplary setting configuration 2500 for an tool and appliance community linked transportation or freight unit multi layered network node topology in one exemplary implementation of participating, transacting and/or trading tool and appliance community linked transportation or freight capacity units in accordance with some embodiments. In some embodiments, the multi layered network node topology of participating, transacting and/or trading tool and appliance community linked transportation or freight capacity configuration 2500 includes the following setting elements, or a subset or superset thereof:

> computing device unit GUI 210 to display method of multi layered network node topology for forward market of transformed tool and appliance community linked transportation and freight units or securities.
>
> hamburger menu toggle 270 to move between different application configurations;
>
> open markets setting toggle 2510 which allows a user to see all market participants of a given auction on a multi layered network node topology for a forward market of transformed tool and appliance community linked transportation and freight units or securities;
>
> restricted markets setting By Organization 2520, By Sex 2530, By Rating 2540, By Security 2550 or by any other restriction the user 110 defines which limit the price-time priority queue auction participants for the user;

privacy settings which restrict push notifications 2560, location information 2570; Sync with contacts 2580, or other privacy settings;

In some embodiments, a user 110 may select open markets 2510 which show every participant in a given auction for a multi layered network node topology for a forward market of tool and appliance community linked transportation and freight units. In some embodiments, participants or users 110 may select to restrict the market view of the GUI such as 400 by organization email 2520 or by sex 2530 or by rating of driver 2540 or rating of user 2540 or by security 2550 or by a plurality of other restrictions but not limited to those restrictions. In some embodiments, users 110 may change privacy settings which restrict push notifications 2560, location settings 2570, Sync with Contacts settings 2580 or a plurality of other settings. In some embodiments, the toggle switches 2510, 2520, 2530, 2540, 2550, 2560, 2570, 2580 may be set to off or on depending on if they hold a right or left toggle switch position. The restricted market settings 2520, 2530, 2540, 2550 may be a subset or superset of the aforementioned in the formation of an open market price-time priority auction for a multi layered network node topology for a forward market of tool and appliance community linked transportation and freight units.

Figure 26:
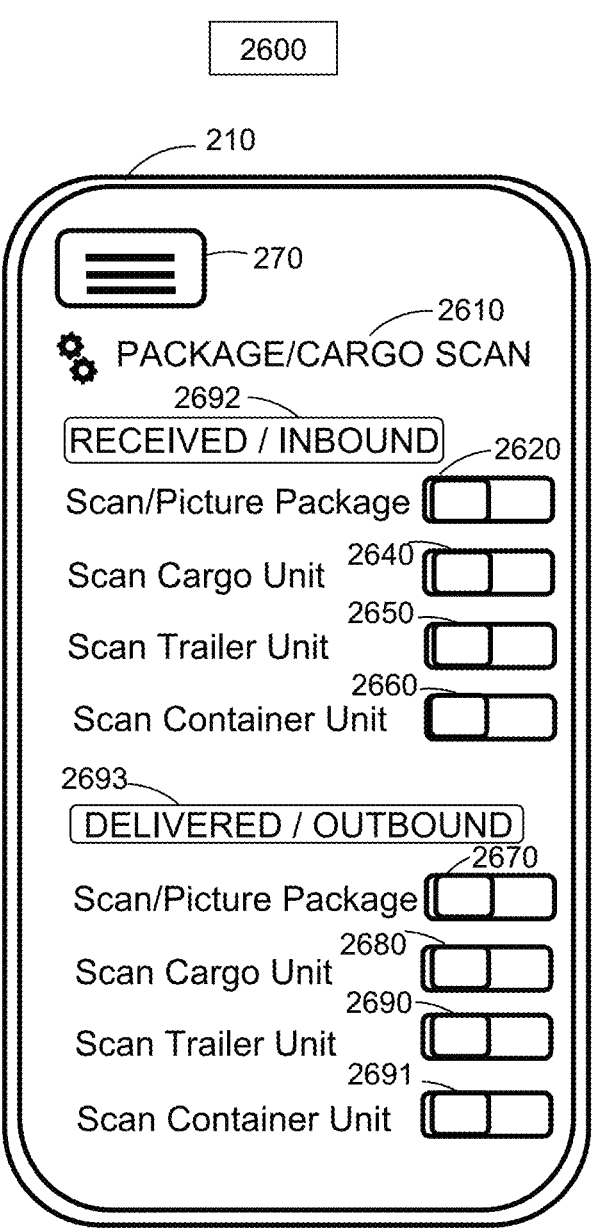
FIG. 26 illustrates an exemplary user interface to display inbound and outbound package, cargo or freight QR scans or UPC scans or pictures to document tool and appliance community linked freight units in which are delivered against the forward market tool and appliance community linked auction with associated price-time priority queues for two or more virtual hubs in accordance with some embodiments.

FIG. 26 illustrates an exemplary setting for a package or cargo scan configuration 2600 for a transformed tool and appliance community linked transportation or freight unit multi layered network node topology in one exemplary implementation of participating, transacting and/or trading tool and appliance community linked transportation or freight capacity units in accordance with some embodiments. In some embodiments, the multi layered network node topology of participating, transacting and/or trading tool and appliance community linked transportation or freight capacity configuration 2600 includes the following setting for a package or cargo scan elements, or a subset or superset thereof:

computing device unit GUI 210 to display method of multi layered network node topology for forward market of tool and appliance community linked transformed transportation and freight units.

hamburger menu toggle 270 to move between different application configurations;

package or Cargo Scan module 2610 to document the status and position of transformed forward market freight or tool and appliance community linked transportation units or security;

package or Cargo Inbound or received module 2692 to scan a picture, universal product code barcode, QR code, or other transformed tool and appliance community linked transportation or freight unit identifier or security;

package or Cargo Inbound scan toggle switch 2620 to scan a picture, universal product code barcode, QR code, or other transformed tool and appliance community linked transportation or freight unit identifier or security;

cargo unit Inbound scan toggle switch 2640 to scan a picture, universal product code barcode, QR code, or other transformed tool and appliance community linked transportation or freight unit identifier or security;

trailer unit Inbound scan toggle switch 2650 to scan a picture, universal product code barcode, QR code, or other transformed tool and appliance community linked transportation or freight unit identifier or security;

container unit Inbound scan toggle switch 2660 to scan a picture, universal product code barcode, QR code, or other transformed tool and appliance community linked transportation or freight unit identifier or security;

package or Cargo Outbound or delivered module 2693 to scan a picture, universal product code barcode, QR code, or other transformed tool and appliance community linked transportation or freight unit or security identifier or security;

package or Cargo Outbound or delivered scan toggle 2670 to scan a picture, universal product code barcode, QR code, or other transformed tool and appliance community linked transportation or freight unit identifier or security;

cargo outbound or delivered scan toggle 2680 to scan a picture, universal product code barcode, QR code, or other transformed tool and appliance community linked transportation or freight unit identifier;

trailer Outbound or delivered scan toggle 2690 to scan a picture, universal product code barcode, QR code, or other transformed tool and appliance community linked transportation or freight unit identifier;

container unit outbound or delivered scan toggle 2691 to scan a picture, universal product code barcode, QR code, or other transformed tool and appliance community linked transportation or freight unit identifier.

In some embodiments, a user 110 may select the package or cargo unit scan module 2610 to scan or take a picture of a package or cargo identification code such as a QR code, Uniform Product code or other identifying package or cargo characteristic. In some embodiments, the user 110 may select the inbound Scan/Picture Package toggle 2620 which captures the identification characteristic which may include QR Codes, Uniform Product Codes, Serial Numbers or other cargo identification characteristics of a package or cargo tool and appliance community linked transportation or freight unit. In some embodiments, inbound cargo may include a larger unit structure than a package such as a crate or large movable unit with identification characteristics which may include QR Codes, Uniform Product Codes, Serial Numbers or other cargo identification characteristics, for such larger units a user 110 may use the Scan Cargo Unit toggle 2640 to capture the cargo identification characteristic for inbound receipt of the tool and appliance community linked transportation or freight unit. In some embodiments, an inbound Scan Trailer Unit toggle 2650 option may be used by a user 110 to instruct the system configuration that receipt of a large trailer unit such as an eighteen wheel trailer unit or smaller trailer, may be scanned to identify the tool and appliance community linked transportation or freight unit. In some embodiments, an inbound Scan Container Unit 2660 toggle may be utilized to track the receipt or location of a shipping container. In some embodiments, a user 110 may select the outbound package or cargo unit scan module 2693 to scan or take a picture of a package or cargo identification code such as a QR code, Uniform Product code or other identifying package or cargo characteristic to confirm delivery to a delivery address of the tool and appliance community linked transportation or freight unit. In some embodiments, the user 110 may select the outbound Scan/Picture Package toggle 2670 which captures the identification characteristic of a package or cargo tool and appliance community linked transportation or freight unit once the unit is delivered to the delivery address. In some embodiments, cargo may include a larger unit structure than a package such as a crate or large movable unit with identification characteristics which may include QR Codes, Uniform Product Codes, Serial Numbers or other cargo identification characteristics, for such larger units a user 110 may use the outbound Scan Cargo Unit toggle 2680 to capture the cargo identification characteristic for outbound receipt of the transformed tool and appliance community linked transportation or freight unit or security. In some embodiments, an outbound Scan Trailer Unit toggle 2690 option may be used by a user 110 to instruct the system configuration that delivery of a large trailer unit such as an eighteen wheel trailer unit or smaller trailer, may be scanned to identify the tool and appliance community linked transportation or freight unit and confirm delivery. In some embodiments, an outbound Scan Container Unit 2691 toggle may be utilized to track the delivery or location of a shipping container which has been delivered. In some embodiments, transformed tool and appliance community linked transportation or freight units or securities may be a subset or superset of the aforementioned in the formation of an open forward market auction for a multi layered network node topology for a forward market of transformed tool and appliance community linked transportation and freight units or securities.

Figure 27:
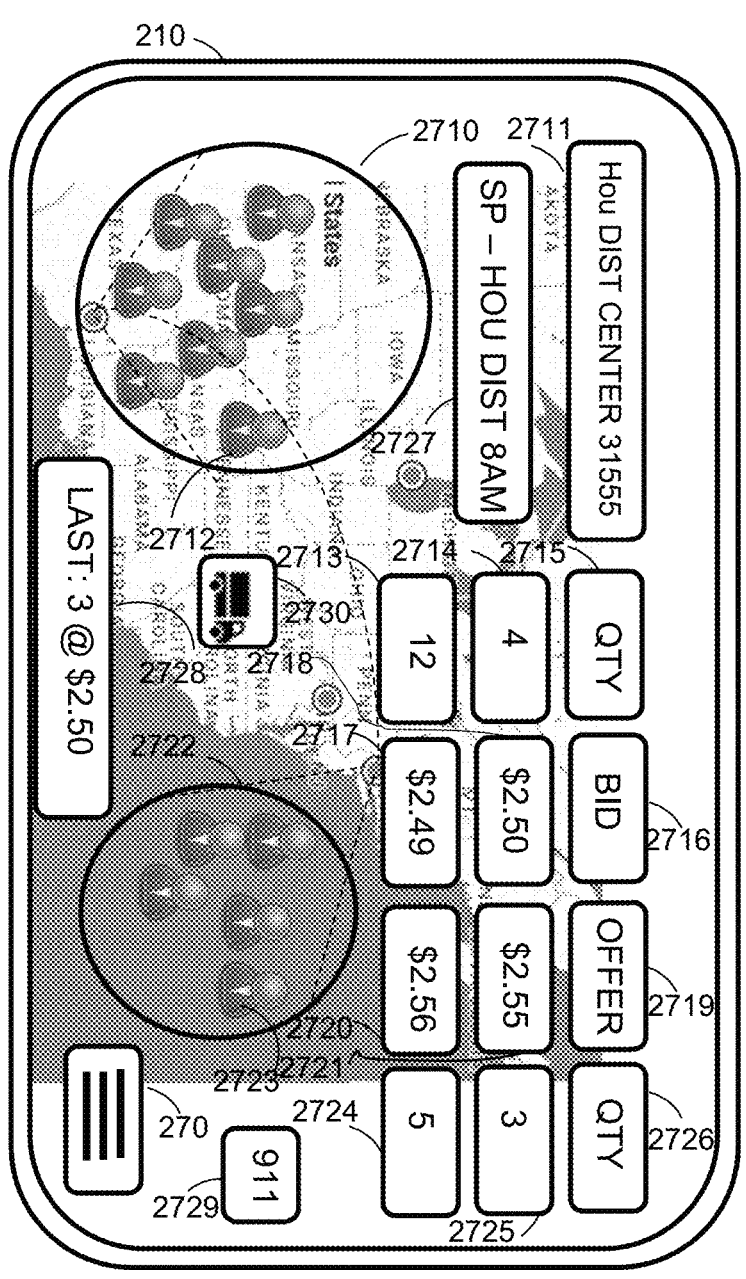
FIG. 27 illustrates an exemplary user interface to display a tool and appliance community linked forward freight auction for a transportation unit with associated price-time priority queues a given hub or multi-hub combination in accordance with some embodiments.

FIG. 27 illustrates an exemplary setting for a tool and appliance community linked package or cargo market configuration 2700 for a transformed tool and appliance community linked transportation or freight unit or security multi layered network node topology in one exemplary implementation of participating, transacting and/or trading transformed tool and appliance community linked transportation or freight capacity units or securities in accordance with some embodiments. In some embodiments, user interface 210 includes the following elements, or a subset or superset thereof:

exemplary tool and appliance community linked virtual hub combination from a shipping center location (a data transformation) 2711;

exemplary tool and appliance community linked virtual hub origin/from location 2710 with users or freight originators 2712 within the tool and appliance community linked virtual hub location 2710 (a data transformation);

exemplary specification summary of the market, level of service and time of delivery commencement 2727 (a data transformation);

exemplary mode of ground transportation or freight capacity type 2730 (a data transformation);

exemplary transaction summary of the last trades quantity and price 2728;

exemplary tool and appliance community linked virtual hub destination/to location 2722 and user who is being delivered on the tool and appliance community linked transportation or freight capacity unit 2723 (a data transformation);

exemplary bid/buy quantity title header 2715 for an exemplary tool and appliance community linked virtual transportation or freight unit hub market (a data transformation);

exemplary bid/buy price title header 2716 for an exemplary virtual tool and appliance community linked transportation or freight hub market (a data transformation);

exemplary offer/sell price title header 2719 for an exemplary virtual tool and appliance community linked transportation or freight hub market (a data transformation);

exemplary offer/sell quantity title header 2726 for an exemplary virtual tool and appliance community linked transportation or freight hub market (a data transformation);

exemplary bid/buy quantity 2414 for the best bid quantity from a plurality of users 110 for an exemplary respective tool and appliance community linked transportation or freight capacity virtual hub combination 2711 (a data transformation);

exemplary bid/buy quantity 2713 for the second-best bid quantity from a plurality of users 110 for an exemplary respective tool and appliance community linked transportation or freight capacity virtual hub combination 2711 (a data transformation);

exemplary bid/buy price 2718 for the best bid price from a plurality of users 110 for an exemplary respective tool and appliance community linked transportation or freight capacity virtual hub combination 2711 (a data transformation);

exemplary bid/buy price 2717 for the second-best bid price from a plurality of users 110 for an exemplary respective tool and appliance community linked transportation or freight capacity virtual hub combination 2711 (a data transformation);

exemplary offer/sell price 2721 for the best offer price from a plurality of users 110 for an exemplary respective tool and appliance community linked transportation or freight capacity virtual hub combination 2711 (a data transformation);

exemplary offer/sell price 2720 for the second-best offer price from a plurality of users 110 for an exemplary respective tool and appliance community linked transportation or freight capacity virtual hub combination (a data transformation) 2711;

exemplary offer/sell quantity 2725 for the best offer quantity from a plurality of users 110 for an exemplary respective tool and appliance community linked transportation or freight capacity virtual hub combination (a data transformation) 2711;

exemplary offer/sell quantity 2724 for the second-best offer quantity from a plurality of users 110 for an exemplary respective tool and appliance community linked transportation or freight capacity virtual hub combination (a data transformation) 2711;

exemplary safety dispatch "911" button 2729 to enact video and audio recording of the user 110 environment and dispatch of that information to authorities and system servers.

exemplary hamburger menu button 270 to move back to menu options and settings away from the participation, transaction, trading price-time priority auction GUI 210 embodiment.

In some embodiments, the user 110 may enter a transaction quantity and price for tool and appliance community linked transportation or freight capacity units to participate, transact and/or trade by the GUI 210 detecting user 110 contact or audio interface with a bid/buy price 2718 or offer/sell price 2721. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual hub combination 2711. A plurality of prices and markets may be presented based on a plurality of transformed tool and appliance community linked contract specifications. In some embodiments, the best bid/buy price 2718 may be moving up in price or down in price depending on the market conditions at any given time. In some embodiments the last trade or last transacted price for a given specification is listed to help the user 110 understand how the market is moving so that the user 110 may submit a competitive offer/selling price 2721 or bid/buying price 2718. In some embodiments, users 110 may adjust settings of the GUI 210 to show more bid/buying prices 2717 or more offer/selling prices 2720. In some embodiments the matrix of market quantities and prices 2713, 2714, 2715, 2716, 2717, 2718, 2719, 2720, 2721, 2724, 2725, 2726 may be referred to as market depth in the GUI 210 embodiment. In some embodiments the number of users 110 may be displayed as user icons 2712 or 2723 for the amount of people logged in which desire to transact, trade or participate in a given virtual hub 2710 to virtual hub 2722 combination for tool and appliance community linked transportation or freight units. In some embodiments, users 110 may select the transportation mode 2730 such that the user allows a market for only one form of transformed tool and appliance community linked transportation or freight capacity as a commodity or the user 110 may allow the system to show multiple forms of tool and appliance community linked transportation or freight capacity between two tool and appliance community linked virtual transportation capacity hubs 2710, 2711, 2722. In some embodiments the GUI 210 may detect a user 110 selecting the 911 button 2729 which may activate voice and video recording functions on the mobile or stationary device 111 and transmit the data with a confirmation from the user 110 to the authorities and system servers to provide enhanced security while participating, transacting or trading forward transformed tool and appliance community linked transportation or freight as a commodity or security. In some embodiments the user may toggle between the GUI 210 market view screen in FIG. 3 and other menu 270 options and settings by the user 110 selecting the hamburger button 270 and the GUI 210 detecting the user 110 input or contact or audio instruction. In some embodiments the GUI 210 may instantiate instructions in the memory of the mobile computing device 210 which then transmits tool and appliance community linked transportation or freight capacity data 241 through the network 226, 214 or wireless GPS network 215 to call upon instruction routines and instruction sub-routines on the tool and appliance community linked transportation forward market database server 271, virtual hub database server 223, network member database server 222, tool and appliance community route processor 217, my route virtual hub processor 218, application processor 219, server 220, sequence route processor 221, and memory which all interface together to make one system which may deliver tool and appliance community linked transportation or freight capacity units to users 110 from and to a plurality of virtual hubs 2710, 2722 with a plurality of specifications at specific market prices.

Figure 28:
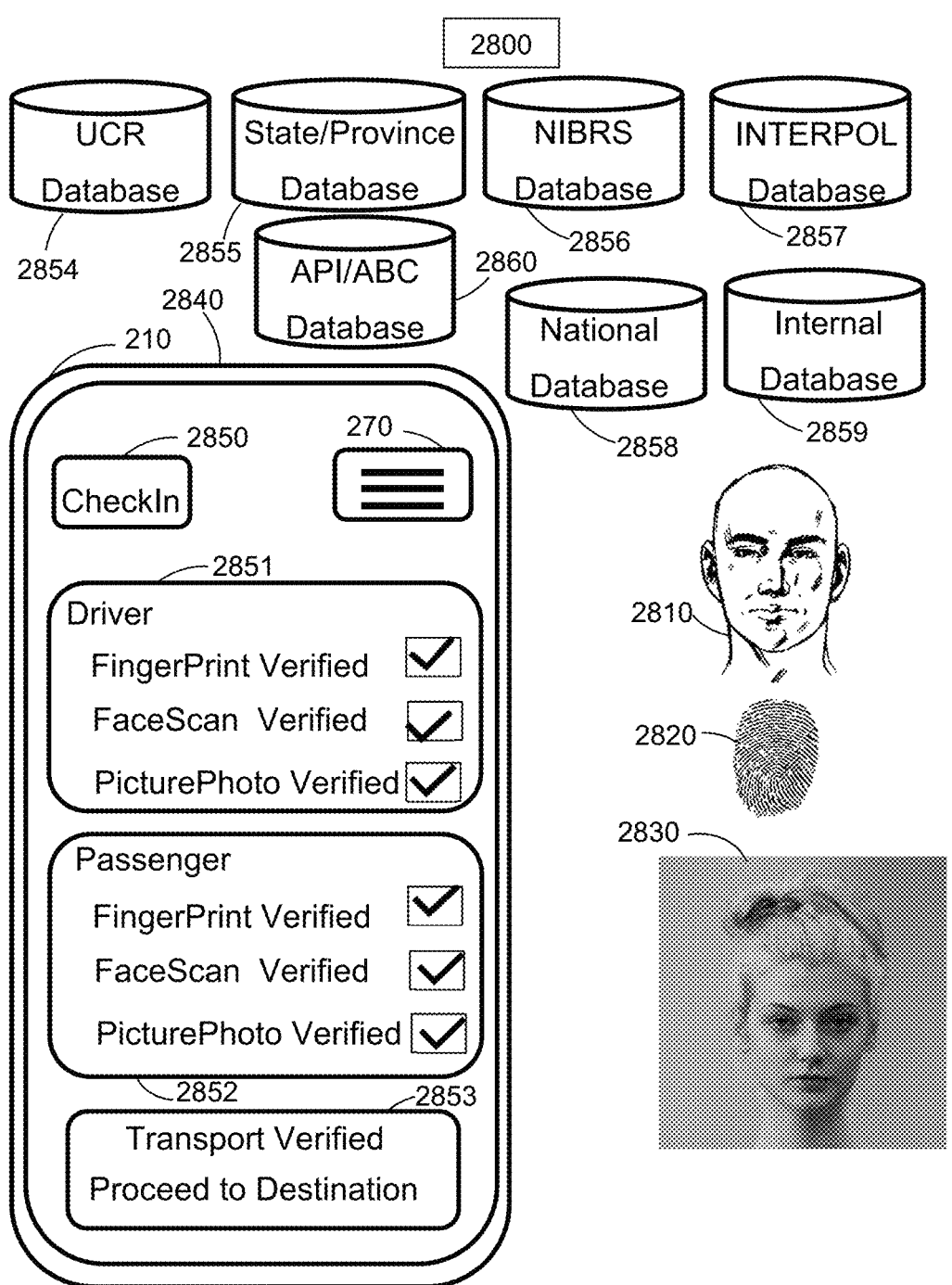
FIG. 28 illustrates an exemplary user interface and database configuration which allow user identity or criminal record or tool and appliance community linked transaction history with associated price-time priority queues to be verified in accordance with some embodiments.

FIG. 28 illustrates an exemplary check in and security database configuration 2800 for an tool and appliance community linked transportation or freight unit multi layered network node topology in one exemplary implementation of participating, transacting and/or trading transformed tool and appliance community linked transportation or freight capacity units or securities in accordance with some embodiments. In some embodiments, the multi layered network node topology of participating, transacting and/or trading tool and appliance community linked transportation or freight capacity configuration 2800 includes the following security configuration elements, or a subset or superset thereof:

exemplary uniform crime reporting ("UCR") database 2854 from international agencies who report crime;

exemplary International State or Provincial crime reporting database 2855 from international governments who report crime;

exemplary International National Incident Based Reporting System ("NIBRS") crime reporting database 2856 from international governments who report crime;

exemplary Interpol crime reporting database 2857 from international governments who report crime which connects National Central Bureaus ("NCBs");

exemplary International application program interface and ABC ("API/ABC") crime reporting database 2860 from international governments who report crime;

exemplary national crime reporting database 2858 from international governments who report crime;

exemplary internal system crime reporting database 2859 from crimes which occurred on system;

exemplary facial scan to identify user 2810 against a plurality of crime databases;

exemplary fingerprint scan to identify user 2820 against a plurality of crime databases;

exemplary photo or photo scan to identify user 2830 against a plurality of crime databases;

exemplary voice scan to identify user 2810 against a plurality of crime databases;

exemplary Computing device unit GUI 210 to display method of multi layered network node topology for forward market of tool and appliance community linked transportation and freight units.

hamburger menu toggle 270 to move between different application configurations;

exemplary tool and appliance community linked Driver or Freight transport or freight or transport seller unit user interface 2851 to confirm identity verification against a plurality of crime databases;

exemplary tool and appliance community linked passenger unit or freight unit user interface 2852 to confirm identity verification against a plurality of crime databases;

exemplary handshake verification user interface 2853 to confirm both buyer and seller of tool and appliance community linked transportation or freight units were correctly verified against crime databases;

In some embodiments, a plurality of crime databases UCR Database 2854, State and Province Database 2855, NIBRS database 2856, INTERPOL database 2857, API/ABC database 2860, National database 2858, Internal system database 2859 are used to confirm a user 110, has been confirmed not to have criminal history in accordance with instructions on the method and system. In some embodiments, tool and appliance community linked transportation or freight unit security may be a subset or superset of the aforementioned in the formation of an open forward market auction for a multi layered network node topology for a forward market of tool and appliance community linked transportation and freight units. Such security checks are standard in airports, but they are not automated and they are not utilized in other modes of transportation which degrades the overall safety of other transportation methods if they are not utilized. In some embodiments, the check in instructions may reject a user from confirmed verified transport if they fail the plurality of safety checks. In some embodiments, confirmed no crime history users 110 do not have activity reported in the plurality of crime databases UCR Database 2854, State and Province Database 2855, NIBRS database 2856, INTERPOL database 2857, API/ABC database 2860, National database 2858, Internal system database 2859 and are confirmed to tool and appliance community linked transport verified status 2853 in the system.

Figure 29:
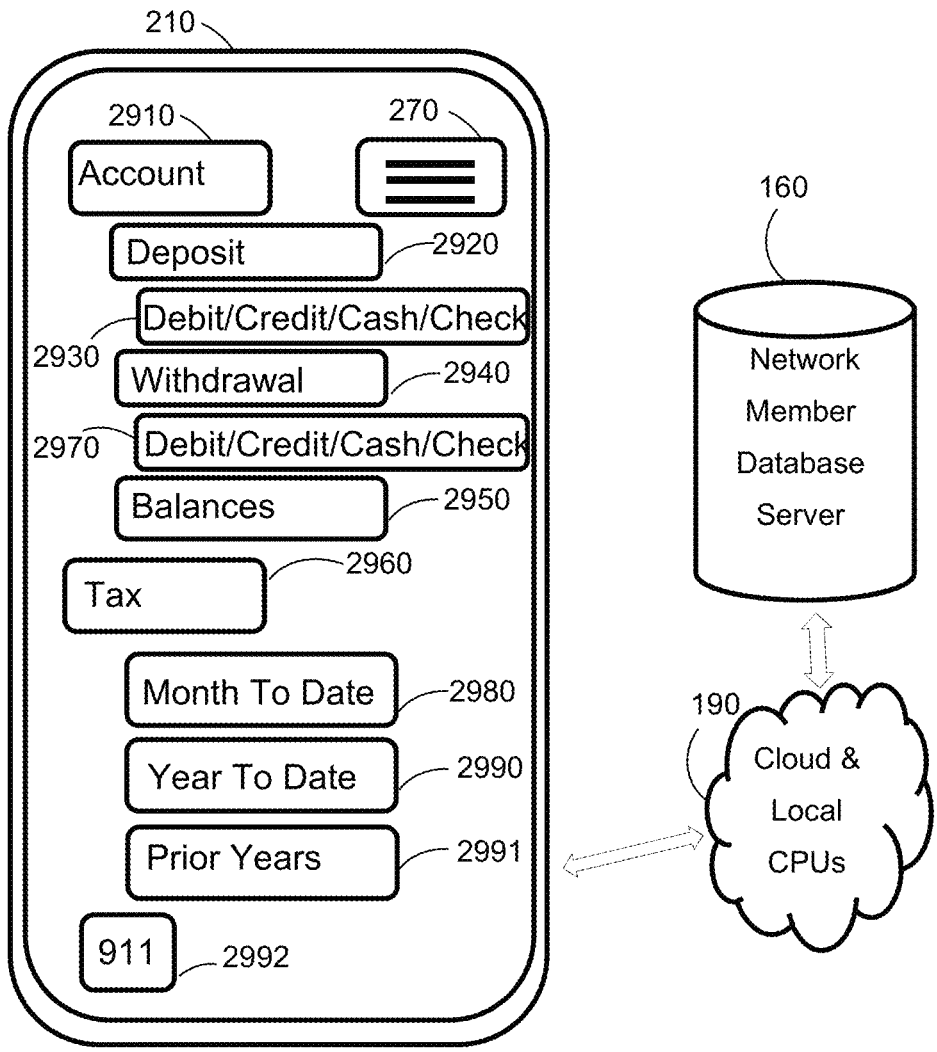
FIG. 29 illustrates an exemplary user interface and database configuration for account balances and payment for the forward market auctions of tool and appliance community linked transportation and freight capacity with associated price-time priority queues between virtual hubs in accordance with some embodiments.

FIG. 29 illustrates an exemplary user accounting configuration 2900 for a transformed tool and appliance community linked transportation or freight unit or security multi layered network node topology in one exemplary implementation of participating, transacting and/or trading transformed tool and appliance community linked transportation or freight capacity unit auctions in accordance with some embodiments. In some embodiments, the multi layered network node topology of participating, transacting and/or trading transformed tool and appliance community linked transportation or freight capacity configuration 2900 includes the following accounting elements, or a subset or superset thereof:

computing device unit GUI 210 to display method of multi layered network node topology for forward market of tool and appliance community linked transportation and freight units.

exemplary hamburger menu toggle 270 to move between different application configurations;

exemplary account button 2910 to edit or confirm user account data;

exemplary deposit button 2920 to add transaction funds or transaction currency or transaction balances to the user account;

exemplary deposit method button 2930 to add transaction funds or transaction currency or transaction balances to the user account through Debit, Credit, Cash, Check, virtual currency, digital currency or a plurality of other payment methods;

exemplary withdrawal button 2940 to send transaction funds or transaction currency or transaction balances to the user account in a different institution;

exemplary withdrawal method button 2970 to send transaction funds or transaction currency or transaction balances to the user account at a different institution through Debit, Credit, Cash, Check, virtual currency, digital currency or a plurality of other payment methods;

exemplary balances button 2950 to confirm user account balances;

exemplary tax button 2960 to track user account activity for taxation reporting;

exemplary month to date tax reporting button 2980;

exemplary year to date tax reporting button 2990;

exemplary prior year tax reporting button 2991;

exemplary "911" security button 2991;

exemplary Network Member Database Server 160;

exemplary cloud and CPU and Network configuration 190 to send and receive Network Member account data.

In some embodiments, user account 2910 data may be displayed with voice or screen or non-screen computing devices with instructions from the GUI 210 in accordance with instructions on the method and system. In some embodiments, user deposit 2920 data may be displayed with voice or screen or non-screen computing devices with instructions from the GUI 210 in accordance with instructions on the method and system. In some embodiments, user deposit method 2930 data such as Debit, Credit, Cash, Check, virtual currency, digital currency or a plurality of other payment methods may be displayed with voice or screen or non-screen computing devices with instructions from the GUI 210 in accordance with instructions on the method and system. In some embodiments, user withdrawal 2940 data may be displayed with voice or screen or non-screen computing devices with instructions from the GUI 210 in accordance with instructions on the method and system. In some embodiments, user withdrawal method 2970 data such as Debit, Credit, Cash, Check, virtual currency, digital currency or a plurality of other payment methods may be displayed with voice or screen or non-screen computing devices with instructions from the GUI 210 in accordance with instructions on the method and system to place money in the system account into a different institution specified by the user 110. In some embodiments, user balances 2950 data may be displayed with voice or screen or non-screen computing devices with instructions from the GUI 210 in accordance with instructions on the method and system. In some embodiments, user tax button 2960 data may be displayed with voice or screen or non-screen computing devices with instructions from the GUI 210 in accordance with instructions on the method and system. In some embodiments, user month to date tax data button 2980, year to date tax data button 2990, prior year tax data button 2991 may be displayed with voice or screen or non-screen computing devices with instructions from the GUI 210 in accordance with instructions on the method and system. In some embodiments, the accounting and tax information may be stored in the Network Member Database Server 222 and transmitted through the cloud, network and CPUs 224, 214 to the GUI computing device 210. In some embodiments, transportation or freight unit accounting and fund interfaces may be a subset or superset of the aforementioned in the formation of an open forward market price-time priority auction for a multi layered network node topology for a forward market of tool and appliance community linked transportation and freight units.

Figure 30:
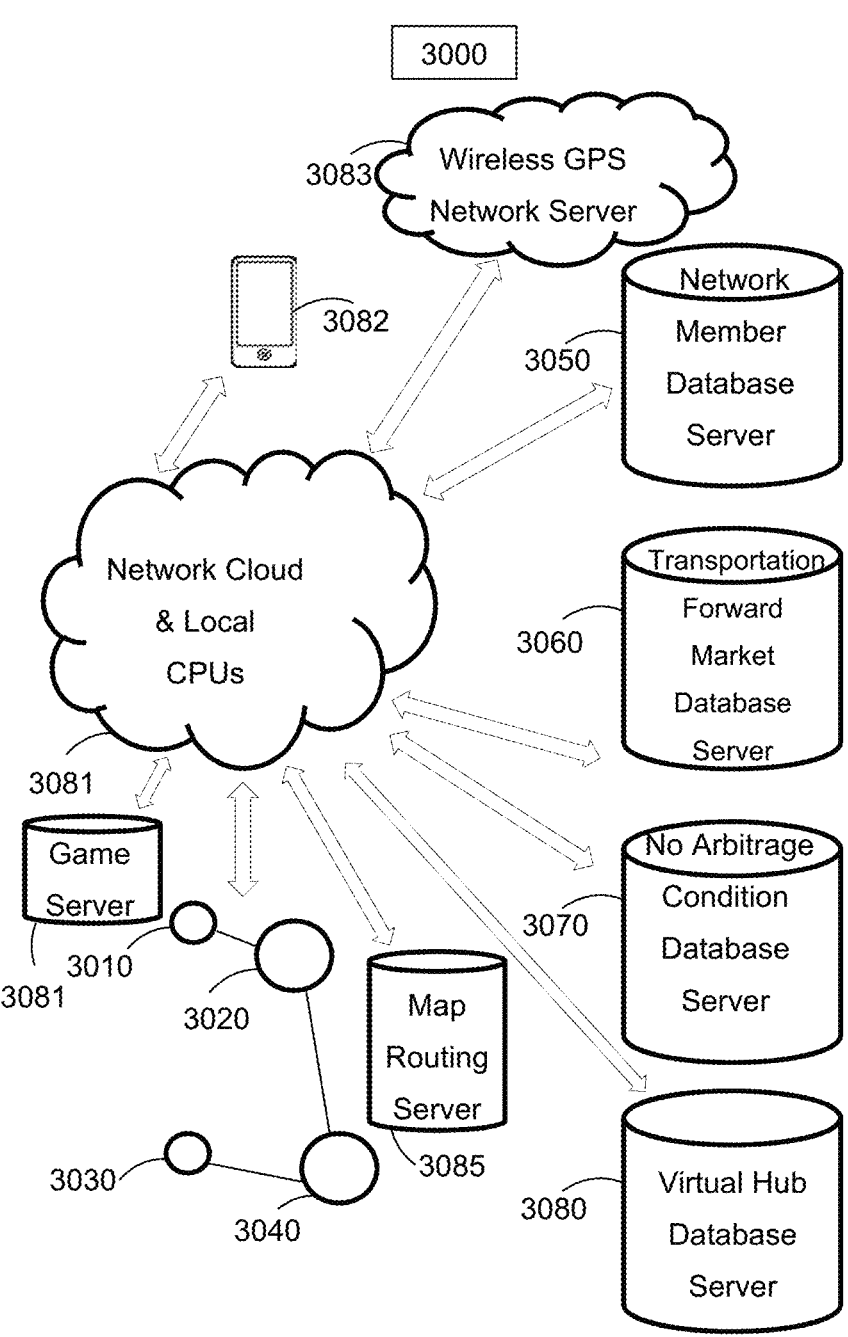
FIG. 30 illustrates an exemplary method and system configuration of multiple tool and appliance community linked virtual hub topology auctions with associated price-time priority queues in accordance with some embodiments.

FIG. 30 illustrates an exemplary network configuration 3000 for a tool and appliance community linked transportation or freight unit multi layered network node topology in one exemplary implementation of participating, transacting and/or trading transportation or freight capacity unit auctions in accordance with some embodiments. In some embodiments, the multi layered network node topology of participating, transacting and/or trading tool and appliance community linked transportation or freight capacity configuration 3000 includes the following accounting elements, or a subset or superset thereof:

exemplary wireless GPS Network and Server 3083;

exemplary wireless computing device that is audio, video, screen or non-screen interfaced 3082;

exemplary Network Member Database Server 3050;

exemplary tool and appliance community linked Transportation Forward Market Database Server 3060;

exemplary tool and appliance community linked Transportation Forward Market Database Server 3060;

exemplary tool and appliance community linked No Arbitrage Condition Database Server 3070;

exemplary tool and appliance community linked Virtual Hub Database Server 3080;

exemplary Network, Network Cloud, and local CPUs 3081;

Exemplary Network Multi Layered Network Virtual Hub Node Topology for forward market tool and appliance community linked transportation of freight unit price-time priority auctions 3010, 3020, 3030, 3040.

In some embodiments, the network topology 3010 may utilize a voice or screen or non-screen computing device 3082 to interface with system and method instructions over a Network and Network Cloud and Networked CPUs 3081 to use instructions on CPUs to order a constrained or unconstrained virtual hub network topology auction over two or more virtual hub nodes 3010, 3020, 3030, 3040 over one or multiple modes of tool and appliance community linked transportation or freight with instructions and data from the Virtual Hub Database Server 3080, the No Arbitrage Condition Database Server 3070, the tool and appliance community linked Transportation Forward Market Database Server 3060, the Network Member Database Server 3050 and the Wireless GPS Network Server 3083. Network Data may be displayed with voice or screen or non-screen computing devices with instructions from the GUI 210 in accordance with instructions on the method and system.

Figure 31:
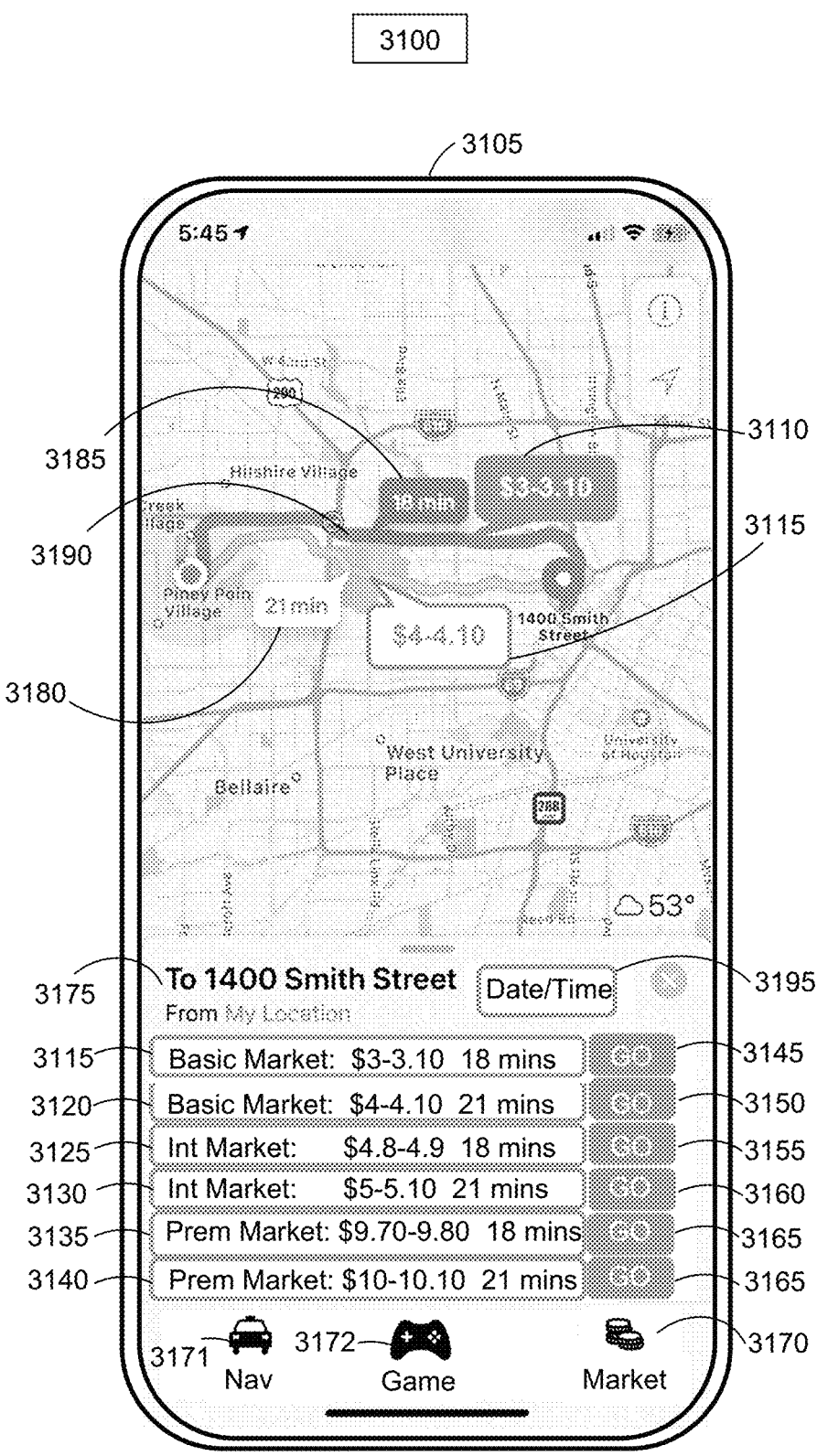
FIG. 31 illustrates an exemplary method and system configuration of the integration interface with GPS map tool and appliance community linked routing with associated price-time priority queues such as TomTom or Apple Maps or other third party map routing software applications.

FIG. 31 illustrates an exemplary network configuration 3100 integrating the disclosed method and system as a tool and appliance community linked layer on a traditional third party map software. In some embodiments, the multi layered network node topology of participating, transacting and/or trading transformed tool and appliance community linked transportation or freight capacity configuration 3100 includes the following accounting elements, or a subset or superset thereof:

exemplary computing device 3105;

exemplary route input by user 3175;

exemplary route node structure 3190 to satisfy user tool and appliance community linked route request 3175;

exemplary alternative route node structure 3180 to satisfy user tool and appliance community linked route request 3175 with associated time 3180;

exemplary time estimate 3185 for route 3190;

exemplary live auction price value 3110 for route 3190;

exemplary alternative live price-time priority queue auction price value 3115 for tool and appliance community linked route 3180;

exemplary navigation mode button 3171;

exemplary game mode button 3172;

exemplary date and time modification button 3195 for disclosed route 3175;

exemplary transformed forward tool and appliance community linked transportation unit price-time priority auction value and modification feed 3115 and selection GO 3145 button to transact the given route with a basic tool and appliance community linked transportation unit or security feature and characteristic for one route 3190 that satisfies the user route request 3175;

exemplary alternative transformed forward tool and appliance community linked transportation unit price-time priority auction value and modification feed 3120 and selection GO 3150 button to transact the given route with a basic tool and appliance community linked transportation unit or security feature and characteristic for one alternative route 3180 that satisfies the user route request 3175;

exemplary transformed forward tool and appliance community linked transportation unit auction value and modification feed 3125 and selection GO 3155 button to transact the given route with an intermediate tool and appliance community linked transportation unit or security feature and characteristic for one route 3190 that satisfies the user route request 3175;

exemplary alternative transformed forward tool and appliance community linked transportation unit auction value and modification feed 3130 and selection GO 3160 button to transact the given route with an intermediate tool and appliance community linked transportation unit or security feature and characteristic for one alternative route 3180 that satisfies the user route request 3175;

exemplary transformed forward tool and appliance community linked transportation unit auction value and modification feed 3135 and selection GO 3165 button to transact the given route with a premium tool and appliance community linked transportation unit or security feature and characteristic for one route 3190 that satisfies the user route request 3175;

exemplary alternative tool and appliance community linked transformed forward tool and appliance community linked transportation unit auction value and modification feed 3140 and selection GO 3165 button to transact the given route with a premium tool and appliance community linked transportation unit or security feature and characteristic for one alternative route 3180 that satisfies the user route request 3175;

exemplary market display feature 3170 as an overlay onto map routing for user requests 3175.

In some embodiments, map routing interfaces 3105 such as Apple Maps or TomTom or another third party, may integrate the disclosed method and system to display the transformed forward tool and appliance community linked transportation unit or security market auction price along a various route given various virtual hub topologies 1800 over the user 110 defined route request 3175. The computing device 3105 may disclose over visual, audio or other communication methods the forward transformed tool and appliance community linked transportation unit auction price 3110 on a given route 3190. In yet other embodiments, the disclosed transportation unit transformation may communicate the forward transformed tool and appliance community linked transportation unit or security auction price 3115 of an alternative route 3180 such that a user may select either route 3190 or 3180 based on the disclosed method and system price 3110 or 3115 which was generated by instructions from a plurality of users between two virtual hubs on the user defined route 3175. The disclosed forward market tool and appliance community linked transportation unit auction may be communicated on an on demand basis representing the current time and day or on a forward basis by changing the Date/Time 3195 user interface button feature to represent the then current market pricing for future time intervals on a plurality of given routes 3190 and 3180 along the user requested virtual hub combination 3175. Tool and appliance community linked virtual hubs may represent the end points of a route defined by the user 3175 or tool and appliance community linked virtual hubs may represent points along a given route but not including the endpoints or tool and appliance community linked virtual hubs may represent points not along the tool and appliance community linked route the user defined 3175. Tool and appliance community linked virtual hub combinations transform transportation capacity units into a forward market which allow users of the method and system to transact in the physical market by either delivering transformed tool and appliance community linked transportation units as a driver of a vehicle or capacity holder or by receiving them as a passenger or package if the tool and appliance community linked unit is a package rather than a person. A tool and appliance community linked transportation unit or security represents space which may be filled by a tool and appliance community linked package or unit. Further the forward transformed tool and appliance community linked transportation unit market price-time priority queue auction 3170 overlay may be a layer on traditional GPS map routing software or as an alternative to time based routing or mileage based routing. The forward tool and appliance community linked transportation unit market specification such as "Basic" 3115, 3120 or "Intermediate" 3125, 3130 or "Premium" 3135, 3140 may also have a plurality of other characteristics or levels which form the basis of a fungible transformed contract or substitutable contract between users which is exchangeable with the same terms and conditions if one user is unable to fulfil their contract obligations for the transformed tool and appliance community linked transportation unit. In some embodiments, the navigation mode 3171 may move the user to turn by turn directions along the price based navigation tool and appliance community linked route 3190. In some embodiments, the game mode 3172 may move the user to a game based overlay on the price based navigation tool and appliance community linked route 3190. In some embodiments, the market mode 3170 may move the user to a market based overlay on the priced based navigation tool and appliance community linked route 3190.

The disclosed method and system of a transformed tool and appliance community linked transportation capacity unit may be fully functional as a layer in map routing software 3100 or as a stand alone application 200, 300, etc.

In some embodiments, the disclosed method and system tool and appliance community linked transportation unit price-time priority queue auction price 3110 and 3115 has two prices or more in other embodiments. Two tool and appliance community linked route prices 3110 are disclosed at $3 and $3.10. The former price of $3 is the price where a user is willing to buy or pay for a tool and appliance community linked transportation unit along the given route 3190. The later price of $3.10 is the price at which a user is willing to sell a tool and appliance community linked transportation unit along the given route 3190. The instructions of the auction may match the highest bidding price of $3 with the lowest selling price in the price queue when the prices match. In other words, in the exemplary embodiment, if a user wanted to sell a transportation unit at the current forward market price-time priority auction queue 3110 on route 3190, the user would enter a price of $3 which is the current highest bidding price in the method and system queue 3110. By way of further example, another user may desire to buy a tool and appliance community linked transportation unit on the forward transformed tool and appliance community linked transportation unit auction method and system on route 3190, to match, the user would enter a price of $3.10 which is the lowest selling price of a seller on the forward market tool and appliance community linked transportation unit auction method and system.

Figure 32:
FIG. 32 illustrates an exemplary method and system configuration of the integration interface with GPS map tool and appliance community linked routing with associated price-time priority queues such as Google Maps or other third party map routing software applications.

FIG. 32 illustrates another exemplary network configuration 3200 integrating the disclosed method and system as a tool and appliance community linked layer on another traditional third party map software. In some embodiments, the multi layered network node topology of participating, transacting and/or trading tool and appliance community linked transportation or freight capacity configuration 3200 includes the following accounting elements, or a subset or superset thereof:

exemplary computing device 3205;
exemplary route input by user 3210;
exemplary tool and appliance community linked route node structure 3295 to satisfy user tool and appliance community linked route request 3210;
exemplary alternative tool and appliance community linked route node structure 3230 to satisfy user tool and appliance community linked route request 3210 with associated time;
exemplary time estimate 3225 for route 3295;
exemplary navigation mode button 3291;
exemplary game mode button 3292;
exemplary market mode button 3293;
exemplary live price-time priority queue auction price value 3220 for route 3295;
exemplary alternative live price-time priority auction price value 3230 for tool and appliance community linked route 3230;
exemplary date and time modification button 3296 for disclosed tool and appliance community linked route 3210;
exemplary transformed forward tool and appliance community linked transportation unit or security auction value and modification feed 3235 and selection GO 3265 button to transact the given route with a basic tool and appliance community linked transportation unit feature and characteristic for one route 3295 that satisfies the user route request 3210;
exemplary alternative transformed forward tool and appliance community linked transportation unit or security price-time priority auction value and modification feed 3240 and selection GO 3270 button to transact the given route with a basic tool and appliance community linked transportation unit feature and characteristic for one alternative route 3230 that satisfies the user route request 3210;
exemplary transformed forward tool and appliance community linked transportation unit or security auction value and modification feed 3245 and selection GO 3275 button to transact the given route with an intermediate tool and appliance community linked transportation unit feature and characteristic for one route 3295 that satisfies the user tool and appliance community linked route request 3210;
exemplary alternative transformed forward tool and appliance community linked transportation unit or security auction value and modification feed 3250 and selection GO 3280 button to transact the given route with an intermediate tool and appliance community linked transportation unit feature and characteristic for one alternative tool and appliance community linked route 3230 that satisfies the user tool and appliance community linked route request 3210;
exemplary transformed forward tool and appliance community linked transportation unit or security auction value and modification feed 3255 and selection GO 3285 button to transact the given route with a premium tool and appliance community linked transportation unit feature and characteristic for one tool and appliance community linked route 3295 that satisfies the user tool and appliance community linked route request 3210;
exemplary alternative transformed forward tool and appliance community linked transportation unit or security price-time priority auction value and modification feed 3260 and selection GO 3290 button to transact the given route with a premium transformed tool and appliance community linked transportation unit feature and characteristic for one alternative tool and appliance community linked route 3230 that satisfies the user tool and appliance community linked route request 3210;
exemplary market display feature 3215 as an overlay onto map tool and appliance community linked routing for user requests 3210.

In some embodiments, map routing interfaces 3205 such as Google Maps or Garmin or another third party navigation method, may integrate the disclosed method and system to display the transformed forward tool and appliance community linked transportation unit or security market auction price along a various route given various virtual hub topologies 1800 over the user 110 defined route request 3210. The computing device 3205 may disclose over visual, audio or other communication methods the forward transformed tool and appliance community linked transportation unit or security auction price 3220 on a given route 3295. In yet other embodiments, the disclosed tool and appliance community linked transportation unit transformation may communicate the forward transformed tool and appliance community linked transportation unit auction price 3230 of an alternative route 3230 such that a user may select either route 3295 or 3230 based on the disclosed method and system price 3230 or 3220 which was generated by instructions from a plurality of users between two tool and appliance community linked virtual hubs on the user defined tool and appliance community linked route 3210 and instructions to generate a price-time priority queue for buyers and sellers of tool and appliance community linked transportation units long given routes. In some embodiments, the user(s) 110 may alter the date 3296 such that the transformed tool and appliance community linked transportation unit or security may be updated with user 110 submitted prices 3235 for forward looking time periods. The disclosed forward market transformed tool and appliance community linked transportation unit or security price-time priority queue auction may be communicated on an on demand basis representing the current time and day or on a forward basis by changing the Date/Time 3296 user interface button feature to represent the then current market pricing for future time intervals on a plurality of given routes 3295 and 3230 along the user requested virtual hub combination 3210. Tool and appliance community linked virtual hubs may represent the end points of a route defined by the user 3210 or virtual hubs may represent points along a given route but not including the endpoints or tool and appliance community linked virtual hubs may represent points not along the route the user defined 3210. Tool and appliance community linked virtual hub combinations transform transportation capacity units or securities into a forward market which allow users of the method and system to transact in the physical market by either delivering transformed tool and appliance community linked transportation units as a driver of a vehicle or capacity holder or by receiving them as a passenger or package if the unit is a package rather than a person. A transformed tool and appliance community linked transportation unit represents space which may be filled by a person or a package. Further the forward transformed tool and appliance community linked transportation unit market auction 3215 overlay may be a layer on traditional GPS map routing software as an alternative to time based routing. The forward tool and appliance community linked transportation unit market specification such as "Basic" 3235, 3240 or "Intermediate" 3245, 3250 or "Premium" 3255, 3260 may also have a plurality of other characteristics or levels which form the basis of a fungible contract or substitutable contract between users which is exchangeable with the same terms and conditions if one user is unable to fulfil their contract obligations for the transformed tool and appliance community linked transportation unit. In some embodiments, the navigation mode 3291 may move the user to turn by turn directions along the price based navigation tool and appliance community linked route 3295. In some embodiments, the game mode 3292 may move the user to a game based overlay on the price based navigation tool and appliance community linked route 3295. In some embodiments, the market mode 3293 may move the user to a market based overlay on the priced based navigation tool and appliance community linked route 3295.

The disclosed method and system of a transformed tool and appliance community linked transportation capacity unit may be fully functional as a layer in map routing software 3200 or as a stand alone application 200, 300, etc.

In some embodiments, the disclosed method and system transformed tool and appliance community linked transportation unit or security price-time priority auction price 3220 and 3230 has two prices or more in other embodiments. Two route prices 3220 are disclosed at $3 and $3.10. The former price of $3 is the price where a user is willing to buy or pay for a tool and appliance community linked transportation unit along the given route 3295. The later price of $3.10 is the price at which a user is willing to sell a tool and appliance community linked transportation unit along the given route 3295. The instructions of the price-time priority auction may match the highest bidding price of $3 with the lowest selling price in the price queue when the prices match. In other words, in the exemplary embodiment, if a user wanted to sell a tool and appliance community linked transportation unit at the current forward market price-time auction queue 3220 on route 3295, the user would enter a price of $3 which is the current highest bidding price in the method and system queue 3220. By way of further example, another user may desire to buy a transformed tool and appliance community linked transportation unit on the forward transformed transportation unit or security auction method and system on route 3295, to match, the user would enter a price of $3.10 which is the lowest selling price of a seller on the forward market transformed tool and appliance community linked transportation unit price-time priority auction method and system.

Figure 33:
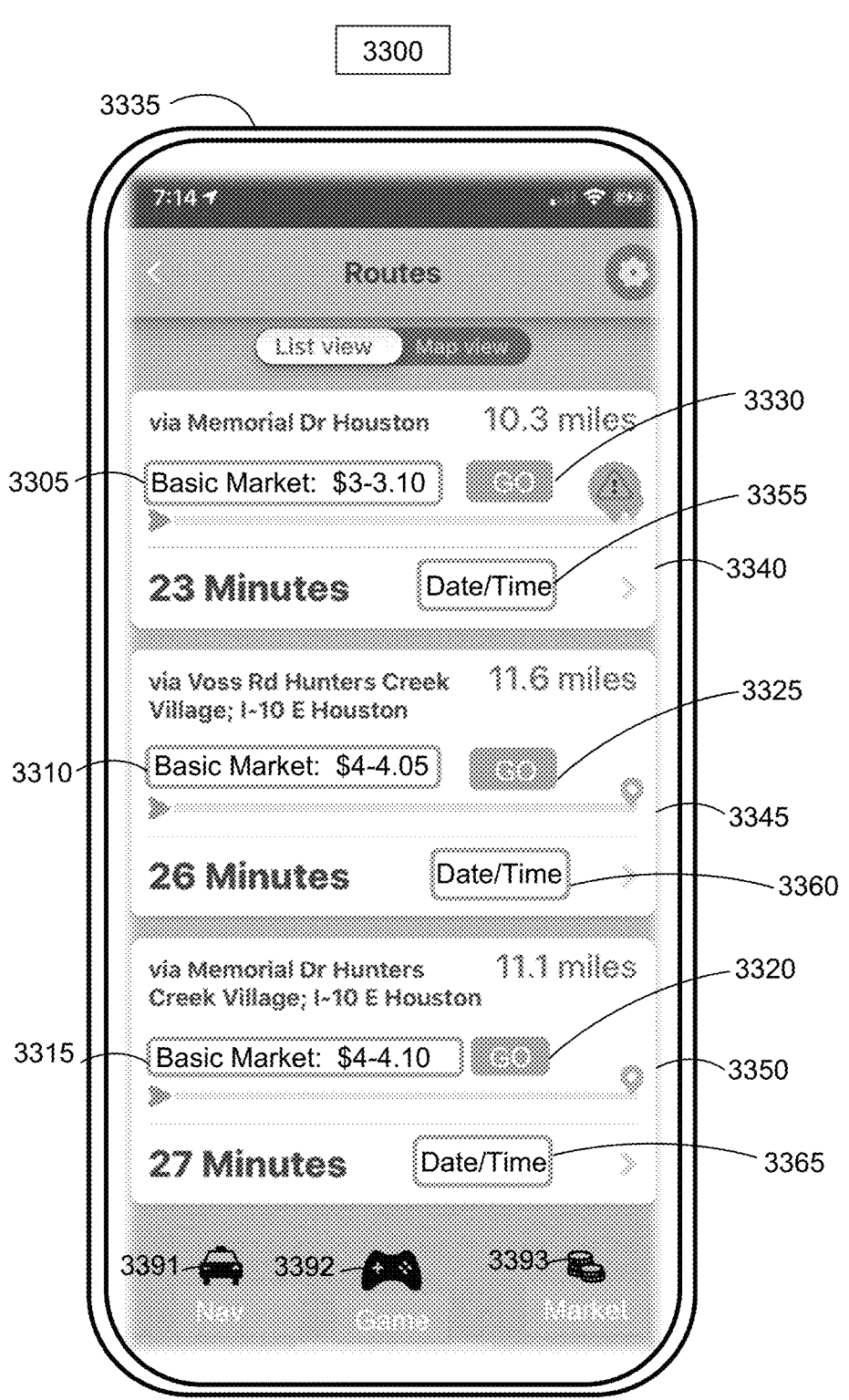
FIG. 33 illustrates an exemplary method and system configuration of the integration interface with GPS map tool and appliance community linked routing with associated price-time priority queues such as Waze Maps or other third party map routing software applications.

FIG. 33 illustrates another exemplary network configuration 3300 integrating the disclosed method and system as a layer on another traditional third party map software. In some embodiments, the multi layered network node topology of participating, transacting and/or trading tool and appliance community linked transportation or freight capacity configuration 3300 includes the following accounting elements, or a subset or superset thereof:

exemplary computing device 3335;

exemplary tool and appliance community linked route node structure 3340 to satisfy user route requests with associated time and price;

exemplary alternative tool and appliance community linked route node structure 3345 to satisfy user route request with associated time and price;

exemplary alternative route node structure 3350 to satisfy user route request with associated time and price;

exemplary live price-time priority auction queue price value 3305 for price based tool and appliance community linked route 3340;

exemplary navigation mode button 3391;

exemplary game mode button 3392;

exemplary market mode button 3393;

exemplary go 3330 button to transact or modify the price based tool and appliance community linked routing;

exemplary go 3325 button to transact or modify the price based tool and appliance community linked routing;

exemplary go 3320 button to transact or modify the price based tool and appliance community linked routing;

exemplary alternative live price-time priority auction price value 3310 for tool and appliance community linked route 3345;

exemplary alternative live price-time priority auction price value 3315 for tool and appliance community linked route 3350;

exemplary date and time modification button 3355 for disclosed tool and appliance community linked route 3340;

exemplary date and time modification button 3360 for disclosed tool and appliance community linked route 3345;

exemplary date and time modification button 3365 for disclosed tool and appliance community linked route 3350;

In some embodiments, map routing interfaces 3335 such as Waze Maps or another third party, may integrate the disclosed method and system to display the transformed forward transportation unit market price-time priority auction price along a various route given various virtual hub topologies 1800 over the user 110 defined route requests. The computing device 3335 may disclose over visual, audio or other communication methods the forward transformed tool and appliance community linked transportation unit or security auction price 3305 on a given route 3340. In yet other embodiments, the disclosed transportation unit tool and appliance community linked transformation may communicate the forward transformed transportation unit auction price 3310 of an alternative route 3345 such that a user may select either route 3340 or 3345 or 3350 based on the disclosed method and system price 3305 or 3310 or 3315 which was generated by instructions from a plurality of users between two tool and appliance community linked virtual hubs on the user defined route and instructions to generate a price-time queue for buyers and sellers of tool and appliance community linked transportation units along given routes. The disclosed forward market transformed tool and appliance community linked transportation unit or security auction may be communicated on an on demand basis representing the current time and day or on a forward basis by changing the Date/Time 3340, 3360, 3365 user interface button feature to represent the then current market pricing for future time intervals on a plurality of given routes 3340 or 3345 or 3350 along the user requested virtual hub combination. In some embodiments, the user(s) 110 may alter the date 3355 such that the transformed tool and appliance community linked transportation unit or security may be updated with user 110 submitted prices 3305 for forward looking time periods. Tool and appliance community linked virtual hubs may represent the end points of a route defined by the user or virtual hubs may represent points along a given route but not including the endpoints or tool and appliance community linked virtual hubs may represent points not along the route the user defined. Virtual hub combinations transform tool and appliance community linked transportation capacity units into a forward market which allow users of the method and system to transact in the physical market by either delivering tool and appliance community linked transportation units as a driver of a vehicle or capacity holder or by receiving them as a passenger or package if the unit is a package rather than a person. A tool and appliance community linked transportation unit represents space which may be filled by a tool or appliance or a package. Further the forward transportation unit market price-time priority auction 3305 overlay may be a layer on traditional GPS map routing software or as an alternative to time based routing. The forward tool and appliance community linked transportation unit market specification such as "Basic" 3305 may also have a plurality of other transformed characteristics or levels which form the basis of a fungible contract or substitutable contract specifications between users which is exchangeable with the same terms and conditions if one user is unable to fulfil their contract obligations for the transformed tool and appliance community linked transportation unit or security. In some embodiments, the navigation mode 3391 may move the user to turn by turn directions along the price based navigation tool and appliance community linked route 3350. In some embodiments, the game mode 3392 may move the user to a game based overlay on the price based navigation tool and appliance community linked route 3340. In some embodiments, the market mode 3393 may move the user to a market based overlay on the priced based navigation tool and appliance community linked route 3350.

The disclosed method and system of a transformed tool and appliance community linked transportation capacity unit may be fully functional as a layer in map routing software 3300 or as a stand alone application 200, 300, etc.

In some embodiments, the disclosed method and system transportation unit price-time priority auction price 3305 and 3310 and 3315 has two prices or more in other embodiments. Two route prices 3305 are disclosed at $3 and $3.10. The former price of $3 is the price where a user is willing to buy or pay for a tool and appliance community linked transportation unit along the given route 3340. The later price of $3.10 is the price at which a user is willing to sell a tool and appliance community linked transportation unit along the given route 3340. The instructions of the price-time priority auction may match the highest bidding price of $3 with the lowest selling price in the price queue when the prices match. In other words, in the exemplary embodiment, if a user wanted to sell a transportation unit at the current forward market auction queue 3305 on route 3340, the user would enter a price of $3 which is the current highest bidding price in the method and system queue 3305. By way of further example, another user may desire to buy a tool and appliance community linked transportation unit on the forward tool and appliance community linked transportation unit auction method and system on route 3340, to match, the user would enter a price of $3.10 which is the lowest selling price of a seller on the forward market tool and appliance community linked transportation unit price-time priority auction method and system.

Figure 34:
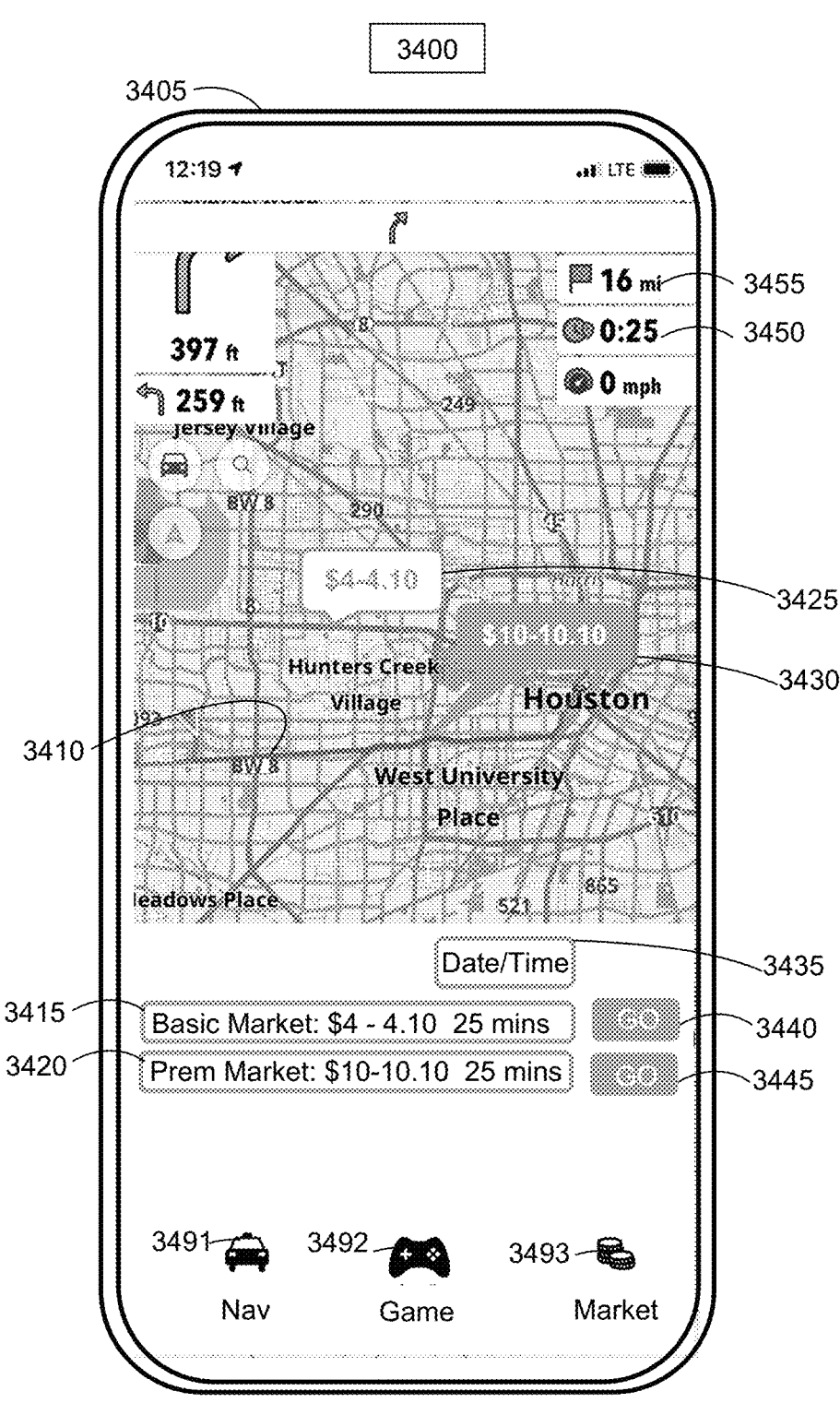
FIG. 34 illustrates an exemplary method and system configuration of the integration interface with GPS map tool and appliance community linked routing with associated price-time priority queues such as Open Street Maps or other third party map routing software applications.

FIG. 34 illustrates another exemplary network configuration 3400 integrating the disclosed method and system as a layer on another traditional third party map software. In some embodiments, the multi layered network node topology of participating, transacting and/or trading transformed tool and appliance community linked transportation or freight capacity unit or security configuration 3400 includes the following accounting elements, or a subset or superset thereof:

exemplary computing device 3405;

exemplary route 3410;

exemplary live price-time priority auction price value 3430 for tool and appliance community linked route 3410;

exemplary alternative live price-time priority auction price value 3425 for tool and appliance community linked route 3425;

exemplary navigation mode button 3491;

exemplary game mode button 3492;

exemplary market mode button 3493;

exemplary date and time modification button 3435 for disclosed tool and appliance community linked route 3410;

exemplary mileage estimate 3455 for disclosed route 3410;

exemplary route estimate 3450 for disclosed route 3410;

exemplary transformed forward transportation unit auction value and modification feed 3415 and selection GO 3440 button to transact the given route with a basic transportation unit or security feature and characteristic for one route 3425 that satisfies the user route request;

exemplary transformed forward tool and appliance community linked transportation unit or security auction value and modification feed 3420 and selection GO 3445 button to transact the given route with a premium tool and appliance community linked transportation unit feature and characteristic for one route 3410 that satisfies the user route request;

In some embodiments, the navigation mode 3491 may move the user to turn by turn directions along the price based navigation tool and appliance community linked route 3410. In some embodiments, the game mode 3492 may move the user to a game based overlay on the price based navigation route 3410. In some embodiments, the market mode 3493 may move the user to a market based overlay on the priced based navigation route 3410.

Figure 35:
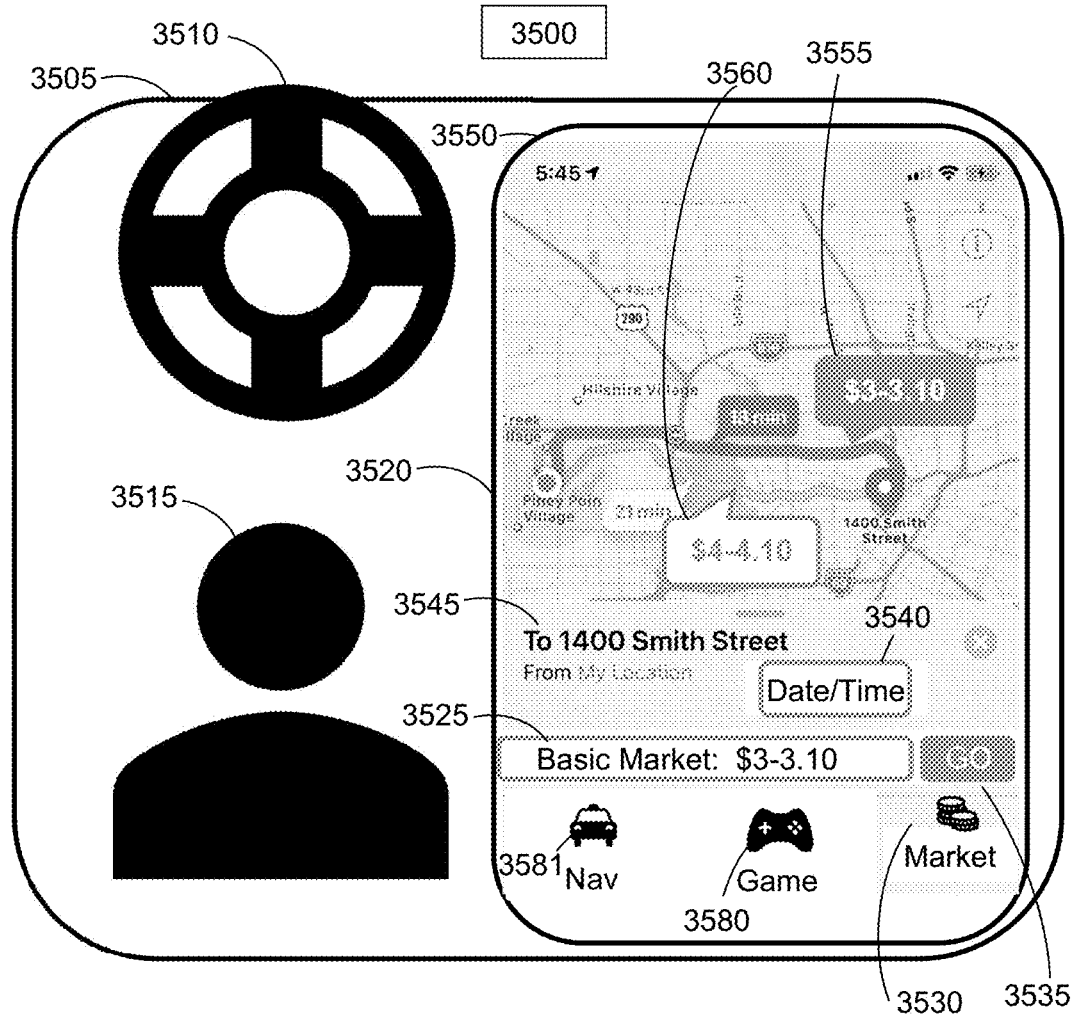
FIG. 35 illustrates an exemplary method and system configuration of the integration interface with GPS map routing in a vehicle such as Tesla, VW, Audi, Daimler, GM, Ford, Honda, Fiat, Nissan, Hyundai, Renault, Suzuki, BMW, Mazda, Dongfeng, Great Wall, Geely, BAIC, Tata, Toyota or any other third party map tool and appliance community linked routing software with associated price-time priority queue applications inside a vehicle.

FIG. 35 illustrates another exemplary network configuration 3500 integrating the disclosed method and system as a layer on another traditional third party map software in the setting of a vehicle GPS navigation system. In some embodiments, the multi layered network node topology of participating, transacting and/or trading tool and appliance community linked transportation or freight capacity configuration 3500 includes the following accounting elements, or a subset or superset thereof:

exemplary computing device 3550;

exemplary vehicle tool and appliance community linked transportation unit carrier unit 3505;

exemplary vehicle tool and appliance community linked transportation unit steering wheel 3510;

exemplary navigation mode button 3581;

exemplary game mode button 3580;

exemplary market mode button 3530;

exemplary user of tool and appliance community linked transportation unit as seller or driver 3515;

exemplary user route request address information 3545;

exemplary date and time modification button 3540 for disclosed route 3545;

exemplary transformed forward tool and appliance community linked transportation unit auction value and modification feed 3525 and selection GO 3535 button to transact the given route with a basic transportation unit feature and characteristic for one route 3545 that satisfies the user route request;

exemplary live price-time priority auction price value 3555 for price based tool and appliance community linked route 3555;

exemplary live price-time priority auction price value 3560 for price based alternative tool and appliance community linked route 3560;

exemplary market layer routing overlay 3530;

In some embodiments, the disclosed method and system transformed tool and appliance community linked transportation unit or security auction market layer may be in a vehicle unit GPS navigation system 3550. In some embodiments, the user 3515 may input driving address instructions 3545 that have an origin location and a destination location. In some embodiments, the user 3515 may communicate with the computing device 3550 through a touchscreen 3520 or and audio interface or another interface. In some embodiments the user 3515 may edit the date/time 3540 button to communicate the market price-time priority auction price based tool and appliance community linked route 3555 from on demand or current time to a forward time or date. Market price-time priority auction based pricing 3555 may vary by date and time due to a plurality of market factors. In some embodiments the user 3515 may edit the market based auction price for the tool and appliance community linked transportation units by selecting the market feature button 3525. In some embodiments the user 3515 may select a give tool and appliance community linked transportation unit auction price to transact by selecting the go button 3535. In some embodiments, the navigation mode 3581 may move the user to turn by turn directions along the price based navigation tool and appliance community linked route 3555. In some embodiments, the game mode 3580 may move the user to a game based overlay on the price based navigation route 3555. In some embodiments, the market mode 3530 may move the user to a market based overlay on the priced based navigation tool and appliance community linked route 3555.

In some embodiments, the disclosed method and system tool and appliance community linked transportation unit auction price 3555 and 3560 has two prices or more in other embodiments. Two route prices 3555 are disclosed at $3 and $3.10. The former price of $3 is the price where a user is willing to buy or pay for a transportation unit along the given route 3545. The later price of $3.10 is the price at which a user is willing to sell a tool and appliance community linked transportation unit along the given route 3545. The instructions of the auction may match the highest bidding price of $3 with the lowest selling price in the price queue when the prices match. In other words, in the exemplary embodiment, if a user 3515 wanted to sell a tool and appliance community linked transportation unit at the current forward market auction queue 3555 on route 3545, the user 3515 would enter a price of $3 which is the current highest bidding price in the method and system queue 3555. By way of further example, another user may desire to buy a tool and appliance community linked transportation unit on the forward transformed tool and appliance community linked transportation unit or security auction method and system on route 3545, to match, the user would enter a price of $3.10 which is the lowest selling price of a seller on the forward market transformed tool and appliance community linked transportation unit or security auction method and system. In some embodiments, alternative tool and appliance community linked routes based on prices in alternative tool and appliance community linked transportation unit price-time priority auctions 3560 may have different prices based on supply and demand conditions. In some embodiments the market based routing layer 3530 serves as an alternative to time based routing or mileage based routing which are fundamentally different premises. In some embodiments, the overall software system 3505 and associated instructions may ask the user 3515 with visual or audio interface if the user 3515 would like to monetize their routes upon starting any navigation sequence for transformed tool and appliance community linked transportation units or securities.

Figure 36:
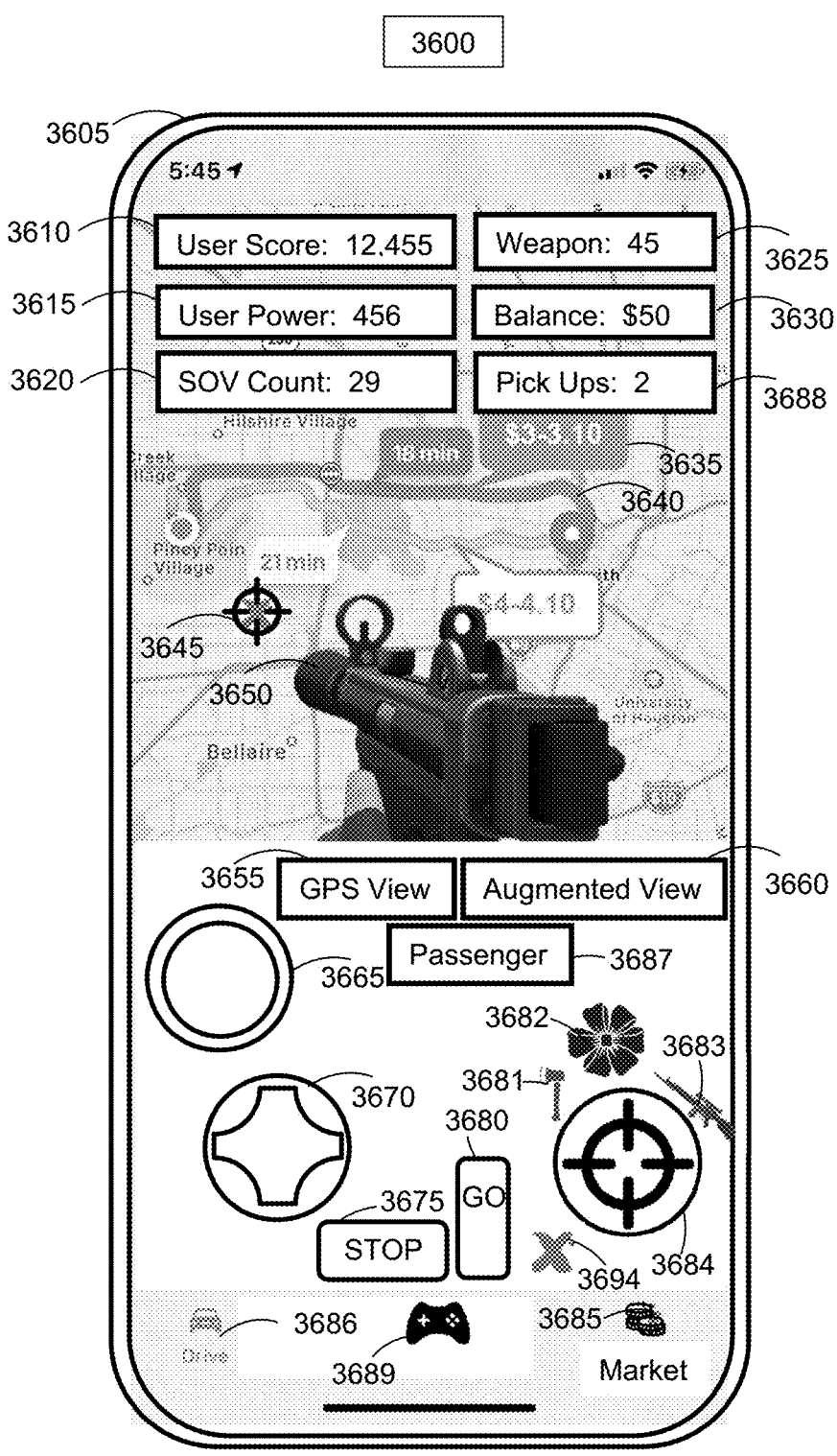
FIG. 36 illustrates an exemplary user interface and database configuration which allow the user to play a strategy based game overlay on the priced based navigation tool and appliance community linked route with associated price-time priority queues.

FIG. 36 illustrates another exemplary network configuration 3600 integrating the disclosed method and system as a game layer on another internal mapping system or traditional third party map system in the setting of a mobile computing device. In some embodiments, the multi layered network node topology of participating, transacting and/or trading transformed tool and appliance community linked transportation or freight capacity unites or securities for price based navigation configuration 3600 includes the following accounting elements, or a subset or superset thereof:

exemplary computing device 3605;

exemplary game overlay user score 3610;

exemplary game overlay user power 3615;

exemplary game overlay SOV (single occupancy vehicle) count 3620;

exemplary game overlay weapon strength 3625;

exemplary game overlay account balance 3630;

exemplary game overlay passenger pick ups 3688;

exemplary game overlay Single Occupancy Vehicle target 3645;

exemplary game overlay Single Occupancy Vehicle weapon 3650;

exemplary game overlay GPS standard map view 3655;

exemplary game overlay augmented or mixed reality view 3660;

exemplary game overlay passenger mode 3687;

exemplary game overlay fire button 3665;

exemplary game overlay multi-purpose direction button 3670;

exemplary game overlay go button 3680;

exemplary game overlay stop button 3675;

exemplary navigation overlay button 3686;

exemplary game overlay button 3689;

exemplary market overlay button 3685;

exemplary market overlay weapon selection button 3683, 3682, 3681, 3694;

exemplary market overlay aim finder toggle 3684.

In some embodiments, the game overlay 3689 awards score and points for destroying the single occupancy vehicle 3620, compute and distribute positive or negative tool and appliance community linked transportation unit game auction strategy points 3610 or power 3615 or rewards 3630 based on any superset combination or subset combination of price 3635, route mileage 3640, number of single occupancy vehicles destroyed or passed 3620, number of passengers 3688, route time estimates 3640, tool and appliance community linked transportation unit route 3640, tool and appliance community linked transportation unit specifications 3415, tool and appliance community linked transportation unit model type 4000 based on model type and age 4000, tool and appliance community linked transportation unit make type 4000, transportation unit age 4000, matched transportation unit specification 800 and 620, matched transportation unit fuel type 4000, matched tool and appliance community linked transportation unit emission specification 4000, cumulative user tool and appliance community linked transportation unit specifications 4100, transportation unit rating 4100, transportation unit safety 4100, transportation unit time 4100, transportation unit delay, transportation unit driver rating 4100, tool and appliance community linked transportation unit rider rating 4100, tool and appliance community linked transportation unit timeliness relative to contract specification 4100.

In some embodiments, the game overlay 3689 may use a plurality of weapon or scoring configurations such as a rifle 3683, an axe 3681, a flower gift 3682, a X logo 3694 to take away points or gain points from other users on the system. In some embodiments the scoring may be independent of other players on the system, but dependent on the users actions in the game overlay 3689. In some embodiments a selected weapon 3650 may be used to destroy single occupancy vehicles. In some embodiments the user may accelerate with the go button 3680 to avoid an attack or fire. In some embodiments the user may slow down or stop with the stop button 3675 to avoid enemy fire or attack. In some embodiments, the stop button 3675 may interface with an autonomous driving system of a vehicle to pick up passengers along a price based navigation tool and appliance community linked route to increase the score of the player 3610 and increase the balances 3630 by earning money on the system. In some embodiments user(s) may be identified by the X logo 3694 or by a person logo who is a bidder on the priced based navigation tool and appliance community linked route 3640 to increase score and balances 3630. In some embodiments user(s) may scan navigation view 3655 or augmented reality view 3660 to look for single occupancy vehicle targets or X logo(s) 3694 or 3645 for users who are bidding on the price based navigation tool and appliance community linked route 3640.

In some embodiments, the strategy of the priced based navigation game overlay is to pick up as many passengers or bidders as possible along the price based navigation route 3640, destroy as many single occupancy vehicles along the price based navigation route 3640 and to give flowers 3682 and rewards to transportation unit providers who have more than one person in the vehicle along the price based navigation route 3640. In some embodiments user(s) may work independently or collectively in tribes to maximize user score in strategy.

Figure 37:
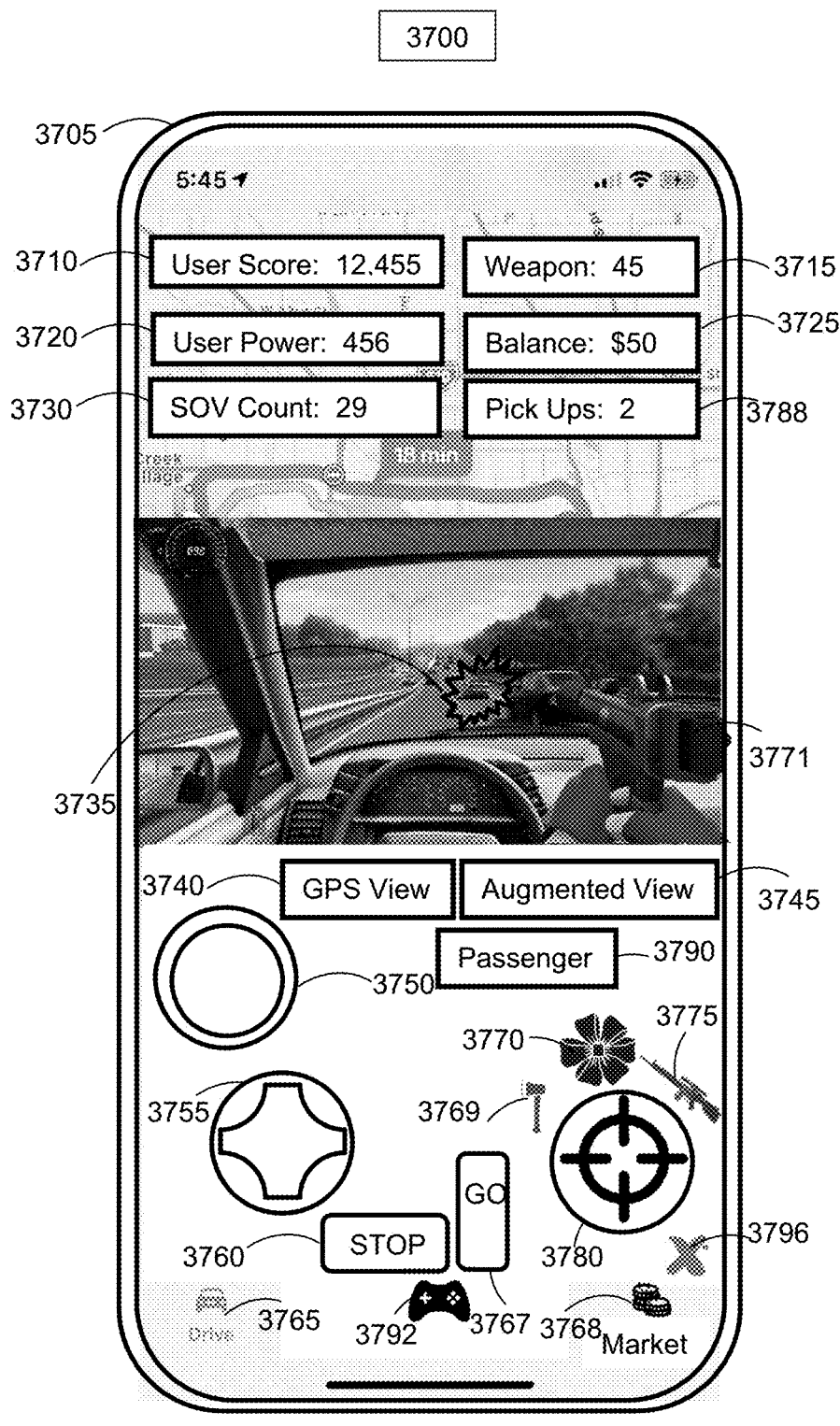
FIG. 37 illustrates an exemplary user interface and database configuration which allow the user to play a strategy based game overlay on the priced based navigation tool and appliance community linked route with associated price-time priority queues with augmented reality.

FIG. 37 illustrates another exemplary network configuration 3700 integrating the disclosed method and system as a game layer on another internal mapping navigation system or traditional third party navigation map system in the setting of a mobile computing device. In some embodiments, the multi layered network node topology of participating, transacting and/or trading tool and appliance community linked transportation or freight capacity for price based navigation tool and appliance community linked configuration 3700 includes the following accounting elements, or a subset or superset thereof:

exemplary computing device 3705;

exemplary game overlay user score 3710;

exemplary game overlay user power 3720;

exemplary game overlay SOV (single occupancy vehicle) count 3730;

exemplary game overlay weapon strength 3715;

exemplary game overlay account balance 3725;

exemplary game overlay passenger pick ups 3788;

exemplary game overlay Single Occupancy Vehicle target 3735;

exemplary game overlay Single Occupancy Vehicle weapon 3771;

exemplary game overlay GPS standard map view 3740;

exemplary game overlay augmented or mixed reality view 3745;

exemplary game overlay passenger mode 3790;

exemplary game overlay fire button 3750;

exemplary game overlay multi-purpose direction button 3755;

exemplary game overlay go button 3767;

exemplary game overlay stop button 3760;

exemplary navigation overlay button 3765;

exemplary game overlay button 3792;

exemplary market overlay button 3768;

exemplary market overlay weapon selection button 3775, 3770, 3769, 3796;

exemplary market overlay aim finder toggle 3780.

In some embodiments, the game overlay view 3768 of the price based navigation system 3705 may alert the user to a single occupancy vehicle 3735 which would then be a target for the user to use a weapon 3771, 3775, 3769 to destroy the single occupancy vehicle to increase user score 3710. In some embodiments, the user may identify a vehicle as having more than one passenger in the vehicle and therefore award or gift flowers 3770 to the vehicle or tool and appliance community linked transportation user in the price based navigation tool and appliance community linked game strategy. In some embodiments, the user may use a weapon 3771 against a single occupancy vehicle 3735 at which point the vehicle would explode and the passenger would be left without a vehicle in the augmented reality view 3745 or GPS view 3740. In some embodiments, the user may award flowers 3770 to a vehicle with more than one passenger to increase their score 3710 and the score of the user that has more than one passenger in their vehicle.

Figure 38:
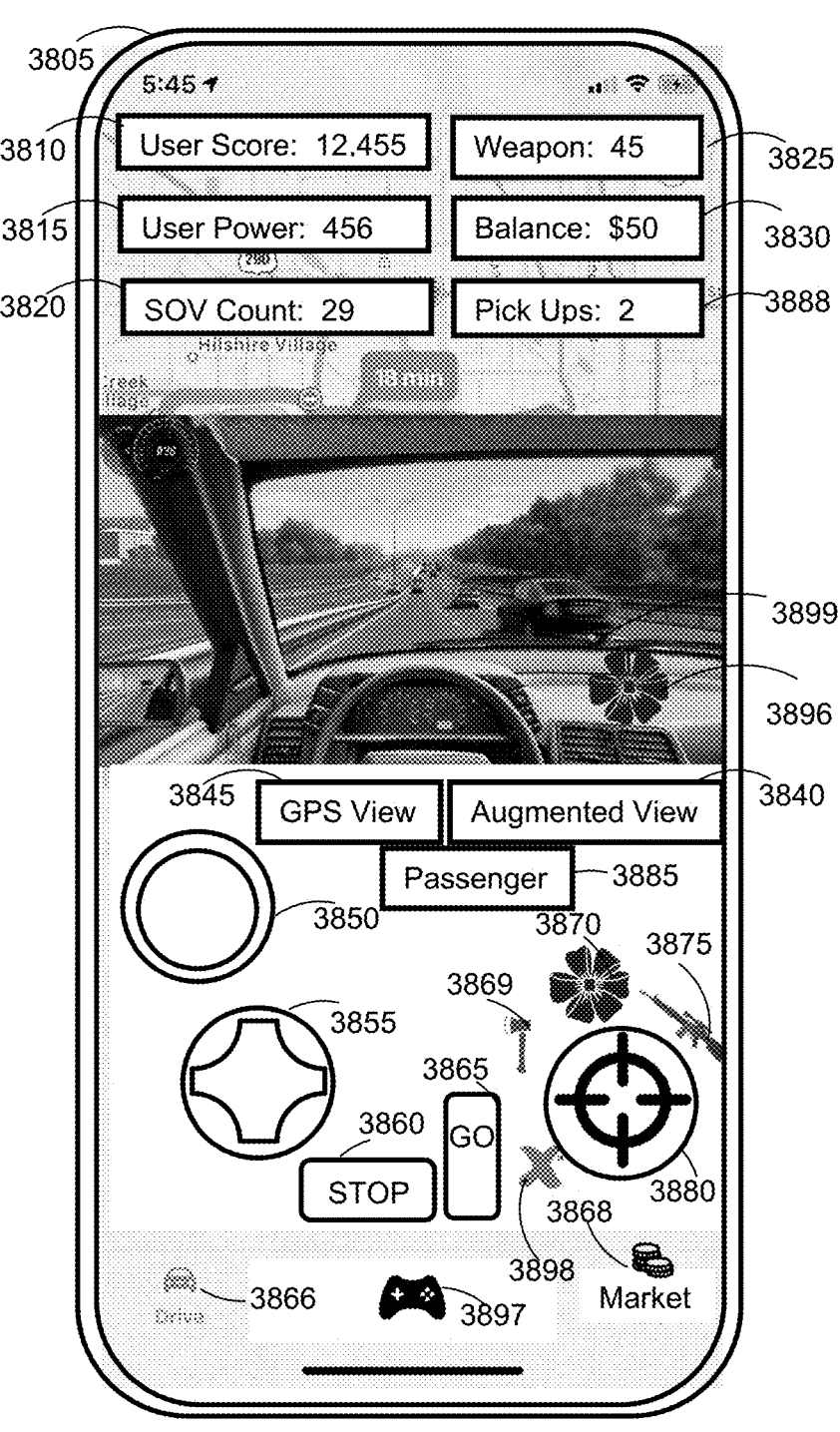
FIG. 38 illustrates an exemplary user interface and database configuration which allow the user to play a strategy based game overlay on the priced based navigation tool and appliance community linked route with associated price-time priority queues with augmented reality.

FIG. 38 illustrates another exemplary network configuration 3800 integrating the disclosed method and system as a game layer on another internal mapping navigation system or traditional third party navigation map system in the setting of a mobile computing device. In some embodiments, the multi layered network node topology of participating, transacting and/or trading tool and appliance community linked transportation or freight capacity for price based navigation configuration 3800 includes the following accounting elements, or a subset or superset thereof:

exemplary computing device 3805;
exemplary game overlay user score 3810;
exemplary game overlay user power 3815;
exemplary game overlay SOV (single occupancy vehicle) count 3820;
exemplary game overlay weapon strength 3825;
exemplary game overlay account balance 3830;
exemplary game overlay passenger pick ups 3888;
exemplary game overlay flower gift 3896;
exemplary game overlay GPS standard map view 3845;
exemplary game overlay augmented or mixed reality view 3840;
exemplary game overlay passenger mode 3885;
exemplary game overlay fire button 3850;
exemplary game overlay multi-purpose direction button 3855;
exemplary game overlay go button 3865;
exemplary game overlay stop button 3860;
exemplary navigation overlay button 3866;
exemplary game overlay button 3897;
exemplary market overlay button 3868;
exemplary market overlay weapon selection button 3869, 3870, 3875, 3898;
exemplary market overlay aim finder toggle 3880.

In some embodiments, the game overlay view 3897 of the price based navigation tool and appliance community linked system 3805 may alert the user to a vehicle with more than one passenger 3899 which would then be a way for the user to gift a flower to the other user 3899.

Figure 39:
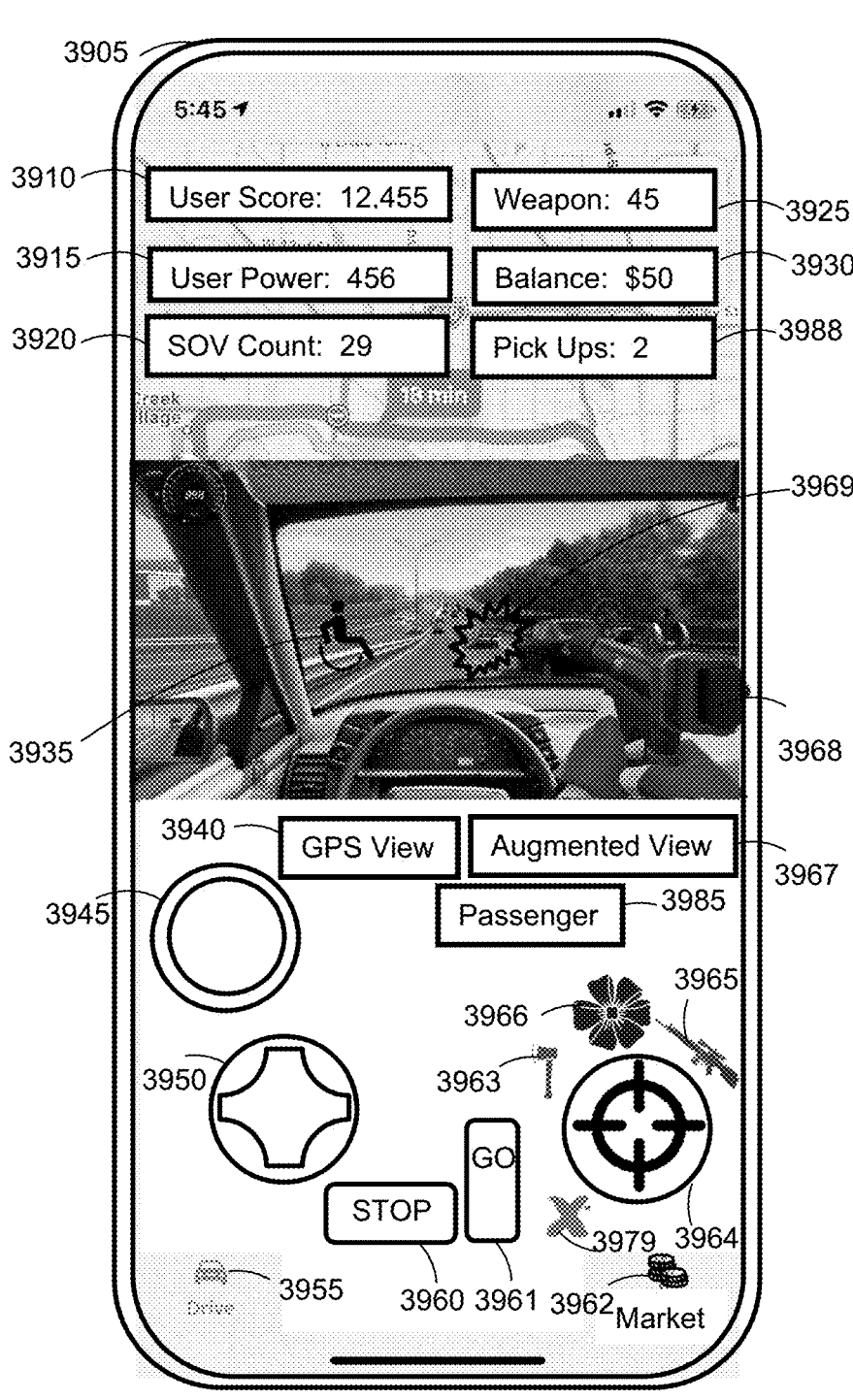
FIG. 39 illustrates an exemplary user interface and database configuration which allow the user to play a strategy based game overlay on the priced based navigation tool and appliance community linked route with associated price-time priority queues with augmented reality.

FIG. 39 illustrates another exemplary network configuration 3900 integrating the disclosed method and system as a game layer on another internal mapping navigation system or traditional third party navigation map system in the setting of a mobile computing device. In some embodiments, the multi layered network node topology of participating, transacting and/or trading tool and appliance community linked transportation or freight capacity for price based navigation configuration 3900 includes the following accounting elements, or a subset or superset thereof:

exemplary computing device 3905;
exemplary game overlay user score 3910;
exemplary game overlay user power 3915;
exemplary game overlay SOV (single occupancy vehicle) count 3920;

exemplary game overlay weapon strength 3925;
exemplary game overlay account balance 3930;
exemplary game overlay passenger pick ups 3988;
exemplary game overlay weapon 3968;
exemplary game overlay GPS standard map view 3940;
exemplary game overlay augmented or mixed reality view 3967;
exemplary game overlay passenger mode 3985;
exemplary game overlay fire button 3945;
exemplary game overlay multi-purpose direction button 3950;
exemplary game overlay go button 3961;
exemplary game overlay stop button 3960;
exemplary navigation overlay button 3955;
exemplary market overlay button 3962;
exemplary market overlay weapon selection button 3963, 3966, 3965, 3979;
exemplary market overlay aim finder toggle 3964;
exemplary user in augmented reality view who has had their single occupancy vehicle destroyed 3935.

In some embodiments, the game overlay view 3905 of the price based navigation tool and appliance community linked system 3905 may show a user who has had their single occupancy vehicle destroyed 3935 which increases the score of the user 3910. In some embodiments, the user may target additional single occupancy vehicles 3969 to destroy along the priced based navigation route.

Figure 40:
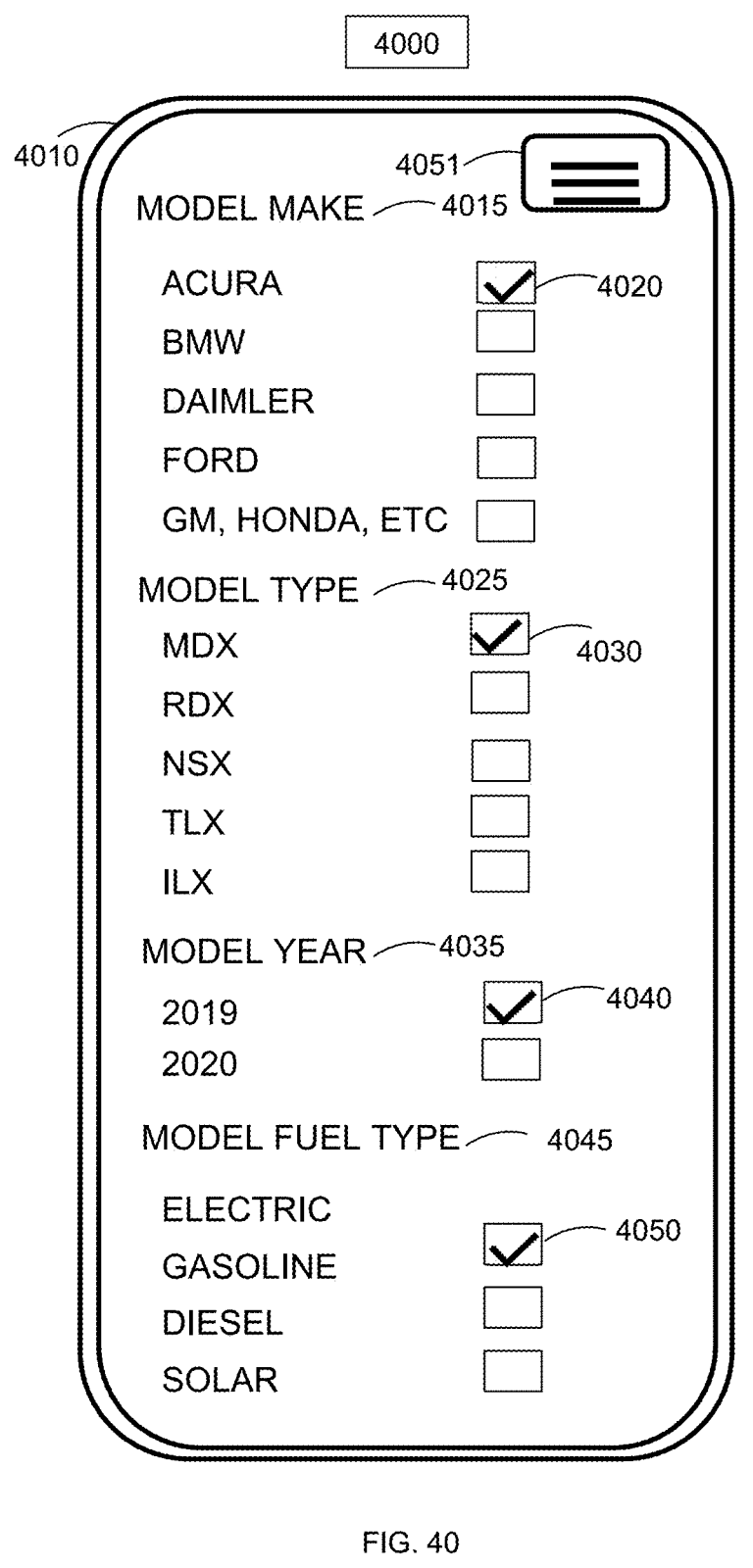

FIG. 40 illustrates another exemplary network configuration 4000 module of the disclosed method and system which records the vehicle specifications for a given user on the system 4010 in the setting of a mobile computing device. In some embodiments, the multi layered network node topology of participating, transacting and/or trading transformed tool and appliance community linked transportation or freight capacity units or securities for price based navigation configuration 4000 includes the following elements, or a subset or superset thereof:

exemplary computing device 4010;
exemplary transportation unit model make 4015;
exemplary transportation unit model type 4025;
exemplary transportation unit model year 4035;
exemplary system menu toggle box 4051;
exemplary tool and appliance community linked transportation unit model fuel type 4045;
exemplary tool and appliance community linked transportation unit model make selection box toggle 4020;
exemplary tool and appliance community linked transportation unit model type selection box toggle 4030;
exemplary tool and appliance community linked transportation unit model year selection box toggle 4040;
exemplary tool and appliance community linked transportation unit model fuel type selection box toggle 4050;

In some embodiments, the disclosed method and system may allow the user to select the model make such as by example an Acura 4020 as a model make 4015. In some embodiments the user may select an unlimited variety of vehicle types in the method and system not limiting the system to those vehicle make 4015 or model 4025 types in FIG. 40. In some embodiments, the user may configure the system for the tool and appliance community linked transportation unit specification model year 4035 or the model fuel type 4045 or a plurality of other vehicle specifications for the purpose of recording specification for the priced based navigation tool and appliance community linked system 4010. In some embodiments, the data transformation of the transformed tool and appliance community linked transportation unit or security links the attributes or supersets or subsets of the model make 4015, model type 4025, model year 4035, model fuel type 4045, or a plurality of other vehicle features to create specification pools as a feature in the data transformations for the transformed transportation units or securities. In some embodiments, the combinations of similar vehicle model make 4015, model type 4025, model year 4035, model fuel type 4045 and plurality of other vehicle attributes are fungible or substitutable in the method of the transformed tool and appliance community linked transportation unit or security. To avoid confusion, and to provide further example, but not limit by example, bus or subway or train or air or private automobile or other transformed tool and appliance community linked transportation units or securities may be substitutable under broad specifications of the transformed transportation or security pool provided that the broad transformed specifications are met for delivery within the transformed tool and appliance community linked transportation unit or security pool.

Figure 41:
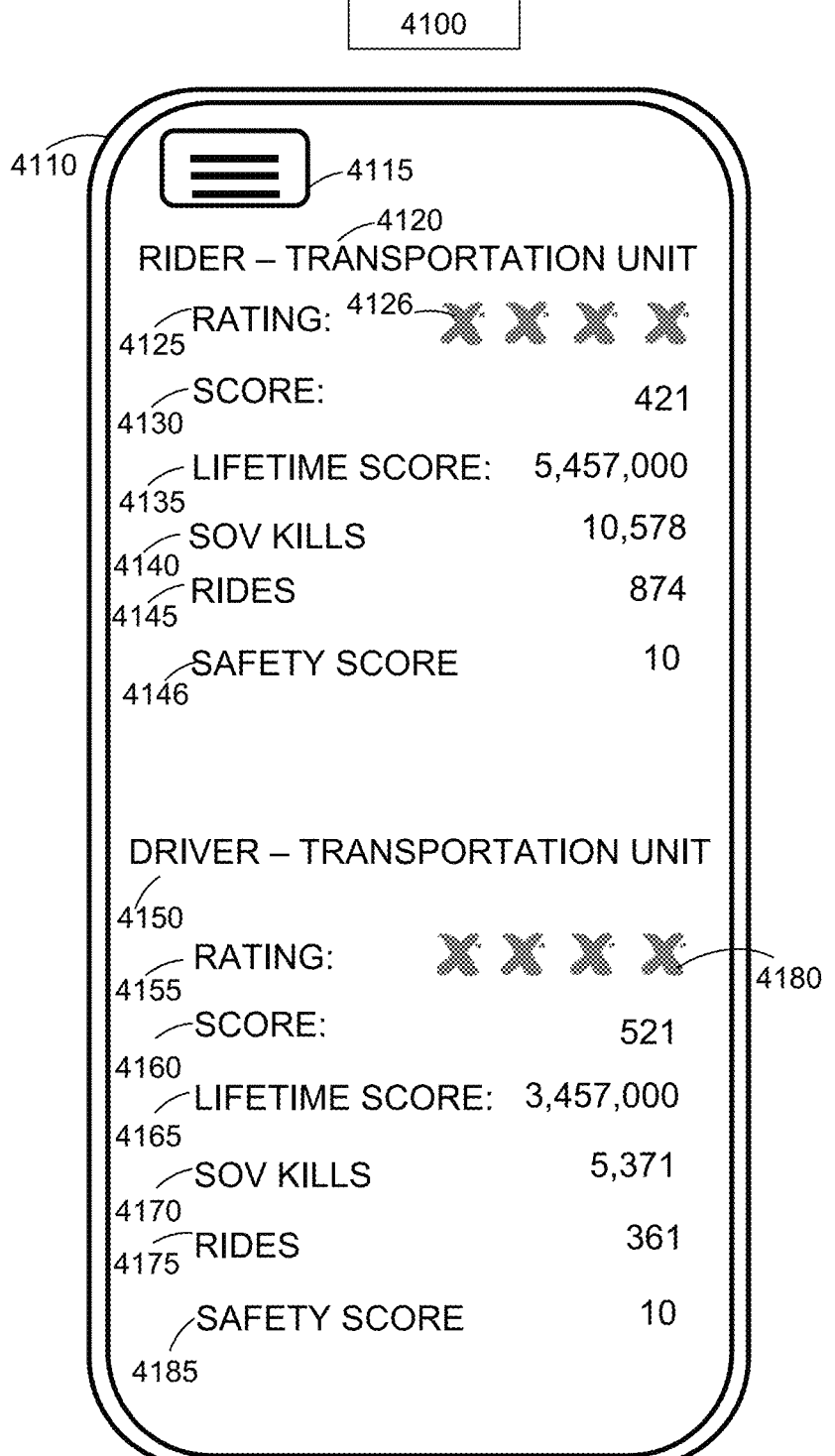
FIG. 41 illustrates an exemplary user interface and database configuration which displays a plurality of metrics for the performance of the user in the game overlay and general system and method of tool and appliance community linked priced based navigation with associated price-time priority queues.

FIG. 41 illustrates another exemplary network configuration 4100 module of the disclosed method and system which records the rider or driver tool and appliance community linked transportation unit specification ratings for a given user on the system 4110 in the setting of a mobile computing device. In some embodiments, the multi layered network node topology of participating, transacting and/or trading tool and appliance community linked transportation or freight capacity for price based navigation configuration 4100 includes the following elements, or a subset or superset thereof:

exemplary menu toggle box 4115;

exemplary rider tool and appliance community linked transportation unit rating category summary 4120;

exemplary rider tool and appliance community linked transportation unit rating summary 4125;

exemplary rider tool and appliance community linked transportation unit rating X logo amount 4126;

exemplary rider tool and appliance community linked transportation unit rating score for navigation route 4130;

exemplary rider tool and appliance community linked transportation unit rating lifetime score 4135;

exemplary rider tool and appliance community linked transportation unit SOV kills 4140;

exemplary rider tool and appliance community linked transportation unit ride count 4145;

exemplary rider tool and appliance community linked transportation unit ride safety score 4146;

exemplary driver tool and appliance community linked transportation unit rating category summary 4150;

exemplary driver tool and appliance community linked transportation unit rating summary 4155;

exemplary driver tool and appliance community linked transportation unit rating X logo amount 4180;

exemplary driver tool and appliance community linked transportation unit rating score for navigation route 4160;

exemplary driver tool and appliance community linked transportation unit rating lifetime score 4165;

exemplary driver tool and appliance community linked transportation unit SOV kills 5,371, exemplary driver tool and appliance community linked transportation unit ride count 4175;

exemplary driver tool and appliance community linked transportation unit ride safety score 4185;

In some embodiments the price based navigation tool and appliance community linked system game overlay layer uses a plurality of the aforementioned combinations to account for user actions in the game overlay of the disclosed method and system.

Figure 42:
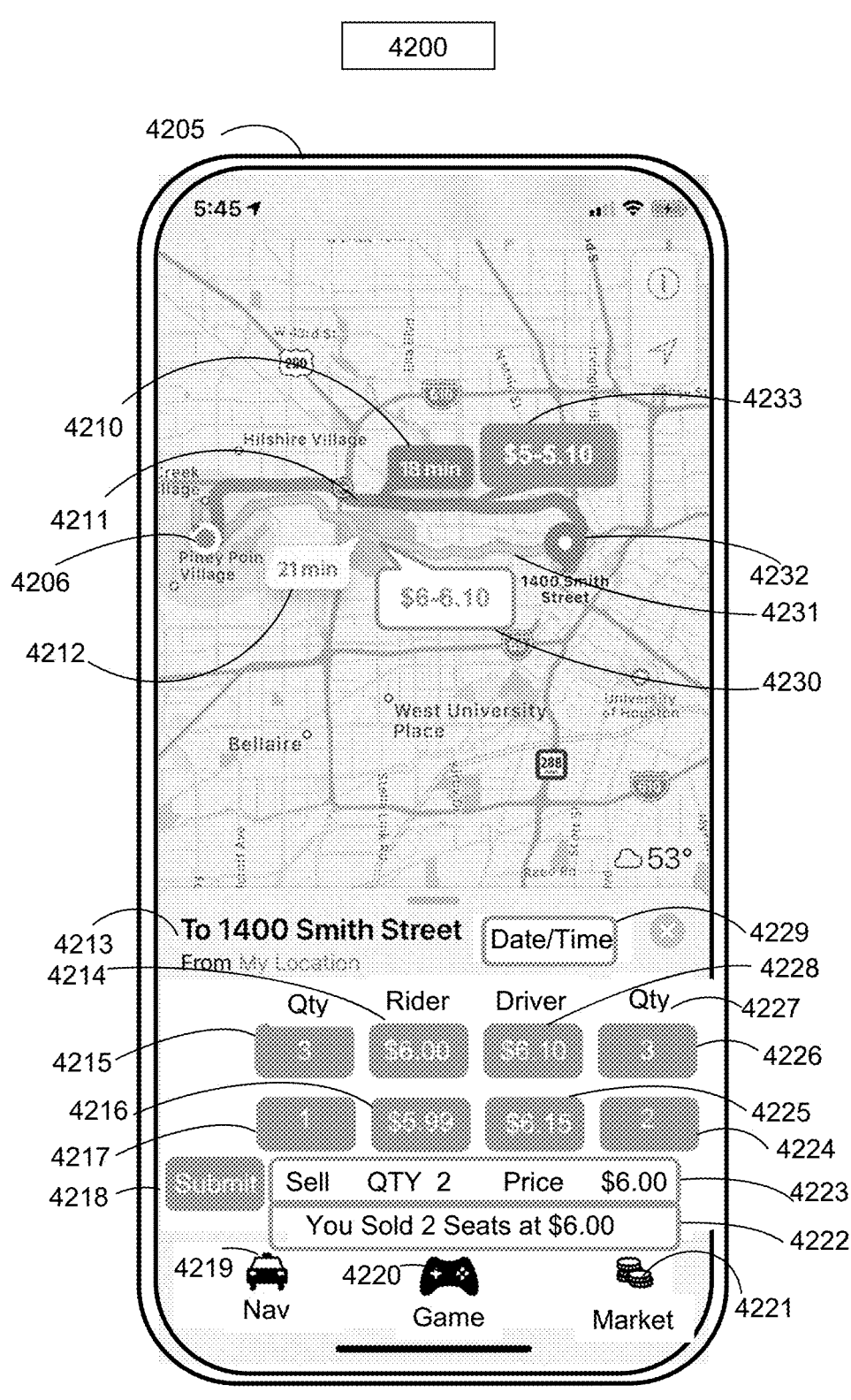
FIG. 42 illustrates an exemplary user interface and database configuration which displays a plurality of tool and appliance community linked routes between two user requested hubs indexed based on the pricing of tool and appliance community linked transportation units or tool and appliance community linked transportation unit securities with associated price-time priority queues and the associated open market transaction interface for those transformed tool and appliance community linked transportation unit securities.

FIG. 42 illustrates another exemplary network configuration 4200 module of the disclosed method and system which records the rider or driver transformed tool and appliance community linked transportation unit or security specification and market framework for the transformation for a specified plurality of routes. In some embodiments, the multi layered network node topology of participating, transacting and/or trading transformed tool and appliance community linked transportation or freight capacity units or securities for price based navigation configuration 4200 includes the following elements, or a subset or superset thereof:

exemplary computing device to display the method or system 4205;

exemplary estimated time of a primary indexed price based navigation route of a transformed tool and appliance community linked transportation unit or security 4120;

exemplary market price of a buyer and seller of primary price based navigation route of a transformed tool and appliance community linked transportation unit or security 4233;

exemplary price based navigation route of a primary transformed tool and appliance community linked transportation unit or security 4211;

exemplary estimated time of a secondary indexed price based navigation tool and appliance community linked route of a transformed tool and appliance community linked transportation unit or security 4231;

exemplary estimated time of a secondary indexed price based navigation tool and appliance community linked route of a transformed tool and appliance community linked transportation unit or security 4212;

exemplary market price of a buyer and seller of secondary price based navigation route of a transformed transportation unit or security 4230;

exemplary starting point virtual hub of an indexed price based navigation tool and appliance community linked route of a transformed tool and appliance community linked transportation unit or security 4206;

exemplary ending point virtual hub of an indexed price based navigation tool and appliance community linked route of a transformed tool and appliance community linked transportation unit or security 4232;

exemplary ending point and starting point address of virtual hub(s) of an indexed price based navigation tool and appliance community linked route of a transformed tool and appliance community linked transportation unit or security 4213;

exemplary date and time specification of an indexed price based navigation tool and appliance community linked route of a transformed tool and appliance community linked transportation unit or security 4213;

exemplary number or quantity of transformed tool and appliance community linked transportation units or securities that are bidding or buying for purchase by riders of a secondary indexed price based navigation route of a transformed tool and appliance community linked transportation unit or security which is first in the rider queue indexed by highest price 4215;

exemplary price of transformed tool and appliance community linked transportation units or securities that are bidding or buying for purchase by riders of a secondary indexed price based navigation route of a transformed tool and appliance community linked transportation unit or security which is first in the rider queue indexed by highest price 4214;

exemplary price of transformed tool and appliance community linked transportation units or securities that are bidding or buying for purchase by riders of a secondary indexed price based navigation route of a transformed tool and appliance community linked transportation unit or security which is second in the rider queue indexed by second highest price 4216;

exemplary number or quantity of transformed tool and appliance community linked transportation units or securities that are bidding or buying for purchase by riders of a secondary indexed price based navigation route of a transformed tool and appliance community linked transportation unit or security which is second in the rider queue indexed by second highest price 4217;

exemplary number or quantity of transformed tool and appliance community linked transportation units or securities that are offering or selling by drivers of a secondary indexed price based navigation route of a transformed tool and appliance community linked transportation unit or security which is first in the driver queue indexed by lowest price 4226;

exemplary price of transformed tool and appliance community linked transportation units or securities that are offering or selling by drivers of a secondary indexed price based navigation route of a transformed tool and appliance community linked transportation unit or security which is first in the driver queue indexed by lowest price 4228;

exemplary number or quantity of transformed tool and appliance community linked transportation units or securities that are offering or selling by drivers of a secondary indexed price based navigation route of a transformed tool and appliance community linked transportation unit or security which is second in the driver queue indexed by second lowest price 4224;

exemplary price of transformed tool and appliance community linked transportation units or securities that are offering or selling by drivers of a secondary indexed price based navigation route of a transformed tool and appliance community linked transportation unit or security which is second in the driver queue indexed by second lowest price 4225;

exemplary order entry submit button to the method and system fora user order 4218;

exemplary order on the method and system by a driver to sell a specified quantity of transformed tool and appliance community linked transportation units or securities 4223;

exemplary order confirmation on the method and system by a driver sold two units of transformed tool and appliance community linked transportation units or securities 4222;

exemplary market view of priced based navigation layer to display indexed prices of a plurality routes which may be one, two, three, or an infinite number of routes between two virtual hubs 4222;

exemplary game view layer of a transformed tool and appliance community linked transportation unit or security 4220;

exemplary navigation view layer of a transformed tool and appliance community linked transportation unit or security 4219;

In some embodiments, the disclosed method and system may allow the user to select the model make such as by example an Acura 4020 as a model make 4015 which is placed in a certain transformed tool and appliance community linked transportation specification pool that may be aggregated with similar transformed transportation unit specification participants or units that then display a user 110 selected navigation route 4211 or plurality of routes 4231 and 4211 or an infinite number of routes between the tool and appliance community linked virtual hub start point 4206 and tool and appliance community linked virtual hub end-point 4232. In some embodiments the prices 4230 on a route 4231 may display the buy price of the highest bidder or rider on a given route 4231 which is listed in more detail in the rider queue display for highest indexed price bid 4214 for a route 4231. In some embodiments, the highest bid price 4214 for a rider on a given route 4231 has an associated quantity 4215 of transformed tool and appliance community linked transportation units or securities. Similarly in some embodiments, the lowest offer or sale price 4228 for a driver on a given route 4231 has an associated quantity 4226 of transformed tool and appliance community linked transportation units or securities. In some embodiments, the rider quantity 4215 listed as three units, may be one rider, two riders, or three riders who desire to purchase a given transformed tool and appliance community linked transportation unit(s) or securities so long as the indexed price is queued to the top based on a highest price index and time stamp for a given specification of a transformed tool and appliance community linked transportation unit or security. In some embodiments, transformed tool and appliance community linked transportation units or securities may represent a similar pool of transformed tool and appliance community linked transportation units or securities based on a superset or subset or the plurality of attributes such as vehicle mode make 4015, vehicle mode model type 4025, vehicle model year 4035, cheapest route 1011, single mode 1012, multi modal 1013, fastest route 1014, most scenic 1015, highest rating 1016, most available 1017, highest volume 1018, most frequent 1019, service level 1020, security and safety 1021, group restricted 1022, modes 810, automobile 811, air 812, autonomous vehicle 813, bike 814, boat 815, bus 816, drone 817, limo 818, motorcycle 819, moped 820, shuttle 821, spaceship 822, subway 823, taxi 824, train 825, fastest optimized 826, cheapest route 827, packages 828, cardo 829, virtual 830, order types 710, 720, term specification 600, timing specification 500, virtual hub end point 230 and start point 220, or a plurality of other specifications. In some embodiments, the match of rider price 4214 and driver price 4228 for a transformed tool and appliance community linked transportation unit(s) or securities occurs the lowest price in the driver queue 4228 equals the highest price in the rider queue 4214. In some embodiments, if no such match of prices occur between driver and rider queues for a given specification of a transformed tool and appliance community linked transportation unit or security, then prices remain in the queue until a match or a new order entry re-indexes the order of all the deals because the price is higher than the current highest bid in the rider queue 4214 or the queue entries for the transformed tool and appliance community linked transportation unit or security may become re-indexed to place an order with the appropriate price index ranking in a queue that places the highest rider price 4214 in the top and descends by price 4216, then time of order entry all other things equal. In some embodiments, the driver price queue 4228, 4225 similarly ranks from lowest driver price 4228 at the top of the queue to highest driver price 4228 at the bottom on the queue, then indexing by time subordinate to price for a given pool specification of transformed tool and appliance community linked transportation units or securities. In some embodiments, a plurality of routes 4231 and 4211 may be displayed as price based tool and appliance community linked navigation options indexed by market pricing. In some embodiments, the user may select one, two or many, many more routes as to how many they desire to be displayed as options between their virtual hubs to perform calculations that may maximize the number of tool and appliance community linked transportation units or securities they sell on a given route specification or the prices which they obtain or any combination of specifications or objectives the user may have in the price based navigation method and display of transformed tool and appliance community linked transportation unit or security.

Figure 43:
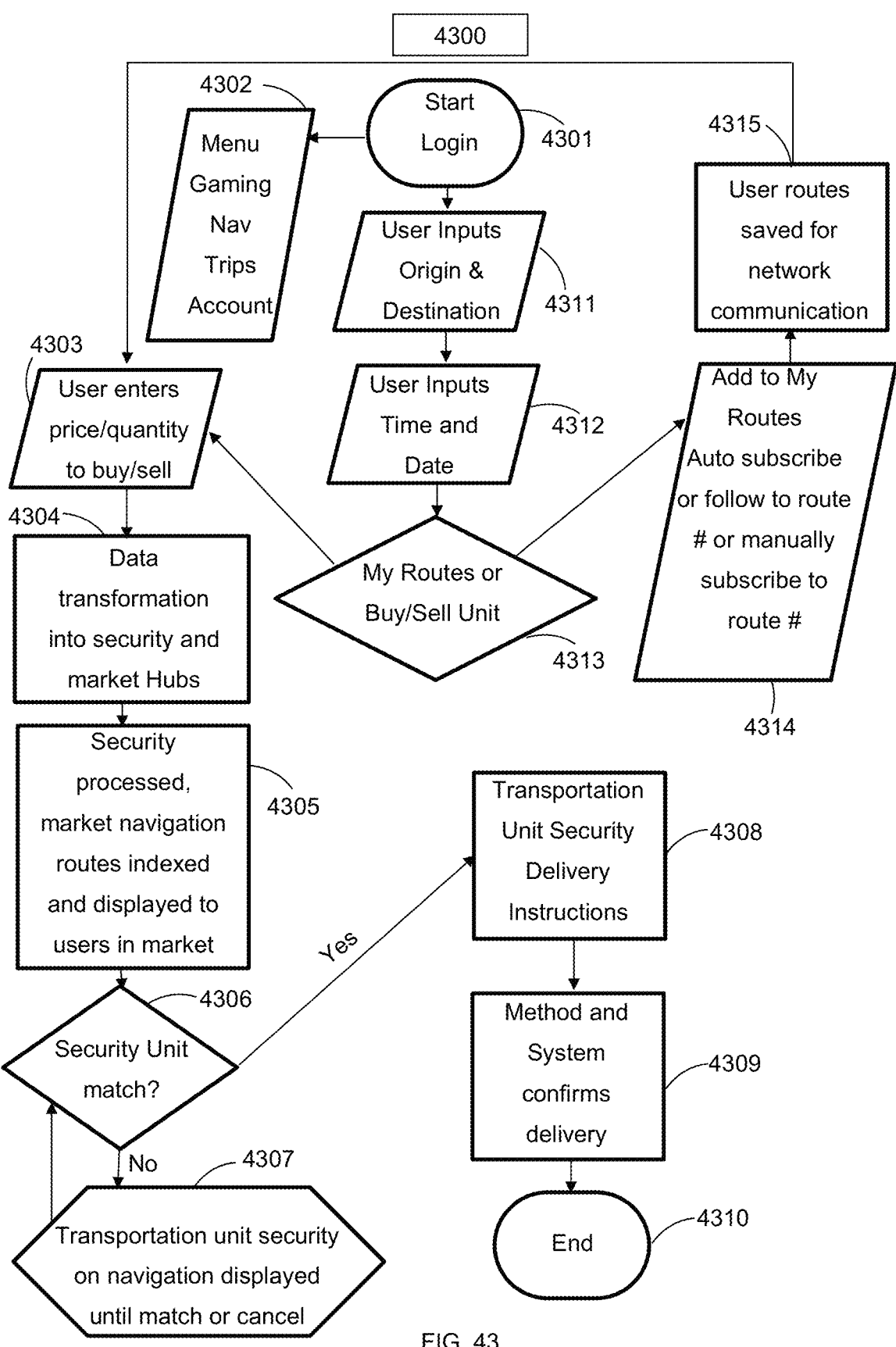
FIG. 43 illustrates an exemplary flow chart of steps in the tool and appliance community linked transportation unit security data transformation and presentation of the transportation unit security with integration to navigation systems with associated price-time priority queues which is another data transformation.

FIG. 43 illustrates an exemplary flow chart 4300 of user 110 experience during a transformed transportation unit or security life cycle. In some embodiments the user 110 may login 4301 to the system which requires the user to go to a plurality of menu options 4302 or user input for origin and destination of tool and appliance community linked virtual hubs 4311 alongside user inputs of time and date 4312 for a given specification that may contain a subset or superset of attributes such as vehicle mode make 4015, vehicle mode model type 4025, vehicle model year 4035, cheapest route 1011, single mode 1012, multi modal 1013, fastest route 1014, most scenic 1015, highest rating 1016, most available 1017, highest volume 1018, most frequent 1019, service level 1020, security and safety 1021, group restricted 1022, modes 810, automobile 811, air 812, autonomous vehicle 813, bike 814, boat 815, bus 816, drone 817, limo 818, motorcycle 819, moped 820, shuttle 821, spaceship 822, subway 823, taxi 824, train 825, fastest optimized 826, cheapest route 827, packages 828, cardo 829, virtual 830, order types 710, 720, term specification 600, timing specification 500, tool and appliance community linked virtual hub end point 230 and start point 220, or a plurality of other specifications. In some embodiments, the user may save a route to the "My Routes" 4313 in "Add My Routes" 4314 whereby the user route is saved in the system for one touch retrieval in the future. In some embodiments, the user may enter a price or quantity to buy or sell a transformed tool and appliance community linked transportation unit or security of a given specification or specification combination 4303 which has many steps involved with the transformation of the tool and appliance community linked transportation unit or security. In some embodiments, additional data transformations occur to process 4305, market navigation route options and indexing 4305, virtual hub or virtual hub combination data transformations 4305, tool and appliance community linked transportation unit transformations 4305 and many other subsets or supersets of transformed transportation unit combinations and combination specifications 4305. In some embodiments, if a transformed tool and appliance community linked transportation unit or security matches 4306 in price and specification, then the transformed tool and appliance community linked transportation unit or security moves into delivery 4308 and the deliver process has many steps of electric signal handoff 4308, 4309 and security checks 4308, 4309, 911 system checks 4308, 4309, GPS server and user 110 position checks 4308, 4309 as well as transportation unit rating checks 4308, 4309 and many other possible checks for all the data elements of the transformed tool and appliance community linked transportation unit or security for verification of delivery 4308, 4309. In some embodiments, if prices of the buyer and seller queue do not match 4307, then the steps of processing 4304, 4305, 4306 repeat until a match is made 4306 to 4308 or an order is cancelled before it expires for the transformed tool and appliance community linked transportation unit or security.

Figure 44:
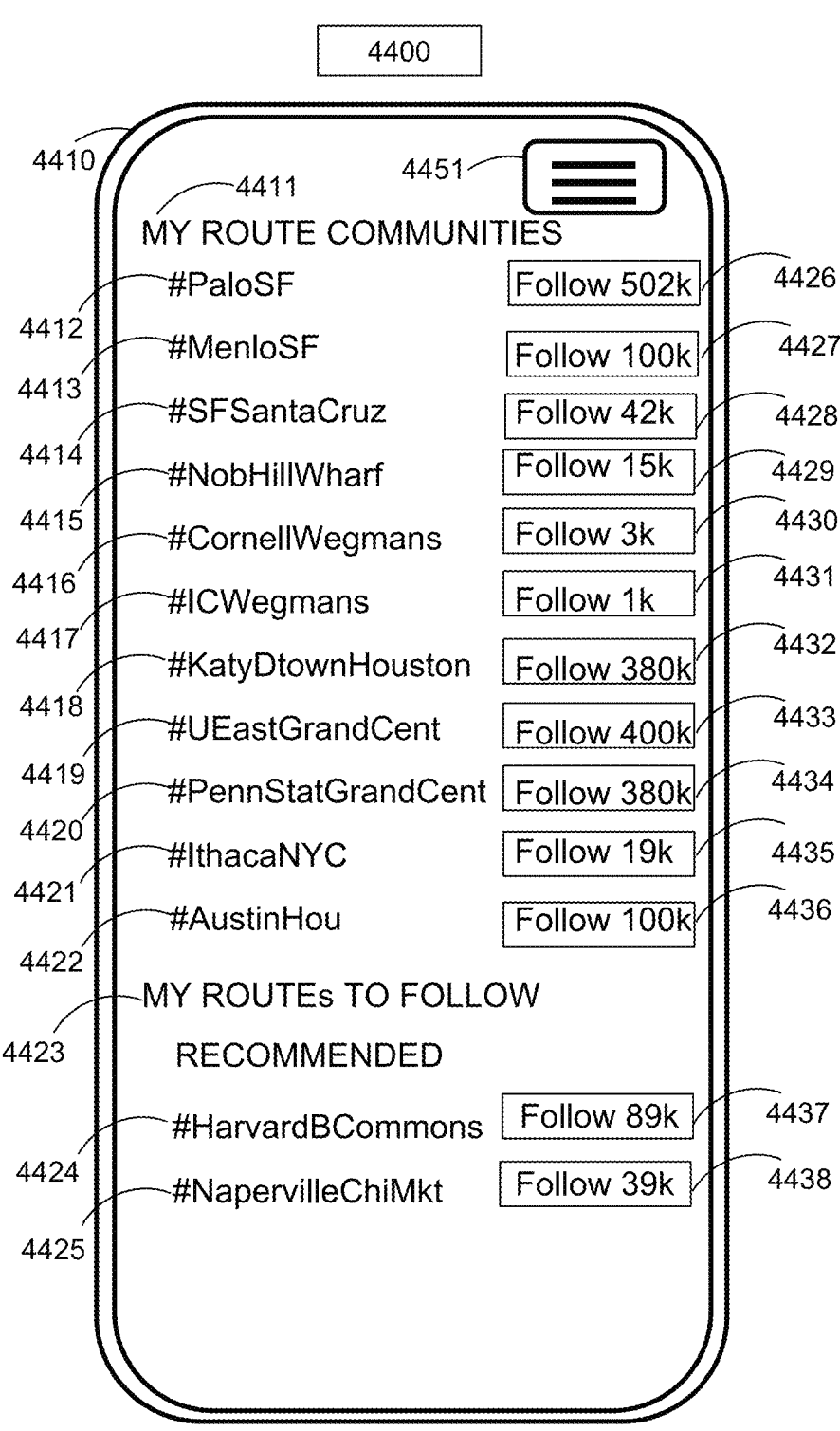
FIG. 44 illustrates an exemplary user interface of tool and appliance community linked virtual hub sequences with associated price-time priority queues as community object (s) to which users may subscribe.

FIG. 44 illustrates an exemplary user interface 4410 for the My Routes Communities functions 4411. In some embodiments, the user interface 4410 may have a menu option 4451 to move to other areas of the method and system. In some embodiments, the virtual tool and appliance community linked transportation hub sequence as an object may be meta data tag #PaloSF 4412 to represent Palo Alto, California to San Francisco, California. In some embodiments, #PaloSF 4412 may have an option for the user 110 to Follow or Join or subscribe, or add 4426 the tool and appliance community linked virtual transportation hub sequence #PaloSF 4412. In some embodiments, the number of followers or network members who are joined to that community object transformed data structure 4412 are 502 k 4426. In some embodiments, the virtual transportation hub sequence as an object may be meta data tag #MenloSF 4413 to represent Menlo Park, California to San Francisco, California. In some embodiments, #MenloSF 4413 may have an option for the user 110 to Follow or Join or subscribe, or add 4427 the virtual tool and appliance community linked transportation hub sequence #MenloSF 4413. In some embodiments, the number of followers or network members who are joined to that community object transformed data structure 4413 are 100 k 4427. In some embodiments, the virtual tool and appliance community linked transportation hub sequence as an object may be meta data tag #SFSantaCruz 4414 to represent San Francisco, California to Santa Cruz, California. In some embodiments, #SFSantaCruz 4414 may have an option for the user 110 to Follow or Join or subscribe, or add 4428 the virtual tool and appliance community linked transportation hub sequence #SFSantaCruz 4414. In some embodiments, the number of followers or network members who are joined to that community object transformed data structure 4414 are 42 k 4428. In some embodiments, the virtual tool and appliance community linked transportation hub sequence as an object may be meta data tag #NobHillWharf 4415 to represent Nob Hill San Francisco, California to Fishermans Wharf, San Francisco, California. In some embodiments, #NobHillWharf 4415 may have an option for the user 110 to Follow or Join or subscribe, or add 4429 the virtual tool and appliance community linked transportation hub sequence #NobHillWharf 4415. In some embodiments, the number of followers or network members who are joined to that community object transformed data structure 4415 are 15 k 4429. In some embodiments, the virtual tool and appliance community linked transportation hub sequence as an object may be meta data tag #CornellWegmans 4416 to represent Cornell University, Ithaca, NY to Wegmans, Ithaca, NY. In some embodiments, #CornellWegmans 4416 may have an option for the user 110 to Follow or Join or subscribe, or add 4430 the virtual tool and appliance community linked transportation hub sequence #CornellWegmans 4416. In some embodiments, the number of followers or network members who are joined to that community object transformed data structure 4416 are 3 k 4430. In some embodiments, the virtual tool and appliance community linked transportation hub sequence as an object may be meta data tag #ICWegmans 4417 to represent Ithaca College, Ithaca, NY to Wegmans, Ithaca, NY. In some embodiments, #ICWegmans 4417 may have an option for the user 110 to Follow or Join or subscribe, or add 4431 the virtual tool and appliance community linked transportation hub sequence #ICWegmans 4417. In some embodiments, the number of followers or network members who are joined to that community object transformed data structure 4417 are 1 k 4431. In some embodiments, the virtual tool and appliance community linked transportation hub sequence as an object may be meta data tag #KatyDtownHouston 4418 to represent Katy, Texas to Houston, Texas. In some embodiments, #KatyDtown-Houston 4418 may have an option for the user 110 to Follow or Join or subscribe, or add 4432 the virtual tool and appliance community linked transportation hub sequence #KatyDtownHouston 4418. In some embodiments, the number of followers or network members who are joined to that community object transformed data structure 4418 are 380 k 4432. In some embodiments, the virtual tool and appliance community linked transportation hub sequence as an object may be meta data tag #UEastGrandCent 4419 to represent Upper East Side, NYC to Grand Central Station, NYC. In some embodiments, #UEastGrandCent 4419 may have an option for the user 110 to Follow or Join or subscribe, or add 4433 the virtual tool and appliance community linked transportation hub sequence #UEastGrandCent 4419. In some embodiments, the number of followers or network members who are joined to that community object transformed data structure 4419 are 400 k 4433. In some embodiments, the virtual transportation hub sequence as an object may be meta data tag #PennStatGrandCent 4420 to represent Penn Station, NYC to Grand Central Station, NYC. In some embodiments, #PennStatGrandCent 4420 may have an option for the user 110 to Follow or Join or subscribe, or add 4434 the virtual tool and appliance community linked transportation hub sequence #PennStatGrandCent 4420. In some embodiments, the number of followers or network members who are joined to that community object transformed data structure 4420 are 280 k 4434. In some embodiments, the virtual transportation hub sequence as an object may be meta data tag #IthacaNYC 4421 to represent Ithaca, NY to Grand Central Station, NYC. In some embodiments, #IthacaNYC 4421 may have an option for the user 110 to Follow or Join or subscribe, or add 4435 the virtual tool and appliance community linked transportation hub sequence #IthacaNYC 4421. In some embodiments, the number of followers or network members who are joined to that community object transformed data structure 4421 are 19 k 4435. In some embodiments, the virtual tool and appliance community linked transportation hub sequence as an object may be meta data tag #AustinHou 4422 to represent Austin, TX to Houston, TX. In some embodiments, #AustinHou 4422 may have an option for the user 110 to Follow or Join or subscribe, or add 4436 the virtual tool and appliance community linked transportation hub sequence #AustinHou 4422. In some embodiments, the number of followers or network members who are joined to that tool and appliance community linked community object transformed data structure 4422 are 100 k 4436. In some embodiments, the virtual tool and appliance community linked transportation hub sequences may be recommended 4423 to follow as an object may be meta data tag #HarvardBCommons 4424 to represent Harvard, Cambridge, Mass to Boston Commons. In some embodiments, #HarvardBCommons 4424 may have an option for the user 110 to Follow or Join or subscribe, or add 4437 the virtual tool and appliance community linked transportation hub sequence #HarvardBCommons 4424. In some embodiments, the number of followers or network members who are joined to that community object transformed data structure 4424 are 89 k 4437. In some embodiments, the virtual tool and appliance community linked transportation hub sequences may be recommended 4423 to follow as an object may be meta data tag #NapervilleChiMkt 4425 to represent Naperville, Chicago to Marketplace, Chicago, Ill. In some embodiments, #NapervilleChiMkt 4425 may have an option for the user 110 to Follow or Join or subscribe, or add 4438 the virtual tool and appliance community linked transportation hub sequence #NapervilleChiMkt 4425. In some embodiments, the number of followers or network members who are joined to that tool and appliance community linked community object transformed data structure 4425 are 39 k 4438.

Figure 45:
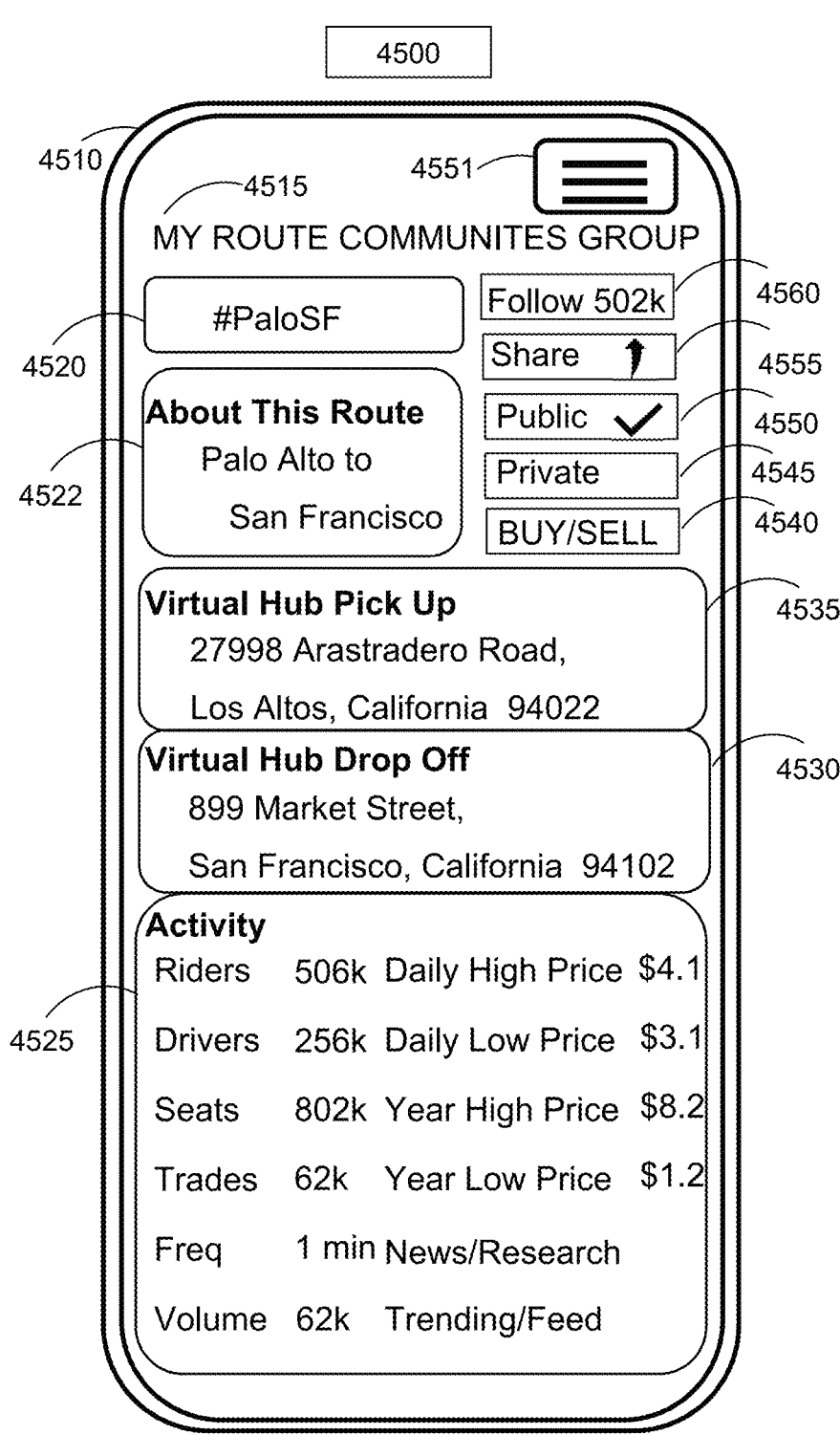
FIG. 45 illustrates an exemplary user interface of an exemplary tool and appliance community linked virtual hub sequence as a community object with associated price-time priority queues and the associated attributes.

FIG. 45 illustrates an exemplary user interface 4500 for the My Routes Communities Group 4515 for a specific transformed data structure of a transformed tool and appliance community linked community virtual hub sequence 4520. In some embodiments, the meta data virtual hub sequence #PaloSF 4520 may list the long form route details in the about the tool and appliance community linked route section 4522. In some embodiments, the specific hub sequence #PaloSF 4520 may list the amount of followers and an option to follow 4560. In some embodiments, the specific hub sequence #PaloSF 4520 may list the ability to share the tool and appliance community linked community group with another social network or text or email or other network protocol. In some embodiments, the specific hub sequence #PaloSF 4520 may list group as public 4550 or private 4545. In some embodiments, the specific hub sequence #PaloSF 4520 may list gateway to buy or sell 4540 transformed transportation units using the LOB 300 for a commute community 241. In some embodiments, the specific hub sequence #PaloSF 4520 may list specific pick up hub address location 4535 or drop off point address 4530. In some embodiments, the specific hub sequence #PaloSF 4520 may list the activity statistics and data with respect to the number of riders 4525, number of drivers 4525, number of seats 4525, number of trades 4525, frequency of tool and appliance community linked transportation units 4525, volume of tool and appliance community linked transportation units 4525, daily high price for transportation units 4525, daily low price for tool and appliance community linked transportation units on the community object of #PaloSF 4520, yearly high price 4525, yearly low price 4525, news, research, trending, feeds for the #PaloSF 4520 virtual hub sequence.

Figure 46:
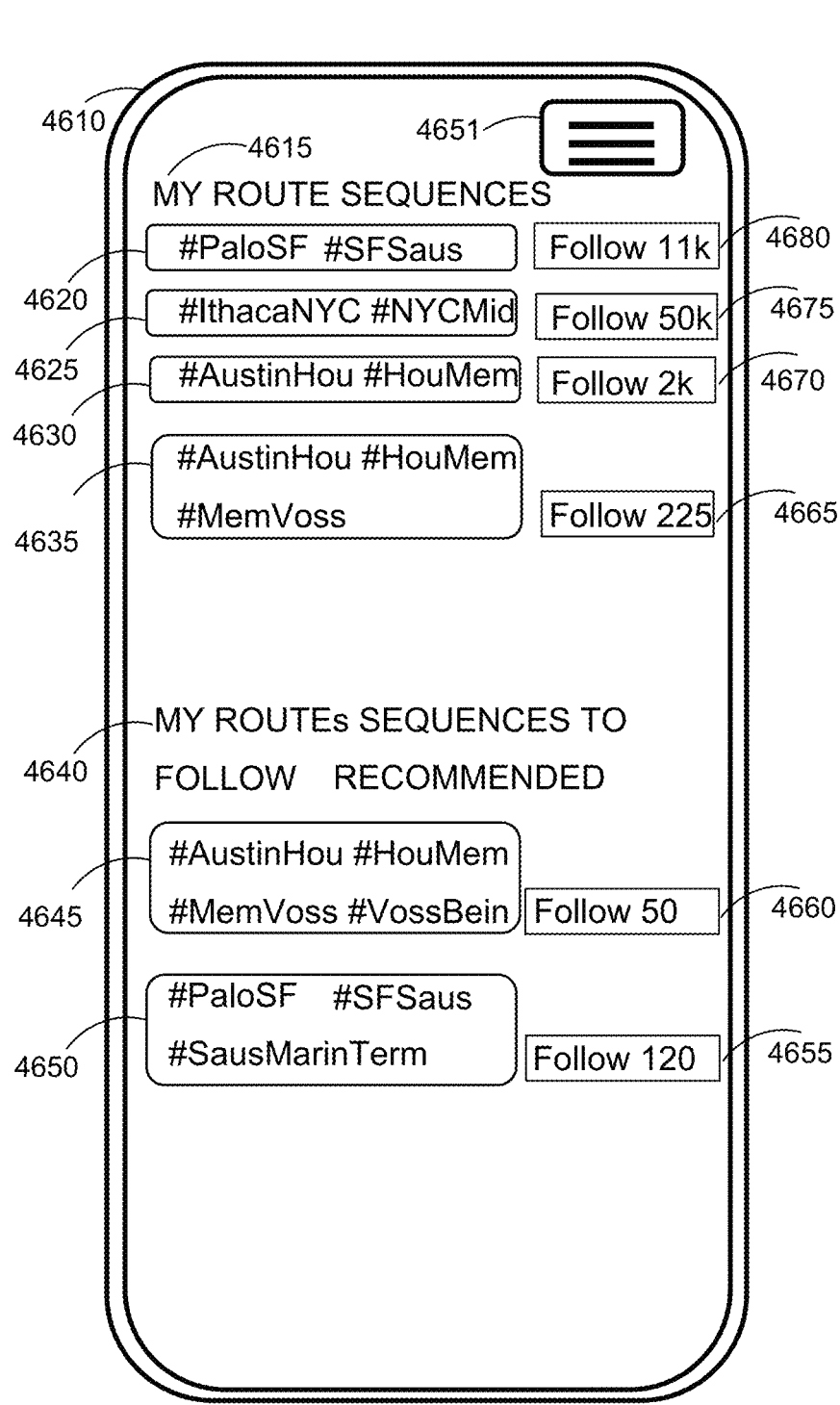
FIG. 46 illustrates an exemplary multi-virtual hub sequence tool and appliance community linked object combination with associated price-time priority queues.

FIG. 46 illustrates an exemplary user interface 4600 with respect to My Route Sequences 4615 which may transform sequences with more than two virtual hubs into sequences as two or three or more series of route sequences 4620. In some embodiments, #PaloSF #SFSaus 4620 may represent an origin virtual hub sequence of Palo Alto, California to San Francisco, California followed by a secondary sequence of San Francisco, California to Sausalito, California 4620. Multi leg virtual hub sequences allow for the power of the data transformation to link the villages, cities or states from a network tool and appliance community linked transportation topology structure from multiple providers of tool and appliance community linked transportation units to provide higher levels of frequency and market opportunity to link public and private systems among many other benefits. In some embodiments, #PaloSF #SFSaus 4620 may allow input from users to join, follow, subscribe or become a member of multi leg sequences which help solve potential last mile issues within tool and appliance community linked transportation systems 4680. In some embodiments, #IthacaNYC #NYCMid 4625, may allow for a tool and appliance community linked transportation unit seller or buyer to connect two disparate tool and appliance community linked transportation networks to provide last mile tool and appliance community linked transportation to a destination at the lowest market cost because each leg or series of tool and appliance community linked virtual hub sequences has an independent market associated with the leg or tool and appliance community linked virtual hub sequence #IthacaNYC #NYCMid 4625. In some embodiments, #IthacaNYC #NYCMid 4625 may allow input from users to join, follow, subscribe or become a member of multi leg sequences which help solve potential last mile issues within tool and appliance community linked transportation systems 4675. In some embodiments, three two leg sequences may be attached through data transformations such that #Austin-Hou then takes a transportation unit to #HouMem which then takes a transportation unit to #MemVoss. The #Austin-Hou #HouMem #MemVoss 4635 three leg virtual hub sequence combination may further solve last mile issues for travelers where public transport may be an issue 4665 or private rides simply are going a different direction, but the sequence tool and appliance community linked community object transformation helps travelers understand options and piece multiple tool and appliance community linked transportation systems onto a single community based object to aggregate communication and transaction benefits of the system. In some embodiments, prior history navigation searches and locations may be used to build recommended additional sequences 4640 which may be recommended for users to subscribe, join, follow or become a member. In some embodiments, the virtual hub route sequence may link 4 or more virtual hub sequence pairs or even combinations of already linked community object pairs 4645. In some embodiments, #AustinHou #HouMem #MemVoss #Voss-Bein 4645 may be linked to provide a last mile sequence to a traveler or driver from Austin to the Memorial Area of Houston in a specific address. Traversing a series of linked trips may allow for the cost of non-linked trips to be dramatically lower due to using a series of connected local tools and appliances rather than a private for hire vehicle which may be 10 times the cost and add a reverse dead head trip that further pollutes the environment and leaves the driver without additional income on the dead head return leg. The transformed virtual hub sequence methodology allows for tool and appliance community linked transportation systems to be integrated in ways that were not formerly possible because the systems were disparate or simply did not allow for linked trips or linked community objects that could optimize topological network structures over existing inefficient structures. In some embodiments, virtual hub sequences which have been linked 4645 may also allow users to subscribe 4660. In some embodiments, #PaloSF #SFSaus #SausMarinTerm 4650 may be linked to provide a last mile sequence to a traveler or driver from Palo Alto, California to Marin Terminal in Sausilito, California in a specific address. In some embodiments, virtual hub sequences which have been linked 4650 may also allow users to subscribe 4655.

Figure 47:
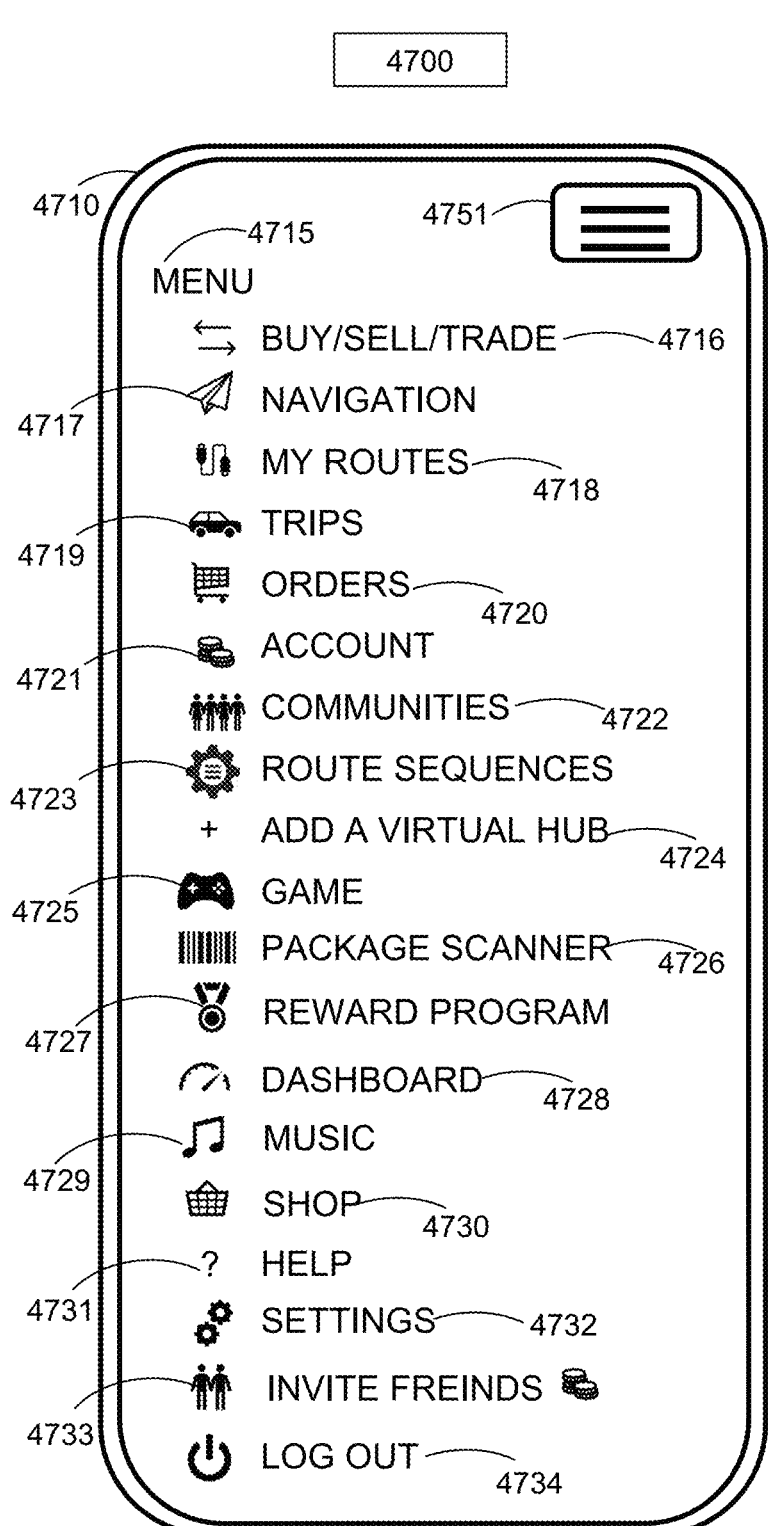
FIG. 47 illustrates an exemplary menu user interface for the method and system of tool and appliance community linked virtual hub transportation sequence unit market with associated price-time priority queues system and method.

FIG. 47 illustrates an exemplary user menu interface 4700. In some embodiments, menu options may list as buy/sell/trade 4716 to go to the tool and appliance community linked transportation unit gateway trading platform for virtual hub combinations and virtual hub sequences. In some embodiments, the user interface may allow a user to go to the navigation 4717 module for price based navigation or route selection based on cost or earnings from a route as described in U.S. patent application Ser. No. 16/242,967, "Price Based Navigation," filed Jan. 8, 2019; the entirety of which is incorporated by reference herein. Furthermore, as described in U.S. patent application Ser. No. 15/877,393, "Electronic Forward market exchange for transportation seats and capacity in transportation spaces and vehicles," filed Jan. 23, 2018, the entirety of which is incorporated by reference herein. In some embodiments, a user 110 may select my routes 4718 to toggle to routes that are important to their user profile or needs in the network member database 222. In some embodiments, trips 4719 may be selected to toggle to the trip delivery view. In some embodiments, orders 4720 may be selected to toggle to cancel or adjust orders in the system that are unfilled. In some embodiments, users may toggle to the account 4721 page or tool and appliance community linked communities object page 4400 or the route sequences page 4723. In some embodiments, users 110 may add additional hubs 4724 or may toggle to the gaming interface 3700. In some embodiments, tool and appliance community linked freight transportation units may need to be scanned on the freight scanning module 4726. In some embodiments, users may select the reward program module 4727 or the dashboard module 4728. In some embodiments, the user may select the music 4729 or shopping module 4730. In some embodiments, the user may select help 4731 or settings 4732 to update account information or privacy settings. In some embodiments, users 110 may invite friends 4733 for rewards or bonuses or cash or credits 4733. In some embodiments, users may also logout 4734.

Figure 48:
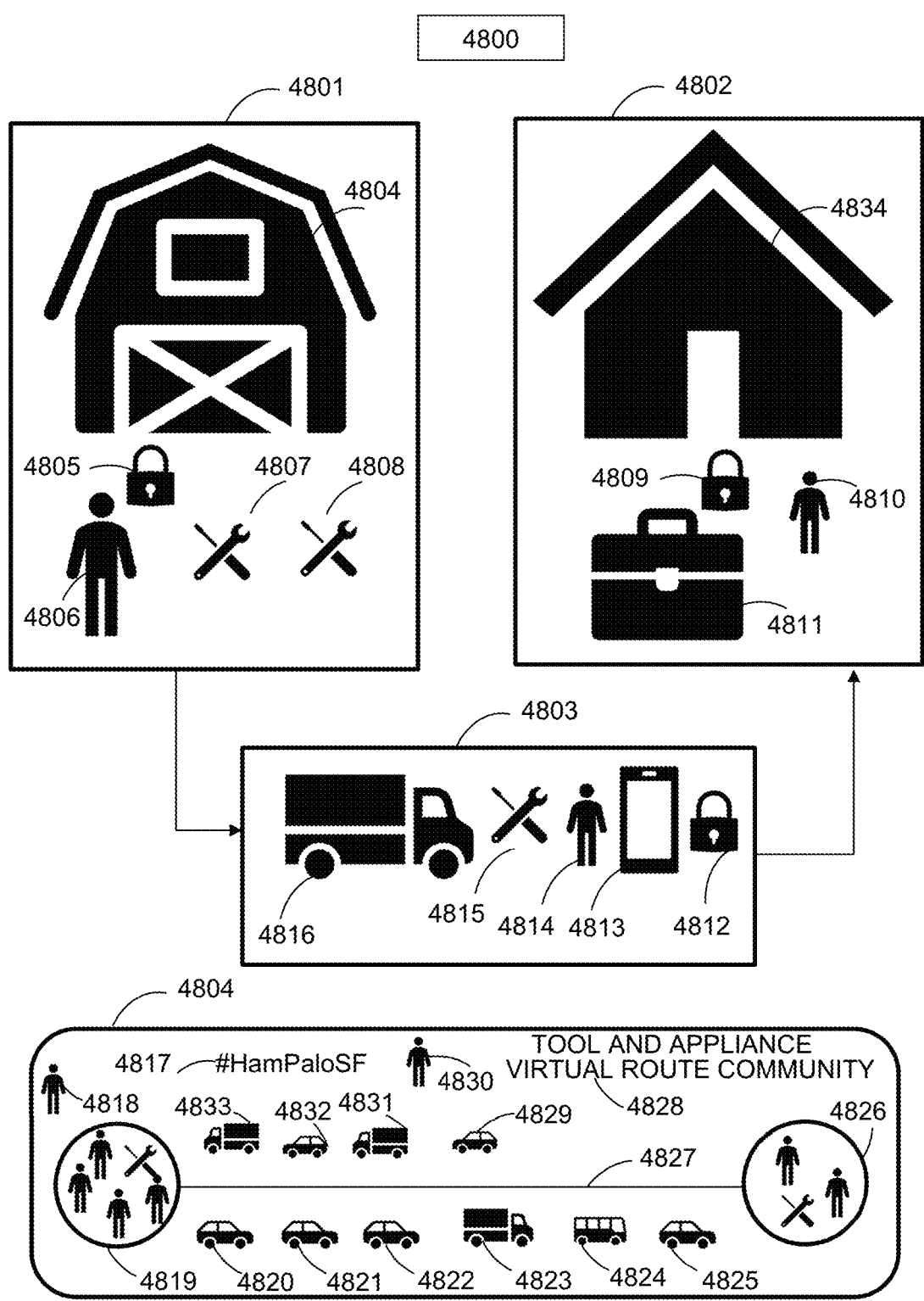
FIG. 48 illustrates an exemplary menu user interface for the method and system of tool and appliance community linked transportation price-time priority queues with delivery security sequence.

FIG. 48 illustrates another exemplary network configuration 4800 module of the disclosed method and system which records the network architecture of a typical tool and appliance community linked object with a price-time priority queue and resulting delivery sequence and integration with the tool and appliance linked virtual community object. In some embodiments, the multi layered network node topology of participating, transacting and/or trading transformed tool and appliance community linked transportation or freight capacity units or securities for tool and appliance community linked objects 4800 includes the following elements, or a subset or superset thereof:

exemplary tool and appliance community object waypoint origin 4801;

exemplary tool and appliance community object waypoint destination 4802;

exemplary tool and appliance community object during transit 4803;

exemplary tool and appliance community object 4804 to which a user may subscribe, join, friend, follow, etc. . . . ;

exemplary barn or tool and appliance community unit storage unit at an tool and appliance community waypoint origin 4804;

exemplary storage security device which electronically locks or unlocks the tool and appliance community object for transport 4805 at waypoint origin;

exemplary tool and appliance community object user at waypoint origin 4806;

exemplary tool and appliance community object unit in the form of an exemplary wrench at the tool and appliance community waypoint origin 4807;

exemplary tool and appliance community object unit in the form of an exemplary screwdriver at the tool and appliance community waypoint origin 4808;

exemplary storage security device which electronically locks or unlocks the tool and appliance community object for transport 4809 at destination waypoint;

exemplary tool and appliance community object user at waypoint destination 4810;

exemplary tool and appliance community delivery lock box at waypoint destination 4811 for tool and appliance community unit;

exemplary tool and appliance community unit transport vehicle in transit between origin and destination waypoint 4816;

exemplary tool and appliance community unit in transit between origin and destination waypoint 4815;

exemplary tool and appliance community unit transport driver in transit between origin and destination waypoint 4814;

exemplary tool and appliance community unit transport mobile computer device method and system interface in transit between origin and destination waypoint 4813;

exemplary tool and appliance community unit transport mobile computer device method and system security interface in transit between origin and destination waypoint 4812;

exemplary tool and appliance community object tag between origin and destination waypoint(s) for a specified tool and appliance community object such as a hammer 4817;

exemplary tool and appliance community linked transport unit user at origin waypoint 4818;

exemplary tool and appliance community linked virtual transport route object 4828;

exemplary tool and appliance community linked transport user 4830;

exemplary tool and appliance community linked object origin waypoint 4819 with users and tool and appliance units;

exemplary tool and appliance community linked object destination waypoint 4826 with users and tool and appliance units;

exemplary tool and appliance community virtual route user 4830;

exemplary tool and appliance community linked object unit transport vehicles on an exemplary waypoint combination 4833, 4832, 4831, 4829, 4820, 4821, 4822, 4823, 4824, 4825.

In some embodiments, users 4806, 4810, 4814, 4818, 4830, 4819, 4826 may follow or subscribe or friend a tool and appliance community linked virtual route 4828 for a particular tool and appliance unit 4817 such as a hammer by example, but not limited by example. In some embodiments, the tool and appliance community linked transport unit 4817 may be comprised of such as hammers, wrenches, saws, knives, flashlights, power saws, power drills, blenders, coffee makers, pots, pans, power tools, ladders, or other tool and appliance varieties. In some embodiments, the tool and appliance community linked transport unit 4817 may be comprised of wrenches 4808, hammers, wrenches, saws, knives, flashlights, power saws, power drills, blenders, coffee makers, pots, pans, power tools, ladders or other tools and appliances. In some embodiments, the tool and appliance community linked transport unit user may be a community member 4806 who owns tool inventory 4807 or appliance inventory 4808 at a waypoint origin 4819 and desires to participate or transact in the price-time priority queue 300 for a certain tool and appliance unit 4807 on a waypoint sequence 4819, 4826 or 4801, 4802. In some embodiments, the tool and appliance community linked transport unit user may be an end consumer, restaurant, hotel, carpenter or other end user 4810 who desires to participate in the price-time priority queue 300 for certain tool and appliance units 4807, 4808. In some embodiments, the end user 4810 or origin owner 4806 of the tool and appliance community linked object with waypoints 4804 may use a mobile or fixed or visual or audio interface computer unit 4813 to enter price-time priority queue 300 based transactions for tool and appliance units 4807, 4808, 4819, 4826, 4815 along an tool and appliance community linked waypoint combination path 4827. In some embodiments, tool and appliance virtual route communities may serve as virtual rental markets 4804 with associated price time priority queues 300 and GPS tracking of the tool and appliance units 4807, 4808, 4819, 4826, 4815 through the scanning of tool and appliance units 2600 at tool and appliance unit waypoint origin 4801, waypoint destination 4802, or along the waypoint sequence path 4803. In some embodiments, the user 4806 may transfer tool and appliance units 4807, 4808 by using the scan feature 2600 of the mobile or fixed or visual or audio interface computer unit 4813 to a tool and appliance community linked transport user 4814 in the tool and appliance community linked vehicle 4816 as a security authorized transaction participant 4812 of the price-time priority queue 300 of the tool and appliance community linked transport unit 4815. In some embodiments, the tool and appliance community linked transport unit 4815 may be delivered to an end user 4810 at an end user destination waypoint 4834 by using the mobile or fixed or visual or audio interface computer unit 4813 unlock sequence 4809 interface to deliver the tool and appliance community linked transport unit 4815 to a secure 4809 delivery storage unit 4811. In some embodiments, scanning procedures 2600 of the mobile or fixed or visual or audio interface computer unit 4813 may comprise secure transfer and records or the tool and appliance community linked transport unit 4815 for both pickup transfer at the tool and appliance community unit object origin 4801, waypoint combination transfer transport 4803 and waypoint destination delivery 4802.

Figure 49:
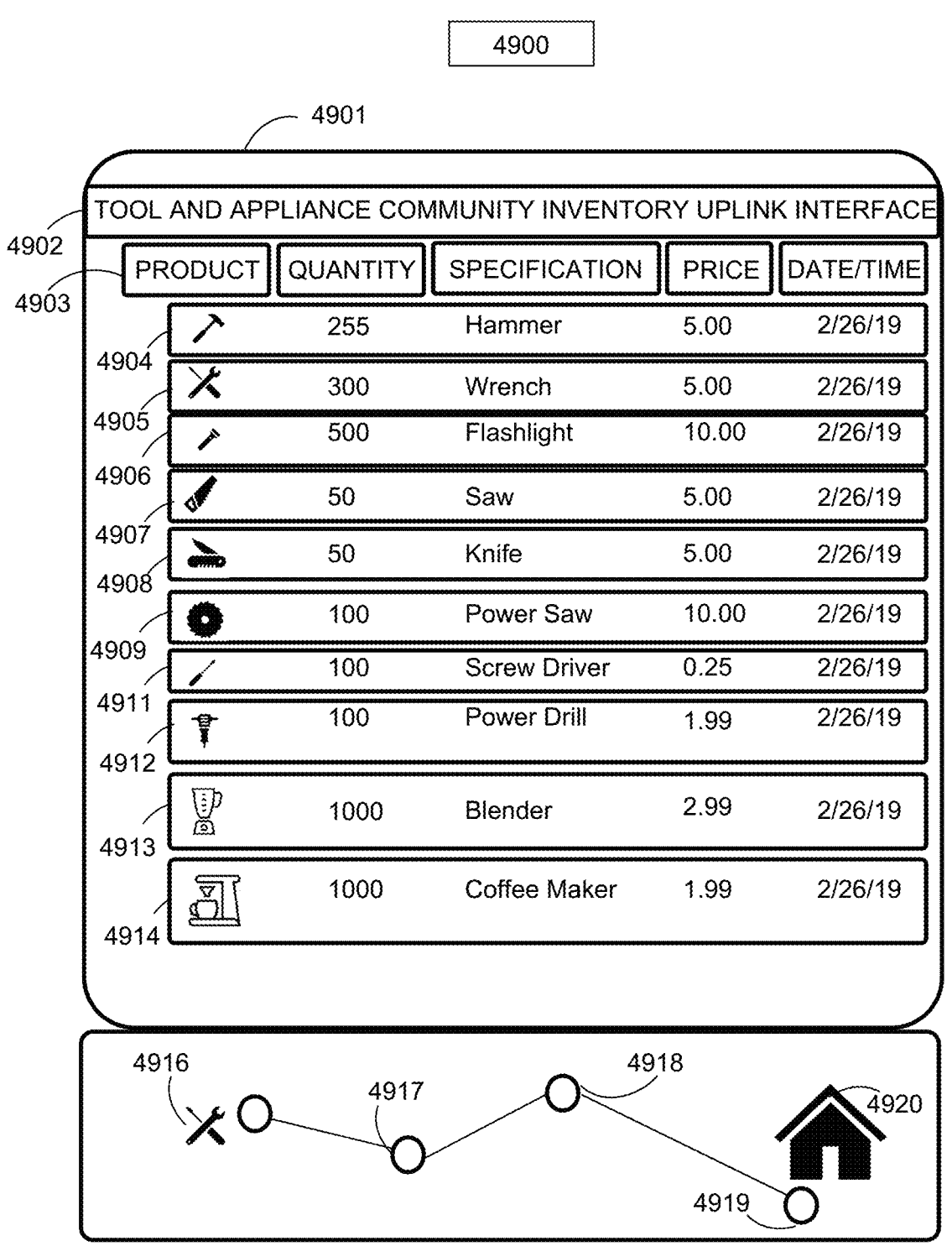
FIG. 49 illustrates an exemplary tool and appliance unit uplink inventory interface with tool and appliance community linked virtual hub transportation sequence unit market system and method with associated price-time priority queues.

FIG. 49 illustrates an exemplary tool and appliance community inventory uplink interface 4900 of the disclosed method and system which may be user to upload tool and appliance community linked transport unit inventory to the tool and appliance linked virtual community object. In some embodiments, the uplink element of the multi layered network node topology of participating, transacting and/or trading transformed tool and appliance community linked transportation or freight capacity units or securities for tool and appliance community linked objects 4900 includes the following elements, or a subset or superset thereof:

exemplary tool and appliance community object unit uplink interface 4901 for tool and appliance unit inventory automation;

exemplary tool and appliance community object unit product type, quantity, specification, price, date and time 4903;

exemplary tool and appliance community unit object of a hammer 4904 with a plurality of specifications;

exemplary tool and appliance community unit object of a wrench 4905 with a plurality of specifications;

exemplary tool and appliance community unit object of a flashlight 4906 with a plurality of specifications;

exemplary tool and appliance community unit object of a saw 4907 with a plurality of specifications;

exemplary tool and appliance community unit object of a knife 4908 with a plurality of specifications;

exemplary tool and appliance community unit object of a power saw 4909 with a plurality of specifications;

exemplary tool and appliance community unit object of a screw driver 4911 with a plurality of specifications;

exemplary tool and appliance community unit object of a power drill 4912 with a plurality of specifications;

exemplary tool and appliance community unit object of a blender 4913 with a plurality of specifications;

exemplary tool and appliance community unit object of a coffee maker 4914 with a plurality of specifications;

exemplary tool and appliance community unit object at origin waypoint 4916;

exemplary tool and appliance community linked transport unit object transfer or bypass waypoint 4917;

exemplary tool and appliance community linked transport unit object transfer or bypass waypoint 4918;

exemplary tool and appliance community linked transport unit object destination waypoint 4919 and storage delivery unit 4920;

In some embodiments, the method and system of tool and appliance community linked transport units 4916 with tool and appliance community linked transport price-time priority queues 300 may utilize an uplink module interface 4901 to upload tool and appliance unit inventory 4901 to the tool and appliance community linked transport unit object which may also be a form of a virtual rental market interface to users of the method and system. In some embodiments, the tool and appliance may include a subset or superset of the following tool and appliance unit examples but not limiting by example: hammers 4904, wrenches 4905, flashlights 4906, saws 4907, knives 4908, power saws 4909, screw drivers 4911, power drills 4912, blenders 4913, coffee makers 4914 or a plurality of other tool and appliance units common to the tool and appliance market. In some embodiments, the tool and appliance units may include specifications and specification profiles in the specifications to standardize the units in the data transformations of the tool and appliance units 4916.

Figure 50:
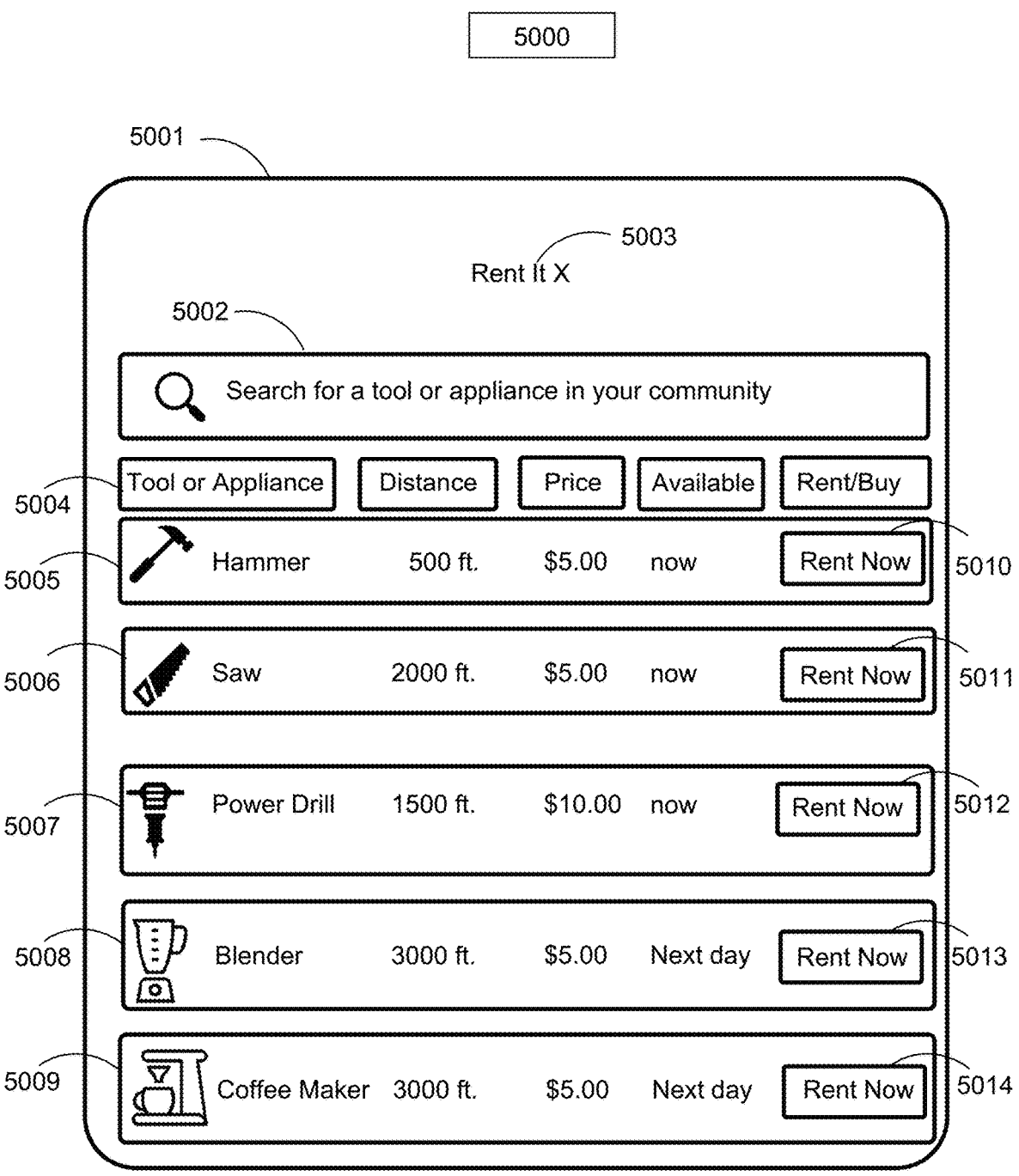
FIG. 50 illustrates an exemplary tool and appliance unit search interface with the tool and appliance community linked virtual hub transportation sequence unit market with associated price-time priority queues.

FIG. 50 illustrates an exemplary tool and appliance community search interface 5000 of the disclosed method and system which may be user to search for a tool or appliance community linked transport unit inventory to the tool and appliance linked virtual community object. In some embodiments, the search element of the multi layered network node topology of participating, transacting and/or trading transformed tool and appliance community linked transportation or freight capacity units or securities for tool and appliance community linked objects 4900 includes the following elements, or a subset or superset thereof:

exemplary tool and appliance community unit object search interface mobile or fixed or audio computer unit 5001;

exemplary tool and appliance community unit object search interface title 5003;

exemplary tool and appliance community unit object search interface for user tool and appliance search input 5002;

exemplary tool and appliance community unit object category title header such as tool or appliance, distance to tool and appliance, price of tool or appliance, availability of tool or appliance, rent or buy option for associated price-time priority queue of tool or appliance 5004;

exemplary tool and appliance community unit object of a hammer 5005 with a distance of 500 feet from the user at a price of $5.00 in the price-time priority queue with an immediate availability and an associated rent or buy now option button 5010;

exemplary tool and appliance community unit object of a saw 5006 with a distance of 2000 feet from the user at a price of $5.00 in the price-time priority queue with an immediate availability and an associated rent or buy now option button 5011;

exemplary tool and appliance community unit object of a power drill 5007 with a distance of 1500 feet from the user at a price of $10.00 in the price-time priority queue with an immediate availability and an associated rent or buy now option button 5012;

exemplary tool and appliance community unit object of a blender 5008 with a distance of 3000 feet from the user at a price of $5.00 in the price-time priority queue with an immediate availability and an associated rent or buy now option button 5013;

exemplary tool and appliance community unit object of a coffee maker 5009 with a distance of 3000 feet from the user at a price of $5.00 in the price-time priority queue with an immediate availability and an associated rent or buy now option button 5014.

In some embodiments, the search function 5002 for the tool and appliance community object 4804 with a price-time priority queue auction indexes the search result with the following prioritization of first the tool or appliance, then second the distance of the tool or appliance from the user in the community object sequence, then by price-time priority. In some embodiments, the search function may prioritize as a second priority price-time prioritization followed by distance as a third index ranking. In some embodiments, the search function 5002 may provide instructions for the graphical user interface 5001 to state if availability of the tool or appliance is immediately available, available the next day or available a plurality of other time and date designations. In some embodiments, the tool and appliance community object 5005 may state only the lowest price $5.00 of the then current price-time priority queue 300 for the specific object requested in the search function 5002. In some embodiments, the tool or appliance may be a hammer 5005, a saw 5006, a power drill 5007, a blender 5008, a coffee maker 5009 or a plurality of other alternative tools and appliances. In some embodiments, the specific tool or appliance may have a buy now or rent now 5010 button. In some embodiments, rare tools or appliances community objects 4804 may require long transport distances over air 812 or sea 815 or road 811 or a plurality of other transport options for the waypoint sequence of the associated tool or appliance community object. In some embodiments, the rent now button 5010 instantiates the instructions for allow the application to consummate a transaction with geolocation and step by step delivery instructions 900, 2100, 2200, 2300 with the user interface as shown from the match of the user who owns the tool or appliance the user who seeks to rent or buy the tool or appliance.

The aforementioned description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
receiving origin location data and destination location data from at least a subset of a plurality of users, wherein the origin location data corresponds to geographic origins and the destination location data corresponds to geographic destinations;

tracking the origin location data and the destination location in real-time from respective satellite navigation systems;

receiving updates of the origin location data and the destination location data in real-time;

determining a plurality of virtual hubs based on the origin location data and the destination location data, wherein the plurality of virtual hubs comprises one or more origin virtual hubs determined based on the origin location data and one or more destination virtual hubs determined based on the destination location data;

determining a plurality of virtual hub routes based on the plurality of virtual hubs, wherein a respective virtual hub route corresponds to a geographic route from a location corresponding to a respective origin virtual hub to a location corresponding to a respective destination virtual hub;

receiving tool appliance attribute data from the plurality of users, wherein the tool appliance attribute data corresponds to one or more attributes of one or more tool appliance products available for purchase or rental from the plurality of users using the plurality of virtual hub routes;

generating one or more tool appliance units based on the tool appliance attribute data, wherein the tool appliance attribute data provides fungibility between first and second tool appliance units of the one or more tool appliance units, wherein a respective tool appliance unit represents a fungible forward market contract for one or more of the tool appliance products traveling along one or more of the plurality of virtual hub routes; and generating a tool appliance forward market platform for trading the one or more tool appliance units based on the plurality of virtual hub routes and the tool appliance attribute data, comprising:

generating one or more graphical layers to be super-imposed onto a navigational map interface being displayed by a respective user device, wherein the navigational map interface being displayed includes visualizations of at least first and second virtual hub routes of the plurality of virtual hub routes.

2. The method of claim 1, wherein:

the tool appliance attribute data comprises data corresponding to product type, product quantity, product specification, product price, product availability, or combinations thereof;

the one or more graphical layers correspond to a network node topology for the tool appliance forward market platform; and a respective node of the network node topology corresponds to a virtual hub of the plurality of virtual hubs.

3. The method of claim 1, wherein the one or more tool appliance products comprise:

one or more hammers, one or more wrenches, one or more saws, one or more knives, one or more flashlights, one or more power saws, one or more power drills, one or more blenders, one or more coffee makers, one or more pots, one or more pans, one or more power tools, one or more ladders, or combinations thereof.

4. The method of claim 1, further comprising:

generating a plurality of route groups based on the plurality of virtual hub routes and the tool appliance attribute data; and generating a forward commodity contract between a first user and the second user of the plurality of users based on the received tool appliance attribute data, wherein the forward commodity contract comprises one or more conditional attributes to provide substitutability between the first and second tool appliance units, wherein the one or more conditional attributes comprise cost of cover, liquidated damages, or force majeure; and wherein the first and second tool appliance units comprise a uniform specification.

5. The method of claim 1, further comprising:

receiving transaction input data from one or more of the plurality of users, wherein the transaction input data comprises data corresponding to one or more bid prices and one or more offer prices for the one or more tool appliance units, acceptance of a respective bid price or a respective offer price, or combinations thereof.

6. The method of claim 5, further comprising:

generating an interface on the respective user device, wherein the interface is configured to receive the transaction input data, and wherein the transaction input data further comprises fixed input data, visual input data, audio input data, or combinations thereof.

7. The method of claim 1, further comprising:

generating a priority queue of the one or more tool appliance units using the tool appliance forward market platform, wherein the priority queue orders the one or more tool appliance units based on product type, product quantity, product specification, product price, product availability, or combinations thereof.

8. The method of claim 1, further comprising:

detecting, at respective user interfaces of the plurality of users, user network logins of the user interfaces using one or more of facial recognition, fingerprint recognition and photo-scan security for authentication, wherein the respective virtual hub route comprises one or more additional locations along the geographic route, and wherein the one or more additional locations correspond to one or more additional virtual hubs.

9. A computing system, comprising:

one or more processors; and one or more memory comprising program instructions executable by the one or more processors to:

receive origin location data and destination location data from at least a subset of a plurality of users, wherein the origin location data corresponds to geographic origins and the destination location data corresponds to geographic destinations;

determine a plurality of virtual hubs based on the origin location data and the destination location data, wherein the plurality of virtual hubs comprises one or more origin virtual hubs determined based on the origin location data and one or more destination virtual hubs determined based on the destination location data;

determine a plurality of virtual hub routes based on the plurality of virtual hubs, wherein a respective virtual hub route corresponds to a geographic route from a location corresponding to a respective origin virtual hub to a location corresponding to a respective destination virtual hub;

receive tool appliance attribute data from the plurality of users, wherein the tool appliance attribute data corresponds to one or more attributes of one or more tool appliance products available for purchase or rental from the plurality of users using the plurality of virtual hub routes;

generate one or more tool appliance units based on the tool appliance attribute data, wherein the tool appliance attribute data provides fungibility between first and second tool appliance units of the one or more tool appliance units, wherein a respective tool appliance unit represents a fungible forward contract for one or more of the tool appliance products traveling along one or more of the plurality of virtual hub routes;

detect, at respective user interfaces of the plurality of users, user network logins of the user interfaces using one or more of facial recognition, fingerprint recognition and photo-scan security for authentication; and generate a tool appliance forward market platform for trading the one or more tool appliance units based on the plurality of virtual hub routes and the tool appliance attribute data, comprising:

generate one or more graphical layers to be superimposed onto a navigational map interface of a respective user interface being displayed by a respective user device, wherein the navigational map interface being displayed includes visualizations of at least first and second virtual hub routes of the plurality of virtual hub routes, wherein:

the respective virtual hub route comprises one or more additional locations along the geographic route, and wherein the one or more additional locations correspond to one or more additional virtual hubs.

10. The computing system of claim 9, wherein the tool appliance attribute data comprises data corresponding to product type, product quantity, product specification, product price, product availability, or combinations thereof.

11. The computing system of claim 9, wherein the one or more tool appliance products comprise one or more hammers, one or more wrenches, one or more saws, one or more knives, one or more flashlights, one or more power saws, one or more power drills, one or more blenders, one or more coffee makers, one or more pots, one or more pans, one or more power tools, one or more ladders, or combinations thereof.

12. The computing system of claim 9, wherein the one or more memory further comprises program instructions executable by the one or more processors to generate a plurality of route groups based on the plurality of virtual hub routes and the tool appliance attribute data.

13. The computing system of claim 9, wherein the one or more memory further comprises program instructions executable by the one or more processors to receive transaction input data from the plurality of users, wherein the transaction input data comprises data corresponding to one or more bid prices and one or more offer prices for the one or more tool appliance units, acceptance of a respective bid price or a respective offer price, or combinations thereof.

14. The computing system of claim 13, wherein the one or more memory further comprises program instructions executable by the one or more processors to generate an interface on the respective computing device, wherein the interface is configured to receive the transaction input data, and wherein the transaction input data further comprises fixed input data, visual input data, audio input data, or combinations thereof.

15. The computing system of claim 9, wherein the one or more memory further comprises program instructions executable by the one or more processors to generate a priority queue of the one or more tool appliance units using the tool appliance forward market platform, wherein the priority queue orders the one or more tool appliance units based on product type, product quantity, product specification, product price, product availability, or combinations thereof.

16. A non-transitory computer-readable medium having stored thereon a plurality of computer-executable instructions which, when executed by a computer, cause the computer to:

receive origin location data and destination location data from at least a subset of a plurality of users, wherein the origin location data corresponds to geographic origins and the destination location data corresponds to geographic destinations;

determine a plurality of virtual hubs based on the origin location data and the destination location data, wherein the plurality of virtual hubs comprises one or more origin virtual hubs determined based on the origin location data and one or more destination virtual hubs determined based on the destination location data;

determine a plurality of virtual hub routes based on the plurality of virtual hubs, wherein a respective virtual hub route corresponds to a geographic route from a location corresponding to a respective origin virtual hub to a location corresponding to a respective destination virtual hub;

receive tool appliance attribute data from the plurality of users, wherein the tool appliance attribute data corresponds to one or more attributes of one or more tool appliance products available for purchase or rental from the plurality of users using the plurality of virtual hub routes;

generate one or more tool appliance units based on the tool appliance attribute data, wherein the tool appliance attribute data provides fungibility between first and second tool appliance units of the one or more tool appliance units, wherein a respective tool appliance unit represents a fungible forward market contract for one or more of the tool appliance products traveling along one or more of the plurality of virtual hub routes;

detect, at respective user interfaces of the plurality of users, user network logins of the user interfaces using one or more of facial recognition, fingerprint recognition and photo-scan security for authentication;

generate a tool appliance forward market platform for trading the one or more tool appliance units based on the plurality of virtual hub routes and the tool appliance attribute data, comprising:

generate one or more graphical layers to be superimposed onto a navigational map interface being displayed by a respective user device, wherein the navigational map interface being displayed includes visualizations of at least first and second virtual hub routes of the plurality of virtual hub routes.

17. The non-transitory computer-readable medium of claim 16, wherein the tool appliance attribute data comprises data corresponding to product type, product quantity, product specification, product price, product availability, or combinations thereof.

18. The non-transitory computer-readable medium of claim 16, wherein the one or more tool appliance products comprise one or more hammers, one or more wrenches, one or more saws, one or more knives, one or more flashlights, one or more power saws, one or more power drills, one or more blenders, one or more coffee makers, one or more pots, one or more pans, one or more power tools, one or more ladders, or combinations thereof.

19. The non-transitory computer-readable medium of claim 16, wherein the respective virtual hub route comprises one or more additional locations along the geographic route, and wherein the one or more additional locations correspond to one or more additional virtual hubs.

20. The method of claim 1, wherein the fungible forward market contract comprises:

metadata specifying at least:

(i) a product specification identifier;

(ii) a delivery time window corresponding to the respective virtual hub route;

(iii) a quantity indicator for the one or more tool appliance products; and (iv) a designated origin and destination virtual hub; and wherein the tool appliance forward market platform is configured to execute a transaction by matching a bid price and an offer price for the fungible forward market contract using a time-prioritized order book.

* * * * *